(12) United States Patent
Reid et al.

(10) Patent No.: US 12,032,068 B2
(45) Date of Patent: *Jul. 9, 2024

(54) SATELLITE CONSTELLATION SYSTEM FOR TRANSMITTING A NAVIGATION SIGNAL

(71) Applicant: Xona Space Systems Inc., San Mateo, CA (US)

(72) Inventors: Tyler Gerald René Reid, Vancouver (CA); Brian Manning, San Mateo, CA (US)

(73) Assignee: Xona Space Systems Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,099

(22) Filed: Apr. 18, 2023

(65) Prior Publication Data

US 2024/0134055 A1    Apr. 25, 2024

Related U.S. Application Data

(63) Continuation of application No. 17/235,479, filed on Apr. 20, 2021, now Pat. No. 11,668,834, which is a
(Continued)

(51) Int. Cl.
*G01S 19/02*    (2010.01)
(52) U.S. Cl.
CPC .................................. *G01S 19/02* (2013.01)
(58) Field of Classification Search
CPC ......... G01S 19/02; G01S 19/07; G01S 19/258
See application file for complete search history.

(56) References Cited

U.S. PATENT DOCUMENTS

| 6,329,950 B1 | 12/2001 | Harrell et al. |
| 10,048,382 B2 | 8/2018 | Yunck |

(Continued)

FOREIGN PATENT DOCUMENTS

| CN | 109001763 | 12/2018 |
| CN | 109001763 A | 12/2018 |

(Continued)

OTHER PUBLICATIONS

Albulet (Dec. 20, 2016. SpaceX Non-Geostationary Satellite System Attachment a Technical in Formation to Supplement Schedule S. GeekWire. http:l/web.archive.org/web/20161115000000*/https://cdn.geekwire.com/wp-content/uploads/2016/11/Technicai-Attachment.pdf) (Year: 2016).

(Continued)

*Primary Examiner* — Bernarr E Gregory
*Assistant Examiner* — Hailey R Le
(74) *Attorney, Agent, or Firm* — Garlick & Markison; Bruce E. Stuckman

(57) ABSTRACT

A satellite orbiting in one of a plurality of orbital planes of a satellite constellation system at an altitude range corresponding to low earth orbit includes at least one processor configured to generate satellite state data, and to generate a navigation signal based on the satellite state data. The satellite includes at least one transmitter configured to transmit the navigation signal for receipt by at least one client device on earth. Each of the plurality of orbital planes includes a corresponding one of a plurality of satellite subsets of a plurality of satellites of the satellite constellation system. Each of the plurality of orbital planes is within the altitude range, and the plurality of orbital planes includes a set of inclined orbital planes at a non-polar inclination.

20 Claims, 56 Drawing Sheets

Related U.S. Application Data continuation-in-part of application No. 16/804,961, filed on Feb. 28, 2020, now Pat. No. 11,513,232.

(60) Provisional application No. 62/853,398, filed on May 28, 2019.

(56) References Cited

U.S. PATENT DOCUMENTS

| | | |
|---|---|---|
| 10,627,524 B2 | 4/2020 | Bennett et al. |
| 10,875,668 B2 | 12/2020 | Bigras et al. |
| 10,903,900 B2 | 1/2021 | Heiman |
| 2002/0177403 A1 | 11/2002 | LaPrade |
| 2006/0208941 A1 | 9/2006 | Ring et al. |
| 2007/0072603 A1 | 3/2007 | Wang |
| 2008/0001818 A1 | 1/2008 | Cohen |
| 2008/0002981 A1 | 1/2008 | Valley |
| 2010/0312531 A1 | 12/2010 | Korb |
| 2013/0065514 A1 | 3/2013 | Whelan et al. |
| 2013/0332072 A1 | 12/2013 | Janky et al. |
| 2014/0266880 A1 | 9/2014 | Farrokhi |
| 2015/0084766 A1 | 3/2015 | Cordaro et al. |
| 2015/0192696 A1 | 7/2015 | Platzer |
| 2016/0011318 A1 | 1/2016 | Cohen |
| 2016/0252623 A1 | 9/2016 | Zuber |
| 2017/0245185 A1 | 8/2017 | Chuberre et al. |
| 2018/0120442 A1 | 5/2018 | Powe |
| 2018/0210090 A1 | 7/2018 | Soualle |
| 2018/0376392 A1 | 12/2018 | Wu |
| 2019/0181946 A1 | 6/2019 | Wendling |
| 2019/0271782 A1 | 9/2019 | Liu et al. |
| 2020/0014460 A1 | 1/2020 | Tong et al. |
| 2020/0218202 A1 | 7/2020 | Nozawa |
| 2020/0379118 A1 | 12/2020 | Reid et al. |
| 2021/0223406 A1 | 7/2021 | Mu |
| 2021/0239855 A1 | 8/2021 | Mu |
| 2021/0247519 A1 | 8/2021 | Reid et al. |
| 2021/0278549 A1 | 9/2021 | Kassas |
| 2022/0030032 A1 | 1/2022 | Poetter |
| 2022/0081132 A1* | 3/2022 | Mukae ............... B64G 3/00 |
| 2022/0350032 A1 | 11/2022 | Gick |

FOREIGN PATENT DOCUMENTS

| | | |
|---|---|---|
| CN | 109061677 A | 12/2018 |
| CN | 108919312 | 11/2023 |
| WO | 20141211967 A2 | 8/2014 |

OTHER PUBLICATIONS

Anderson, et al.; "Low Earth Orbit Navigation Systems (LEONS): Scalable GNSS-Independent Time Transfer and Positioning for Space Users"; Proceedings of the 2023 International Technical Meeting, ION ITM 2023, Jan. 24-26, 2023; https://doi.org/10.330128/2023.18591.

Divis, D. A. (Jun. 15, 2016). Iridium-based system, proposed GPS backup, incorporates crypto protections. Inside GNSS—Global Navigation Satellite Systems Engineering, Policy, and Design (Year: 2016).

Elliott Kaplan; Christopher Hegarty; "Understanding GPS Principles and Applications," Second Edition, Artech, 2005 (Year: 2005).

European Patent Office; Communication pursuant to Rule 114(2) EPC; Application No. 20822220.8; Dec. 19, 2022; 4 pgs.

Hauschild, Andre, Tegedor, Javier, Montenbruck, Oliver, Visser, Hans, Markgraf, Markus, "Innovation: Orbit determination of LEO satellites with real-time corrections" (Apr. 24, 2017) (Year: 2017).

International Searching Authority; International Search Report and Written Opinion; International Application No. PCT/US2020/021687; Jan. 4, 2021; 13 pgs.

International Searching Authority; International Search Report and Written Opinion; International Application No. PCT/US2022/026492; Sep. 1, 2022; 13 pgs.

International Searching Authority; International Search Report and Written Opinion; International Application No. PCT/US2022/071656; Aug. 1, 2022; 10 pgs.

Japan Patent Office; Office Action; Mar. 14, 2023; 10 pgs.

Meng, et al.; A Global Navigation Augmentation System Based on LEO Communication Constellation; 2018; pp. 65-71; IEEE European Navigation Conference (ENC).

Simon, et al.; Performance Evaluation and Interpretation of Unfiltered Feher-Patented Quadrature-PHase-Shift Keying (FQPSK); TMO Progress Report 42-137; 29 pages; May 15, 1999.

Stephen Clark ("FCC approves SpaceX's plan to operate Starlink satellites at lower altitude," Spaceflight Now, Apr. 30, 2019) (Year: 2019), last visited Mar. 15, 2023.

European Patent Office; Extended European Search Report; Application No. 20822220.8; Sep. 29, 2023; 17 pgs.

\* cited by examiner

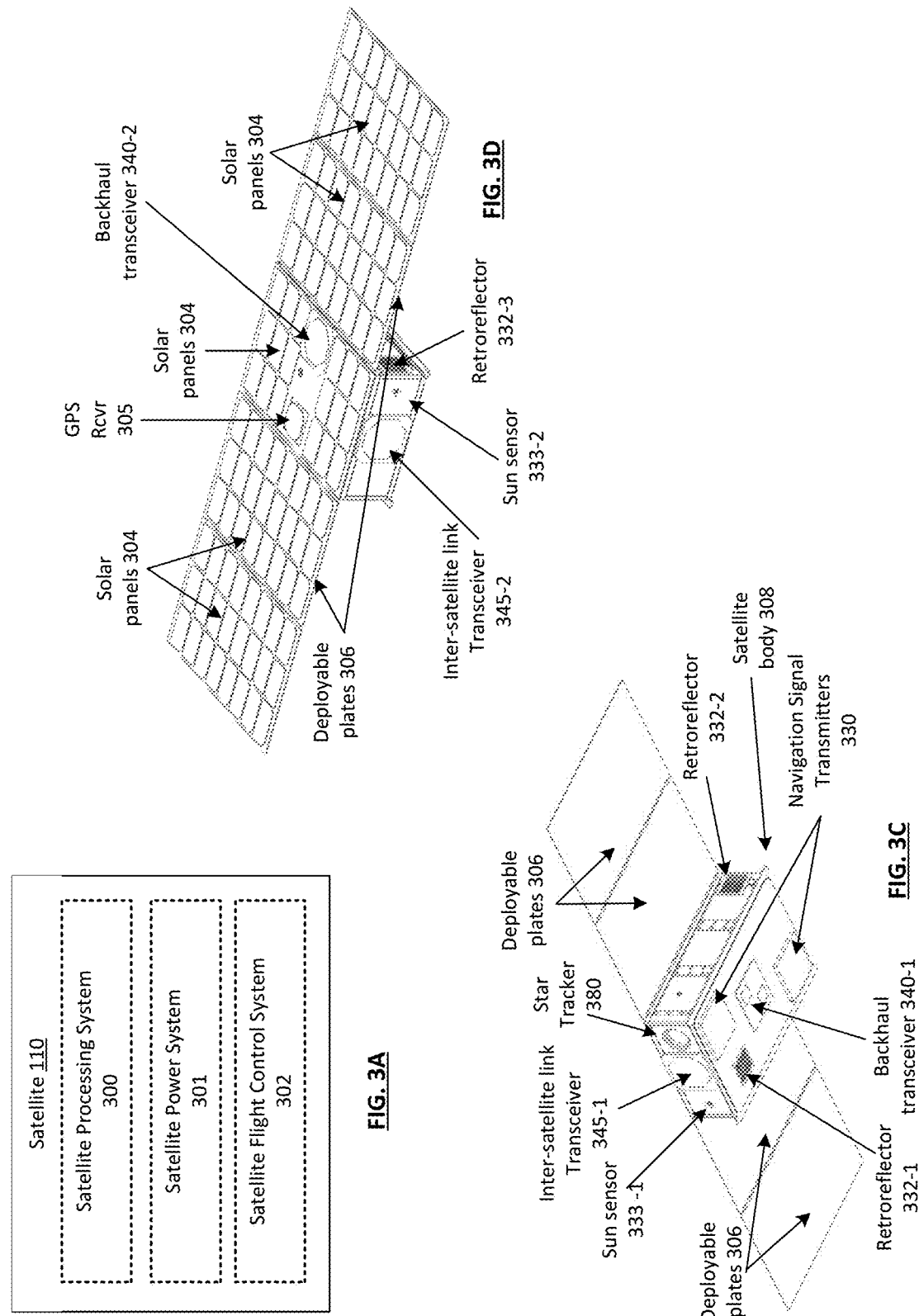

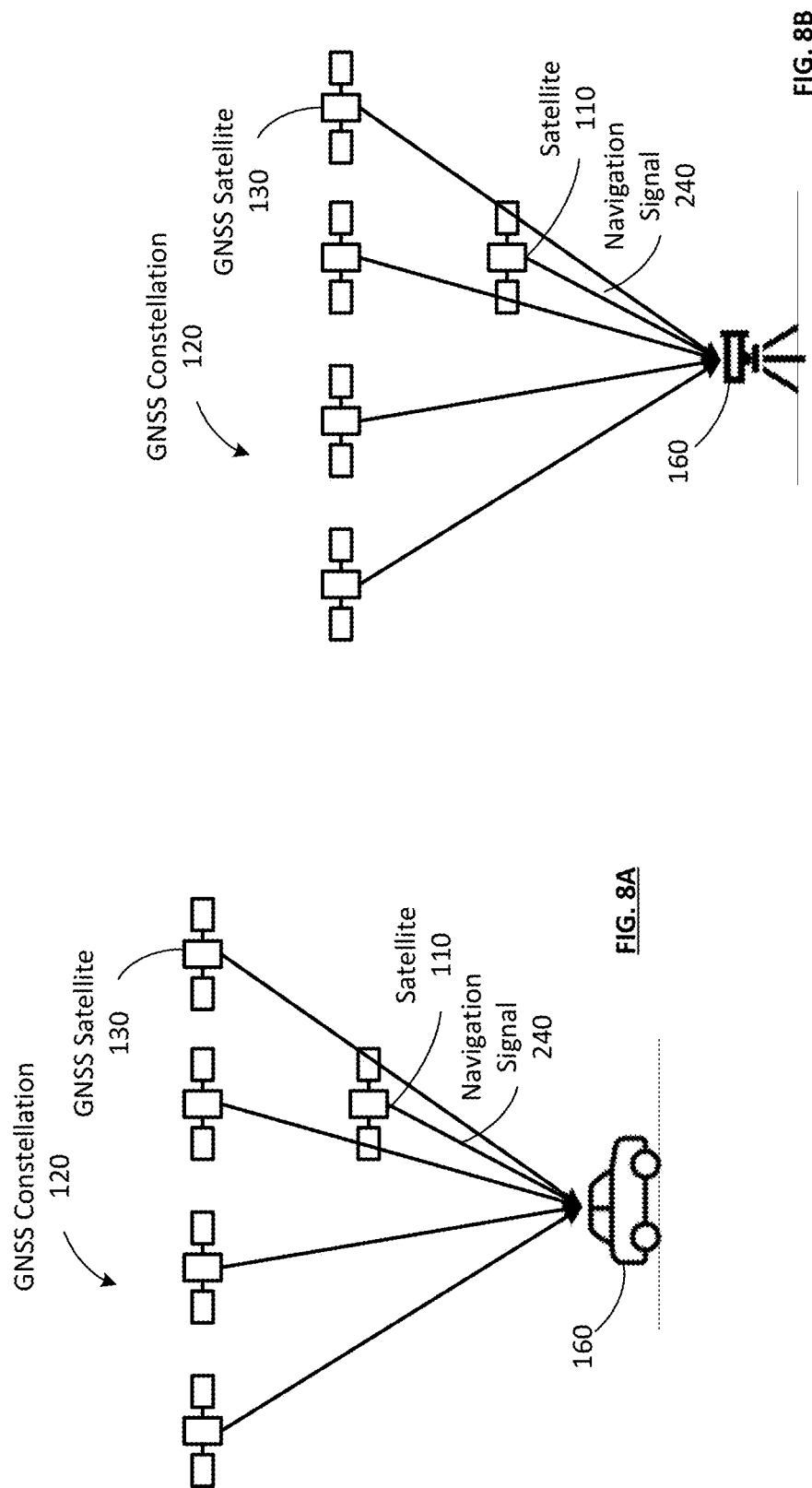

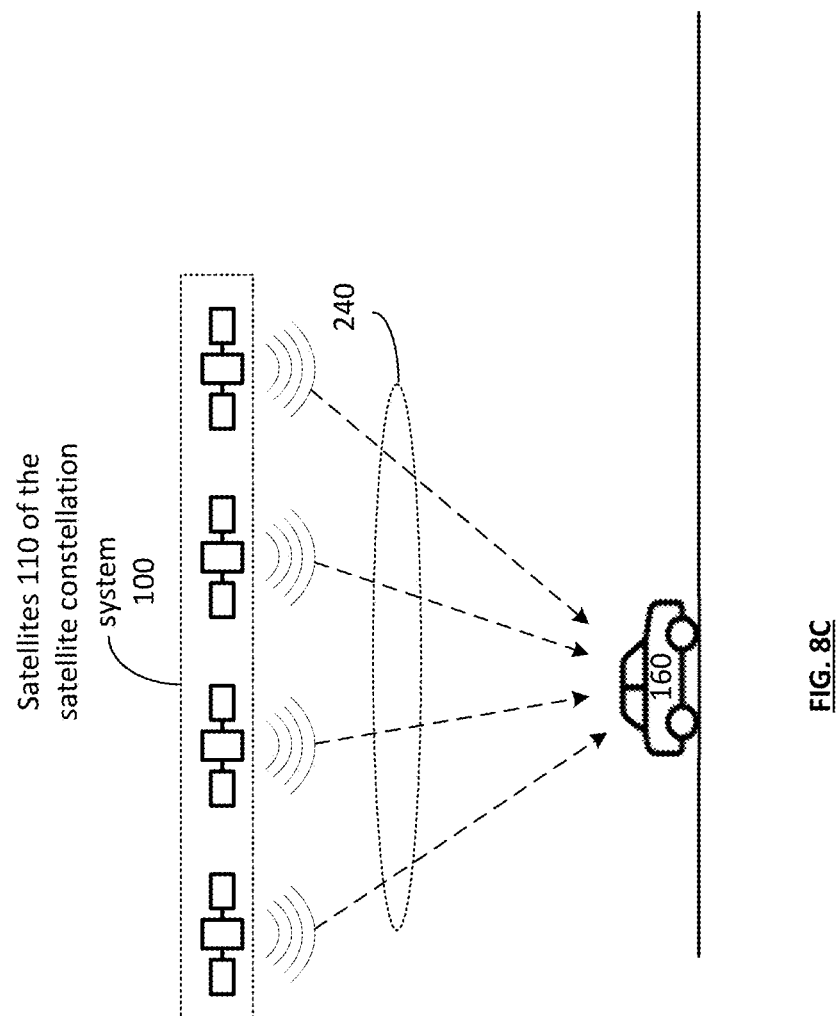

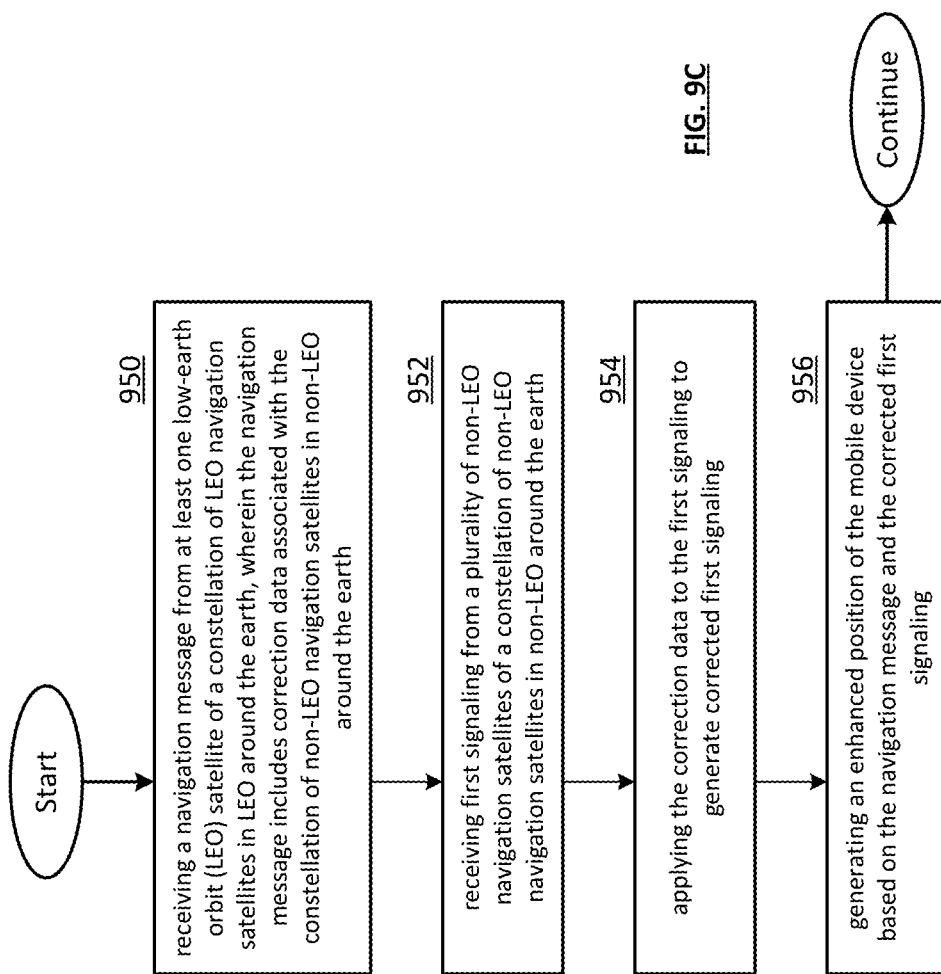

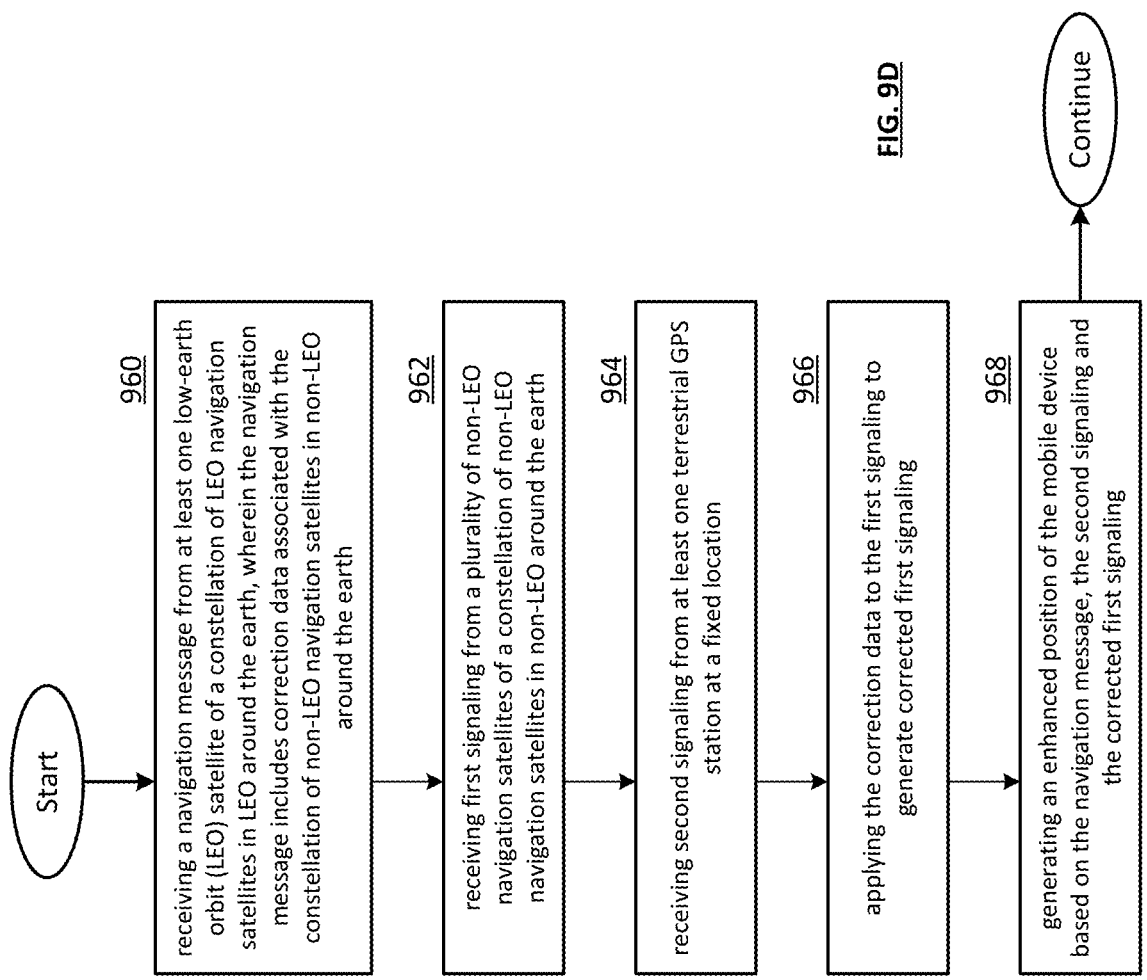

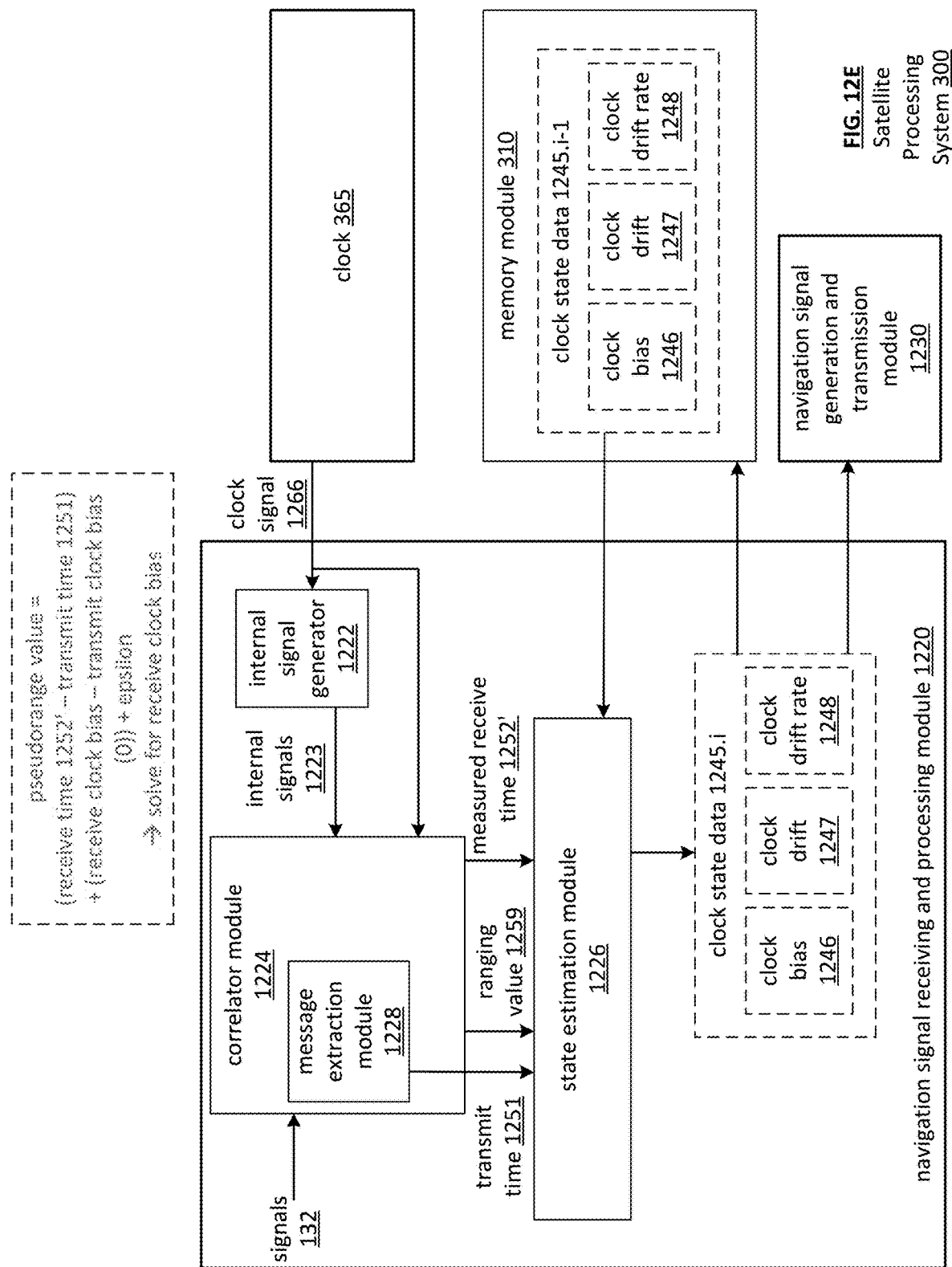

Client device 160

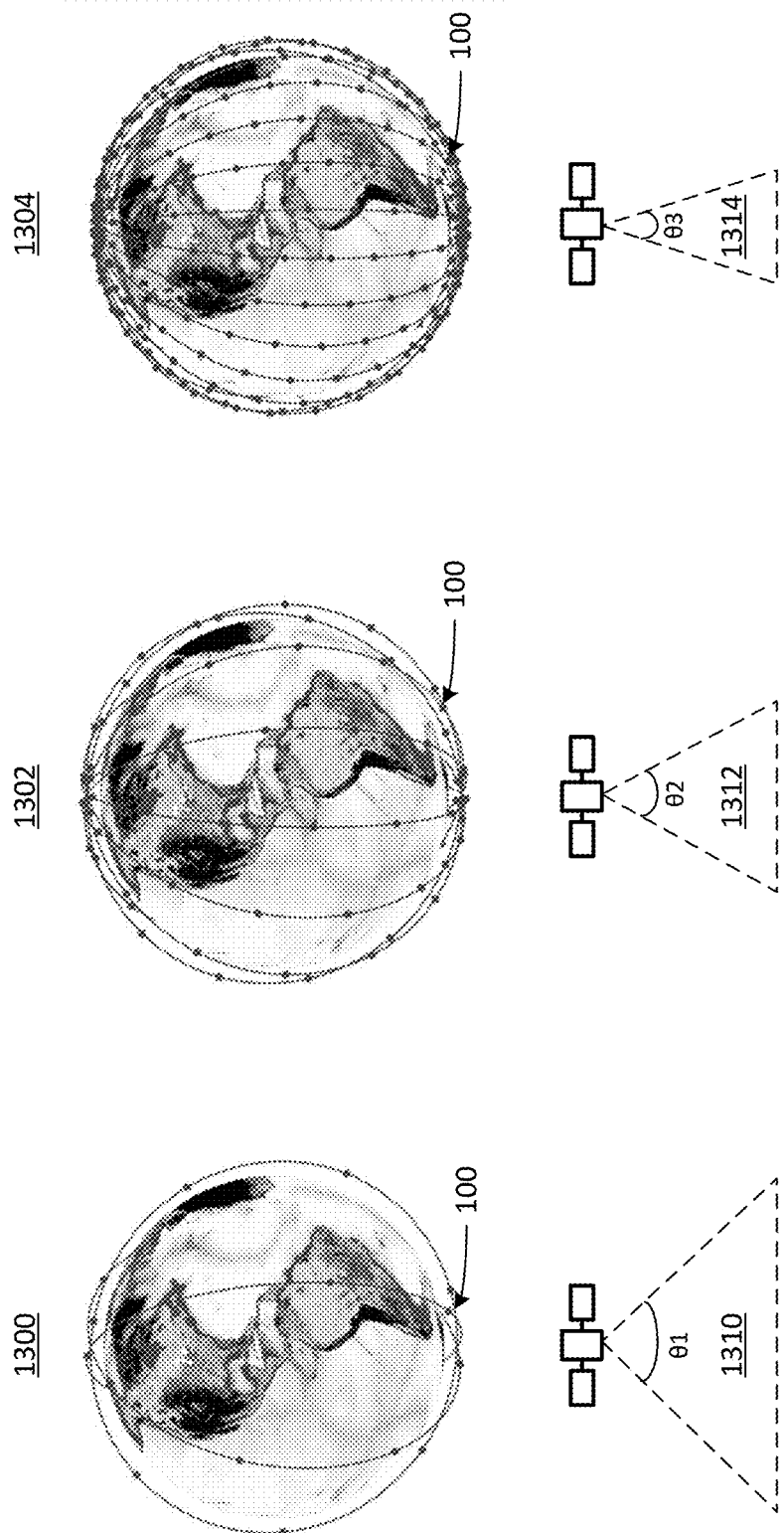

| orbital plane 1500.1 | altitude 1505.1 | inclination 1506.1 | # of satellites 1507.1 |
|---|---|---|---|

...

| orbital plane 1500.P | altitude 1505.P | inclination 1506.P | # of satellites 1507.P |
|---|---|---|---| constellation configuration plan 1515

FIG. 15A satellite constellation system 100 satellite constellation system 100 satellite constellation system 100 coverage level data 1525.1 coverage level data 1525.1 coverage level data 1525.2 coverage level data 1525.2 coverage level data 1525.2 coverage level data 1525.3 coverage level data 1525.3 coverage level data 1525.3

SATELLITE CONSTELLATION SYSTEM FOR TRANSMITTING A NAVIGATION SIGNAL

CROSS REFERENCE TO RELATED APPLICATIONS

The present U.S. Utility Patent Application claims priority pursuant to 35 U.S.C. § 120 as a continuation of U.S. Utility application Ser. No. 17/235,479, entitled "SATELLITE FOR TRANSMITTING A NAVIGATION SIGNAL IN A SATELLITE CONSTELLATION SYSTEM", filed Apr. 20, 2021, now U.S. Pat. No. 11,668,834, which is a continuation-in-part of U.S. Utility application Ser. No. 16/804,961, entitled "SATELLITE FOR BROADCASTING HIGH PRECISION DATA", filed Feb. 28, 2020, issued as U.S. Pat. No. 11,513,232 on Nov. 29, 2022, which claims priority pursuant to 35 U.S.C. § 119(e) to U.S. Provisional Application No. 62/853,398, entitled "BROADCASTING HIGH PRECISION DATA VIA A SATELLITE SYSTEM", filed May 28, 2019, all of which are hereby incorporated herein by reference in their entirety and made part of the present U.S. Utility Patent Application for all purposes therefor.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This disclosure relates generally to satellite systems and more particularly to global navigation satellite systems and radio occultation.

BRIEF DESCRIPTION OF THE SEVERAL VIEWS OF THE DRAWING(S)

FIG. 3A is a schematic block diagram of a satellite in accordance with various embodiments;

FIG. 3C is a pictorial diagram of a satellite in accordance with various embodiments;

FIG. 3D is a pictorial diagram of a satellite in accordance with various embodiments;

FIGS. 8A-8F are schematic block diagrams illustrating utilization of satellite constellation system by various client devices in accordance with various embodiments;

FIG. 9C is a flowchart diagram illustrating an example of a method in accordance with various embodiments;

FIG. 9D is a flowchart diagram illustrating an example of a method in accordance with various embodiments;

FIGS. 12B-12F are schematic block diagrams of a satellite processing system in accordance with various embodiments;

FIG. 13A is an illustration of various satellite constellations and antenna beamwidth adjustments in accordance with various embodiments;

FIG. 15A is an illustration of a constellation configuration plan in accordance with various embodiments;

DETAILED DESCRIPTION OF THE INVENTION

Figure 1:
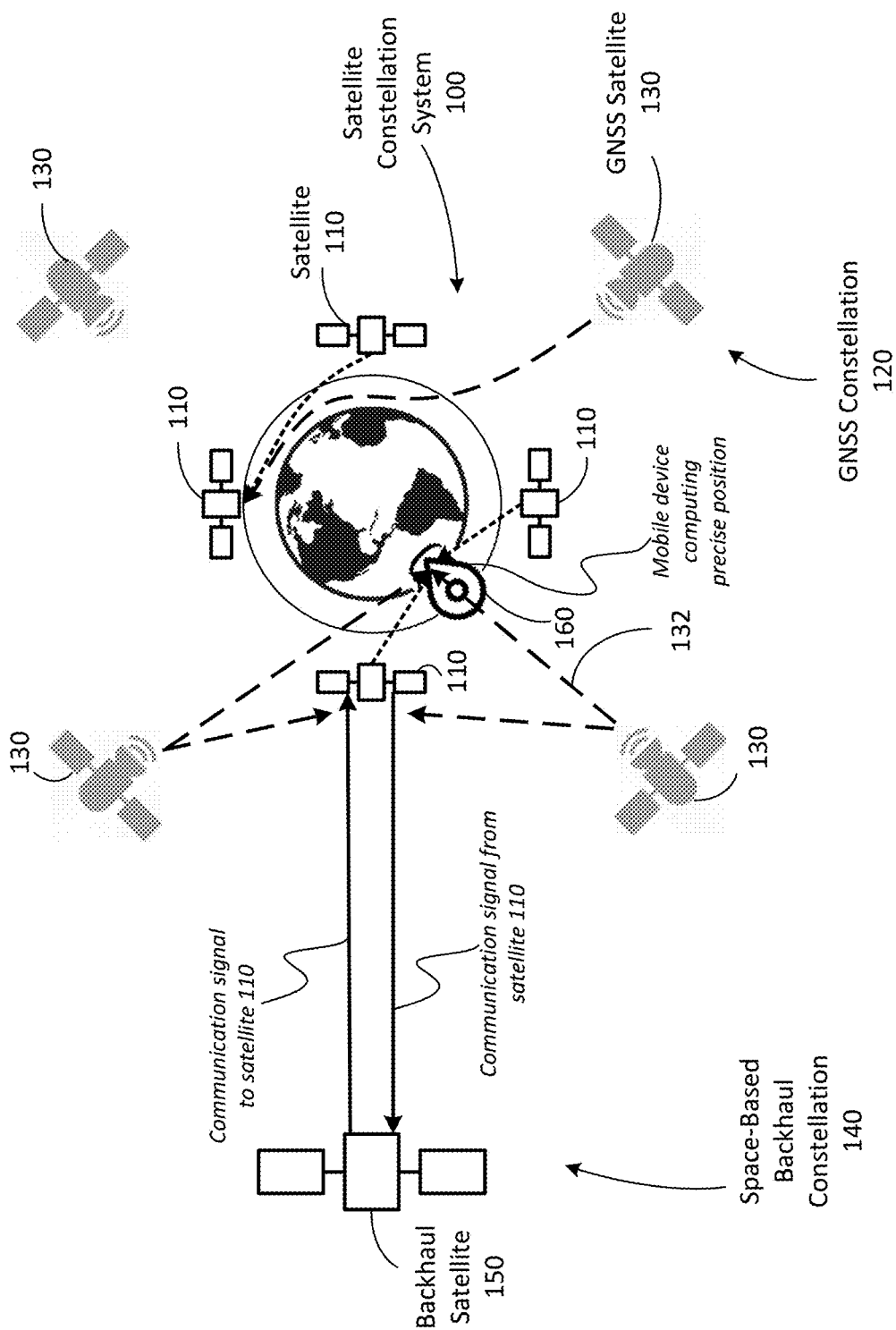
FIG. 1 is a schematic block diagram of an embodiment of a satellite constellation system in accordance with various embodiments.

FIG. 1 illustrates an embodiment of a satellite constellation system 100. Satellite constellation system 100 can include a plurality of satellites 110, which can be implemented via combination of devoted purpose-built satellites, purpose built payloads on a standard satellite bus, and/or hosted payloads or services part of another satellite network. These satellite bus and navigation components can make use of commercial-of-the-shelf (COTS) components and be compatible with CubeSat and other standard bus architectures. In some embodiments, some or all of the plurality of satellites 110 of satellite constellation system 100 orbit in accordance with low earth orbit (LEO), and can be referred to as "LEO satellites". Alternatively, some or all satellites of the first satellite constellation can orbit in accordance with medium earth orbit (MEO), and/or geostationary orbit (GEO). Satellite constellation system 100 is operable to provide secure precision location and time transfer services and/or monitoring atmospheric and environmental conditions.

Some or all of the satellites 110 can receive signals 132 from Global Navigation Satellite System (GNSS) satellites 130 of a GNSS constellation 120. The signals 132 include for example, a ranging signal containing clock information and almanac and ephemeris information that can be used for precision positioning, navigation and timing. The GNSS constellation 120 can be implemented by utilizing one or more of the Global Positioning System (GPS) satellite constellation, the Quasi-Zenith Satellite System, the BeiDou Navigation Satellite System, the Galileo positioning system, the Russian Global Navigation Satellite System (GLONASS) the Indian Regional Navigation Satellite System and/or any other satellite constellation utilized for navigation services. In some embodiments, some or all of the plurality of GNSS satellites 130 of the GNSS constellation 120 can orbit in accordance with MEO, and/or some or all of the plurality of GNSS satellites 130 or otherwise can orbit in another outer orbit from the satellites 110 of the satellite constellation system 100. In either case, when the satellites 110 are LEO satellites, the GNSS satellites can be referred to as "non-LEO satellites".

Some or all of the satellites 110 can send signals to and/or receive signals from one or more backhaul satellites 150. Backhaul satellite 150 can be implemented by utilizing a satellite in any orbit, such as (LEO), (MEO), and/or (GEO), provided satellite 150 is capable of transmitting and/or receiving data from satellite 110. In some embodiments, a backhaul satellite constellation 140 can include a plurality of backhaul satellites 150 operable to bidirectionally communicate with satellites 110. In various embodiments, one or more backhaul satellites include an atomic clock for transmitting a timing reference in communications to the satellites 110.

In various embodiments, the one or more backhaul satellites 150 can be selectively implemented via one or more of the satellites 110 that have been assigned this functionality, on a dedicated basis, when for example, the navigation functionality of a satellite 110 has degraded to the point where it is no longer useful to provide secure precision location and time transfer services and/or monitoring atmospheric and environmental conditions. Furthermore, one or more satellites 110 can be assigned the role of backhaul satellite based on its status such as its position in orbit, current utilization, battery capacity and/or other state or condition of the satellite 110 or otherwise, as will be discussed later, for example, in conjunction with the resource allocation of FIG. 3B.

The satellite constellation system 100 can be operable to provide navigation services through a space-based broadcast of encrypted and/or unencrypted navigation messages, atmospheric and/or other signal(s) which can include timing data and overlaid data for satellite identification and precision positioning and navigation. This data can include, but is not limited to, (i) precision orbit and clock data of both the precision satellite system and of the GNSS constellation; (ii) atmospheric data, models and/or other atmospheric monitoring data used for determining a current weather state, for weather prediction, for control of the satellites 110 and/or for further orbit or clock data correction; (iii) cryptographic parameters including encryption key management; (iv) integrity information concerning the backhaul satellites 150, satellite constellation system 100, the GNSS satellites 130 and/or their constellations; and (v) general messages to pass information (such as state, conditions, health, and other command and control information) between satellites 110 and the ground and/or other types of data discussed herein. This data can be derived based on some combination of measurements from (i) terrestrial monitoring stations; and (ii) GNSS measurements taken by the satellite constellation system 100 in-situ. In case (ii), precision orbit data of the GNSS satellites can be uploaded to the satellite constellation system 100 via space-based backhaul communications, reducing the need for ground links, though ground links and intersatellite links can also be used. This enables autonomous orbital position and clock determination in orbit.

Alternatively or in addition, the satellite constellation system 100 can be operable to collect atmospheric data by means of radio occultation (RO) through some combination of GNSS and other signals of opportunity including some broadcast by satellites 110 of the satellite constellation system 100 themselves. Higher broadcast power than GNSS utilized by the satellite constellation system 100 allows for deeper penetration into the atmosphere that enable processing to yield higher fidelity ionospheric and tropospheric models both in terms of spatial and temporal updates. These high density models can serve multiple purposes such as (i) data for weather prediction models on the ground or in situ in the satellite 110; and (ii) the construction of local, regional and/or global ionospheric and tropospheric corrections for use in precision navigation both by the satellite constellation system 100 and by standard GNSS. The raw or processed data can be transmitted back from the ground to the satellite constellation system 100 by some combination of ground stations or space-based backhaul communications.

The GNSS satellites 130 can provide signals to satellites 110 for GNSS Radio Occultation for use in atmospheric monitoring, mapping and other atmospheric data generation. These measurements can, in turn, be sent to the ground through a combination of communication links, as discussed in further detail in conjunction with FIG. 2. Through this connection with the ground, precise orbits and clocks of the GNSS satellites 130 can be uploaded to the satellite constellation system 100. This orbit and clock data can used along with measurements from GNSS, other correction data, sensors onboard, and/or other information to autonomously perform orbit and clock determination onboard satellite 110. Atmospheric models can be generated indicating signal delays in the ionosphere and troposphere and/or indicating weather data including a current weather state, a predictive weather model or other atmospheric data, can be broadcast along with precision orbit and clock data for use in precision navigation on Earth, included in backhaul and/or inter-satellite communication and used by the satellites 110 to further enhance the determination of their orbital position. The atmospheric data can include corrections created on the ground as part of the data products produced as part of atmospheric monitoring. Alternatively or in addition, these atmospheric data and corrections can be created autonomously by one or more satellites in situ, where data is shared between satellites in the satellite constellation system 100, and where, for example, edge computing on board one or more satellites 110 is used to create local, regional or global atmospheric and/or weather models.

At least one client device 160 can include a receiver configured to receive the signals transmitted by at least one satellite 110. The receiver can be configured to receive the signals directly from the satellites 110, and/or can be configured to receive this information from ground stations, server systems, and/or via a wired and/or wireless network. The client device 160 can include at least one memory that stores operational instructions for execution by at least one processor of the client device 160, enabling the client device 160 to process signals transmitted by the satellites 110 to extract the atmospheric models, precision orbit data, clock data, and/or other data from the signals. The client device 160 can be operable to process the signals and/or this data to compute its precise position (i.e. an "enhanced position" with greater accurate when compared with ordinary positioning provided by the GNSS system) and/or a precise time. This precise position and/or precise time can be further processed by client device 160 and/or can be otherwise utilized by the client device 160 for positioning, navigation and/or timing and/or otherwise to perform its functionality in conjunction with one or more of a range of applications discussed herein. A client device 160 can be operable to display, via a display device of the client device some or all of the atmospheric models, precision orbit data, and/or clock data received from the least one satellite 110 for review by a user of the client device 160.

Alternatively or in addition, this precise position and/or other data generated utilizing the signals received from satellites 110 can be transmitted, via a transmitter of the client device 160, to a server system or other computing device, for example via network 250. For example, this server system and/or other computing device can be associated with an entity responsible for tracking of client device 160 and/or responsible for monitoring secure performance of client device 160. Thus, storing, processing, and/or display of this information received from one or multiple client devices 160 can be facilitated by the server system and/or another computing device, for example, via its own at least one processor and/or at least one memory.

Client devices 160 can include, can be implemented within, and/or can be otherwise utilized by devices on the ground, devices near the earth's surface, devices within the atmosphere, and/or other space-based systems. Client devices 160 can include, can be implemented within, and/or can be otherwise utilized by mobile devices, cellular devices, wearable devices, autonomous or highly automated vehicles or other vehicles such as cars, planes, helicopters, boats, unmanned aerial vehicles (UAVs), fixed devices installed upon or within infrastructure, and/or other computing devices operable to receive and/or utilize the atmospheric models, precision orbit data, and/or clock data.

The LEO satellite 110 provides a reduced distance to earth, which, combined with the greater signal power compared with GNSS, provides client devices 160 with much stronger signals. The reduced orbital period of the LEO further provides faster signal convergence. The LEO satellite 110 includes many additional technological improvements and advantages including many functions, features and combinations thereof as described further herein.

Figure 2:
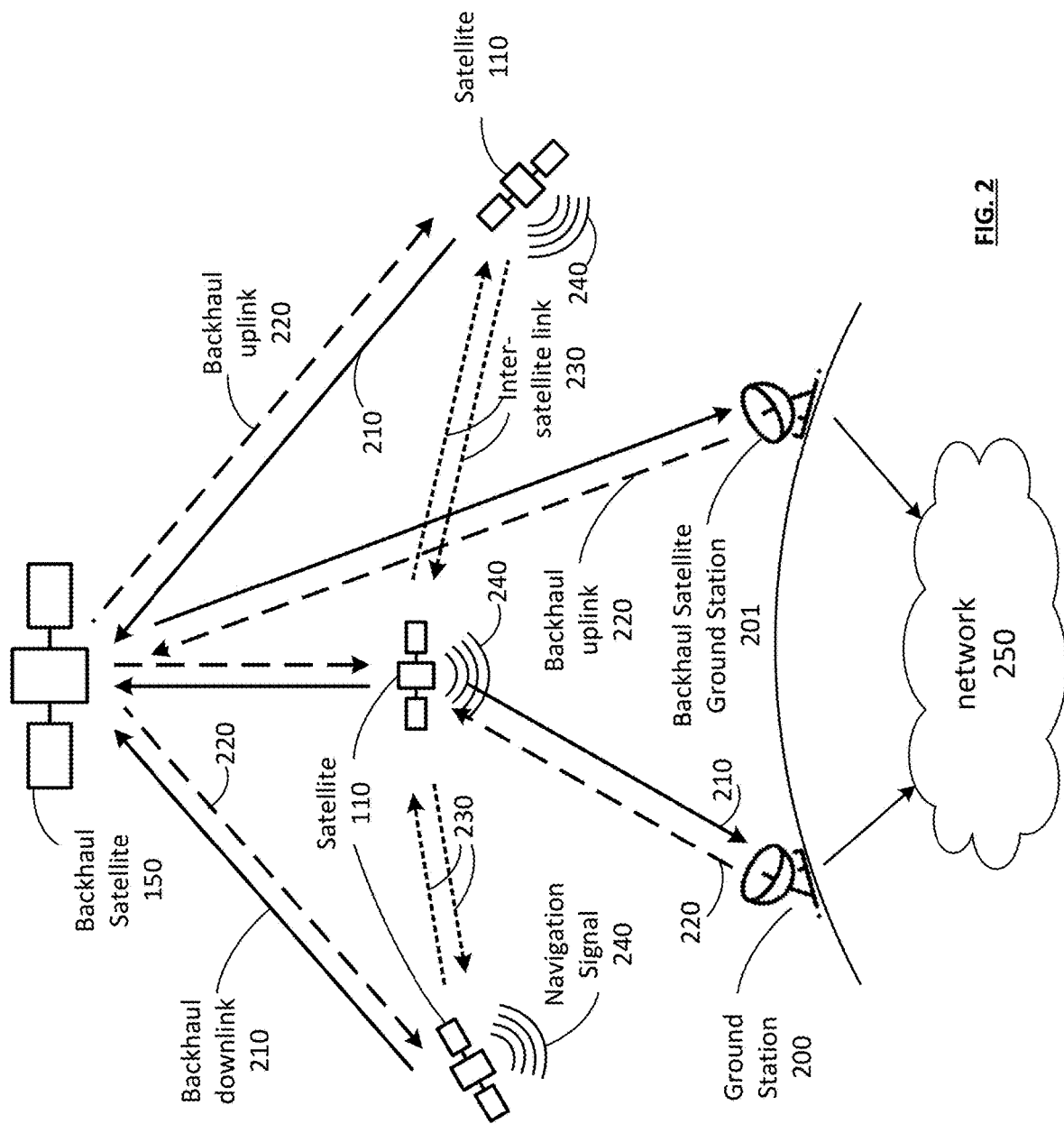
FIG. 2 is a schematic block diagram illustrating various communication links utilized by a satellite constellation system in accordance with various embodiments.

FIG. 2 illustrates embodiments of the communication of various data via satellite constellation system 100. As part of satellite constellation system 100's task of generating a precision navigation signal and/or environmental monitoring, data can be transferred between the ground stations 200 and/or 201 and the satellites 110, between satellites 110 in satellite constellation system 100 and other satellites in space, and/or between any combination of entities capable of receiving or transmitting data of interest to satellite 110 as part of satellite constellation system 100.

This transfer can be facilitated via a plurality of nodes of the satellite constellation system 100. As used herein, nodes of the satellite constellation system 100 can correspond to any devices that generates, receives, transmits, modifies, stores, and/or relays messages or other data communicated by satellite constellation system 100 as discussed herein. Nodes of satellite constellation system 100 can include one or more satellites 110; one or more ground stations 200 and/or 201; one or more backhaul satellites 150; and/or one or more client devices operable to utilize information included in messages in its operation and/or operable to display information included in messages to a user.

The data communicated between nodes of the satellite constellation system 100 can be comprised of many different message types, including, but not limited to: navigation messages containing data to enable the determination of a precise position by an end user device or end user system; precise point positioning (PPP) correction messages containing precise orbit and clock data of GNSS satellites and/or other satellites in satellite constellation system 100; atmospheric correction messages containing temperature, humidity, and/or other atmospheric parameters that affect the precision of the navigation signal that can be corrected for; command and control messages containing command and control information for the physical direction and/or attitude of the satellite, satellite state management, and/or enabling and/or disabling different transmissions of satellite 110; measurement messages containing ground based and/or external space-based measurements that can augment the navigation filter (as part of the orbit determination module); status messages containing information about satellite 110's signal health, battery usage, power generation, memory usage and/or other information providing status information;

cryptographic messages containing information providing encryption key updates along with any general encryption scheme updates; constellation monitoring messages contain GNSS satellite and/or constellation health information, estimated performance of each satellite and/or each constellation, and/or other information related to other GNSS satellites and/or constellations; and/or other messages containing information that can be transmitted to and/or from satellite 110 intended for users, ground segment, other satellites in the constellation, or any other desired start and/or end point for the communication.

Some or all of these message types can be included in the data transmitted as illustrated in FIG. 2. Some or all of these message types can be transmitted by satellite 110 and/or received by satellite 110, and/or can be generated onboard satellite 110 and/or can be generated by another entity, for example on the ground and/or received by a ground station 200 and/or 201, for example, via network 250.

The data can be transmitted and/or received over any one of these links, or any combination of these links, in an encrypted and/or unencrypted manner, and/or in any combination of encrypted and/or unencrypted manner. The encryption can be performed at the message level, where one or more individual messages are encrypted, for example, separately. Alternatively or in addition, the encryption can be performed at the data stream level, where the data stream that includes one or more messages of the same or different type is encrypted. In some embodiments, all of the messages can be encrypted. Alternatively, some or all of the messages are not encrypted. A message can be transmitted and/or received over a combination of links (e.g. from an inter-satellite link to the backhaul) and can change encryption state as it goes from one node in the communication chain to another. Encrypting the data transmitted by the satellite constellation system 100 allows more control over who can receive the necessary data for making radio occultation (RO) measurements and precision navigation, enabling the licensing of the usage of the data. In addition to encrypting the data itself, the spreading code of the navigation signal that is used for ranging can also be encrypted. This further allows controlling access to the information transmitted by satellite constellation system 100.

The data, which can comprise of any combination of the various messages, can be transmitted along any combination of links, for example, as illustrated in FIG. 2, between any combination of nodes of the satellite constellation system 100. These links can include different types of links, such as backhauls, inter-satellite links 230, and/or navigation signals 240.

As used herein, backhaul communications correspond to a link between satellite 110 and backhaul satellite 150, and/or a link between satellite 110 and ground station 200. The backhaul communications can be comprised of a transmit and/or receive component on each of the nodes. Communication from satellite 110 intended to be received to satellite 150, to ground station 200, and/or to ground station 201 through satellite 150, shown through backhaul downlink 210, is termed the downlink portion of the backhaul. The uplink portion, depicted as backhaul uplink 220 in FIG. 2, is the communication originating from ground station 200, and/or from ground station 201 through satellite 150 intended to be received by at least one of satellite 110 within satellite constellation system 100.

Backhaul downlink 210 can be designated to communicate one or more particular types of messages. Backhaul downlink 210 can communicate information such as RO measurement data, navigation message information, status information about each of the satellites, requested command and control of other satellites in satellite constellation system 100, and/or other information to be sent from the satellite in satellite constellation system 100 to another satellite or to the ground.

Backhaul uplink 220 can be designated to communicate one or more particular types of messages. Backhaul uplink 220 can communicate information such as PPP correction data, atmospheric map data, ground base measurements for the on-board filtering, command and control data, navigation message data of other satellites in satellite constellation system 100, and/or other information to be sent to the satellites in satellite constellation system 100 either from the ground or from another satellite.

Inter-satellite link 230 corresponds to a link between two or more satellites 110 within satellite constellation system 100. These inter-satellite links can be omni-directional links such that the transmission is one-to-many, dedicated links between satellite pairs in different orbital planes, and/or dedicated links between satellites pairs within the same orbital plane. A single satellite 110 can be capable of transmitting and/or receiving from any combination of these types of inter-satellite links. These inter-satellite links can either be dedicated data links or can be the data that is modulated onto the ranging signal if the ranging signal is being broadcast by the satellite at the full 180+ degree beamwidth of the satellite 110.

The inter-satellite links can contain any information to be sent between satellites or from one satellite with a backhaul connection to another satellite without a backhaul connection or from one satellite without a backhaul connection to another satellite with a backhaul, or the same process through multiple satellites. This can either be on top of and/or combined with the ranging signal, or can be a dedicated signal sent, for example by dedicated transceivers operating at differing frequencies.

Navigation signal 240 is the signal transmitted from satellite 110 containing at least a ranging signal, but can also contain other data corresponding to one or more of the various types of messages or other data discussed herein. Navigation signal 240 can be a one-to-many broadcast transmission, and any satellite 110, ground station 200, ground station 201, and/or satellite 150 can be equipped to receive the navigation signal.

Any data transmitted and/or received by satellite 110 can travel through any single set of links (e.g. backhaul only) and/or through any combination of links (e.g. backhaul to inter-satellite link). Any data can also be transmitted through any number of the nodes (station or satellite) in the communication chain for the purpose of being received by a specific node in the communication chain. In some embodiments, data such as correction messages can be sent from the ground to one or more satellite 110 via one or more of the following means:

Data can be transmitted from at least one ground station 200 directly to every satellite 110 on orbit.

Data can be transmitted from at least one ground station 200 to a subset of satellites (e.g. one in each orbital plane) and then across "along-links" through inter-satellite communication in the orbital plane with relatively low latency and without any stringent pointing requirements. "Along-links" inter-satellite links (either radio or optical) between a satellite and the satellite ahead and/or behind it in the orbital plane (an orientation where the angle between those satellites should remain fairly static). These "along-links" in orbit can be maintained through different flight procedures such as changes in the yaw angles needed in order to maintain solar panel orientation with respect to the sun by using omni-directional transceivers of the "along-link" data or steerable transceivers. In an example configuration where the orbital planes are polar orbits, the number of ground stations needed can be minimized by placing the ground stations at high latitudes, where it can "see" satellites from multiple planes simultaneously. Additionally, for this example configuration, the sequence of placing satellites in the orbital planes as satellite constellation system 100 is grown can be optimized to ensure that these "along-links" are used optimally.

Data can be transmitted from at least one ground station 200 and/or ground station 201 to at least one relay satellite 150 in orbits. These relay satellites 150 include communication satellites in GEO, in MEO, and/or in LEO. Satellites 110 can then receive the data from at least one satellite 150 that retransmits the data received from ground station 200 and/or ground station 201 to satellite 110.

For communication between satellites 110 in satellite constellation system 100, a dedicated inter-satellite link can be used with dedicated transceivers.

For communication between satellites 110, satellites 110 can add data messages to the data stream being modulated on the navigation signal in cases where satellite 110 are capable of receiving the navigation signal from another satellite 110 within satellite constellation system 100. A satellite can be in view if it is at a lower altitude than the broadcasting satellite or if it has line of sight to the satellite's transmission due to its orbital placement or if the broadcasting satellite beamwidth is large enough to reach the target satellite (e.g. 180+ degree beamwidth for neighboring satellites)

The ground stations 200 and/or 201 can be configured to communicate via a network 250, via at least one communication interface of the ground stations 200 and/or 201. The network 250 can be implemented by utilizing wired and/or wireless communication network and can include a cellular network, the Internet, and/or one or more local area networks (LAN) and/or wide area networks (WAN). Ground stations 200 and/or 201 can be operable to transmit and/or receive data from at least one server system. The at least one server system can include at least one processor and/or memory and can be operable to generate and/or store some or all of the data transmitted and/or received by ground stations 200 and/or 201. The at least one server system can be affiliated with an entity responsible for the satellite constellation system 100 and/or can be affiliated with a different entity, such as a weather service entity and/or navigation entity that generates and/or stores data transmitted and/or received by ground stations 200 and/or 201. Alternatively or in addition, client devices 160 can be operable to receive data via network 250.

FIG. 3A is a schematic block diagram of a satellite in accordance with various embodiments. In particular, an example of a satellite 110 is presented that includes a satellite processing system 300, a satellite power system 301 and a satellite flight control system 302.

In various embodiments, the satellite power system 301 includes an array of solar cells, a battery, a fuel cell or other chemical power generation system and/or a power management system that operates, for example, under control of the satellite processing system 300 to manage the production, storage and use of electrical power in conjunction with the operation of satellite 110. The satellite flight control system includes 302 includes one or more propulsion systems, an attitude controller, an inertial stabilizer and/or one or more other devices that operate under of the satellite processing system 300 to maintain, manage and otherwise adjust the orbital position and/or orientation of the satellite 110.

In various embodiments, the satellite processing system 300 includes memory that stores data, an operating system including several system utilities, and applications and/or other routines that include operational instructions. The satellite processing system 300 further includes one or more processors that are configured to execute the operational instructions to perform various the functions, features and other operations of the satellite 110 in conjunction with the satellite power system 301, the satellite flight control system 302, an on-board clock, one or more sensors, one or more transmitters, receivers and/or transceivers and one or more other devices.

Figure 3B:
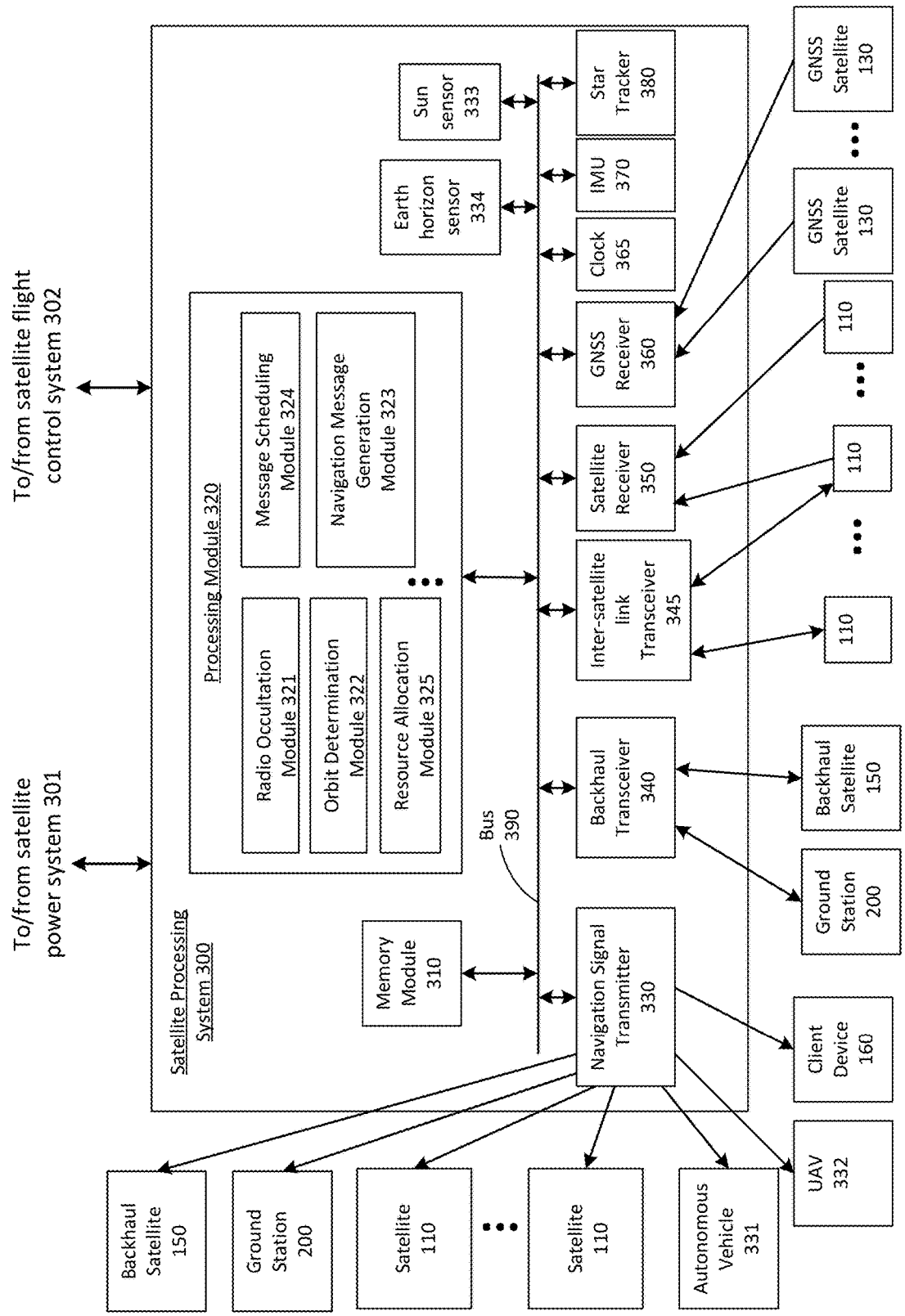
FIG. 3B is a schematic block diagram of a satellite processing system in accordance with various embodiments.

FIG. 3B presents an embodiment of a satellite processing system 300. The same or different satellite processing system 300 can be onboard some or all of the satellites 110, and the functionality of some or all of the satellites 110 discussed herein can be enabled via satellite processing system 300. A bus 390 can be operably couple and/or facilitate communication between the various components of the satellite processing system 300. While a particular bus configuration is shown, other bus configurations can likewise be employed.

Satellite processing system 300 can include at least one memory module 310 which can be implemented by utilizing at least one memory. Satellite processing system 300 can include at least one processing module 320 which can be implemented utilizing one or more processors. The memory module 310 can store operational instructions that, when executed by the processing module 320, configure the satellite processing system 300 to execute some or all of the functionality of satellites 110 discussed herein.

In some embodiments, the processing module 320 is utilized to implement a radio occultation module 321 operable to perform some or all of the radio occultation functionality of satellite 110 discussed herein. Alternatively or in addition, the processing module 320 is utilized to implement an orbit determination module 322 operable to perform some or all of the radio occultation functionality of a satellite 110 as discussed herein. Alternatively or in addition, the processing module 320 is utilized to implement an orbit determination module 322 operable to perform some or all of the orbit determination functionality of a satellite 110 as discussed herein. Alternatively or in addition, the processing module 320 is utilized to implement a navigation message generation module 323 operable to perform some or all of the navigation message generating functionality of a satellite 110 as discussed herein. Alternatively or in addition, the processing module 320 is utilized to implement a message scheduling module 324 operable to perform some or all of the message scheduling functionality of a satellite 110 as discussed herein. Alternatively or in addition, the processing module 320 is utilized to implement a resource allocation module 325 operable to perform some or all of the resource allocation functionality of a satellite 110 as discussed herein. The memory can store operational instructions corresponding to the radio occultation module 321, the orbit determination module 322, the navigation message generation module 323, and/or the message scheduling module 324, and when these operational instructions are executed by the processing module 320, the satellite processing system 300 can perform the functionality of the radio occultation module 321, the orbit determination module 322, the navigation message generation module 323 the message scheduling module 324 and/or the resource allocation module 325 respectively.

Satellite processing system 300 can include one or more of sensors, which can include, but are not limited to: at least one star tracker 380; at least one inertial measurement unit (IMU) 370; at least one sun sensor 333; at least one earth horizon sensor 334, at least one GNSS receiver 360 operable to receive navigation signals transmitted by GNSS satellites 130; at least one clock 365, and/or at least one satellite receiver 350 operable to receive the navigation signal 240 transmitted by other satellite processing systems 300; and/or any other sensors operable to collect other types of measurement data and/or to receive signals transmitted by other entities. The measurements and/or signals collected by these sensors can be processed via processing module 320 and/or can be stored via memory module 310, for example, in a temporal)/cache.

In various embodiments, the clock 365 is implemented via a temperature compensated crystal oscillator (TCXO), oven-controlled crystal oscillator (OCXO) or other non-atomic clock that, for example, as adjusted and/or stabilized based on a timing signal from an atomic clock contained in the communications from a backhaul satellite, ground link or one or more of the GNSS satellites 130. In some embodiments, the same clock 365 is utilized by both GNSS receiver and the navigation signal transmitter. This allows the clock portion of the estimated state of the satellite using GNSS measurements to reflect the clock used to generate the navigation signal. Alternatively, one or more satellites 110 can implement the clock 365 via a stable atomic clock. In such a scenario, the non-atomic clock in other satellites 110 can be adjusted and/or stabilized based on a timing signal contained in inter-satellite communication from the satellite(s) 110 that contains the atomic clock.

Satellite processing system 300 can include at least one inter-satellite link transceiver 345 operable to transmit data to and/or receive data from one or more other satellite processing systems 300; a backhaul transceiver 340 operable to transmit data to and/or receive data from the backhaul satellites 150 and/or ground stations 200 and/or 201; and/or a navigation signal transmitter 330 operable to broadcast and/or otherwise transmit signals 240 including, for example, navigational signals including, a ranging signal, GNSS correction data, a navigation message and/or other navigational signal, radio occultation data, command and control data and/or data. Data transmitted by the navigation signal transmitter 330 can be received by one or more backhaul satellites 150, one or more ground stations 200 and/or 201, one or more satellite processing systems 300 onboard other satellites 110, and/or one or more client devices 160 which can include, for example, one or more automobiles, tablets, smartphones, smartwatches, laptop computers, desktop computers, other computers and computer systems, navigation devices, device location systems, weather systems, marine navigation systems, rail navigation systems, aircraft, agricultural vehicles, surveying systems, autonomous or highly automated vehicles 331, UAVs 332, and/or other client devices 160 as discussed herein.

While a configuration is shown having at least one inter-satellite link transceiver 345, in the alternative, the navigation signal transmitter 330 can be implemented via a transceiver having a fixed antenna beam pattern or an antenna beam pattern that can be dynamically adjusted to include both a main lobe that is directed toward the earth for the transmission of navigation signals 240 and one or more sidelobes in the direction of one or more other satellites. Such a configuration enables the inter-satellite communications to be integrated with or otherwise transmitted and received contemporaneously with the navigation signals 240.

In some embodiments, some or all ground stations 200 and/or 201 can include some or all of the components of satellite processing system 300, and/or can otherwise perform some or all of the functionality of the satellite processing system 300 as discussed herein. In such embodiments, the satellite constellation system 100 can include one or more ground stations 200 and/or 201 in addition to the plurality of satellites 110, where the ground stations 200 and/or 201 serve as additional nodes communicating in the satellite constellation system 100 in the same and/or similar fashion as the plurality of satellites 110 by generating, transmitting, receiving, and/or relaying some or all of the signals and/or data as discussed herein with regards to the satellites 110. In this fashion, some or all of ground stations 200 and/or 201 can effectively serve as a subset of the plurality of satellites 110, the only distinction being that these ground stations 200 and/or 201 that make up this subset of the plurality of satellites 110 are located on the ground and/or are located at a facility on the surface of the earth at a fixed position, while some or all of the remaining ones of the plurality of satellites 110 are orbiting in LEO.

Alternatively or in addition, at least one backhaul satellite 150 can similarly include some or all of the components of satellite processing system 300, and/or can otherwise perform some or all of the functionality of a satellite processing system 300 as discussed herein. In such embodiments, the satellite constellation system 100 can include one or more backhaul satellites 150 in addition to the plurality of satellites 110, where the backhaul satellites 150 serve as additional nodes communicating in the satellite constellation system 100 in the same and/or similar fashion as the plurality of satellites 110 by generating, transmitting, receiving, and/or relaying some or all of the signals and/or data as discussed herein with regards to the satellites 110. The at least one backhaul satellite 150 can be considered a subset of the plurality of satellites 110, with the only distinction being that the at least one backhaul satellite 150 is located in a more outer orbit than LEO and/or than the orbit of the other ones of the plurality of satellites 110.

Alternatively or in addition, at least one client device 160 that is operable to receive and utilize data transmitted by satellites 110 as discussed herein can similarly include some or all of the components of the satellite processing system 300, and/or can otherwise perform some or all of the functionality of a satellite processing system 300 as discussed herein. In such embodiments, the satellite constellation system 100 can include, in addition to the plurality of satellites 110, one or more mobile computing devices, cellular devices, vehicles, and/or other client devices 160 discussed herein. Thus, some or all of these types of devices can serve as additional nodes communicating in the satellite constellation system 100 in the same and/or similar fashion as the plurality of satellites 110 by utilizing their own processing module, memory module, receivers, transmitters, and/or sensors to generate, transmit, receive, and/or relay some or all of the signals and/or data as discussed herein with regards to the satellites 110. Some or all of these devices can be considered a subset of the plurality of satellites 110, with the only distinctions being that these devices are user devices that include a display and/or interface allowing a user to observe and/or interact with the data generated by and/or received from the satellites 110; that these devices are configured to further post-process received data in conjunction with the functioning of the client device 160 and/or in conjunction with one of the more of the applications discussed herein; that these devices are located on or near the surface of the earth; and/or that these devices are located at altitudes that are closer to the surface of the earth than LEO and/or the other orbit of the other ones of the plurality of satellites 110.

In some embodiments, the ground stations 200 and/or 201, the backhaul satellite 150, and/or some or all of these client devices 160 can receive application data associated with the satellite constellation system 100 for download. For example, the application data can be downloaded from a server system associated with the satellite constellation system 100 via the network 250. Alternatively or in addition, the application data can be transmitted, via one or more of the links discussed in conjunction with FIG. 2, to some or all of these devices for download via other satellites 110 orbiting in LEO. The application data can thus be received for download by a device for download in a signal, received by a receiver of the device, that was broadcasted by a satellite 110. The application data can be installed and stored in the memory of the device and can include operational instructions that, when executed by the processing module of the device, cause ground stations 200 and/or 201, backhaul satellite 150, and/or client devices 160 to operate in the same or similar fashion as satellite processing system 300 and/or to otherwise perform some or all of the functionality or other operations of the satellites 110 as discussed herein. Alternatively or in addition, some or all ground stations 200 and/or 201, backhaul satellite 150, and/or client devices 160 can be equipped with additional hardware to implement some or all of the processing module 320, memory module 310, and/or some or all of the sensors, transmitters, receivers, and/or transceivers of satellite processing system 300 of FIG. 3B to enable the device to perform some or all of the functionality of the satellites 110 as discussed herein.

Consider the following example, the processing module 320 is configured to generate navigation signals 240, such as ranging signals modulated and coded with navigation messages that contain timing, ephemeris and almanac data. In addition, the navigation messages can include, for example, PPP data associated with the satellites 130, command and control data, integrity data associated with satellites 130 and other satellite 110, RO data, atmospheric or weather data including a current weather state, a weather map and/or a predictive weather model, secure clock data, encryption and security information, any of the other types of data produced or transmitted by the satellite 110 in the navigation signals 240. In various embodiments, the data of the navigation signal 240 can be formatted in frames and subframes with a data rates exceeding 1 kbits/sec, however other data rates can be used. Navigations signals can be generated in two or more frequency channels at a signal power of 50 W, 100 W or more or at some lower power.

The operations of the processing module 320 can further include, for example, locking-in on the timing of the ranging signals of the signals 132 via the associated pseudo random noise (PRN) codes associated with each satellite 130 (that is not excluded based on integrity monitoring), demodulating and decoding the ranging signals to generate and extract the associated navigation messages from the GNSS satellites 130 in range of the receiver, applying correction data received via backhaul and/or inter-satellite communications and atmospheric data generated locally and/or received via backhaul and/or inter-satellite communications to the position and timing information from the navigation messages from the GNSS satellites 130.

In various embodiments, first-order ionospheric delay is mitigated using the combinations of dual-frequency GNSS measurements. Otherwise, ionospheric and tropospheric delay can be corrected using atmospheric models generated based on the RO data. Furthermore, the processing module 320 can use a Kalman filter such as an extended Kalman filter or other estimation technique where orbital position, clock error, ionospheric delay, tropospheric delay and/or carrier-phase errors are estimated filter states. The precise orbital position of the satellite 110 can be generated by positioning calculations that employ navigation equations to the corrected orbital positions and timing for each of the satellites 130.

In various embodiments, the operations of the satellite 110 include, for example, orbital control, attitude control, power management and control, temperature control, radio occultation, generating and/or maintaining tropospheric models, ionospheric models, weather models, atmospheric data generation, weather data generation, orbit determination, navigation message scheduling, navigation message generation, GPS reflectometry, sensor data collection, sensor data processing, GNSS reception, backhaul transmission and reception, inter-satellite transmission and reception, GNSS satellite integrity monitoring, LEO satellite integrity monitoring, secure timing generation and transmission, memory clean-up, health status monitoring of the components and systems of the satellite 110, receiving updates, processing updates and/or other operations described herein. The resource allocation module 325 operates to control the various operations of the satellite 110 based on reception of command data from a ground station, an amount of memory usage, an amount of processor utilization, the distance between the satellite 110 and a backhaul satellite 150, other satellites 110 and/or a ground station 200, the battery level of the satellite 110, when the satellite 110 will be in an orbital position to generate additional power, a fuel status, a health status of the satellite 110, atmospheric data, weather data including a current weather state, a predictive weather model and or other status or conditions determined by the satellite processing system 300.

The resource allocation module 325 can also operate to control the various operations of the satellite 110 based on the orbital position of the satellite 110 relative to positions above the earth corresponding to high population density, low population density, an ocean, a rainforest, a mountain range, a desert or other terrestrial condition or feature. The resource allocation module 325 can also operate to control the various operations of the satellite 110 based on the orbital position of the satellite 110 relative to the orbital positions of one or more other satellites 110 in the satellite constellation system 100. The resource allocation module 325 can also operate to control the various operations of the satellite 110 based on the state of the satellite constellation system 100 including, for example the number of satellites 110, the number of orbital paths, the number of satellites in each orbital path, the number and positions of satellites 110 that are on-line, off-line, are not currently generating navigation signals and/or navigation messages and/or other status of the various satellites 110 of the satellite constellation system 100.

The control of various satellite operations by the resource allocation module 325 can include determining when to enable or initiate an operation, when to disable or cease an operation and/or the percentage of time allocated to each of the operations during a time period such as a second, a minute, an hour, an orbital period, or a day. The control of various satellite operations by the resource allocation module 325 can also include selecting and assigning memory resources, processing resources, sensor resources, transmitter, receiver and/or transceiver resources, to the various operations selected to be performed. The control of various satellite operations by the resource allocation module 325 can also include selecting memory parameters such as queue sizes, cache sizes, and other memory parameters. The control of various satellite operations by the resource allocation module 325 can also include selecting processing parameters such as one or more processing speeds, or other processing parameters. The control of various satellite operations by the resource allocation module 325 can also include selecting transmitter, receiver and transceiver parameters, for example, encryption parameters, data protocol parameters, transmit power, transmission beamwidth, reception beamwidth, beam steering parameters, frequencies, the number of channels in use, data rates, modulation techniques, multiple access techniques, and other transmit and receive parameters. The control of various satellite operations by the resource allocation module 325 can also include selecting other parameters used by the satellite processing system including various thresholds used to determine whether or not two quantities compare favorably to one another.

The operations of the satellite 110 can be described further in conjunction with the examples and embodiments that follow. In various embodiments, the satellite 110 is a LEO satellite of a constellation 100 of LEO navigation satellites in LEO around the earth. A global positioning receiver, such as GNSS receiver 360, is configured to receive first signaling, such as signaling 132 from a first plurality of non-LEO navigation satellites, such as satellites 130 of a constellation 120 of non-LEO navigation satellites in non-LEO around the earth. An inter-satellite transceiver, such as inter-satellite link transceiver 345, is configured to send and receive inter-satellite communications with other LEO navigation satellites 110 in the constellation of LEO navigation satellites. At least one processor of the processing module 320 is configured to execute operational instructions that cause the processor(s) to perform operations that include: determining an orbital position of the LEO satellite based on the first signaling; and generating a navigation message based on the orbital position. A navigation signal transmitter, such as navigation signal transmitter 330, is configured to broadcast the navigation message to at least one client device 160. The navigation message facilitates the determination by these client device(s) of an enhanced position of these client device(s) based on the navigation message and further based on second signaling 132 received from a second plurality of non-LEO navigation satellites of the constellation of non-LEO navigation satellites.

In various embodiments the LEO satellite also includes a backhaul transceiver, such as backhaul transceiver 340, configured to receive correction data associated with the constellation of non-LEO navigation satellites, wherein the determining the orbital position of the LEO satellite is further based on based the correction data. The backhaul transceiver can be configured to receive the correction data from either a backhaul communication satellite in geostationary orbit around the earth or a terrestrial transmitter. The operations of the processor(s) can further include:

generating radio occultation data based on the inter-satellite communications with at least one of the other LEO navigation satellites in the constellation of LEO navigation satellites; and transmitting the radio occultation data via the backhaul transceiver. The correction data can include orbital correction data and timing correction data associated with the constellation of non-LEO navigation satellites. The navigation message can include a timing signal and the orbital position associated with the LEO satellite. The navigation message can further include the orbital correction data and the timing correction data associated with the constellation of non-LEO navigation satellites.

In various embodiments, the LEO satellite further includes a non-atomic clock configured to generate a clock signal, wherein the timing signal is generated by adjusting the clock signal based on the first signaling and further based on the timing correction data. The constellation of non-LEO navigation satellites can be associated with at least one of: a Global Positioning System of satellites, a Quasi-Zenith Satellite System, a BeiDou Navigation Satellite System, a Galileo positioning system, a Russian Global Navigation Satellite System (GLONASS) or an Indian Regional Navigation Satellite System. The navigation message can include correction data associated with the constellation of non-LEO navigation satellites in non-LEO around the earth, wherein the at least one client device determines the enhanced position of the client device by applying the correction data to the second signaling. The navigation message can further include a timing signal and the orbital position associated with the LEO satellite, wherein the at least one client device determines the enhanced position of the at least one client device further based on the timing signal and the orbital position associated with the LEO satellite.

In various embodiments, the inter-satellite communications include correction data associated with the constellation of non-LEO navigation satellites received via at least one of the other LEO navigation satellites in the constellation of LEO navigation satellites, wherein determining the orbital position of the LEO satellite is further based on based the correction data.

The inter-satellite communications can include at least one of: navigation signal 240, the navigation message and/or other state data needed to do the state estimation of the satellite 110 sent to at least one of the other LEO navigation satellites in the constellation of LEO navigation satellites; radio occultation; atmospheric data generated based on radio occultation; control information associated with satellite direction; control information associated with satellite attitude; control information associated with satellite status; control information associated with satellite inter-satellite transmit/receive condition; command information associated with satellite inter-satellite transmit/receive status; command information associated with inter-satellite transmit power or frequency; control information associated with encryption; constellation integrity information relating to the health of one or more LEO navigation satellites in the constellation of LEO navigation satellites; or constellation integrity information relating to the health of one or more non-LEO navigation satellites in the constellation of non-LEO navigation satellites. Furthermore, the inter-satellite communications can include one-to-many transmissions between the LEO satellite and two or more of the other LEO navigation satellites in the constellation of LEO navigation satellites.

In various embodiments, the first plurality of non-LEO navigation satellites can include four or more non-LEO navigation satellites of the constellation of non-LEO navigation satellites that are in reception range of the global positioning receiver, however signals 132 from fewer non-LEO satellites can be used when navigation signals 240 are received from one or more LEO satellites via inter-satellite communications. The second plurality of non-LEO navigation satellites can include three or more non-LEO navigation satellites of the constellation of non-LEO navigation satellites that are in reception range of the at least one client device, however signals 132 from fewer non-LEO satellites can be used when navigation signals 240 are received from more than one LEO satellites in reception range of the at least one client device.

In various embodiments, at least one processor of the processing module 320 is configured to execute operational instructions that cause the processor(s) to perform operations that include: determining an orbital position of the LEO satellite 110 based on the first signaling 132 and the correction data received via either the backhaul transceiver 340 or the inter-satellite link transceiver 345 and generating a navigation message based on the orbital position. The navigation signal transmitter 330 configured to broadcast the navigation message to at least one client device 160, the navigation message facilitating the at least one client device to determine an enhanced position of the at least one client device based on the navigation message.

In various embodiments, at least one processor of the processing module 320 is configured to execute operational instructions that cause the processor(s) to perform operations that include: determining an orbital position of the LEO satellite based determining, based on the first signaling 132, an error condition associated with one of the non-LEO navigation satellites of the constellation of non-LEO navigation satellites; and generating a navigation message based on the orbital position, wherein the navigation message includes a timing signal and the orbital position associated with the LEO satellite, correction data associated with the constellation of non-LEO navigation satellites, and integrity monitoring data that includes an alert signal that indicates the error condition associated with the one of the non-LEO navigation satellites of the constellation of non-LEO navigation satellites. The navigation signal transmitter is configured to broadcast the navigation message to at least one client device, the navigation message facilitating the client device(s) to determine an enhanced position of the at least one client device, based on the navigation message and further based on second signaling received from a second plurality of non-LEO navigation satellites of the constellation of non-LEO navigation satellites in the non-LEO around the earth while excluding signals from the one of the non-LEO navigation satellites. Furthermore, the satellite 110 itself can exclude signals from the one of the non-LEO navigation satellites when calculating its orbital position.

The alert signal and/or integrity monitoring data that indicates the error condition associated with the one of the non-LEO navigation satellites of the constellation of non-LEO navigation satellites can also be shared with the other LEO satellites 110 and/or one or more ground stations via inter-satellite and/or backhaul communications. This allows the other satellites 110 to exclude signals from the one of the non-LEO navigation satellites when calculating their orbital position. This also allows the other satellites 110 to include integrity monitoring data indicating the faulty satellite in their own navigation messages.

In various embodiments, at least one processor of the processing module 320 is configured to execute operational instructions that cause the processor(s) to perform operations that include: determining an orbital position of the LEO satellite based on the first signaling; determining, based on the inter-satellite communications, an error condition associated with one of the other LEO navigation satellites of the constellation of LEO navigation satellites; and generating a navigation message based on the orbital position, wherein the navigation message includes a timing signal and the orbital position associated with the LEO satellite, correction data associated with the constellation of non-LEO navigation satellites, and an alert signal that indicates the error condition associated with one of the other LEO navigation satellites of the constellation of LEO navigation satellites. The navigation signal transmitter is configured to broadcast the navigation message to at least one client device, the navigation message facilitating the at least one client device to determine an enhanced position of the at least one client device, while excluding signals from the one of the other LEO navigation satellites, for example, based on the navigation message and further based on second signaling received from a second plurality of non-LEO navigation satellites of the constellation of non-LEO navigation satellites in the non-LEO around the earth.

The alert signal and/or integrity monitoring data that indicates the error condition associated with the one of the LEO satellites of the constellation of LEO satellites can also be shared with the other LEO satellites 110 and/or one or more ground stations via inter-satellite and/or backhaul communications. This allows the other satellites 110 to include integrity monitoring data indicating the faulty satellite in their own navigation messages. It should be noted that, while the foregoing integrity monitoring operation have been described as being performed by the satellite 110 in-situ, in other embodiments, integrity monitoring activities involving the detection of faulty LEO or non-LEO satellites can instead be performed by one or more ground stations and the resulting integrity monitoring data can be shared with the satellites 110 via a combination of backhaul and inter-satellite communication. Furthermore, the function of integrity monitoring involving the detection of faulty LEO or non-LEO satellites can be assigned to a particular satellite 110 on a dedicated basis that is not tasked with, configured for and/or capable of, the generation of navigation signals 240.

In various embodiments, at least one processor of the processing module 320 is configured to execute operational instructions that cause the processor(s) to perform operations that include: determining a first orbital position of the LEO satellite at a first current time based on the first signaling; generating a plurality of first orbital position estimates of the LEO satellite for a plurality of first subsequent times associated within a first time window from the first current time; generating, based on a curve fitting technique, a first navigation message indicating the first orbital position at the first current time and the first plurality of orbital position estimates of the LEO satellite for the first plurality of subsequent times; broadcasting, via the navigation signal transmitter, the first navigation message to at least one client device; determining a second orbital position of the LEO satellite at a second current time based on the first signaling, the second current time corresponding to one of the first plurality of subsequent times associated with the first time window and the second current time corresponding to one of the first plurality of orbital position estimates; generating an error metric based a difference between the first orbital position of the LEO satellite at the second current time and the corresponding one of the first plurality of orbital position estimates. When the error metric compares unfavorable to an error threshold: generating, based on the curve fitting technique, a second plurality of updated orbital position estimates of the LEO satellite for a second plurality of subsequent times associated from the second current time; generating a second navigation message indicating the second orbital position at the second current time and the second plurality of orbital position estimates of the LEO satellite for the second plurality of subsequent times; and broadcasting, via the navigation signal transmitter, the second navigation message to the at least one client device. When the first time window expires at a third current time without a second navigation message generated: determining a third orbital position of the LEO satellite at the third current time based on the first signaling; generating, based on the curve fitting technique, a third plurality of updated orbital position estimates of the LEO satellite for a third plurality of subsequent times associated within a second time window from the third current time; generating a third navigation message indicating the third orbital position at the third current time and the third plurality of orbital position estimates of the LEO satellite for the third plurality of subsequent times; and broadcasting, via the navigation signal transmitter, the third navigation message to the at least one client device.

In various embodiments, at least one processor of the processing module 320 is configured to execute operational instructions that cause the processor(s) to perform operations that include: determining an orbital position of the LEO satellite based on the first signaling; generating a second timing signal by adjusting the clock signal based on the first signaling and further based on correction data associated with the constellation of non-LEO navigation satellites; and generating a navigation message based on the orbital position, wherein the navigation message includes the second timing signal and the orbital position of the LEO satellite and correction data associated with the constellation of non-LEO navigation satellites.

In various embodiments, at least one processor of the processing module 320 is configured to execute operational instructions that cause the processor(s) to perform operations that include: generating radio occultation data based on the inter-satellite communications with at least one of the other LEO navigation satellites in the constellation of LEO navigation satellites, the radio occultation data indicating atmospheric conditions associated with the ionosphere and the troposphere; transmitting the radio occultation data via a backhaul transceiver; receiving correction data associated with the constellation of non-LEO navigation satellites, the correction data generated based in part on the radio occultation data; determining an orbital position of the LEO satellite based on the first signaling and the correction data; and generating a navigation message based on the orbital position.

In various embodiments, at least one processor of the processing module 320 is configured to execute operational instructions that cause the processor(s) to perform operations that include: determining the transmit/receive status for the inter-satellite communications between the LEO satellite and at least one other of the plurality of other LEO navigation satellites in the constellation of LEO navigation satellites. For example, the transmit/receive status for the inter-satellite communications between the LEO satellite and at least one other of the plurality of other LEO navigation satellites in the constellation of LEO navigation satellites can be determined based on at least one of: a memory usage of the LEO satellite; a memory usage of the at least one other of the plurality of other LEO navigation satellites; a distance between the LEO satellite and a backhaul receiver; a distance between the at least one other of the plurality of other LEO navigation satellites and the backhaul receiver; a battery level of the LEO satellite; a different between the battery level of the LEO satellite and a battery level of the at least one other of the plurality of other LEO navigation satellites; an estimated time that the LEO satellite can generate more power; an estimated time that the at least one other of the plurality of other LEO navigation satellites can generate more power; or atmospheric data that indicates atmospheric conditions generated based on radio occultation.

In various embodiments, the inter-satellite communications include at least one of: the navigation message sent to at least one of the other LEO navigation satellites in the constellation of LEO navigation satellites; radio occultation; atmospheric data generated based on radio occultation; control information associated with satellite direction; control information associated with satellite attitude; control information associated with satellite status; control information associated with satellite inter-satellite transmit/receive condition; command information associated with satellite inter-satellite transmit/receive status; command information associated with inter-satellite transmit power or frequency; control information associated with encryption; constellation integrity information relating to the health of one or more LEO navigation satellites in the constellation of LEO navigation satellites; or constellation integrity information relating to the health of one or more non-LEO navigation satellites in the constellation of non-LEO navigation satellites.

FIG. 3C is a pictorial diagram of a satellite in accordance with various embodiments. In particular, a lower perspective view of a satellite, such as satellite 110, is presented. The satellite body is constructed in a modular fashion of six commercial off-the-shelf units such as CubeSat units or other units that are interconnected. The front face of the satellite body 308 includes a first sun sensor 333-1, a first inter-satellite link transceiver 345-1 and a star tracker 380. The bottom side of the satellite body 308 includes a first retroreflector 332-1, a first backhaul transceiver 340-1 and two navigation signal transmitters 330, for example, corresponding to two different frequency channels. The side of the satellite body includes a second retroreflector 332-2. The top of the satellite body is fitted with deployable plates 306 that fold out for use in orbit (as shown) to support an array of solar cells for powering the satellite.

FIG. 3D is a pictorial diagram of a satellite in accordance with various embodiments. In particular, an upper perspective view of a satellite, such as satellite 110. The rear face of the satellite body 308 includes a second sun sensor 333-2 and a second inter-satellite link transceiver 345-2. The top side of the satellite body 308 includes a GPS receiver 305, a second backhaul transceiver 340-2 and solar panels 304. Solar panels 304 are also arranged on the top of the deployable plates 306. The side of the satellite body includes a third retroreflector 332-3.

As discussed herein, components of the satellite processing system 300 operate to generate a precise orbital position of the satellite 110. In addition to the use of this orbital position in the generation of navigation signals 240, this orbital position can be used to determine when the satellite 110 needs to be repositioned and to aid in such repositioning by use of the satellite flight control system 302.

In various embodiments, the precise orbital position of the satellite 110 at a given time is compared with its desired orbital position at that time to determine the amount of deviation. Furthermore, the predicted path of the satellite 110 can be compared with the predicted paths of numerous other space objects including other satellites, spacecraft, space junk and other near-earth objects to predict a potential future collision. Such determinations and predictions can be generated via a ground station in backhaul communication with the satellite 110 of via the satellite itself. In either case, the satellite 110 can be repositioned to a desired location and orientation using of the satellite flight control system 302.

In various embodiments, the satellite flight control system 302 includes a multi-axis propulsion system. In the alternative, the satellite flight control system 302 includes merely a three-axis attitude controller that is used reposition the satellite 110. Consider the example satellite configuration shown in FIGS. 3C and 3D. Roll, pitch and/or yaw axis variations in the satellites attitude can cause multi-axis drag force vectors acting on the satellite body 308 and the deployable plates 306, in particular, that can be used in the repositioning process to vary the orbital path of the satellite 110.

It should be noted that the example shown in FIGS. 3C and 3D present but one of the many possible implementations of the satellite 110.

Figure 4:
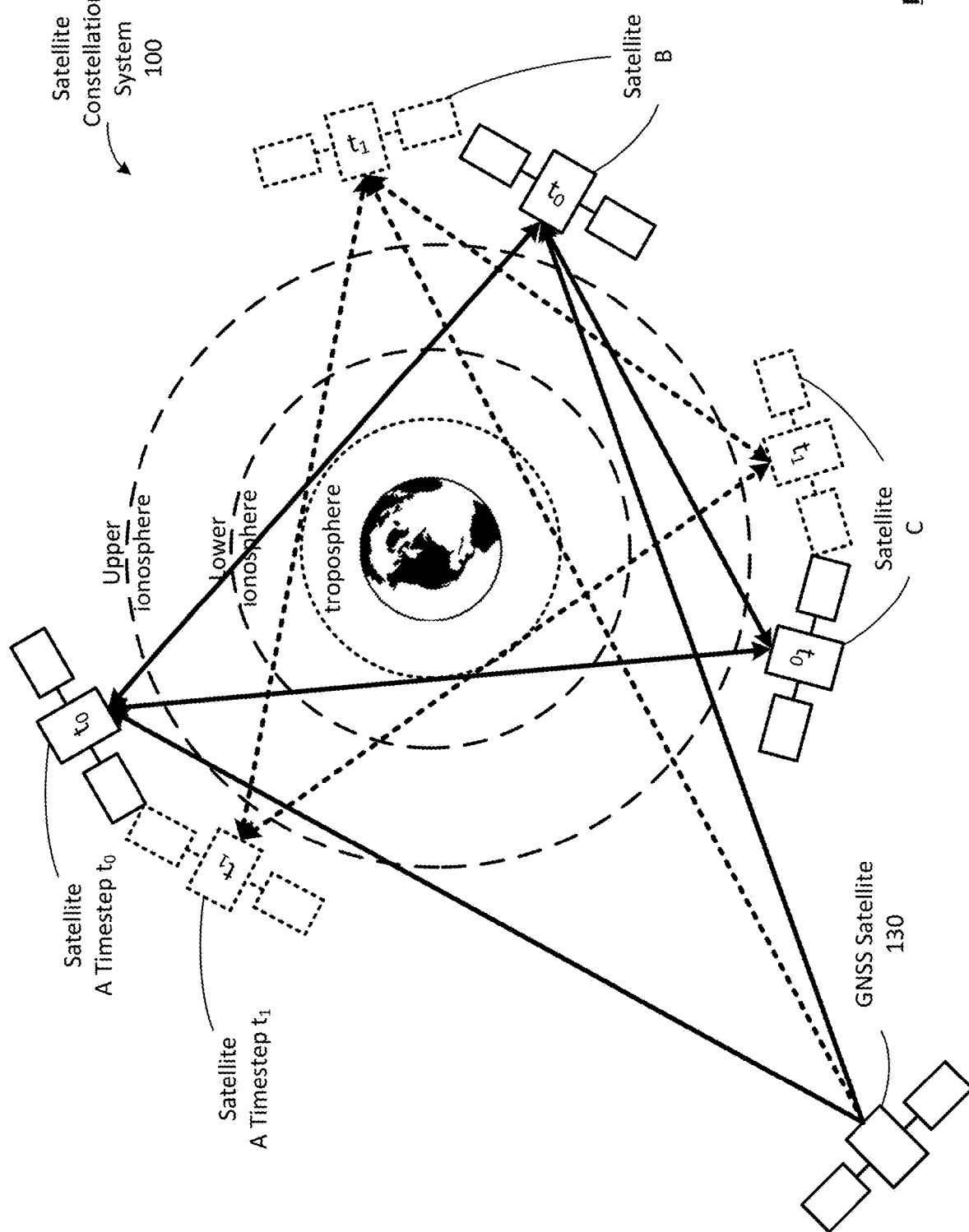
FIG. 4 is a schematic block diagram of a satellite constellation system utilized to perform radio occultation in accordance with various embodiments.

FIG. 4 presents an example embodiment of a satellite constellation system 100 that is implemented to perform atmospheric monitoring via radio occultation (RO). Radio occultation enables detailed monitoring of the Earth's atmosphere, which allows for more accurate weather forecasting. This is performed by characterizing elements of a transmitted signal as it passes through Earth's atmosphere. In particular, each satellite 110 can be operable to observe and/or generate RO data based on received signals transmitted by other satellites 110 and/or GNSS satellites 130, such as navigation signals 240 and/or GNSS signals. This RO data includes measurements and/or other data that characterizes a portion of the atmosphere that the received signal traversed in its transmission from the other satellite. A satellite 110's generation of RO data based on received signals, and/or a satellite 110's transmission of this generated RO data, can be accomplished by utilizing radio occultation module 321.

RO can be performed using Global Navigation Satellite System (GNSS) signals that are being transmitted from Medium Earth Orbit (MEO) and subsequently monitored from satellites in Low Earth Orbit (LEO). These GNSS signals provide RO information on the upper atmosphere, but due to their weak signal strength, these GNSS signals are unable to provide high quality measurements to the lower portions (altitudes) of the atmosphere. Furthermore, the GNSS signals come from a limited number of MEO satellites. This limitation on number and the relatively slow orbital period of these GNSS satellites 130 naturally constrains the rate of change of observation vectors and therefore the amount of atmosphere being observed. These factors limit both the spatial and temporal resolution of the atmosphere being monitored.

Satellite constellation system 100 presents improvements to current atmospheric monitoring techniques. In contrast to existing GNSS-based RO methods, satellite constellation system 100 can handle the transmission and/or reception of navigation signals 240 in addition to traditional GNSS signals received from GNSS satellites 130. The geometry of the line of sight vector, in this case a line of sight vector being a radio line of sight such that the receiving end can receive a transmission from the transmission end, between satellites 110 in a LEO orbit provides a unique geometry that gives rise to uncommon atmospheric cuts that are capable of providing a deeper understanding of the Earth's atmosphere, as depicted in FIG. 4. To further atmospheric modeling capabilities, navigation signal 240 is transmitted by satellites 110 in LEO, and can be delivered at higher power levels than those from MEO. This enables deeper penetration of the atmosphere down to the planetary boundary layer and/or to less than 5 km in altitude, even in heavy moisture conditions. This provides an unprecedented level of detailed information of all levels of the atmosphere.

Additionally, using LEO satellites for both transmission and reception in RO results in an unprecedented number of RO events due to the smaller LEO orbital period. This greatly increases the temporal and spatial resolution of atmospheric measurements, resulting in a higher fidelity model and in turn a better understanding of its dynamics. Furthermore, a LEO constellation with a high density of satellites, with groups spaced across different orbital planes will result in sections of the atmosphere between the orbital planes being observed with a very high frequency (e.g. 10 minutes between observations depending on the spacing in the orbital plane), providing near real time tomography of the atmosphere.

Furthermore, navigation signal 240 of satellite constellation system 100 can reside in one or more different frequency bands than GNSS signals used for RO today, enabling another dimension of atmospheric characterization than what is possible today.

The data finks (Backhaul uplink 220, downlink 210, inter-satellite link 230, and/or navigation signal 240) permit the RO data obtained by the satellites to be transmitted down to the ground quickly for optimal use. The RO data can include the raw RO measurements observed by each satellite 110 and/or can include post-processed data that can, for example, contain already computed temperature and/or humidity profiles of the atmosphere. For example, satellites 110 can be operable to compute temperature and/or humidity profiles of the atmosphere based on the observed RO measurements.

In the example illustrated in FIG. 4, three satellites A, B, and C, are located in a LEO orbit, and a single GNSS satellite 130 is located in a MEO orbit. The satellites A, B, and C are each distinct satellites 110 of the satellite constellation system 100. The satellites A, B, and C and the single GNSS satellite 130 are depicted at two different time steps: $t_0$ and $t_1$.

At the first time step, $t_0$, all three satellites 110 can see, and/or can otherwise be operable to receive, each other's navigation signal 240. Since each satellite 110 is capable of transmitting and/or receiving navigation signal 240, each of the line of sight vectors, representing an ability to transmit and/or receive navigation signal 240, are shown as two-way vectors. Due to the placement of the satellites 110 in orbit and the properties of navigation signal 240 such as the broadcast power, each of these lines of sight traverse through different layers of the Earth's atmosphere, including layers that are close to the Earth's surface. The signal from GNSS satellite 130 can also be used by satellites A and B at the first time step, $t_0$, to get information through the uppermost part of the atmosphere. Note that while satellite C does have a line of sight to GNSS satellite 130, that signal does not traverse any layers of the atmosphere of interest for monitoring and is unable to produce RO measurements, and is therefore omitted from the figure.

At the second time step, $t_1$, which is shortly after the first time step, all three of satellites 110 have moved in their orbit. For this example, the time between $t_0$ and $t_1$ is such that GNSS satellite 130 has effectively not changed location due to the much longer orbital period of a MEO satellite compared to a LEO satellite. At time step $t_1$, once again all three of the satellites 110 are able to maintain their lines of sight, this time at slightly different locations in the atmosphere, providing new measurement data. Due to the placement of satellites 110 in their orbit in this example, only one of the satellites is able to use the signal from GNSS satellite 130 for RO purposes. The line of sight vector from GNSS satellite 130 and Satellite A no longer goes through the atmosphere to create observations and the line of sight vector from GNSS satellite 130 and Satellite C still does not go through the atmosphere. Note that while the line of sight vector from GNSS satellite 130 and Satellite B is maintained that measurement will be degraded due to how much atmosphere the signal must traverse. This exemplifies one of the drawbacks of RO systems today using existing GNSS signals unable to constantly provide information as there are some cases where the geometry is in such a way that does not allow high quality RO observations to be made.

Building from this example, considering a typical orbital period for a LEO satellite of 90 minutes, every 90 minutes a LEO satellite will complete a full sweep of its trajectory around Earth's atmosphere. Furthermore, with a dense constellation of satellites spread across a given number of orbital planes, the time between one pair of satellites passing through a part of the atmosphere and the following pair passing through nearly the same region of the atmosphere can be very short (e.g. tens of minutes). Thus, the satellites 110 of the satellite constellation system 100 allow for an unprecedented temporal revisit of regions of the atmosphere that can be used to better predict weather and improve models. When performing RO with MEO GNSS signals, the geometry change is much slower since a MEO satellite's orbital period is approximately 12 hours. Furthermore, the LEO and MEO satellite orbits are not in sync, which does not guarantee the ability to repeatedly pass through the same parts of the atmosphere and therefore cannot provide the spatially correlated temporal data that can be provided by this satellite system.

The raw RO measurements and/or processed data can be processed by one or more client devices 160 and/or other computing devices that receive the RO data from the satellites 110 and/or from ground station 200 and/or 201, for example, via network 250. The processing of this data can enable a range of applications, for example, by various other entities that benefit from improved characterizations and/or profiles of the atmospheric.

One example application of utilizing the received raw RO measurements and/or processed data includes generating weather forecasting data. For example, one or more client devices 160 can process the RO data to generate forecast models, to improve upon forecast models, and/or to generate other weather forecasting data.

As another example application, one or more client devices 160 can process the RO data to generate ionospheric data, such as ionospheric mappings and/or other data characterizing various portions of the ionosphere over time. This can include generating real-time and/or substantially close to real-time ionospheric mappings. This can include generating models that can be utilized to generate prediction data utilized predict and/or improve upon predictions of future states of the ionosphere. This can be utilized to improve performance of other systems that transmit through the ionosphere. For example, spaced-based communications systems can utilize the information from this real-time ionospheric mapping and/or other detailed ionospheric maps, and/or can utilize these models to better predict behavior of transmissions through the ionosphere and/or to improve performance and efficiency of their systems.

As another example application, one or more client devices 160 can process the RO data in conjunction with space measurement systems. In particular, the scientific measurement of stars and/or signals from space can be improved by utilizing ionospheric data generated based on the RO data. For example, the model can be utilized to predict ionospheric mappings at future times, to schedule the running of telescopes, and/or to otherwise facilitate scheduling and/or adjustment of measurements of stars and/or signals from space.

As another example application, one or more client devices 160 can process the RO data in conjunction with communication constellations, for example that rely on transmitting through the ionosphere. In particular, current ionosphere mappings or predicted future ionosphere mappings generated based on the received RO data can be utilized to aid in determining power levels that need to be broadcast based on current ionosphere mappings or predicted future ionosphere mappings. This can also be utilized to determine and/or predict current and/or future possible areas of outages, for example, enabling the communication constellations to adapt its transmissions accordingly.

As another example application, one or more client devices 160 can process the RO data in conjunction with space weather monitoring for early warning for high value space assets and/or ground infrastructure.

As another example application, one or more client devices 160 can process the RO data for improved GNSS, improved performance of satellite constellation system 100, and/or improvements for other third-party users interested in detailed real-time atmospheric models.

Some or all of these applications of received RO data can alternatively be facilitated via a processing module 320 of a satellite processing system 300 and/or via another processing system affiliated with the satellite constellation system 100. Models and/or other processed data in conjunction with these applications can be transmitted, for example via network 250 and/or directly from a satellite 110, to client devices 160 associated with end users of this data, for example, for display to the end users via a display device. Alternatively or in addition, the client devices 160 can download application data, for example via network 250, from a server system affiliated with the satellite constellation system 100. This application data, when executed by the client device, can cause the client device 160 to receive and/or process the RO data in conjunction with one or more of these applications.

The example demonstrated in FIG. 4 depicts each satellite 110 transmitting and receiving navigation signal 240. With these two-way links, each of the satellites in the link pair is capable of making RO observations for the same portion of the atmosphere and is capable of logging the necessary data, for example by generating and/or otherwise observing the RO data based on the received navigation signal 240, by temporarily storing the RO data in memory module 310 in a queue for transmission, and/or by transmitting the RO data via a backhaul link. Therefore, only one of the satellites need to be in view a ground station 200, and/or the backhaul satellite 150, or a backhaul node, such as one of the plurality of nodes of the satellite constellation system 100 in the transmission chain of backhaul links to the ground station 200 and/or the backhaul satellite 150. The satellite constellation system 100 can thus be configured such that only one of the satellites in a satellite pair transmit the RO data down to users on the ground, either directly or through a space-based satellite backhaul communication link, in real time. This allows the use of fewer resources, as only one of the two satellites needs to record the necessary measurements. To reduce power usage, the satellite system can be further configured in a such a way that optimizes a set of one way links such that only one satellite is transmitting navigation signal 240 and one is receiving the navigation signal 240 in a given pair.

As used herein, the satellite in a given pair that is designated to broadcast navigation signal 240 is designated the "transmitter satellite", and the other satellite in designated to receive navigation signal 240 is designated the "receiver satellite." The transmitter satellite can be configured to broadcast navigation signal 240. The transmitter satellite can be further configured to not receive navigation signal 240 from the other satellites 110, to not generate the RO data based on the navigation signal 240 received from the other satellites 110, and/or to not transmit the RO data via a backhaul link. The receiver satellite can be configured to receive navigation signal 240, to generate corresponding RO data and to transmit this RO data via a backhaul link. The receiver satellite can be configured to not transmit its own navigation signal 240. In some embodiments, the satellite in a given pair that is determined to be best placed for transmitting the data to ground users (either directly or through a space-based satellite backhaul communication link) can be selected as the receiver satellite, and the other satellite in the pair can be selected as the transmitter satellite. This optimization can further be performed across multiple sets of satellites where a single satellite is configured as the transmitter satellite to transmit to multiple satellites receiving and logging navigation signal 240.

Consider the pair of satellites A and B of FIG. 4. One of the satellites in the pair can be designated as the transmitter satellite at a particular time, while the other satellite in the pair is designated as the receiver satellite at the particular time. Which one of the satellites is designated as the transmitter satellite vs. the receiver satellite can be set and/or adjusted automatically via an adjustment process. The adjustment process can include determining the pair of satellites A and B should swap roles and/or determining the roles of the pair of satellites A and B to be reevaluated for potential swapping, in response to detection of a corresponding trigger condition. The adjustment process can be performed by utilizing processing module 320 of satellite A and/or satellite B, enabling the pair of satellites automatically determine roles amongst themselves. Alternatively, the adjustment process can be performed by another processing module 320 and/or other processing system of the satellite constellation system that is not included in the pair, where the roles are determined and received as instructions to satellite A and satellite B.

Performing the adjustment process can include determination of one or more trigger conditions that dictate the current roles should be swapped and/or otherwise be set. Example trigger conditions for automatic setting and/or adjustment of which satellite in the pair is designated as the transmitter satellite and which satellite in the pair is designated as the receiver satellite in a given pair of satellites 110 (Satellite A and Satellite B) include:

Determining satellite A's memory usage exceeds a given threshold such that it must stop recording RO measurements. As a result, satellite B is designated as the transmitter satellite and satellite A is designated as the receiver satellite.

Determining the distance between satellite A and a backhaul satellite 150 and/or a ground station 200 is greater than the distance between satellite B and backhaul satellite 150 and/or ground station 200 such that Satellite B is in a better position to record measurements. As a result, satellite B is designated as the receiver satellite and satellite A is designated as the transmitter satellite.

Determining the battery level of satellite A is below a given threshold such that it must stop transmitting a navigation signal. As a result, satellite B is designated as the transmitter satellite and satellite A is designated as the receiver satellite.

Determining the difference between battery level in satellite A and satellite B compares in such a way that Satellite A is determined to have more battery to use and/or is determined to have a more favorable battery level than satellite B. As a result, satellite A is designated as the transmitter satellite and satellite B is designated as the receiver satellite.

Determining that the difference between when satellite A will be able to generate power and when Satellite B will be able to generate power compares in such a way that satellite A is determined to be able to generate power sooner. As a result, satellite A is designated as the transmitter satellite and satellite B is designated as the receiver satellite.

Any other status changes, conditions or states of the individual satellites 110 or of the satellite constellation system 100 that may favor one satellite transmitting and/or receiving either in a paired configuration or in a one-to-many or many-to-one configuration.

While these trigger conditions illustrate examples between a specific pair of satellites, similar trigger conditions can be determined between any number of satellites when a one-to-many or many-to-one architecture is being used. In particular, consider a subset of three or more satellites 110. Similar trigger conditions can be utilized to determine a single one of the subset of three or more satellites 110 to be designated as the transmitter, and/or where a single one of the subset of three or more satellites 110 to be designated as the receiver. For example a single receiver in the subset can be selected in response to determining this satellite 110 is determined to have the least favorably battery level of the subset of satellites, in response to determining this satellite has a closest distance to backhaul satellite 150 and/or a ground station 200 of the subset of satellites, and/or a most favorable transmission path to backhaul satellite 150 and/or a ground station 200 of the subset of satellites. Alternatively, more than one of the subset of three or more satellites can be designated as transmitter satellites and/or receiver satellites. In some embodiments, all of the subset of three or more satellites 110 are designated as either a transmitter satellite or receiver satellite. Alternatively, at least one of the subset of three or more satellites can be designated to perform the functionality of both a transmitter satellite and a receiver satellite, and/or can be designated to not perform the functionality of either a transmitter satellite or a receiver satellite.

In performing the adjustment process, the automatic determination of which satellite in a pair of satellites and/or in a grouping of three or more satellites is designated as the receiver satellite requires communication between the satellites in the pair and/or grouping to relay status utilized to determine trigger conditions and/or to relay which satellite is designated to perform which role. Consider the following steps illustrating an example of performing the adjustment process between a pair of satellites A and B:

1. Satellite A's memory usage for storing RO measurements exceeds a given threshold and sends (through any link or combination of links in FIG. 2) a message to satellite B that it must stop receiving messages and that it is changing into transmission mode as a transmitter satellite.
2. Satellite A continues to log RO measurements and enables transmission of navigation signal (if not already enabled)
3. Satellite B can send (through any link or combination of links in FIG. 2) a status message to satellite A confirming that satellite B is in a mode corresponding to the receiver satellite and/or is otherwise logging measurements.
4. Satellite A can receive satellite B's status message and/or satellite A can detect that satellite B has changed state by receiving a navigation signal from satellite B (if it was not already receiving a navigation signal from satellite B)
5. Satellite A stops logging RO measurements.

A similar process can be performed in response to detection of another trigger condition described above. In particular, a satellite can determine to change its own state in response to detecting its battery level, memory capacity, other health status, distance from backhaul satellite and/or ground station, or other condition independent of other satellites compares favorably to a corresponding threshold dictating the satellite must change its state to be a transmitter satellite or a receiver satellite. In response to determining its own condition must change, the satellite can alert the other satellite in the pair and/or multiple satellites in the grouping of the change.

Alternatively or in addition, status information such as battery level, memory capacity, other health status, distance from backhaul satellite and/or ground station and/or other states and conditions can be exchanged between both satellites in a pair and/or between some or all satellites in a group, where a single satellite in the pair or grouping collects its own status information and the corresponding status information from the other one or more satellites in the pair or grouping, compares this status information and/or measures differences between statuses of the satellites and determines the optimal satellite to be selected as a transmitter satellite and/or the optimal satellite to be selected as a receiver satellite based on, for example, the corresponding trigger conditions. Once the selections have been made by the single satellite, this satellite can transmit one or more notifications indicating the assigned roles to the one or more other satellites in the pair or grouping. If one of the other satellites later determines its own condition must change based on monitoring its own status, the satellite can alert the other satellites in the grouping accordingly, and this process of collecting status data and reassigning roles by a single satellite can be triggered and repeated.

Alternatively or in addition, the decision for changing of the state can also be made by a ground monitor that is listening to all the status messages and send commands to the given satellites and/or can be made by another satellite that is not necessarily in the satellite pair but that can receive the status messages of the two satellites in the pair. This outside ground monitor and/or other satellite can generate and transmit notifications to the satellites in the pair or grouping indicating their newly assigned roles.

Alternatively or in addition, any of the changes to whether a satellite is a transmitter satellite and/or a receiver satellite can be performed in real time based on status messages or other command and control data and/or can be performed based on predetermined positions within the orbit based on known precomputed metrics that are a function of the satellite's placement within an orbit. For example, it can be precomputed that a satellite closer to a fixed ground station 200 should always be the receiver in a pair and therefore satellite 110 can be preconfigured to change to logging RO measurements when within a certain threshold distance of fixed ground station 200. This can correspond to a trigger condition that can be determined by a satellite monitoring its own status, where the change in role of the satellite can be relayed to the other satellites in the pair and/or grouping and can trigger the other satellites in the pair and/or grouping to change their roles accordingly.

In some embodiments, the broadcast signal from any satellite 110 in LEO can be used by any number of other satellites 110 in LEO. While lines of sight shown in FIG. 4 are representative of satellites 110 receiving each other's navigation signals, it's important to note that the signals transmitted are broadcast signals that can be received by any satellite.

Alternatively or in addition to dynamically and automatically being capable of changing role from transmitter satellite to receiver satellites, satellites 110 can be similarly operable to automatically adjust the transmission of navigation signal 240. Due to the fact that satellite constellation system 100 controls navigation signal 240 that can be used for RO measurements, the signal design can be dynamic to allow navigation signal 240 to change in cases where atmospheric conditions necessitate it (e.g. changes that make losses greater can result in a boost in the signal power, or changes that may require larger bandwidths can result in adjusting the bandwidth, or even frequency). When satellite constellation system 100 controls the broadcast, satellite constellation system 100 can have a feedback loop between the transmission and receiving ends to optimize the transmitted signal to get the best information possible. That optimization can change base signal characteristics such as frequency, bandwidth, power levels, waveform, and/or other signals characteristics.

The ability to control both the transmission and the receiving side allows satellite constellation system 100 to be a closed loop RO system in the sense that satellite constellation system 100 can adjust key transmit parameters, including but not limited to, frequency, power, and signal structure, to provide the best transmission for measuring atmospheric properties at the current moment. What is considered best transmission is a function of the receiving satellite's measurement performance which can be fed back to the transmitting satellite to adjust the signal parameters through any combination of the links in FIG. 2. Example signal characteristics of the navigation signal 240 that can be adjusted include frequency of the navigation signal; bandwidth of the navigation signal; waveform of the navigation signal; power of the navigation signal; and/or any other parameters that define the generation of a signal, the transmission of a signal, and/or other properties of the signal itself.

The feedback loop process that is utilized to determine when and/or how to adjust these parameters can be performed by utilizing the processing module 320 of one or more satellites. An example of this feedback loop process includes the following steps:
1. Satellite A receives signal from Satellite B and computes a raw measurement from the ranging signal (the raw measurement includes, but is not limited to, the range to the satellite, frequency and code offsets, carrier phase, signal receive power, etc.)
2. Satellite A evaluates performance metrics on the raw measurement (e.g. receive power compared to a desired threshold, ability to track the signal and compute carrier phase measurements, etc.) and decides if any threshold is not met.
3. If thresholds are not met (e.g. receive power is too low) Satellite A transmits a message, through any combination of links shown in FIG. 2, to request a signal characteristic change from Satellite B (e.g. if receive power is too low, then request a boost in the signal power)
   a. Alternatively to sending a request for a signal characteristic change, Satellite A can transmit the performance metrics and Satellite B can make the decision for what to change.
   b. Different performance metrics can be used to control different signal characteristics, but it does not have to be a one to one mapping between signal characteristic and performance metric.

As discussed, the satellite constellation system 100 is implemented as a LEO-LEO system due to the transmission and reception of signals between satellites 110 in LEO. Implementing satellite constellation system 100 as a LEO-LEO system can enable some or all of the functionality and/or improvements to existing systems listed below, for example, as a result of the fact that this system controls the broadcast and some due to the fact that various backhaul networks can be leveraged:

The geometry of satellite constellation system 100 results in line of sights between satellites 110 that traverse through a different portion of the atmosphere than a line of sight between a LEO satellite and a MEO satellite.

Faster motion on both the transmission and receiving sides means an increase in atmospheric measurement frequency and geometric diversity.

Leveraging a combination of the links in FIG. 2, the RO measurements can be transmitted from the satellites to users (Earth based and/or space based) in near real time.

Sufficient density of available tomography can allow for the creation of ionosphere and troposphere models derived for the creation of GNSS corrections without a need for ground infrastructure.

The above allows for not only the creation of corrections for GNSS satellites, but also for the precision satellite constellation itself, improving robustness and convergence times towards precision navigation.

With high spatial density ground monitoring stations and/or a LEO multifrequency satellite constellation, real-time, highly detailed maps of the ionosphere can be produced for both scientific, government, and industrial applications. Some applications include improved Earth weather prediction, GNSS corrections for improved stand-alone positioning and positioning augmented with this satellite system, protection of satellite assets from space weather events, and others. This unique approach would combine measurements from satellite constellation system 100 to the ground and/or from existing GNSS satellites to satellite constellation system 100. This allows for atmospheric model layer separation and finer granularity.

The RO tomography data generated through the RO measurements recorded by satellite constellation system 100 can be used to generate a map of the ionosphere and troposphere where appropriate navigation atmospheric correction messages are derivative products of this map. This data can be used in traditional GNSS Precise Point Positioning (PPP) approaches in addition to the navigation schemes presented here. The reduces the search space in carrier phase ambiguity resolution and can greatly accelerate convergence time.

Alternatively or in addition to providing atmospheric data, the satellite constellation system 100 can be implemented to provide precise navigation by giving users their precise position and time. One of the key elements to providing this information to users through a satellite based ranging signal includes performing precise orbit determination, or otherwise being able to precisely determine the location of the satellite in space. This information can then, along with a ranging signal, be broadcast down to users on the ground to enable precise positioning and/or timing. In addition to the complete solution, correction information can be provided to spatially "close" users, such as users in orbits near those of our satellites, to allow those users to get precision positioning and timing data. This enables this satellite system to be able to provide precise positioning to users at altitudes below this satellite system and users at altitudes at close (above) to this satellite system. The precision navigation section performed by satellites 110 includes orbit determination, autonomous constellational monitoring, and/or adjusting of signal characteristics for providing the best navigation signal.

Current methods for precision and high accuracy orbit determination require the use of ground monitoring stations to observe the location of satellites with specialized measuring equipment and perform heavy computation for determining orbits. Satellite constellation system 100 improves existing systems by performing autonomous in-situ distributed orbit determination, where processing is done onboard satellites 110 autonomously through edge computing. This significantly minimizes requirements on ground infrastructure. Autonomous orbit and clock estimation onboard the satellite in real-time allows for lower cost clocks as part of the satellite hardware. Temperature compensated crystal oscillators (TCXOs) and oven-controlled crystal oscillators (OCXOs) are lower cost than Chip Scale Atomic Clocks (CSACs) and other timekeeping technology, but are most stable over shorter periods of time. Real-time orbit determination and dissemination to the user makes the use of these clocks possible, whereas if orbit determination is done by the ground network, then longer periods between uploads would require higher performance clocks onboard.

Additionally, some embodiments of satellite processing system 300 use the same clock 365 in both the GNSS receiver and/or other elements that handle the analog to digital conversion of the signal and other elements within the receiver, and in the generation of the navigation signal carrier frequency. This usage of the same clock 365 results in the estimated clock state using GNSS measurements reflecting the state of the clock used to generate the navigation signal itself, which results in a more precise navigation signal and navigation message. In other embodiments, multiple clocks 365 may be present, where the clock generating the navigation signal carrier frequency is "disciplined" to the clock in the GNSS receiver or the clock in the GNSS receiver is "disciplined" to the clock generating the navigation signal carrier frequency.

The precise orbit determination, or the estimation of the satellite's precise state, which can contain information including, but not limited to: position, velocity, acceleration, clock bias, clock drift, clock drift rate, current time, attitude, attitude rates, carrier phase offsets, etc.), is performed onboard the satellite using a navigation filter that uses measurements from on-board and/or offboard sensors and/or correction data. This process is described below:

1. Raw data from a GNSS receiver, Inertial Measurement Unit (IMU), attitude determination instruments, and/or radio signals from neighboring satellites in this system are collected by and/or are otherwise available to each satellite 110. Measurements can also be ground based, where this data is transmitted to the satellite via a data link.
2. The raw GNSS measurements are fed into a tightly coupled navigation filter onboard the satellite 110. For example, the navigation filter can be implemented by utilizing orbit determination module 322. The filter uses GNSS orbit corrections and/or other correction data such as atmospheric corrections provided by any combination of the links in FIG. 2 to produce a tightly-coupled PPP carrier phase ambiguity-resolved navigation solution.
3. The navigation filter propagates the state estimate to the current epoch.
4. The navigation filter updates the position (of the satellite center of mass), attitude, clock, and/or other state estimates given the most recent measurements.
5. The position, attitude, and/or clock estimates are, using one or more models based on physics or other data driven models, propagated forward for a short period to produce predictions of the position of the broadcast antenna phase center.
6. This predicted path of the satellite orbit and clock (where the clock is the same clock generating the carrier for the navigation signal) are fit to a curve that will become the broadcast navigation message. This curve fit is packaged into a binary navigation message to be broadcast by the satellite to the users.
7. The broadcast orbit and clock message can be broadcast by the satellite 110 at regular intervals that meet the minimum time to first fix.
8. If the orbit and clock states computed by the physics-based propagation differ from the orbit and clock computed using the navigation message, a new navigation message will enter the broadcast queue, performing autonomous integrity monitoring.
9. The broadcast signal is received by users and/or user devices such as client devices 160, and the precise orbit data enables the user and/or client device 160 to compute a precise position and time solution.
10. The precise position and time solution can be displayed to the user (for example as a pin on a map with some bounds on the error that show that the user's position is very precise), for example, by utilizing a display device of client device 160. In the case of a robotic or autonomous or highly automated system, this position solution can be ingested natively, for example, to be used as a measurement for precision autonomy.

Figure 5A:
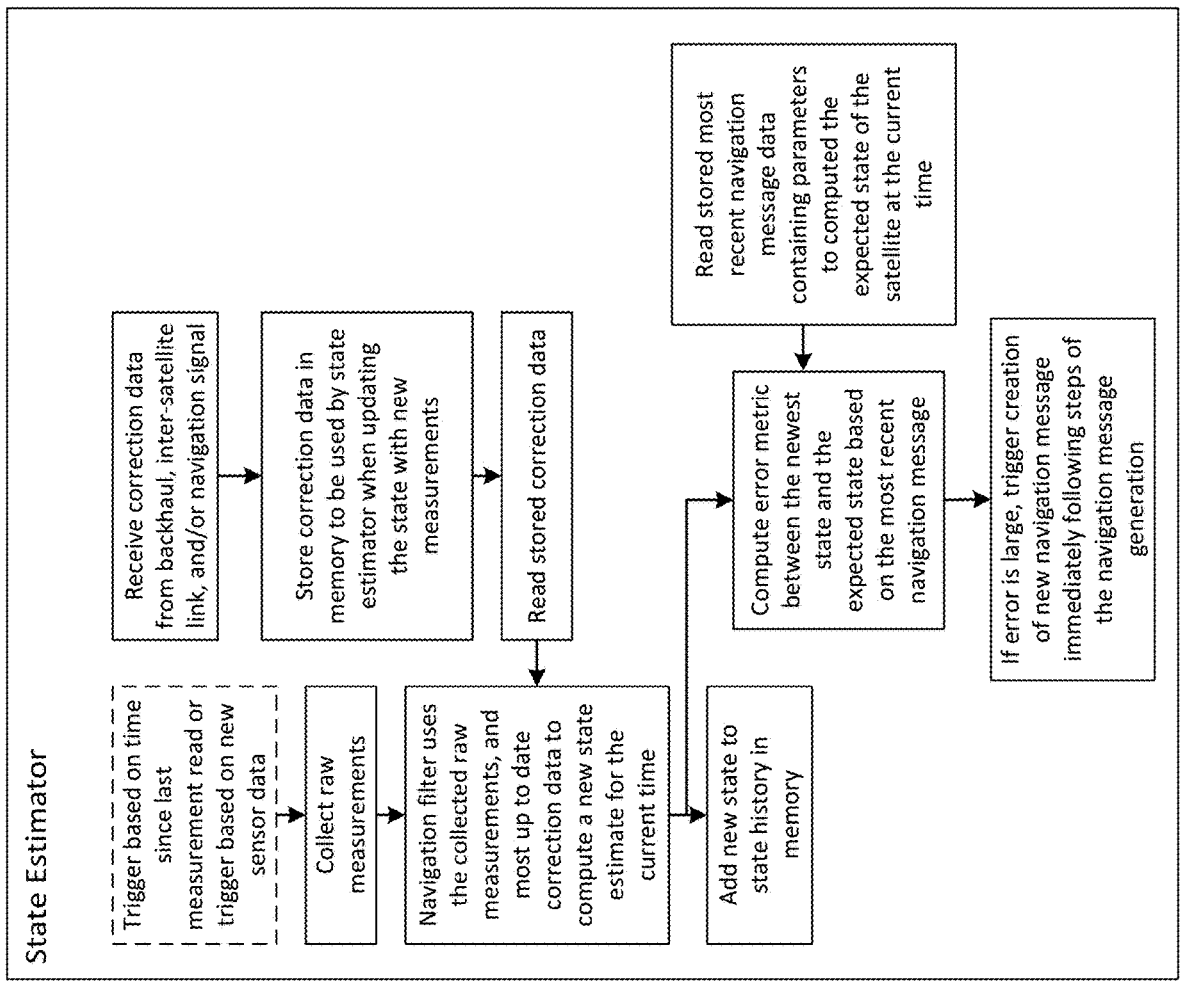
FIG. 5A is a flowchart diagram illustrating an example of a state estimator flow performed by a satellite processing system in accordance with various embodiments.
Figure 5C:
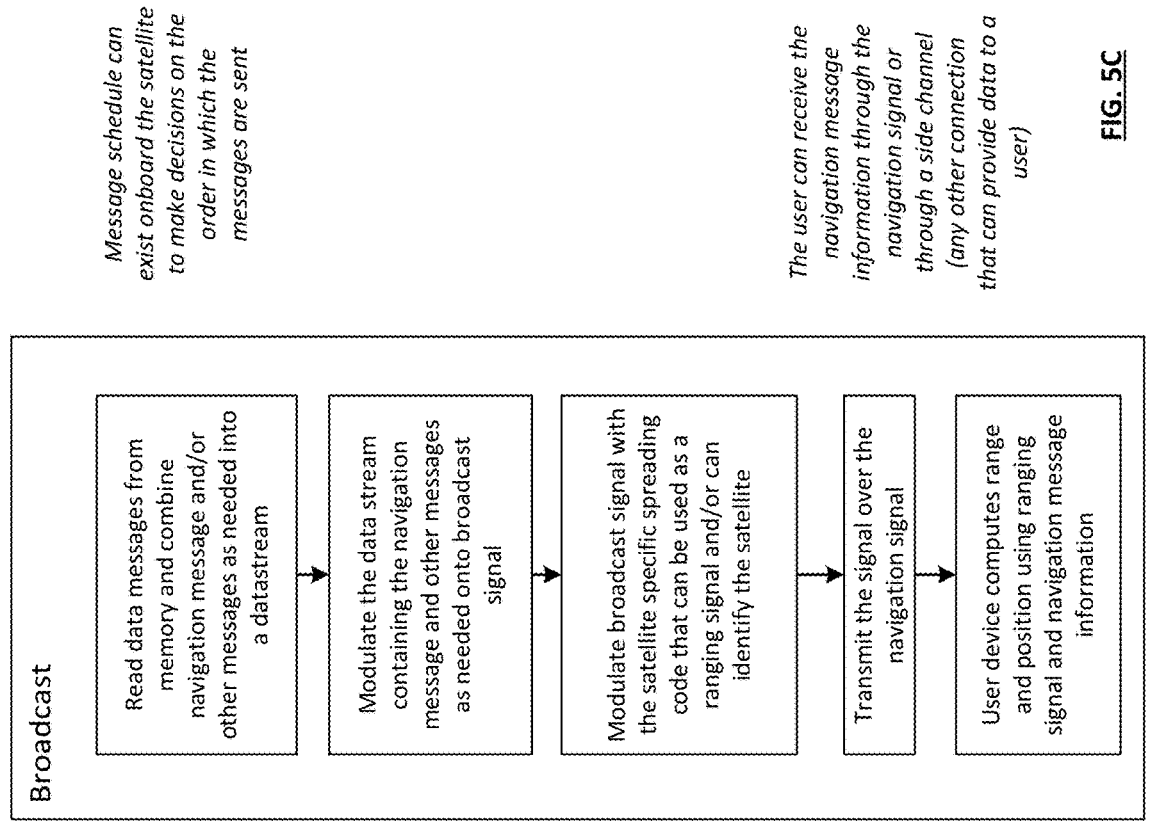
FIG. 5C is a flowchart diagram illustrating an example of a broadcast flow performed by a satellite processing system in accordance with various embodiments.

Each satellite 110 can perform process for the autonomous orbit determination via performance of a state estimation flow as illustrated in FIG. 5A, performance of a navigation flow as illustrated in 5B, and/or performance of a broadcast flow as illustrated in FIG. 5C. These separate depictions of the state estimation flow, navigation flow, and broadcast flow highlight the fact that process can be performed in several different loops triggered by different events. The satellite processing system 300 can be utilized to perform some or all of the steps illustrated in FIGS. 5A, 5B, and/or 5C, for example, by utilizing orbit determination module 322, navigation message generation module 323, and/or message scheduling module 324, respectively.

Figure 5B:
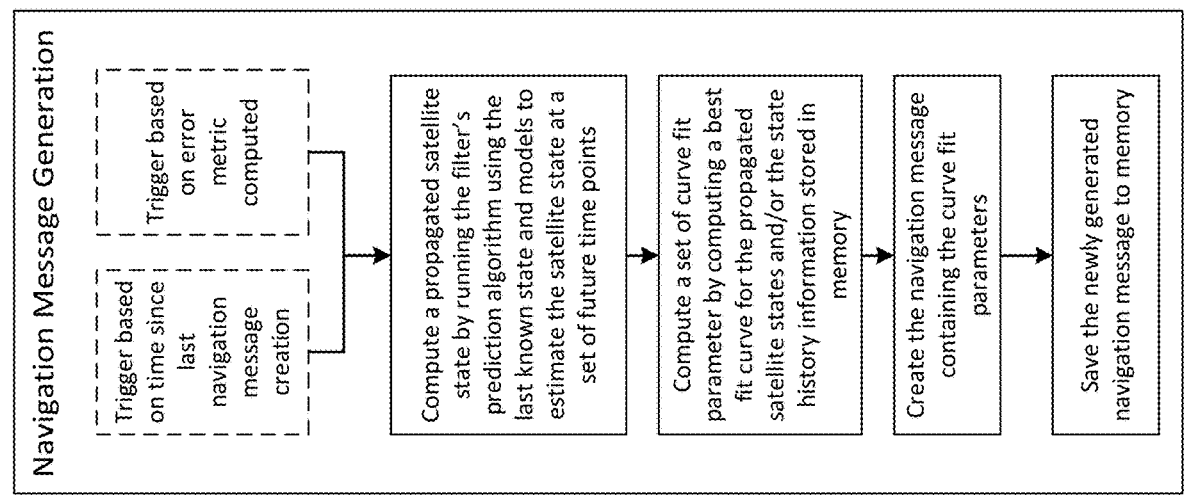
FIG. 5B is a flowchart diagram illustrating an example of a navigation message generation flow performed by a satellite processing system in accordance with various embodiments.
Figure 6:
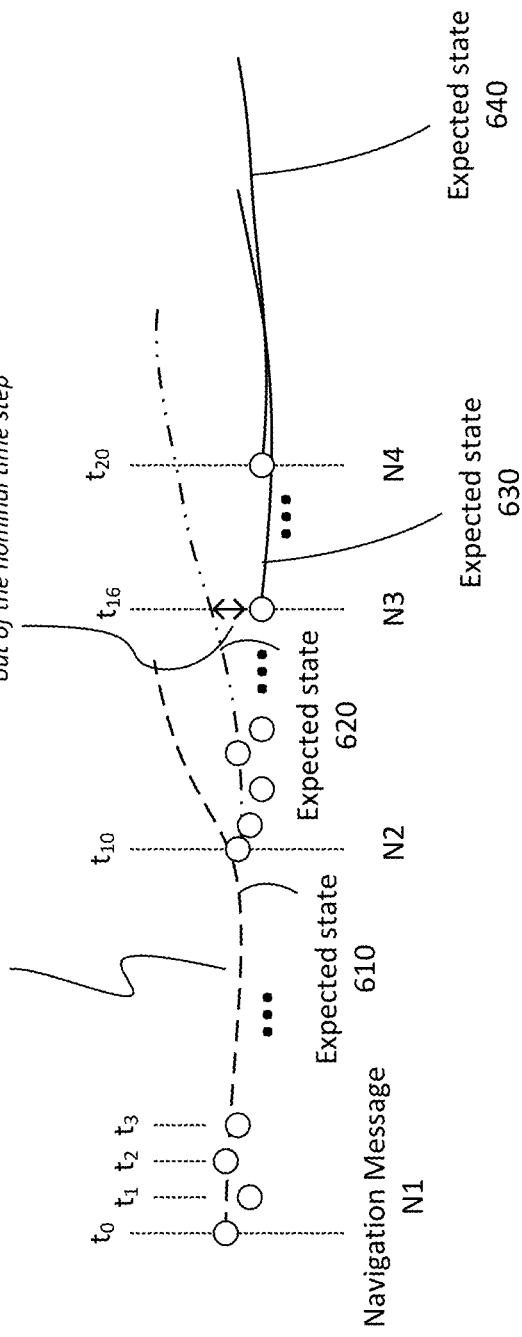
FIG. 6 is an illustration depicting the process of self-monitoring by a satellite processing system in accordance with various embodiments.

FIG. 5A illustrates an embodiment of a state estimation loop. The loop is configured to run at a specific rate or triggered based on new measurements from the sensors onboard the satellite. Upon the trigger, the new measurement from the onboard sensors, which can include, but is not limited to, inertial measurement units (IMUs), GNSS receivers, attitude sensors (e.g. star trackers, horizon sensor, etc), radio signal receivers to signals from neighboring satellites in this satellite positioning system, and other sensors, are used by the navigation filter to compute the precise state. Note that measurements can also be made from ground-based sensors and the data of the measurement can be transmitted to the satellite via any combinations of the links in FIG. 2. These sensor measurements can be used in conjunction with precise GNSS orbit and clock data estimated by the ground segment (PPP correction data) and/or other correction data (such as atmospheric models) desired. This correction data can be uploaded via any combinations of the links in FIG. 2 and can be stored in memory onboard the satellite. The newly computed state can be saved to an onboard history vector of the current and/or past states. Additionally, this newly computed state can be compared to the expected state at the current time based on the last navigation message. If the error metric exceeds a given threshold then the navigation loop is triggered to generate a new navigation message as described in FIG. 5b. A more detailed example of the comparison with the expected state is depicted in FIG. 6.

Typical ground-based orbit and clock determination for GNSS only uses the signals received on the ground. Having the orbit and clock determination onboard, enables the satellite to make use of additional sensors that help decouple the attitude from the orbit as well as the orbit from the clock. Decoupling the attitude is important as it enables the use of this orbit and clock determination system to be used on a variety of satellites including small satellites where only minimal attitude control may be available. For example, in a satellite configuration where the broadcast signals are nadir pointing and the received GNSS L1/L2/L5 signals are received from a zenith antenna, a non-trivial offset will be present between these antennas which must be accounted for in user precise positioning Inertial sensors, which are essentially only affected by orbital effects and not clock effects, can be integrated into the orbit determination and propagation process and help separate orbit and clock errors, especially as GNSS geometry worsens in polar regions.

The orbit determination can be aided by terrestrial stations, especially in polar regions, where not only would ground stations be typically visible to the greatest number of satellites, but the GNSS geometry is weakest on orbit. The ground stations can broadcast another ranging signal that can be received by satellites on orbit to aid in the orbit determination by providing more high accuracy range measurements. This allows for the measurements to very cleanly enter the estimator. This also allows for the ground station to be broadcast-only (one-to-many) rather than talking directly to a specific satellite, keeping orbit determination autonomous without need for direct communication to the ground station. The ground stations can also be capable of receiving the ranging signal broadcast by this satellite system, allowing the ground stations to either do some estimation on the ground and send the estimate back to the satellite or more simply send the measurements collected on the ground up to the satellites on orbit and let the satellite use the measurements in their onboard estimators. The latency between the collection of the measurement on the ground and the reception of that on orbit may introduce some complications in the estimation. Ground stations can also be equipped with a laser to point at a retroreflector on the satellite providing another accurate range measurement to the satellite. Once again, this measurement can then be used on the ground and estimates can be sent to the satellite, or the measurements can be directly sent to the satellites to be used in the onboard estimators.

The precise orbit determination computed onboard the satellites can use Precise Point Positioning (PPP) correction data, which consists of precise orbit and clock estimates of GNSS satellites. PPP data can be transmitted from the ground to the satellites via any combination of the links depicted in FIG. 2.

The navigation message creation is a second loop running onboard the satellite that can be set to its own rate independent of the precise orbit determination rate. The process flow for the navigation message creation is shown in FIG. 5B. This loop can be either triggered by timing for a fixed frequency of operation or by a trigger based on a computed error metric that is computed at the precise orbit determination rate. One manifestation is that the navigation message is generated by computing a best fit curve on the expected future state computed by running the filter's prediction step. Such a best fit curve has a set of parameters (e.g. that define the orbit and clock state) that can be put into a binary message to be sent as part of the navigation message.

The broadcast flow of FIG. 5C can be once again running at an independent rate, this time specified by the desired data rate for data to be transmitted on the ranging signal, handles the transmission of the navigation message, along with any other data messages that are desired. This transmission system reads a queue of messages and modulates the data contained in the messages onto the navigation signal (which in some embodiments has a ranging signal already modulated onto the carrier), which can be at various different frequencies. Note that in some cases only the ranging is modulated on the carrier to make the navigation signal.

Once modulated, that signal is transmitted from the satellite 110 and can be received by at least one client device 160 which can include, but is not limited to, devices on the ground (such as handheld devices, vehicles, etc.), devices in the air (such as planes, drones, etc.), devices in space, and/or other embodiments of client device 160 discussed herein. Client device 160 can compute a range to each satellite 110 in view with the ranging signal and, given the precise navigation message data, is able to compute a precise position.

In various embodiments, the orbit determination process onboard of each of the satellites 110 allows the satellites to monitor their own messages and/or those of the neighboring satellites. Satellites 110 can be operable to perform a self-monitoring process. In particular, at every time step that the navigation filter updates the precise state of the satellite, satellite processing system 300 can compare the newly computed precise state with the expected state as described in the most recent navigation message.

FIG. 6 demonstrates an example of this self-monitoring process. For this example, the rate of the estimation loop and the navigation message generation are such that a new navigation message is generated, nominally, every 10 measurement updates. Starting at time $t_0$, the navigation filter has computed a precise state, shown as a circle at time step $t_0$ on the figure, and a navigation message, N1, is generated as described in conjunction with FIG. 5B. Using the navigation message data, the expected state for all time steps in the time window between $t_0$ and $t_0$ is shown as a line, which corresponds to expected state 610. Note that the line, and therefore the message can be valid for a longer time period than the time period for the next triggered navigation message update. Moving forward in time, FIG. 6 shows the estimated states at time steps $t_1$, $t_2$, and $t_3$. At each one of these time steps, a comparison is computed between the estimated state and the expected state as given by navigation message N1. In this example, none of these comparisons compare unfavorably, so the system behaves nominally.

At the end of the time window at time $t_{10}$, the time-based trigger results in a new navigation message, N2, being generated as depicted in FIG. 5B. This new navigation message is now what is being transmitted at regular intervals over, for example, the navigation signal. The new expected state through time is once again shown as a curve, in this case expected state 620. A new time window is set between times $t_{10}$ and $t_{20}$.

Moving forward through time to time step $t_{16}$, the difference between the estimated state (shown as a circle) and the expected state as computed using navigation message N2, exceeds a given threshold, resulting in a trigger of the generation of a new navigation message, N3. This new message has a new curve for future expected states, in this case expected state 630.

As time continues to move forward to the end of the new time window at step $t_{20}$, the generation of a new navigation message, N4, is triggered by the nominal time based trigger behavior. This new message has a new curve for expected states, in this case expected state 640. Other variations are possible, for example, a new time window can be set between times $t_{16}$ and $t_{26}$ upon the transmission of navigation message N3. In the absence of deviation from the expected state 630 during this time window, the next navigation message (N4) could then be sent at step $t_{26}$ when this updated time window expires.

Alternatively and/or additionally to performing this self-monitoring, satellites 110 can be configured to perform neighborhood monitoring, where satellites 110 are operable to monitor some or all physically neighboring satellites in constellation. Through an ability to transmit and/or receive navigation signals, a consistency check based on in-situ measurements can be used to identify upsets on any one particular satellite or group of satellites to quickly resolve any issues and maintain integrity of the system. Each satellite 110 can be equipped to transmit and/or receive navigation signal 240 and the corresponding navigation message data through any link depicted in FIG. 2 to and/or from its neighbors both within its orbital plane, and/or in neighboring orbital planes, as depicted in the configuration in FIGS. 7A and 7B.

Figure 7B:
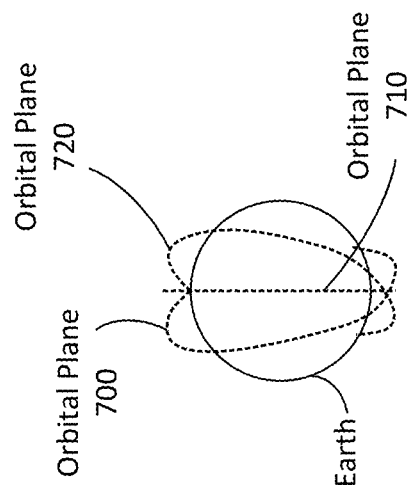
FIG. 7B is an illustration of orbital planes in accordance with various embodiments.
Figure 7A:
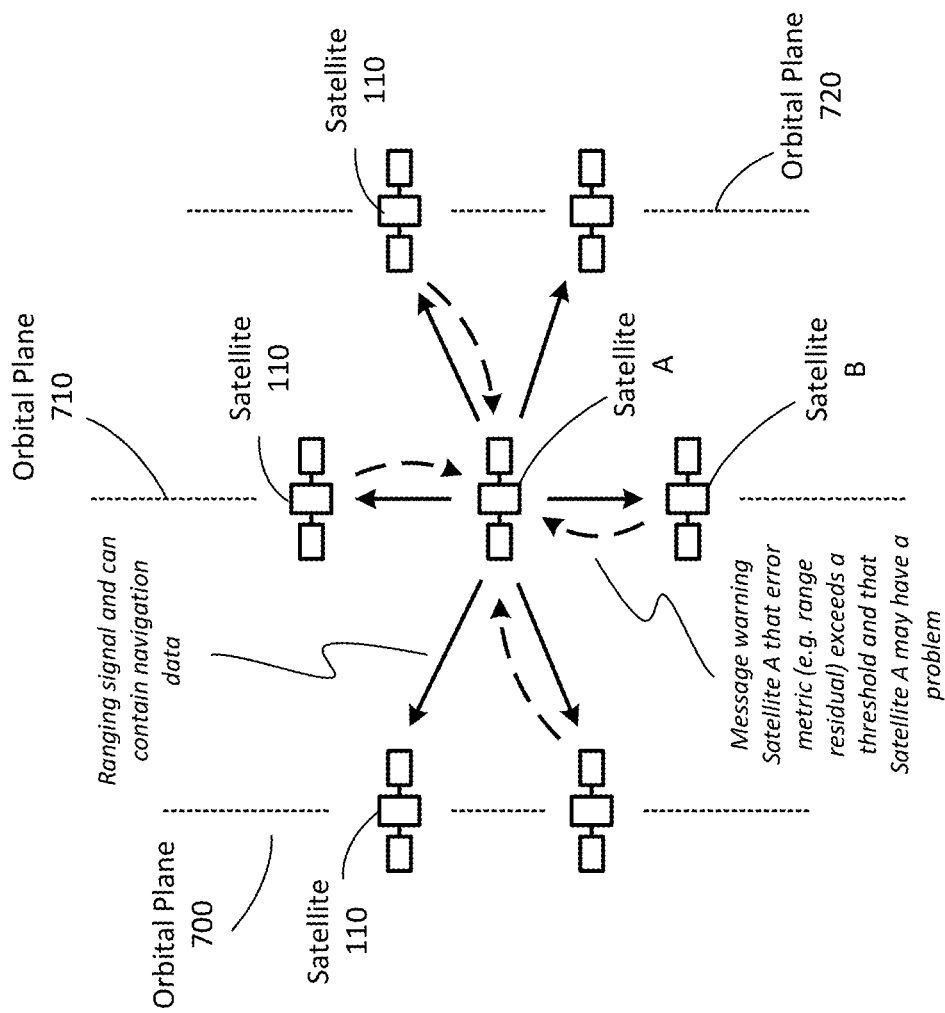
FIG. 7A is a schematic block diagram of satellites utilized to perform neighborhood monitoring in accordance with various embodiments.

FIG. 7A illustrates a two-dimensional depiction of a subset of the plurality of satellites 110, including satellite A and satellite B. This subset can constitute a "neighborhood" with respect to satellite A, where all satellites 110 are in view of satellite A and/or where satellite A can otherwise transmit and/or receive navigation signal 240 from its neighboring satellites. These neighboring satellites of satellite A can include satellites 110 on the same orbital plane 710 as satellite A, and can include one or more satellites on either side of satellite A along orbital plane 710. These neighboring satellites of satellite A can alternatively or additionally include satellites 110 on different orbital planes 700 and 720. As illustrated in the three-dimensional depiction of orbital planes 700, 710, and 720 with respect to earth of FIG. 7B, orbital planes 700 and 720 can be neighboring orbital planes of orbital plane 710. Some or all of the other satellites 110, such as satellite B, can have their own neighborhood of neighboring satellites, which can include a proper subset of the satellites 110 in the neighborhood of satellite A and/or can include at least satellite A.

In this example embodiment, navigation signal 240 contains both the ranging signal and data containing at least the navigation message data. However, in other embodiments, navigation signal 240 can contain only the ranging signal with each satellite either already knowing the navigation message data for its neighboring satellites and/or receiving the navigation message data through any combination of the links depicted in FIG. 2.

In the example embodiment depicted in FIG. 7A, the neighboring satellites (e.g. satellite B) to satellite A can compute the expected range measurement to satellite A as each satellite knows its own estimated state and can compute the expected state of satellite A using the corresponding navigation message data for satellite A. Satellite B can also compute the measured range using navigation signal 240 from satellite A. From these two ranges, an error metric can be computed (e.g. a range residual). If that error metric exceeds a given threshold then satellite B can send a message, through any combination of the links in FIG. 2, to satellite A notifying satellite A that it may be broadcasting incorrect navigation message data. This notification can be in the form of a status message that can send a flag, the error metric data, and/or any data that can be used by Satellite A as a notification of possible error or other anomalies. If satellite A receive messages from more than a threshold number or percentage of neighboring satellites, satellite A can update its status information in the navigation message to notify users (including the neighboring satellites) that its navigation message data should not be trusted and therefore that the satellite should not be used. In addition to notifying satellite A, the neighboring satellites can also send error information that satellite A can use to verify and update its state estimate to correct for errors in the estimator, provided that each of the neighboring satellites are performing nominally.

Figure 7C:
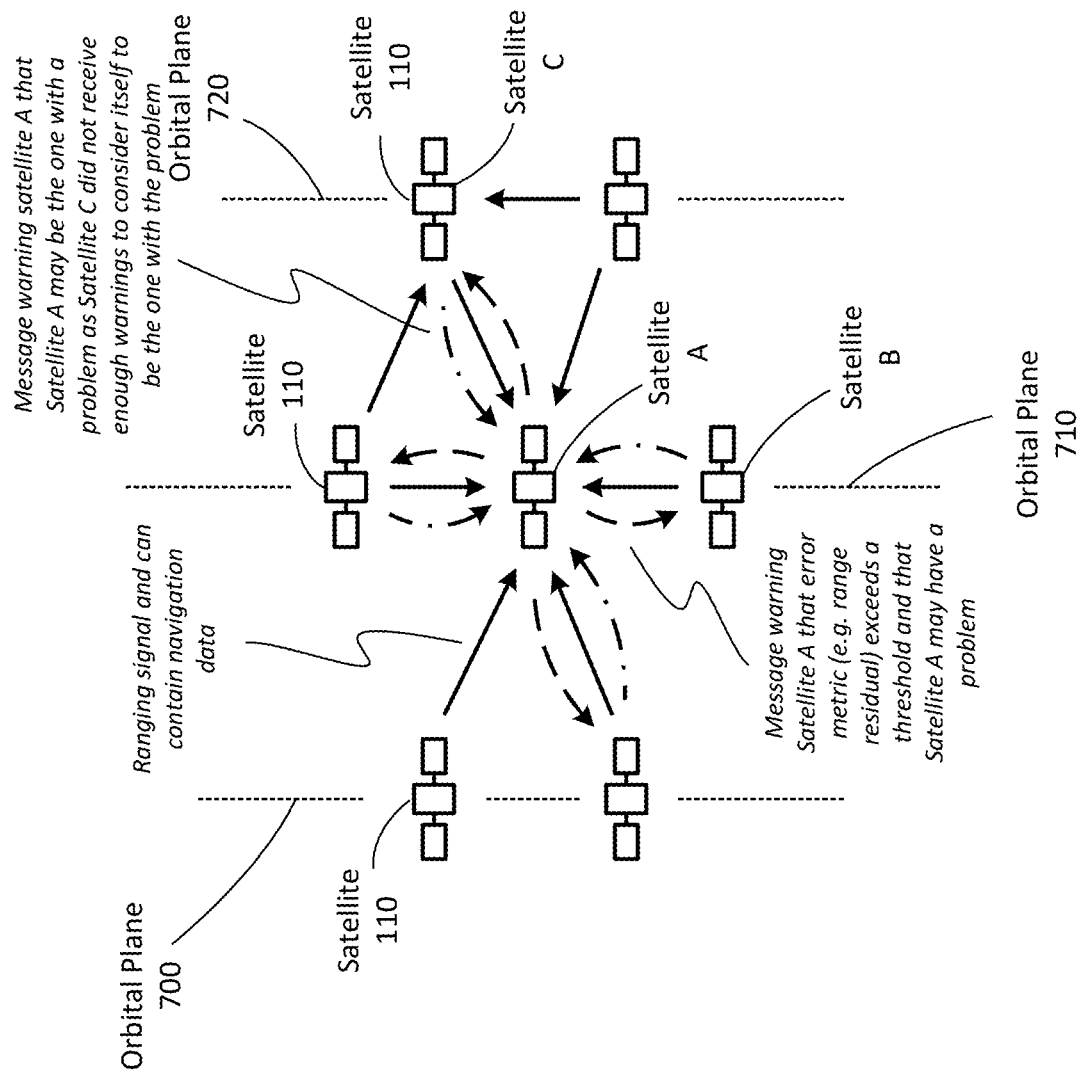
FIG. 7C is a schematic block diagram of satellites utilized to perform neighborhood monitoring in accordance with various embodiments.

FIG. 7C depict a further example case with a neighborhood of satellites on orbital planes 700, 710, and 720 of FIG. 7B. If Satellite A computes an error metric that exceeds a given threshold value to a number of neighboring satellites above a threshold number or percentage, it can either self-detect that it may have an error in its state estimate, and/or the neighboring satellites can alert Satellite A that Satellite A may have a problem. Satellite A can notify each of the neighbors that they may be wrong (e.g. Satellites B and C) in response to computing the error metric that exceeds a given threshold for these neighboring satellites. If the neighbors (e.g. Satellites B and C) have not received enough warning messages to put it over a threshold number or percentage, they can each respond to Satellite A indicating Satellite A may be the satellite in the neighborhood with an error.

Satellites 110, as part of satellite constellation system 100, can also adjust signal parameters, for example as described previously, for the purpose of improving the performance of the reception and/or use of navigation signal 240 by users in space and/or users on Earth. Trigger conditions for adjusting signal parameters (such as beamwidth, power levels, and/or other signal characteristics of interest) can include the following, alternatively or in addition to the trigger conditions discussed in previous sections:

Determining the location of satellite 110 above the Earth is, for example, over a major city or otherwise compares favorably to a location range for a trigger condition. As a result, satellite 110 can narrowing the beamwidth and/or increasing the signal power to aid in increasing the received signal strength of navigation signal 240.

Determining proximity and/or density of one or more satellites 110 in orbit (such as over the polar regions if the satellite orbits are polar orbits) that result in a very high density of transmissions of navigation signal 240. As a result, some or all satellites 110 can autonomously decide to turn off transmissions, for example based on remaining battery capacity and/or power margins left in satellites 110.

Determining other location based and/or monitoring based triggers that are deemed to affect the quality of navigation signal 240 received by users.

The setting of these parameters can be adjusted autonomously by satellites 110 by utilizing satellite processing system 300 based on information received from neighboring satellites and/or ground measurements, adjusted by a ground segment with a human in the loop and/or autonomously based on monitoring data of satellite constellation system 100, and/or can be configured before launch of the satellite and fixed for a given satellite 110 and given orbit.

In various embodiments, forces on the satellite can be calculated based on satellite orientation and precise measurements, which can be utilized to build an atmospheric density model. Many LEO satellites at lower altitudes feel forces due to atmospheric drag. While the upper atmosphere is very thin, it still provides an appreciable amount of force that eventually leads to the de-orbit of these satellites unless preventative measures are taken. While existing rough models can be used for the density of air in the upper atmosphere, it is known that this density is not temporally or spatially constant. Satellite constellation system 100 can be capable of taking precise GNSS measurements, as described in conjunction with FIGS. 5A-5C, and thus can have precisely known positions and velocities. Satellite 110 can also know its orientation (pose) precisely and can therefore calculate the expected forces due to solar and/or albedo radiation pressure, among other forces acting on the satellite. Once all other large orbital perturbations are taken into account, this information can be processed onboard the satellite and/or on the ground and used to determine the magnitude of the atmospheric drag force acting on a given satellite 110. Once this drag force is calculated, the density of the atmosphere at these specific satellite 110 positions can be calculated. With a dense constellation of satellite 110 and this data from each satellite 110, models of the upper atmospheric density can be generated by either interpolating values spatially and/or temporally, or through other means. The resulting atmospheric density models can be used to help with on-orbit trajectory prediction for satellite 110 and/or any other satellite in similar orbits that are capable of receiving the atmospheric density model data. Additionally, these models can form the foundation for creating forecasts of upper atmosphere density.

In various embodiments, certain users can be become nodes transmitting navigation signals to expand the network of satellite constellation system 100, giving rise to substantially more navigation signals and an improved service. These additional nodes can be implemented utilizing hardware and/or software of any of the client devices 160 discussed herein, for example, equipped with its own satellite processing system 300 and/or operable to perform some or all of the functionality of a satellite 110 as discussed herein. These additional nodes can be static, for example, fastened to infrastructure and/or otherwise installed in a particular constant and/or known location. These additional nodes can alternatively be mobile, for example, corresponding to a mobile device and/or vehicle with a changing location.

Similar to how orbit determination is performed in this navigation constellation scheme with satellites in low Earth orbit to deliver an additional navigation signal on the ground, all other aerial and ground receivers can employ the same precise positioning scheme and can in turn transmit similar navigation signals to create a much larger and more comprehensive navigation network. Each additional receiver works as a node in a more substantial network of navigation signals, aiding both in collaborative positioning and in current GNSS-challenged environment.

Employing similar estimation processes as satellites 110 from satellite constellation system 100, user devices or other devoted ground or aerial navigation nodes can create and/or transmit their own navigation signals. This gives rise to substantially more signals for more robust positioning in traditionally challenging GNSS environments. In one embodiment, these navigation signals can be nearly identical to those transmitted by satellites as part of satellite constellation system 100. In other implementations, different schema may be be considered for specific applications or use cases. This may include the usage of different electromagnetic spectrum or other transmission modalities including but not limited to, optical and/or ultrasonic. This can also include a different number of transmission frequencies or signal modulations.

As an example, consider a dense urban environment with several aerial and ground-based robotic systems in operation. Aerial systems flying above buildings can utilize the line of sight signals to a combination of GNSS satellite and satellite constellation system 100 satellite navigation signals for precise and secure positioning. With its position solution computed, this aerial platform can broadcast its own navigation message, in much the same way as the satellites in satellite constellation system 100. This, along with aerial and other navigation nodes in the network, including potentially as stationary infrastructure, adds significant diversity in line of sight in urban canyons, substantially aiding ground vehicle navigation. For example, the top corners of certain tall buildings can be good candidates for infrastructure node locations, having a clear line of sight to the sky and the road below. To further aid in this problem, ground vehicles can broadcast their own navigation signals to improve collaborative localization at the street level where now relative range measurements help the multi-agent navigation system.

In various embodiments, the satellite constellation system 100 can provide secure data to its users. Current GNSS signals that are available for civilian use are broadcast unencrypted with known signal and data structures. This was pivotal in the global adoption of GNSS as the standard bearer for positioning, but as the number of those that depend on GNSS services has grown, the vulnerabilities of GNSS have become more apparent. GNSS being at such low power is often jammed unintentionally and since its signal structure is publicly available it is subject to malicious spoofing attacks.

The satellite constellation system 100 improves upon traditional GNSS services by performing full encryption of the spreading code along with the navigation data. In this case, there can be several channels that offer different data at different rates. This is accomplished using a combination of code shift keying along with encrypted data modulated at a lower rate. Where appropriate, the data is encoded using a Low Density Parity Check scheme that allows for forward error correction, enabling the satellites to deliver data to ground users at a high, robust data rate.

The encryption keys can be locally stored in memory of client devices 160, for example, in some manifestation of tamper-resistant hardware within the receiver utilized by some or all client devices 160 to receive navigation signals 240 from satellites 110. Each client device's key can be leaf that belongs to a layered Merkle-Damgard tree, giving this satellite constellation system 100 the ability to provide service to any number of client devices 160 while denying service to anyone who breaks the terms of service. These keys can be changed collectively at predetermined intervals that allow for a subscription plan alongside permanent users. These changeovers can be carried out using secure one-way functions.

There can be several acquisition methods for the encrypted signal. Any client devices 160 with preexisting knowledge of their location and time within reason can carry out direct acquisition of the signal using a parallel search strategy. All other client devices 160 can directly acquire these signals as the required computational resources are available to them. Once a single satellite from the constellation has been acquired, a coarse almanac is recovered that allows the user to find any other satellites that may also be in view along while anticipating the satellites that will soon be in view.

With a single satellite in view, a client device 160 in a known location can have secure knowledge of their time. Likewise, any users that know 3 out of 4 position domain parameters (latitude, longitude, height, clock-bias) can securely determine the fourth with this satellite system. Ina secure time example, a receiver is surveyed and has a known latitude, longitude, and height. In order to provide a secure timing service, the receiver need only acquire a single satellite signal. The pseudo range calculated from the user to the satellite can subtracted by the predicted range to the satellite knowing the surveyed receiver location. The clock bias can be calculated from this difference. Since the signals and data are encrypted, the user can trust that the signal came from a trusted satellite in this constellation and thus the clock bias calculation can be trusted. With four satellites in view, an unambiguously secure position and time solution can be solved for using these satellite signals.

Application data corresponding to a secure service of the satellite constellation system 100 can be stored in at least one memory of the client device 160. For example, the application data can be received by the client device 160 for download from a server system associated with the satellite constellation system 100 via network 250 and/or can be received in a signal transmitted by a satellite 110. When this application data, and/or other executable instructions stored in memory of the client device 160, are executed by at least one processor of the client device 160, this can cause the client device 160 to securely obtain and/or update their key, to utilize their key to securely determine their position and/or time based on encrypted signals received from satellites 110, and/or to utilize their key to confirm authenticity of received signals as being transmitted by received from satellites 110 as opposed to a spoofing entity.

In various embodiments, the satellite constellation system 100 can be operable to perform space-based GNSS Constellation Monitoring. A GNSS satellite fault can produce serious positioning errors if incorporated into a calculated position. In order for GNSS signals to be incorporated in safety-critical applications, such as aviation, their performance must be constantly monitored for such fault events. Many receivers used in these applications incorporate autonomous monitoring techniques such as Receiver Autonomous Integrity Monitoring (RAIM) to detect and exclude signals that may be faulty, but autonomous integrity techniques for receivers using code-phase positioning have severe limitations in that they cannot easily observe some satellite faults. These techniques may be enough to ensure that the true position is within one-third of a mile from the calculated position, but in order to obtain tighter bounds, also known as protection levels, on true position, local or wide area monitoring techniques must be employed. Satellite monitoring can be accomplished through systems known as Satellite Based Augmentation Systems (SBAS). In existing systems, reference stations in a region of interest can use these measurements to estimate the different error sources that may be present. These error estimates are then passed to central processing facilities where they are then then broadcast to users via a satellite link from a geostationary satellite. These systems are able to detect satellite faults and broadcast alerts to users, for example, within 6 seconds of the beginning of such faults.

Similar GNSS satellite fault monitoring can be carried out by satellite 110 in LEO when satellite 110 is using carrier phase precise positioning techniques, such as described in conjunction with FIGS. 5A-5C. Autonomous integrity monitoring techniques can be utilized to achieve precise protection levels, for example, by calculating position solutions using subsets of GNSS satellites running in parallel. For instance, if there are N satellites in view, there are N+1 position solutions calculated for the case that one GNSS satellite is excluded. These solutions are compared with each other in order to derive protection levels for the calculated position. If a single GNSS satellite is faulted, all N+1 solutions will begin to deviate from the true position except for the subset solution that has excluded that GNSS satellite. If the solutions become separated by an amount set by a threshold, then it can be determined that there is a fault in the GNSS signal emanating from the GNSS satellite. By computing these subsets and comparing the solutions to a given threshold, satellite 110 can know that a GNSS satellite was producing a faulty measurement if the solutions separated by more than the given threshold and can then transmit alert information for the faulted GNSS satellite.

A single satellite 110 in LEO can use the above method to detect a faulty GNSS measurement. Satellite constellation system 100 can have multiple satellites 110 in view of the same faulted GNSS satellite. Because of this, there will be larger observability of such a GNSS satellite fault and this will allow all satellite 110 observing the faulted GNSS satellite to form a consensus and thus have higher confidence in a decision to alert users. This technique differs from existing services in that all current GNSS satellite health monitoring is carried out by terrestrial reference stations whereas this provides a satellite-based solution that carries out this task autonomously. Satellite constellation system 100 can also be capable of transmitting alerts via navigation messages or other alert data to users in the event that there is an observed GNSS satellite fault through any combination of links in FIG. 2.

Beyond GNSS faults, satellite constellation system 100 can also transmit parameters describing the performance of the GNSS satellites. Satellite constellation system 100 can provide multiple simultaneous precise observations of the GNSS satellites using the methods outlined above. These observations can then be compiled and transmitted as corrections and confidence parameters to be used by GNSS receivers.

By utilizing satellites 110 in this fashion to detect GNSS faults and/or to determine parameters describing the performance of the GNSS satellites for transmission, GNSS systems can be monitored entirely in space. This presents an improvement to existing systems by facilitating this GNSS monitoring without any dependence on ground-based reference stations or ground based central processing facilities. Existing systems are further improved due to the better geometry, higher signal strength, and greater number of satellites more satellites in view as a result of utilizing the satellites 110 rather than ground-based facilities.

FIGS. 8A, 8B, and 8C illustrate the service levels available to ground and/or aerial users as a function of the number of satellites 110 in view from satellite constellation system 100. FIG. 8A shows the scenario with one satellite 110 in view with a client device 160 corresponding to a mobile user such as a vehicle. When used in conjunction with GNSS satellites, satellite 110 can provide data to increase the precision of GNSS. Satellite 110 further adds a navigation signal to provide additional range and range rate information. The rapid geometry change associated with satellite 110 allows for fast initialization of precise positioning. Hence, this augments GNSS, improving precision. FIG. 8B shows the case for a client device 160 corresponding to a static user with one satellite 110 in view. In this case, because the position of static user is known, satellite 110 provides a secure source of timing information when the navigation signal is provided with encryption, which can used without GNSS.

FIG. 8C shows the scenario where satellite constellation system 100 has sufficient satellites such that four or more satellites 110 are in view to the client device 160, such as the automobile represented. In this scenario, a sufficient number of independent navigation signals 240 from satellite constellation system 100 are available such that a highly precise can be supported by exclusive use of navigation signals 240, and/or such that highly secure position solution with full encryption can be supported when navigation signals are provided with encryption.

The various functionality of the satellite constellation system 100 discussed can be utilized to implement one or more other applications. For example, satellite constellation system 100 can be utilized by maritime systems, where one or more client devices 160 is onboard and/or otherwise corresponds to one or more boats or other maritime systems. Satellite constellation system 100 can provide precision positioning to maritime systems, which can be utilized by the maritime systems for mapping, ice navigation, ice routing, and port operation. The precise position information can further be shared with neighboring maritime systems to improve maritime situational awareness. This can greatly improve the safety of these systems (e.g. in bad weather) due to the much better precision (especially in the arctic where signals 132 are harder to receive) if that information is shared between different ships, or between static maritime elements (e.g. lighthouses) and ships. Authentication and/or encryption can be utilized to protect against GNSS spoofing. Position security provided satellite constellation system 100 by can be utilized by maritime systems for asset tracking, for example, to be utilized by autonomous or highly automated ships that operate without a crew onboard. Boats and/or other maritime systems can thus be implemented as client devices 160.

Alternatively or in addition, satellite constellation system 100 can be utilized by banking systems or other entities to perform transaction authentication. Location-based security can be provided for entities that perform financial transactions and/or other transactions. For example, position security can be used as a form of two step authentication in banking and other password-protected critical functions. This can also be utilized by voting systems to provide protection against voter fraud in elections. ATM machines, voting machines, and/or other equipment utilized to perform secure transactions can be implemented as client devices 160.

Alternatively or in addition, satellite constellation system 100 can be utilized to enable infrastructure time synchronization. Satellite constellation system 100 can provides an additional source of secure timing to infrastructure systems that provide timing Client devices 160 across different infrastructure entities can be utilized to synchronize timing across power stations, data centers, telecommunications hubs, cellular towers, financial institutions and/or other critical infrastructure.

Alternatively or in addition, satellite constellation system 100 can be utilized as a source for timing traceability for financial transactions. Satellite constellation system 100 can provide an additional source for timing traceability required for proof-of-payment systems and applications that require accurate and reliable timing traceability. For example, transactions on the New York Stock Exchange require timing traceability for legal purposes. Timing for these transactions is typically traced through GPS measurements to national timing centers like those managed at the USNO. Measurements taken from a client device 160 using the satellite constellation 100 can aid or replace these methods of timing traceability.

Alternatively or in addition, satellite constellation system 100 can be utilized in supply chain management to provide secure tracking of individual shipping containers, packages, vehicle assets, and/or vessel assets, allowing management with finer granularity and/or confirmation of arrival at destination. The individual shipping containers, packages, vehicle assets, and/or vessel assets can be implemented as client devices 160 and/or can be coupled to client devices 160 to enable the secure tracking of these assets by an entity that owns these assets or otherwise oversees the transportation and/or delivery of and/or by these assets.

Alternatively or in addition, satellite constellation system 100 can be utilized in surveying and/or mapping. In particular, satellite constellation system 100 can be utilized to provide precision, integrity, and/or security while enabling high definition mapping for autonomous or highly automated applications and/or safety critical applications. Surveying and/or mapping equipment can be implemented as client devices 160.

Alternatively or in addition, satellite constellation system 100 can be utilized by autonomous or highly automated road vehicles. Autonomous or highly automated road vehicles require high integrity (safety-critical), precise, and secure positioning, as provided by the satellite constellation system 100. Autonomous or highly automated road vehicles can be implemented as client devices 160, and satellite constellation system 100 can enable geofencing, lane determination, and vehicle control of the autonomous or highly automated road vehicles.

Alternatively or in addition, satellite constellation system 100 can be utilized by autonomous or highly automated mobile robotic platforms. The satellite constellation system 100 can provide location precision and/or security for mobile robotic platforms targeted at the movement/delivery of goods within small areas, shipping yards, or cities, where the autonomous or highly automated mobile robotic platforms are implemented as client devices 160.

Alternatively or in addition, satellite constellation system 100 can be utilized by autonomous or highly automated aerial vehicles, urban air mobility vehicles, drones, and/or UAVs. Autonomous or highly automated aerial vehicles require high integrity (safety-critical), precise, and secure positioning, as provided by the satellite constellation system 100. Autonomous or highly automated road vehicles can thus be implemented as client devices 160. The satellite constellation system 100 can enabled services such as autonomous or highly automated navigation and management of the airspace, and/or full automated takeoff, taxi, and landing.

Alternatively or in addition, satellite constellation system 100 can be utilized in asset tracking and/or Fleet Tracking. This can include the tracking of assets such UAVs, truck and vehicle fleets, as well as bike, scooter, and/or other 'last mile' device services. These assets can thus be implemented as client devices 160. Precision and security is required for utilization of these services, for example to unlock a bike at a given depot and/or to return the user's deposit upon return of the asset.

Alternatively or in addition, satellite constellation system 100 can be utilized by transportation services. In ride sharing scenarios, the satellite constellation system 100 provides both precision and security. Precision is needed to aid in passenger-vehicle pairing where, especially in a robo-taxi environment, precise navigation is required to correctly determine the vehicle in question. Furthermore, location security prevents drivers from spoofing rides or misleading customers and similarly prevents riders from misleading drivers (or robo-taxis) in terms of pick up location. Thus, these vehicles can be implemented as client devices 160.

Alternatively or in addition, satellite constellation system 100 can be utilized in robotic Agriculture. The agricultural industry pioneered precise GNSS corrections for machine control and it is still the primal)/sensor for localization in featureless environments, e.g. an open field. Currently, tractors require a driver, but as they become more autonomous or highly automated, a driver may no longer be present and security in positioning will be critical. Other robotic platforms in agriculture may include UAVs, mobile robotic platforms with wheels, legs, tracks, and/or articulated manipulator arms. Thus, some or all of this agricultural equipment can be implemented as client devices 160.

Alternatively or in addition, satellite constellation system 100 can be utilized in the Internet of Things (IoT) and/or 'Big Data' Security. As IoT devices become more prevalent, tying data to the world in a geospatial sense, the criticality of this data will increase. Even if stationary, as a periodic security check, devices of an IoT network can check its location, perhaps even indoors, to verify the installation location has not been tampered with, inadvertently or otherwise. Thus, IoT devices can be implemented as client devices 160.

Alternatively or in addition, satellite constellation system 100 can be utilized in insurance entities. For example, as autonomous or highly automated system interaction increases, who is responsible for what will become more important, and secure geolocation will be critical in resolution.

Alternatively or in addition, satellite constellation system 100 can be utilized in environmental monitoring, as discussed herein. Through radio occultation data, improved spatial and temporal resolution of atmospheric maps can be built for improving scientific models as well as weather prediction models.

Figure 8E:
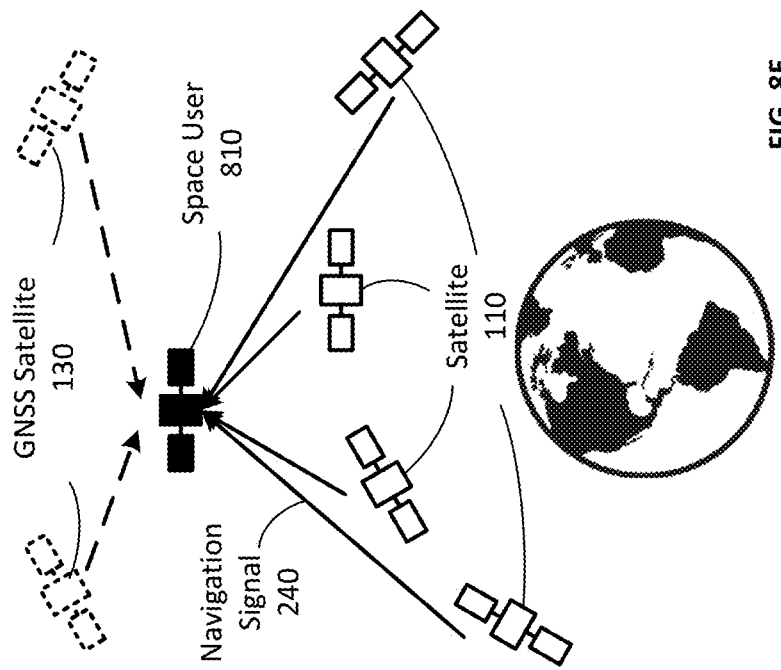
Figure 8D:
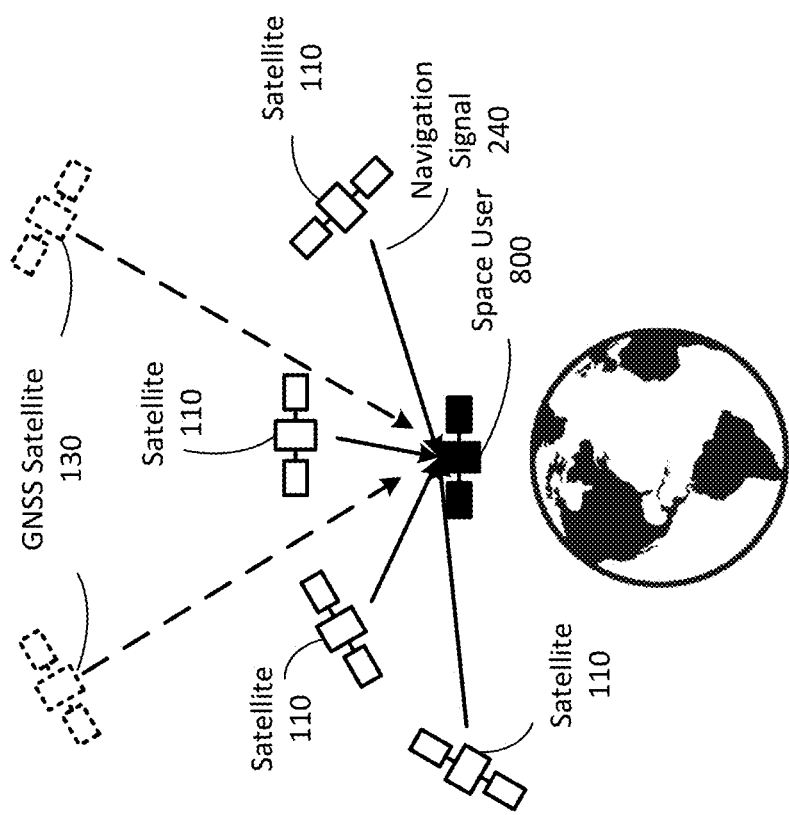

Alternatively or in addition, satellite constellation system 100 can be utilized in various space applications, as illustrated in FIGS. 8D and 8E. Client device 160 can be implemented by space-based devices, such as space user 800 and space user 810. Users in orbit at altitudes both higher (Space User 810) and lower (Space User 800) than the satellite constellation system 100 can utilize satellite constellation system 100, either in conjunction with GNSS or independently as shown by FIG. 8D and FIG. 8E, to obtain a secure and/or precision location for use in orbit determination. The beamwidth of navigation signal 240 can be designed and/or adjusted to be an omni-directional signal to enable users higher than satellite constellation system 100 and/or multiple antennas onboard satellite 110 can support transmitting navigation signal 240 with a more directional beamwidth pointed in various directions.

Figure 8F:
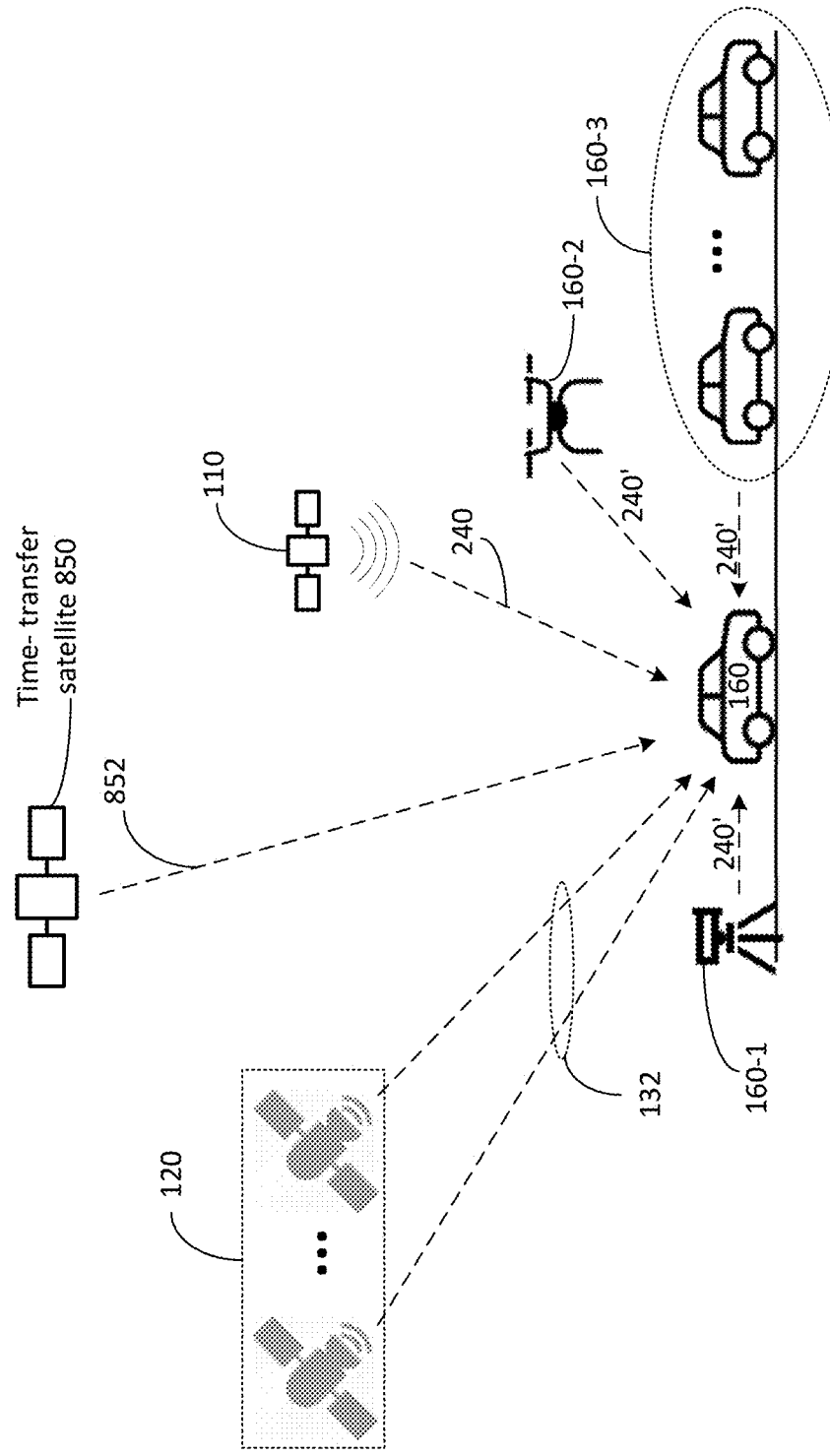

FIG. 8F presents another scenario with one satellite 110 in view with a client device 160 corresponding to a mobile client device such as a vehicle. When used in conjunction with GNSS satellites of constellation 120, satellite 110 can provide data to increase the precision of GNSS signaling 132. As previously discussed, satellite 110 further adds a navigation signal 240 to provide additional range and range rate information. The rapid geometry change associated with satellite 110 allows for fast initialization of precise positioning.

In this example, however, additional navigation signals 240' are received from a ground station 160-1 such as a terrestrial navigation station, an aircraft, such as UAV 160-2, and one or more other vehicles 160-3. In various embodiments, the navigation signals 240' are formatted similarly to the navigation signal 240 and further augment GNSS accuracy, improving precision in the position, navigation and timing of the mobile device 160. Furthermore, the presence of many vehicles 160-3 in close proximity, each of which is determining its position on a precision basis provides the vehicles the opportunity to operate in a mesh navigation network to share their positions and collectively enhance the accuracy of position, navigation and/or timing as a group. Furthermore, sharing of the navigation messages 240' in such a mesh network configuration can be used to identify, model the signal characteristics of, and track, a mobile jammer in proximity to the client devices 160-1, 160-2 and 160-3. In various embodiments, the client devices 160-1, 160-2 and/or 160-3 respond to stored user preferences that indicate, for example, whether or not a user of the corresponding device opts-in or opts-out of the generation of its own navigation messages 240'.

As further illustrated, a time-transfer satellite 850 is provided that transmits a secure timing signal 852, such as an encrypted signal or other secure signal that provides a ground truth timing reference. The time-transfer satellite 850 can be implemented via a special satellite dedicated to the purpose. Consider a spoofing scenario where one or more spoofing stations capture and repeat valid signals 132 and/or 140. The secure timing signal 852 can be used by the client device 160 to detect the spoofing stations by determining that the timing in the signals 132 and/or 140 repeated by these stations varies from the ground truth timing of the secure timing signal 852 by more than some acceptable timing threshold.

Ina further example, the time-transfer satellite 850 can be implemented via one or more other satellites 110 that has been dedicated to this purpose via command and control signaling sent via inter-satellite links 230. The role of time-transfer satellite 850 can be assigned to any of the satellites 110, based on the memory usage of the satellite; the memory usage other satellites; the distance between the satellite and a backhaul receiver; the battery level of the satellite; a difference between the battery level of the satellite and the battery level other satellites; an estimated time that the satellite can generate more power; an estimated time that other satellites can generate more power; atmospheric data that indicates atmospheric conditions; and/or other state of the particular satellite, particularly when compared to the state or states of the other satellites 110.

Consider another example where integrity monitoring of the LEO constellation 100 determines that one or more particular satellites 110 are no longer capable of generating accurate orbital positioning. The role of these particular satellites 110 can be relegated to the reduced functionality of providing the secure timing signal 852.

Figure 9A:
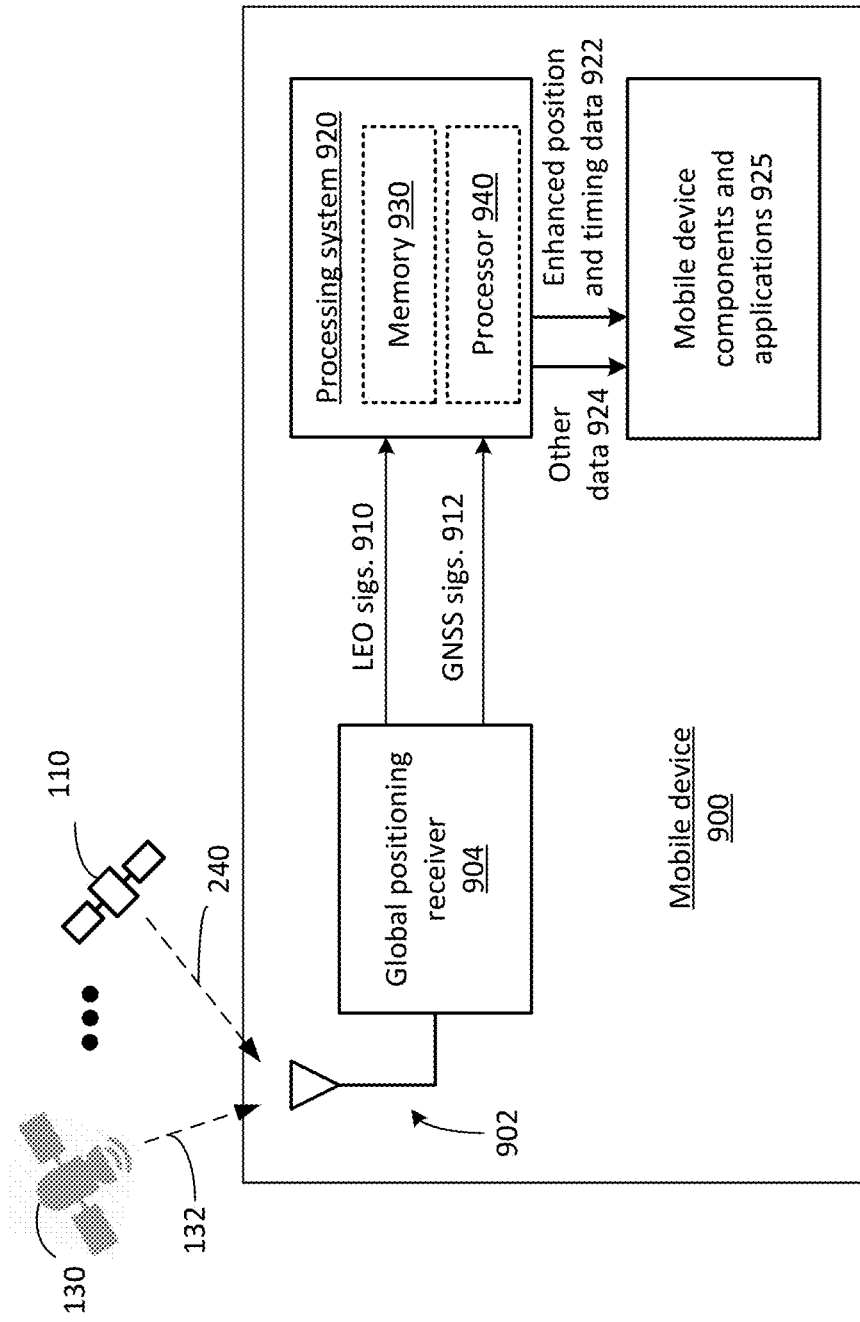
FIG. 9A is a schematic block diagram illustrating an example client device in accordance with various embodiments.

FIG. 9A is a schematic block diagram illustrating an example client device in accordance with various embodiments. In particular, a mobile device 900 is presented that includes a global positioning receiver 904 having an antenna 902, a processing system 920 having a memory 930 and one or more processors 940 and further having additional mobile device components and applications 925 that round out the specific functionality of the mobile device. For example, the mobile device 900 can be an automobile, a tablet, a smartphone, a smartwatch, a laptop computer, another mobile computer or computer system, a navigation device, a device location system, a weather system, a marine navigation system, a rail navigation system, an aircraft, an agricultural vehicles, a surveying system, an autonomous or highly automated vehicle, a UAV or other mobile device that operates by generating timing, navigation and/or positioning.

In various embodiments, the global positioning receiver 904 includes an RF section configured to receive signals 132 in one or more frequency channels from Global Navigation Satellite System (GNSS) satellites 130 of a GNSS constellation 120 and to downconvert these signals to GNSS signals 912, each having a ranging signal containing clock information and ephemeris information for each of the GNSS satellites 130 in range. Similarly, the RF section is configured to receive one or more navigation signals 240 in one or more frequency channels from satellites 110 of constellation 100 and to downconvert these signals to LEO signals 910, each having a ranging signal containing a navigation message that includes clock information and ephemeris information for each of the satellites 110 in range. In addition, the navigation message can contain correction data associated with the GNSS satellites 130, such as PPP correction messages, other clock and orbital correction data, constellation integrity information relating to the health of one or more satellites 110 and/or constellation integrity information relating to the health of one or more satellites GNSS satellite 130. Furthermore, the LEO signals 910 can contain other data contained in the navigation signals 240 including, for example, command and control data, RO data, atmospheric or weather data, secure clock data, encryption and security information, and/or any of the other types of data produced or transmitted by the satellites 110 as discussed herein.

The processing system 920 is configured to generate enhanced position and timing data 922 based on the GNSS signals 912 and/or the LEO signals 910 for use by the mobile device components and applications 925 that use such information, for example, for precision position, navigation and timing. In addition, the other data 924 can be demodulated, or otherwise extracted, from the LEO signals 910 by the processing system 920 that includes, for example, command and control data, RO data, atmospheric or weather data including a current weather state, a weather map and/or a predictive weather model, secure clock data, encryption and security information, any of the other types of data produced or transmitted by the satellites 110 or can be generated by the processing system 920 based on the navigation signals 240 and/or the signals 132. In various embodiments, the constellation integrity information is used by the processing system 920 to exclude or otherwise ignore signals 132 and/or navigation signals 240 that corresponding to satellites that have been identified as faulty.

The operations of the processing system 920 can further include, for example, locking-in on the timing of the ranging signals via the associated pseudo random noise (PRN) codes associated with each satellite 110 and 130 (that is not excluded), demodulating and decoding the ranging signals from the GNSS signals 912 to generate and extract the associated navigation messages from the GNSS satellites 130 in range of the receiver, demodulating and decoding navigation messages contained in the ranging signals of the LEO signals 910 to extract the precise position and timing data associated with each satellite 110 along with the correction data for the GNSS signals 912, and applying the correction data and atmospheric data to the position and timing information from the navigation messages from the GNSS satellites 130. In various embodiments, the first-order ionospheric delay is mitigated using the combinations of dual-frequency GNSS measurements. Otherwise, ionospheric and tropospheric delay can be corrected using atmospheric models generated based on the RO data. Furthermore, the processing system 920 can use closed loop state estimation techniques such as a Kalman filter, extended Kalman filter or other estimation technique where, for example orbital position, clock error, ionospheric delay, tropospheric delay and/or carrier-phase errors are estimated states. The precise position of the generate enhanced position and timing data 922 can be generated by positioning calculations that employ navigation equations to the orbital positions and timing for each of the satellites 110 and 130.

It should be noted, that when encryption is employed to the navigation signals 240, decryption can be employed by the global positioning receiver 904 and or the processing system 920 in order to securely lock onto the ranging signal and/further to extract the data therefrom.

Consider the following example. The global positioning receiver 904 receives navigation signals 240 that includes a navigation message from at least one satellite 110 containing correction data associated with a non-LEO constellation of satellites, such as non-LEO satellites 130. The global positioning receiver 904 also receives signals 132 from the non-LEO satellites 130. One or more processors 940 is configured to execute operational instructions that cause the processor(s) to perform operations that include: applying the correction data to the signals 132 to generate corrected signaling; and generating enhanced position data corresponding to a position of the mobile device based on the navigation message and the corrected signaling. In this fashion, PPP correction messages, other clock and orbital correction data, constellation integrity information relating to the health of one or more satellites 110 and/or constellation integrity information relating to the health of one or more satellites GNSS satellite 130 can be used be used to generate more precise position, navigation and timing from the signals 132 received from satellites of the non-LEO constellation and further based on the timing signal and the orbital position associated with the satellite 110.

Consider a further example. The global positioning receiver 904 receives navigation signals 240 that include navigation messages from four or more satellites 110. One or more processors 940 is configured to execute operational instructions that cause the processor(s) to perform operations that include: generating enhanced position data corresponding to a position of the mobile device based on the navigation messages. In this fashion, navigation messages that may include constellation integrity information relating to the health of one or more satellites 110 can be used be used to generate more precise position, navigation and timing based on the timing signals and the orbital positions associated with the satellites 110.

Figure 9B:
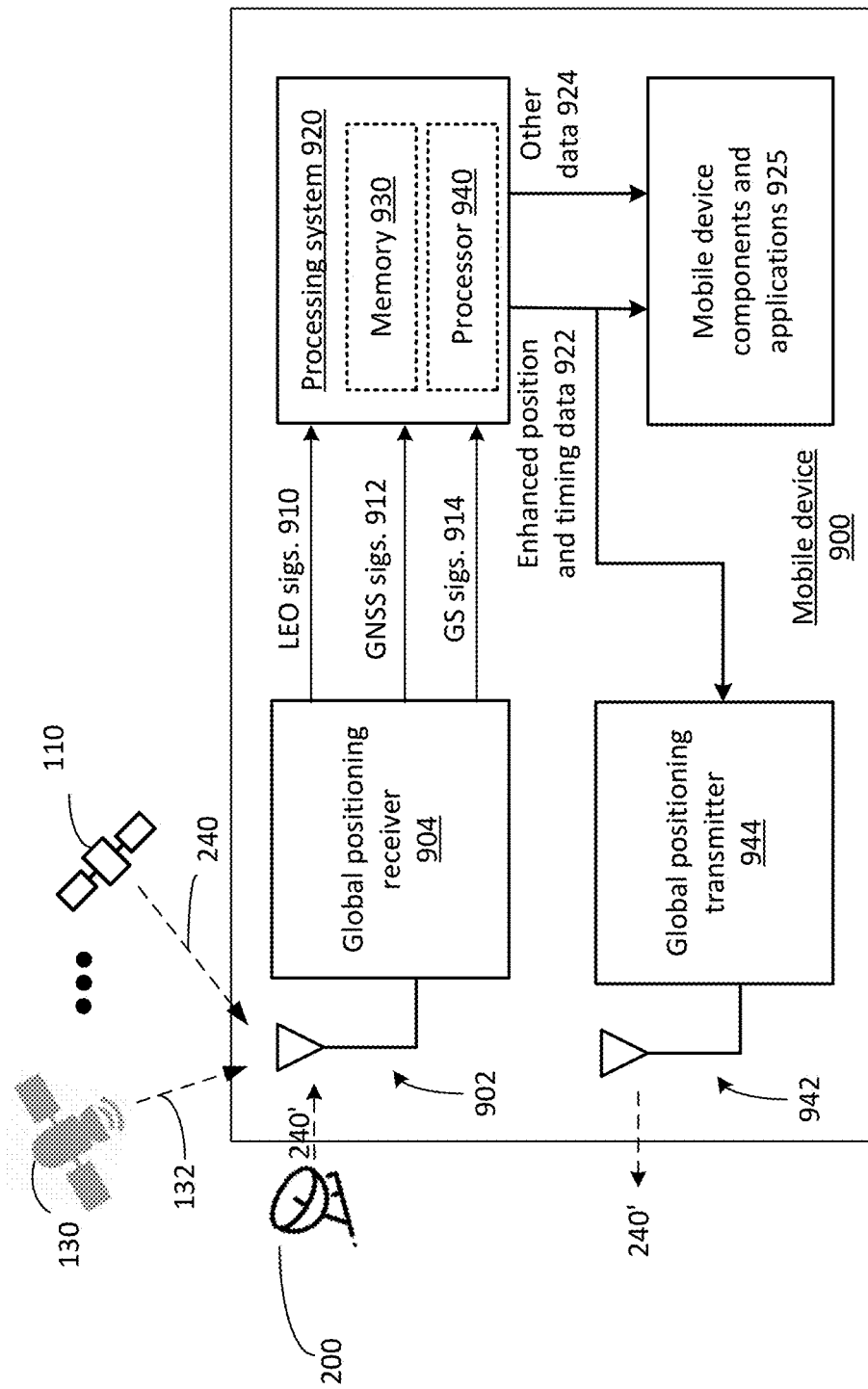
FIG. 9B is a schematic block diagram illustrating an example client device in accordance with various embodiments.

FIG. 9B is a schematic block diagram illustrating an example client device in accordance with various embodiments. In particular, another mobile device 900 is presented that includes many common elements of presented in conjunction with FIG. 9A that are referred to by common reference numerals. In this example, however, an additional navigation signal 240' is received from a ground station 200 and/or 201 such as a terrestrial GPS station, terrestrial station implemented as a node of the satellite constellation system 100, or other ground station that provides a source of a navigation signal 240'. The navigation signal 240' reside in one of the frequency channels of navigation signal 240. Other frequency channels can likewise be employed to avoid interference with navigation signals 240 and/or signals 132.

In various embodiments, the navigation signal 240' is formatted similarly to the navigation signal 240 and the GPS receiver generate ground station (GS) signals 914 that can include any or all of the information contained in the LEO signals 910. The processing system 920 is configured to generate enhanced position and timing data 922 based on the GNSS signals 912, GS signals 914 and/or the LEO signals 910 for use by the mobile device components and applications 925 that use such information, for example, for precision position, navigation and timing. In addition, the other data contained in the navigation signals 240 and/or 240' is processed by the processing system 920 to generate other data 924 that includes, for example, command and control data, RO data, atmospheric or weather data, secure clock data, encryption and security information, any of the other types of data produced or transmitted by the satellites 110 or can be generated by the processing system 920 based on the navigation signals 240, 240' and/or the signals 132. In this fashion, the ground station 160-1 operates as an additional satellite with a fixed, and therefore, precise location.

As discussed in conjunction with FIG. 8F the navigation signals 240' can be generated by mobile client devices 160. Furthermore, the mobile device 900 can include a global positioning transmitter 944 that operates similar to the corresponding functionality of satellite 110 in generating its own navigation signal 240' that is transmitted via antenna 942. In various embodiments, the memory 930 includes stored user preferences that indicate, for example, whether or not a user of the mobile device 900 opts-in or opts-out of the generation of its own navigation messages 240'.

FIG. 9C is a flowchart diagram illustrating an example of a method in accordance with various embodiments. In particular, a method is presented for use with one or more of the other functions and features discussed herein. Step 950 includes receiving a navigation message from at least one low-earth orbit (LEO) satellite of a constellation of LEO navigation satellites in LEO around the earth, wherein the navigation message includes correction data associated with the constellation of non-LEO navigation satellites in non-LEO around the earth Step 952 includes receiving first signaling from a plurality of non-LEO navigation satellites of a constellation of non-LEO navigation satellites in non-LEO around the earth. Step 954 includes applying the correction data to the first signaling to generate corrected first signaling. Step 956 generating an enhanced position of the mobile device based on the navigation message and the corrected first signaling.

FIG. 9D is a flowchart diagram illustrating an example of a method in accordance with various embodiments. In particular, a method is presented for use with one or more of the other functions and features discussed herein. Step 960 includes receiving a navigation message from at least one low-earth orbit (LEO) satellite of a constellation of LEO navigation satellites in LEO around the earth, wherein the navigation message includes correction data associated with the constellation of non-LEO navigation satellites in non-LEO around the earth Step 962 includes receiving first signaling from a plurality of non-LEO navigation satellites of a constellation of non-LEO navigation satellites in non-LEO around the earth. Step 964 includes receiving second signaling from at least one terrestrial GPS station at a fixed location. Step 966 includes applying the correction data to the first signaling to generated corrected first signaling. Step 968 includes generating an enhanced position of the mobile device based on the corrected first signaling, the second signaling and the navigation message.

Figure 10:
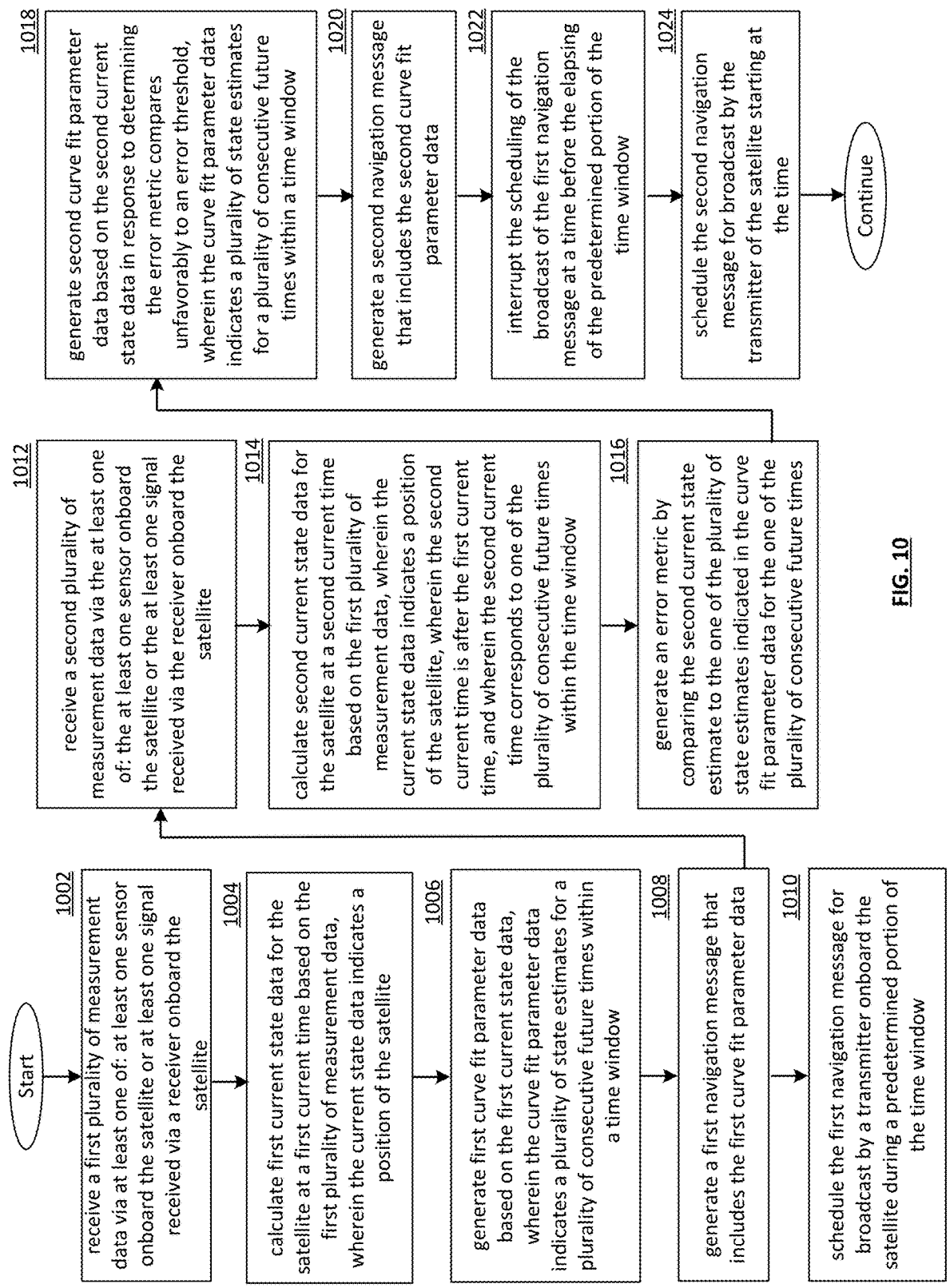
FIG. 10 is a logic diagram of an example of a method of performing self-monitoring in accordance with various embodiments.

FIG. 10 illustrates an example embodiment of a flowchart illustrating an example of performing self-monitoring. In particular, a method is presented for use in association with one or more functions and features described in conjunction with FIGS. 1-8E, for execution by a satellite processing system 300 that includes a processor or via another processing system of satellite constellation system 100 that includes at least one processor and memory that stores instructions that configure the processor or processors to perform some or all of the steps described below.

Step 1002 includes receiving a first plurality of measurement data via at least one sensor onboard the satellite and/or at least one signal received via a receiver onboard the satellite. For example, the at least one sensor can include an IMU and/or a clock. The at least one signal can include a GNSS signal received from a GNSS satellite, and/or can include a signal generated by another satellite processing system 300. The at least one signal can include PPP corrections received over a backhaul data link. Some or all of the first plurality of measurements can be stored in memory of the satellite processing system for later use as historical measurements.

Step 1004 includes calculating first current state data for the satellite at a first current time based on the first plurality of measurement data and/or based on historical measurements retrieved from the memory. The current state data can indicate a position of the satellite, an attitude of the satellite, and/or the first current time. Step 1006 includes generating first curve fit parameter data based on the first current state data. The curve fit parameter data can indicate a plurality of state estimates for a plurality of consecutive future times within a time window. For example, the time window can be predefined, and can start at the current time and/or can start at a time shortly after the current time. Steps 1002, 1004, and/or 1006 can be performed as discussed in conjunction with the state estimator flow illustrated in FIG. 5A.

Step 1008 includes generating a first navigation message that includes the first curve fit parameter data. The first navigation message can be generated in accordance with some or all of the steps illustrated in the navigation message generation flow illustrated in FIG. 5B. Step 1010 includes scheduling the first navigation message for broadcast by a transmitter onboard the satellite during a predetermined portion of the time window. For example, the first navigation message can be scheduled to be transmitted repeatedly multiple times within the predetermined portion of the time window. The predetermined portion of the time window can be a proper subset of the time window and/or can include the entire time window. The predetermined portion of the time window can correspond to a first temporal portion of the time window, for example, beginning with the current time and/or the first one of the plurality of future times, and lasting for a predefined duration. In some embodiments, the predefined duration and/or the frequency at which the first navigation message is scheduled to be repeatedly transmitted can correspond to and/or based on a predetermined minimum time to first fix. The first navigation message can be scheduled and/or transmitted by the transmitter in accordance with some or all of the steps illustrated in the broadcast flow illustrated in FIG. 5C.

Step 1012 includes receiving a second plurality of measurement data via the same or at least one sensor onboard the satellite and/or the at least one signal received via the receiver onboard the satellite. Step 1014 includes calculating second current state data for the satellite at a second current time based on the first plurality of measurement data, wherein the current state data indicates a position of the satellite, an attitude of the satellite, and/or the second current time. The second current time can be after the first current time, and the second current time can correspond to one of the plurality of consecutive future times within the time window. Step 1016 includes generate an error metric by comparing the second current state estimate to the one of the plurality of state estimates indicated in the curve fit parameter data for the one of the plurality of consecutive future times, for example, as illustrated in the state estimation flow of FIG. 5A.

In response to determining the error metric compares unfavorably to an error threshold, the method can include steps 1018-1024, for example as illustrated in the state estimation flow of FIG. 5A. Step 1018 includes generating second curve fit parameter data based on the second current state data, wherein the curve fit parameter data indicates a plurality of state estimates for a plurality of consecutive future times within a time window. Step 1020 includes generating a second navigation message that includes the second curve fit parameter data. Step 1022 includes interrupting the scheduling of the broadcast of the first navigation message at a time before the elapsing of the predetermined portion of the time window, and step 1024 includes scheduling the second navigation message for broadcast by the transmitter of the satellite starting at the time and/or starting shortly after the time. For example, the next scheduled transmission of the first navigation message can be replaced by a transmission of the second navigation message, once the second navigation message is generated.

Figure 11:
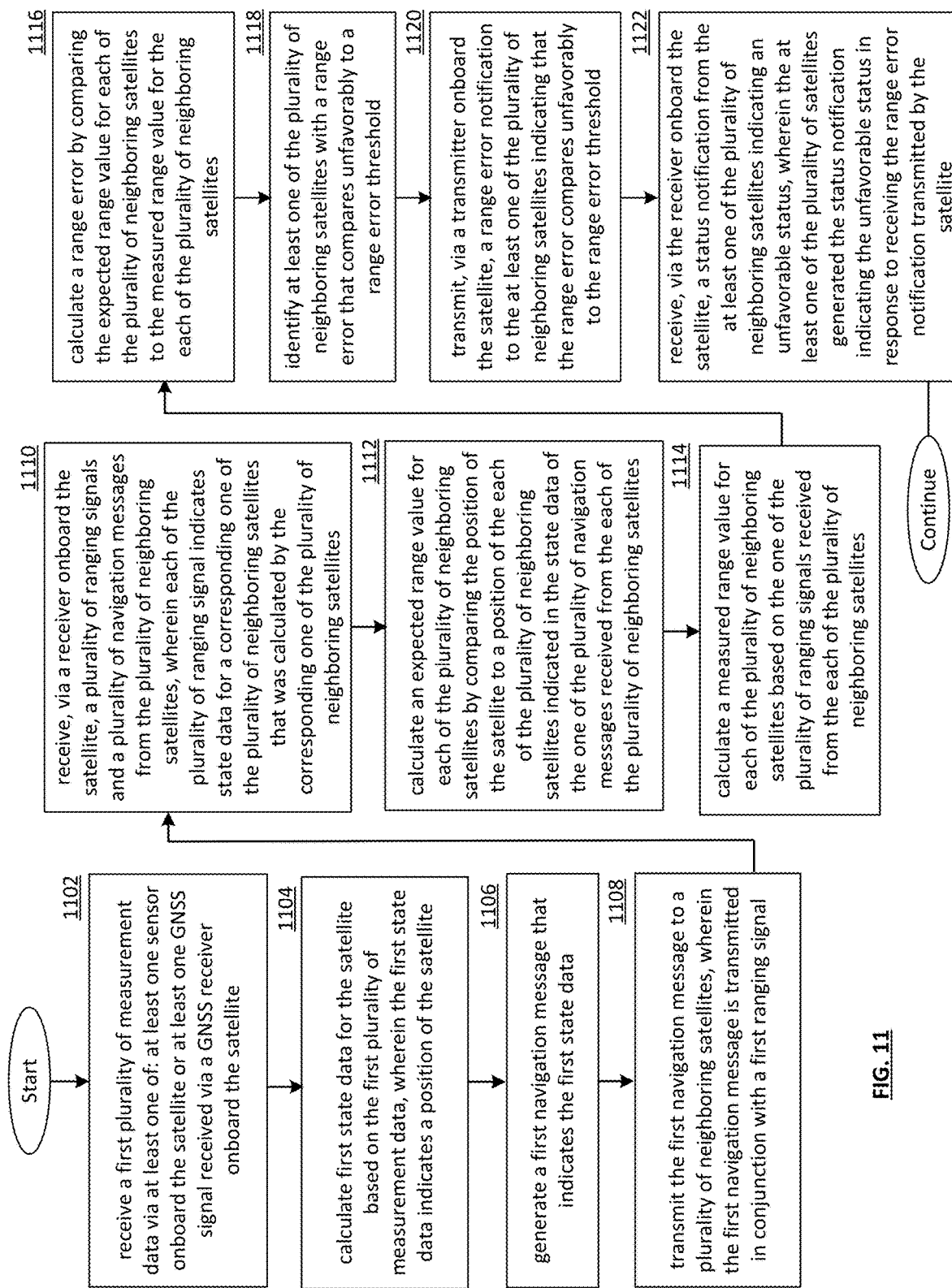
FIG. 11 is a logic diagram of an example of a method of performing neighborhood-monitoring in accordance with various embodiments.

FIG. 11 illustrates an example embodiment of a flowchart illustrating an example of performing neighborhood-monitoring. In particular, a method is presented for use in association with one or more functions and features described in conjunction with FIGS. 1-10, for execution by a satellite processing system 300 that includes a processor or via another processing system of satellite constellation system 100 that includes at least one processor and memory that stores instructions that configure the processor or processors to perform the some or all of the steps described below.

Step 1102 includes receiving a first plurality of measurement data at least one sensor onboard the satellite and/or or at least one GNSS signal received via a GNSS receiver onboard the first satellite. Step 1104 includes calculating first state data for the first satellite based on the first plurality of measurement data, wherein the first state data indicates a position of the first satellite. Step 1106 includes generating a first navigation message that indicates the first state data. Step 1108 includes transmitting the first navigation message to a plurality of neighboring satellites, wherein the first navigation message is transmitted in conjunction with a first ranging signal.

Step 1110 includes receiving, via a receiver onboard the first satellite, a plurality of ranging signals and a plurality of navigation messages from the plurality of neighboring satellites. Each of the plurality of navigation messages can indicates state data for a corresponding one of the plurality of neighboring satellites, where each state data was calculated by the corresponding one of the plurality of neighboring satellites. Step 1112 includes calculating an expected range value for each of the plurality of neighboring satellites by comparing the position of the first satellite to a position of the each of the plurality of neighboring satellites indicated in the state data of the one of the plurality of navigation messages received from the each of the plurality of neighboring satellites. Step 1114 includes calculating a measured range value for each of the plurality of neighboring satellites based on the one of the plurality of ranging signals received from the each of the plurality of neighboring satellites. Step 1116 includes calculating a range error by comparing the expected range value for each of the plurality of neighboring satellites to the measured range value for the each of the plurality of neighboring satellites.

Step 1118 includes identifying at least one of the plurality of neighboring satellites with a range error that compares unfavorably to a range error threshold. Step 1120 includes transmit, via a transmitter onboard the first satellite, a range error notification to the at least one of the plurality of neighboring satellites indicating that the range error compares unfavorably to the range error threshold. Step 1122 includes receiving, via the receiver onboard the first satellite, a status notification from the at least one of the plurality of neighboring satellites indicating an unfavorable status, wherein the at least one of the plurality of satellites generated the status notification indicating the unfavorable status in response to receiving the range error notification transmitted by the first satellite.

Some or all of the plurality of neighboring satellites can each include their own satellite processing system 300, and some or all of the plurality of the plurality of neighboring satellites can be operable to similarly perform some or all of these steps of FIG. 10.

In various embodiments, the method further includes receiving a second plurality of measurement data via the at least one of: the at least one sensor onboard the first satellite or the at least one GNSS signal received via the GNSS receiver onboard the first satellite, for example at a different time. The method further includes calculating second state data for the first satellite on the second plurality of measurement data, where the second state data indicates a second position of the first satellite, for example, at the different time. The method further includes generating a second navigation message that indicates the second state data. The method further includes transmitting the second navigation message to the plurality of neighboring satellites in conjunction with a second ranging signal. The method further includes receiving, via the receiver onboard the first satellite, a range error notification from a subset of the plurality of neighboring satellites. The range error notification was transmitted by each of the plurality of neighboring satellites in the same fashion as illustrated in FIG. 11, in response to the each of the subset of the plurality of neighboring satellites determining a second range error compares unfavorably to the range error threshold. In particular, the each of the subset of the plurality of neighboring satellites calculated the second range error for the first satellite by comparing a second expected range value for the first satellite to a measured range value for the first satellite. Each of the subset of the plurality of neighboring satellites calculated the second measured range value for the first satellite based on the second ranging signal received from the first satellite, and the each of the subset of the plurality of neighboring satellites calculate the second expected range value for the first satellite by comparing the second position of the first satellite to its current position. Each of the subset of the plurality of neighboring satellites calculate its current position based on measurement data it collected.

In various embodiments, the method further includes determining a status of the first satellite is unfavorable in response to determining a proportion of the plurality of neighboring satellites included in the subset of the plurality of neighboring satellites compares unfavorably to a maximum threshold proportion. The method can further include transmitting, via the transmitter onboard the satellite, a status notification indicating an unfavorable status of the satellite to the plurality of neighboring satellites. For example, the maximum threshold proportion can dictate that at least a predefined number and/or proportion of satellites must have sent range error notifications to the first satellite for the first satellite to determine that its status is unfavorable. If less than the maximum threshold proportion of satellites send the range error notification to the first satellite, the first satellite can determine its status is favorable. In some embodiments, the range error notification can be generated by the neighboring satellites to include the value of the calculated range error, and the first satellite determining whether or not the status is unfavorable as a function of the number of satellites from which the calculated range error as well as the value of the range error in each notification. For example, fewer number of satellites may be required to have send range error notifications if these range error notifications indicate high range errors, while a higher number of satellites may be required to have send range error notifications if these range error notifications indicate smaller range errors.

In some embodiments, the method further includes determining a status of each of the subset of the plurality of neighboring satellites is unfavorable in response to determining a proportion of the plurality of neighboring satellites included in the subset of the plurality of neighboring satellites compares unfavorably to a minimum threshold proportion. The method can further include transmitting, via the transmitter onboard the satellite, a notification indicating the unfavorable status of the to the subset of the plurality of neighboring satellites to the subset of the plurality of neighboring satellites. The minimum threshold proportion can be the same as, can be lower than, and/or substantially or lower than the maximum threshold proportion. For example, the minimum threshold proportion can dictate that less than a predefined number and/or proportion of satellites must have sent range error notifications to the first satellite for the first satellite to determine that their statuses are unfavorable. If more than the minimum threshold proportion of satellites send the range error notification to the first satellite, the first satellite can determine their statuses are favorable and/or cannot conclude that their statuses are unfavorable. In some embodiments, a neighboring satellite is only determined to be unfavorable if they were the only satellite of the plurality of neighboring satellites that sent the range error notification.

Figure 12A:
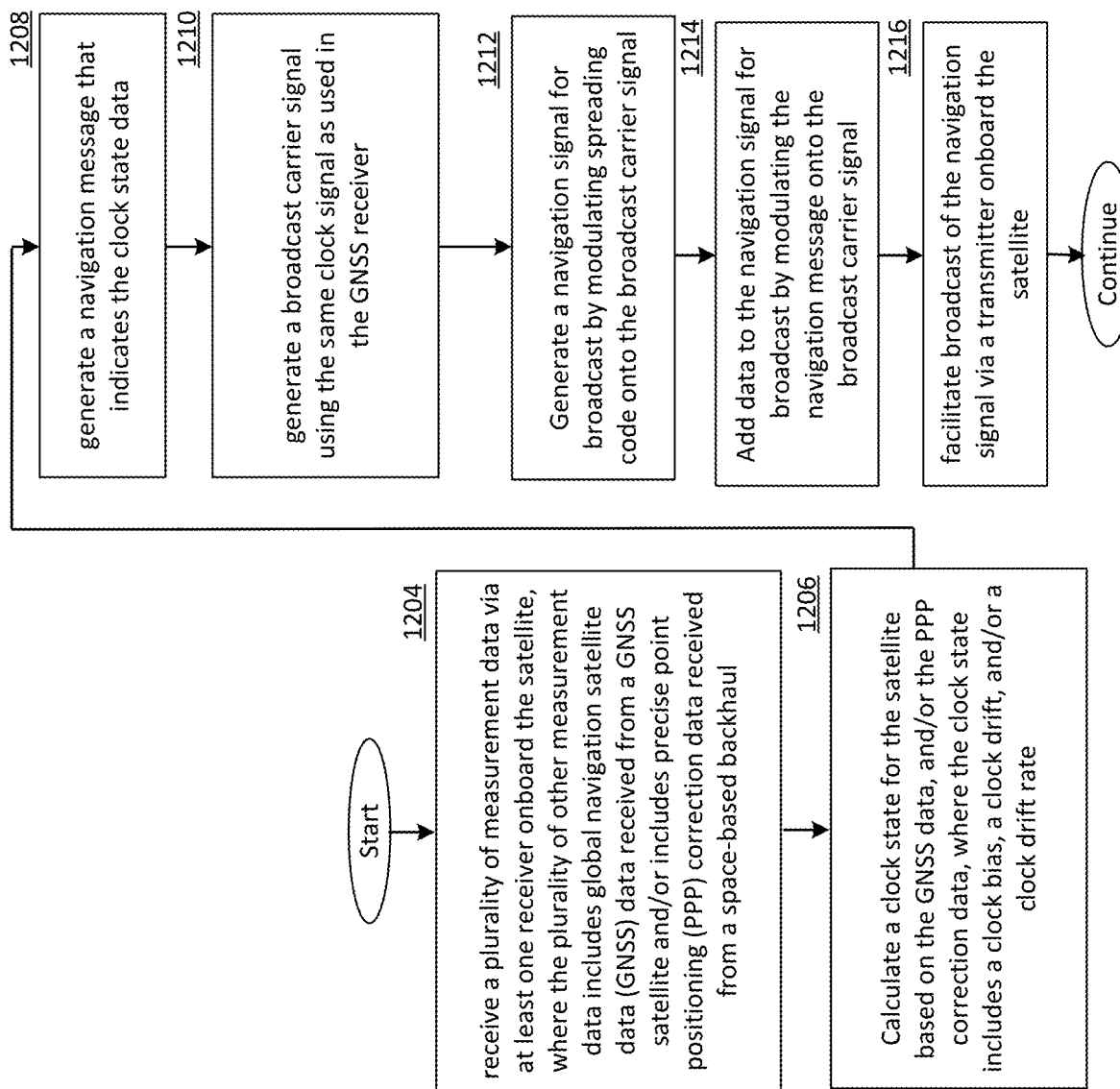
FIG. 12A is a logic diagram of an example of a method of performing state estimation in accordance with various embodiments.
Figure 12B:
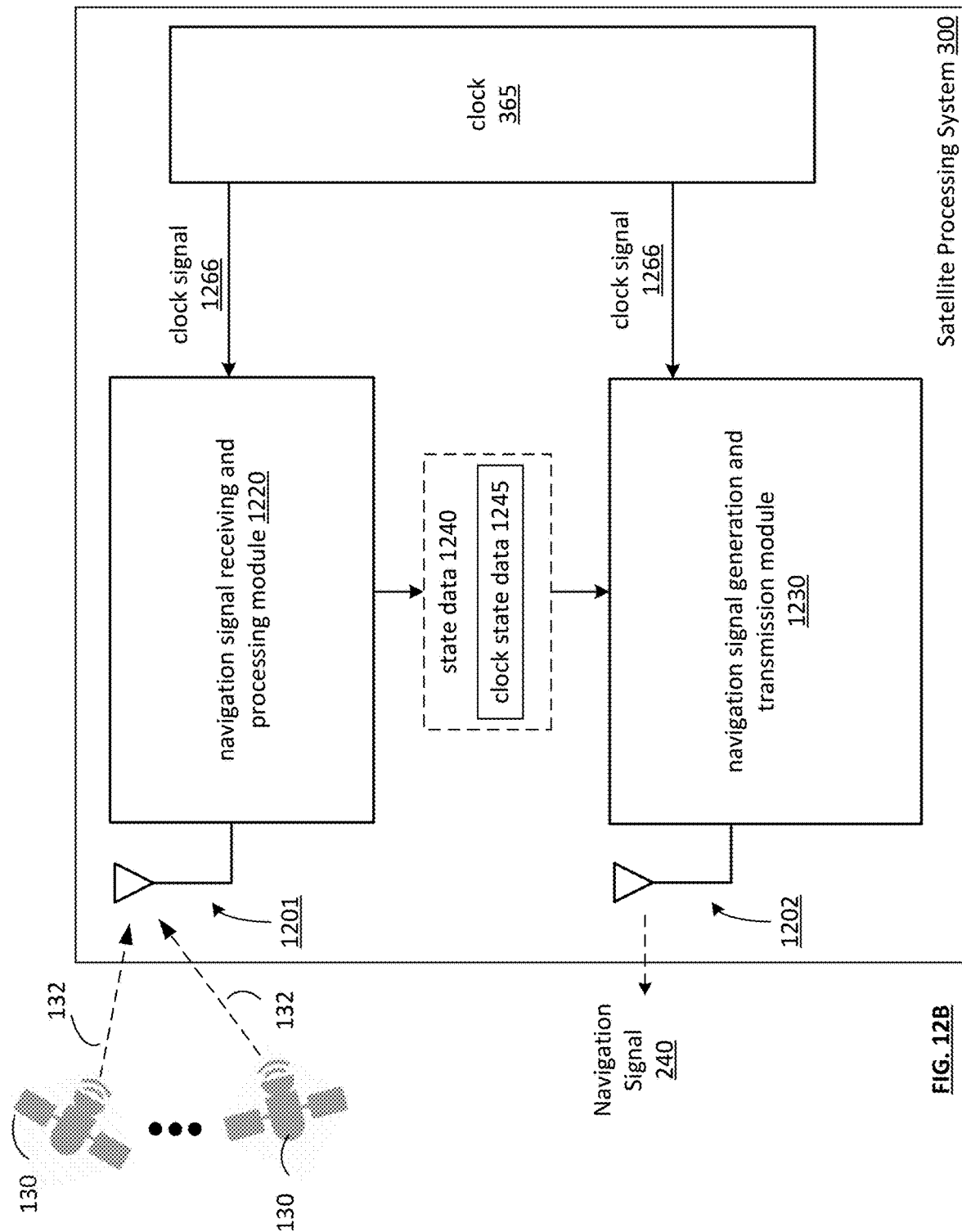
Figure 12C:
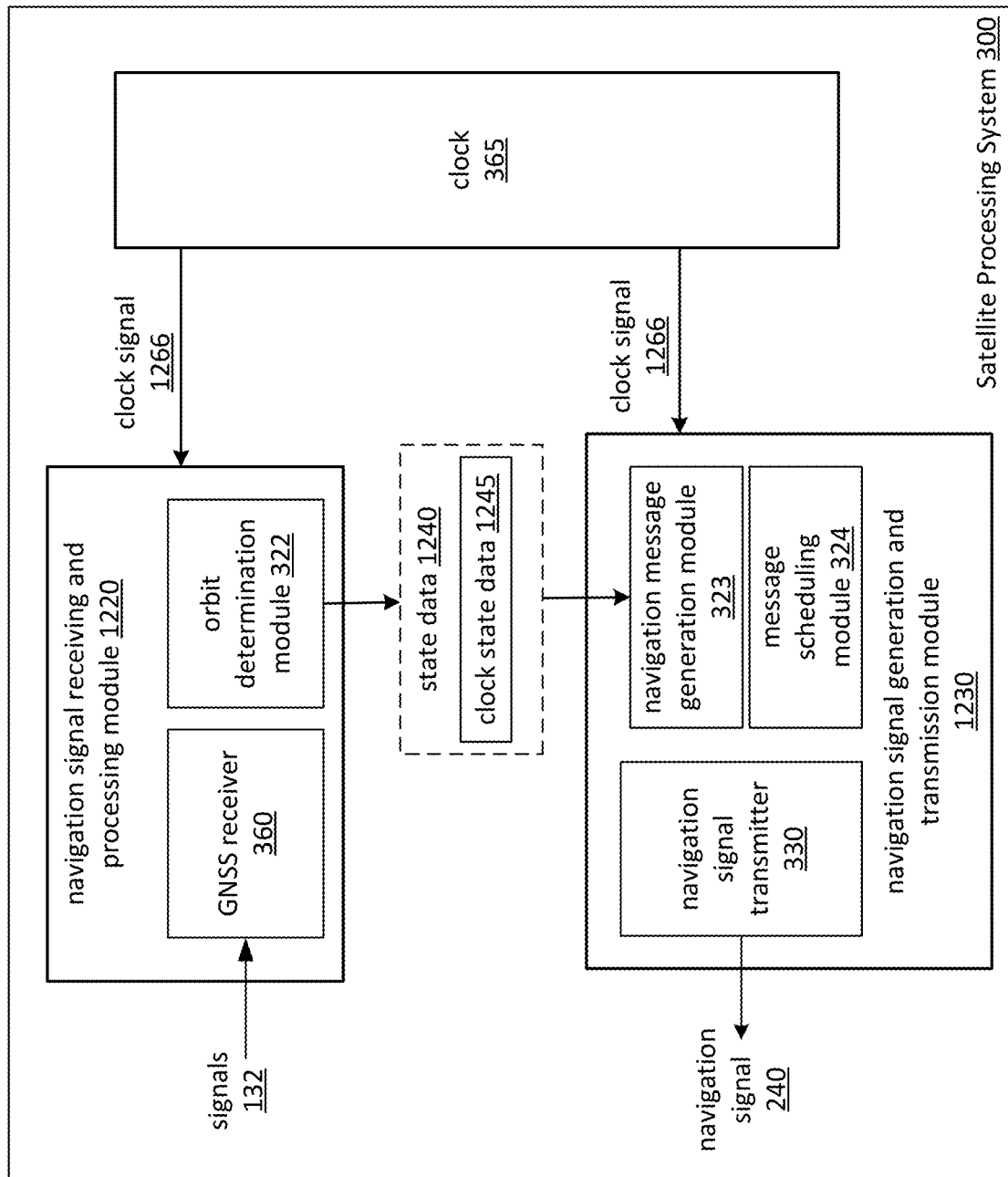
Figure 12D:
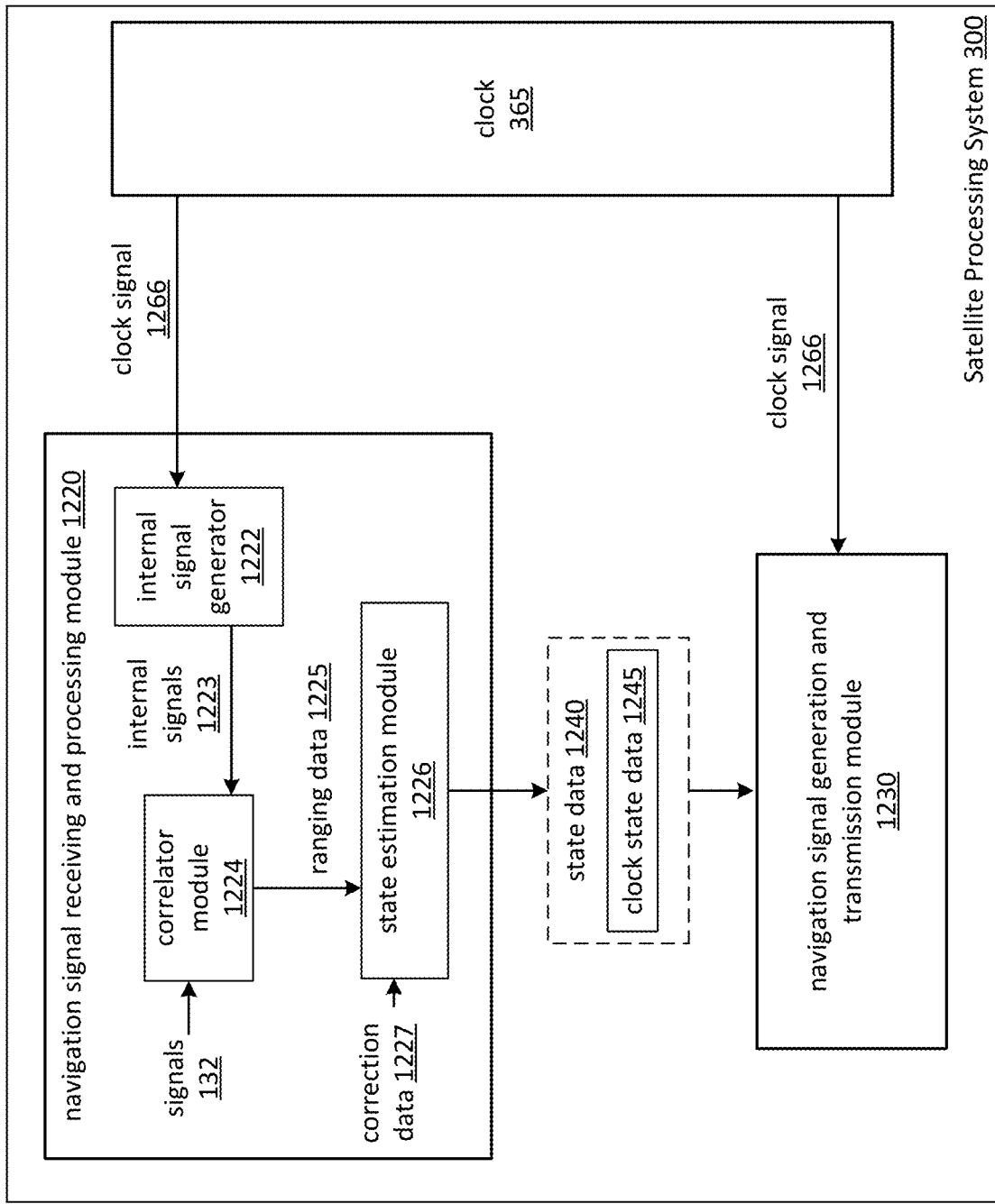
Figure 12F:
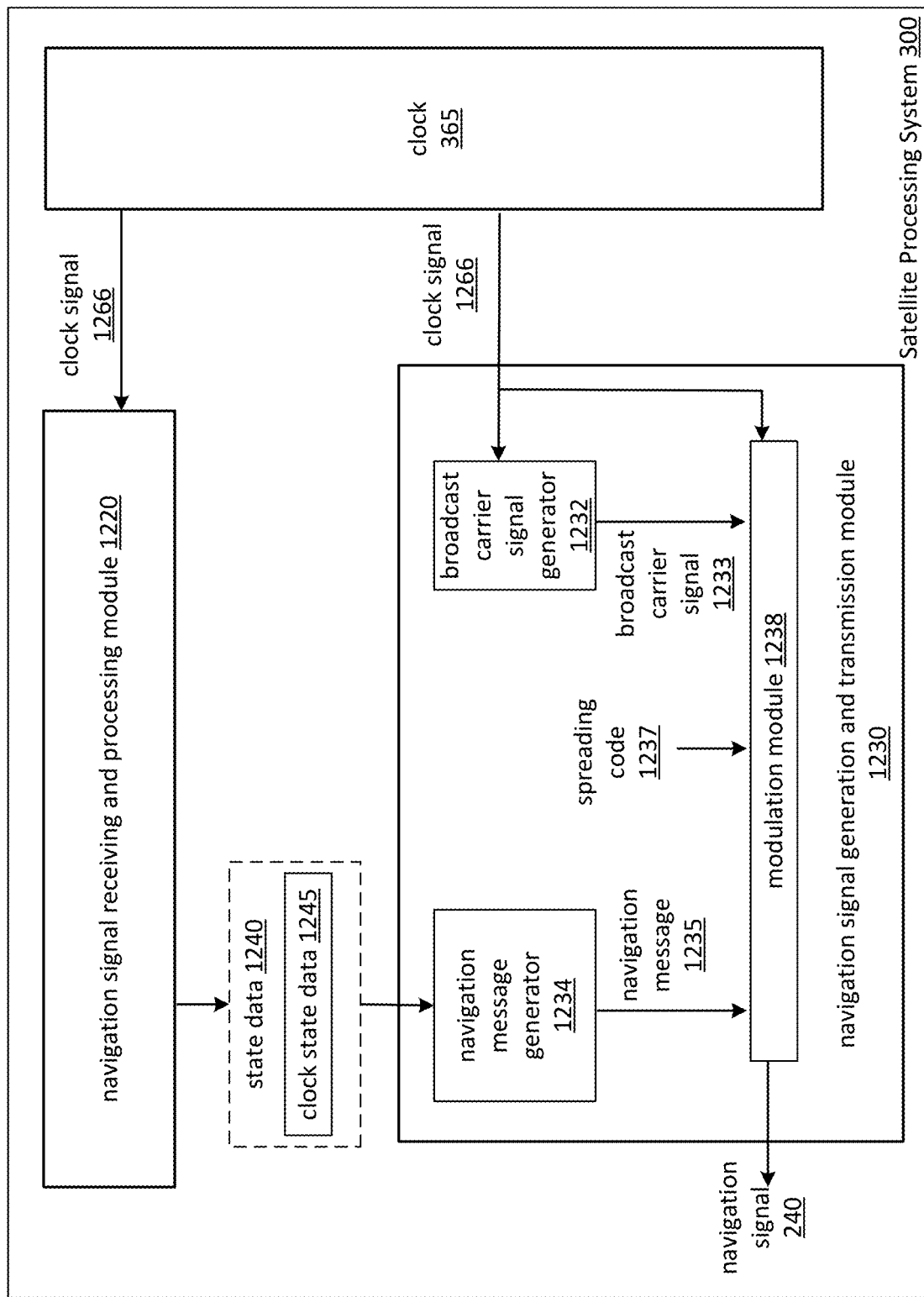
Figure 12G:
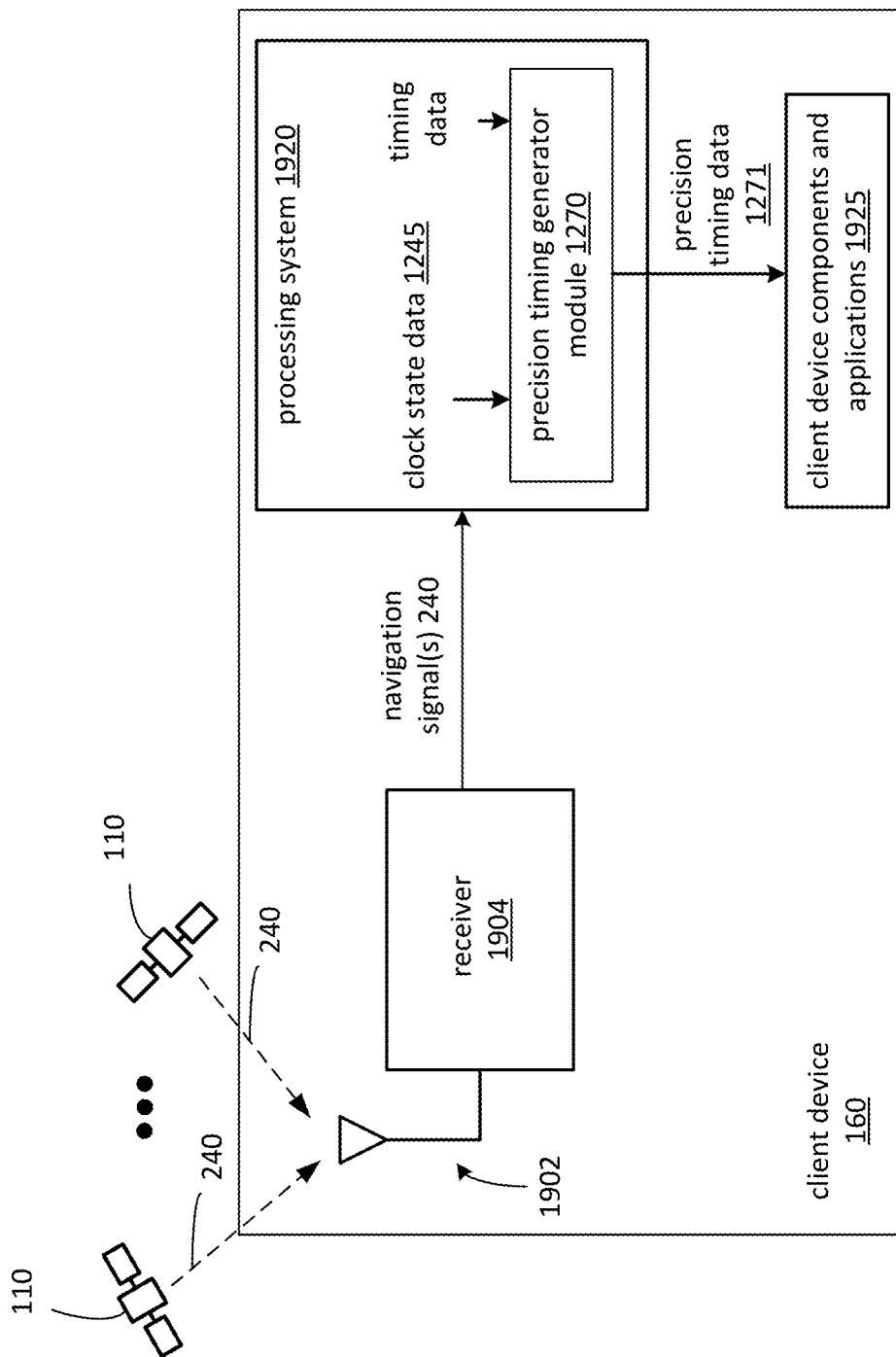
FIGS. 12G-12H are schematic block diagrams of a client device in accordance with various embodiments.
Figure 12H:
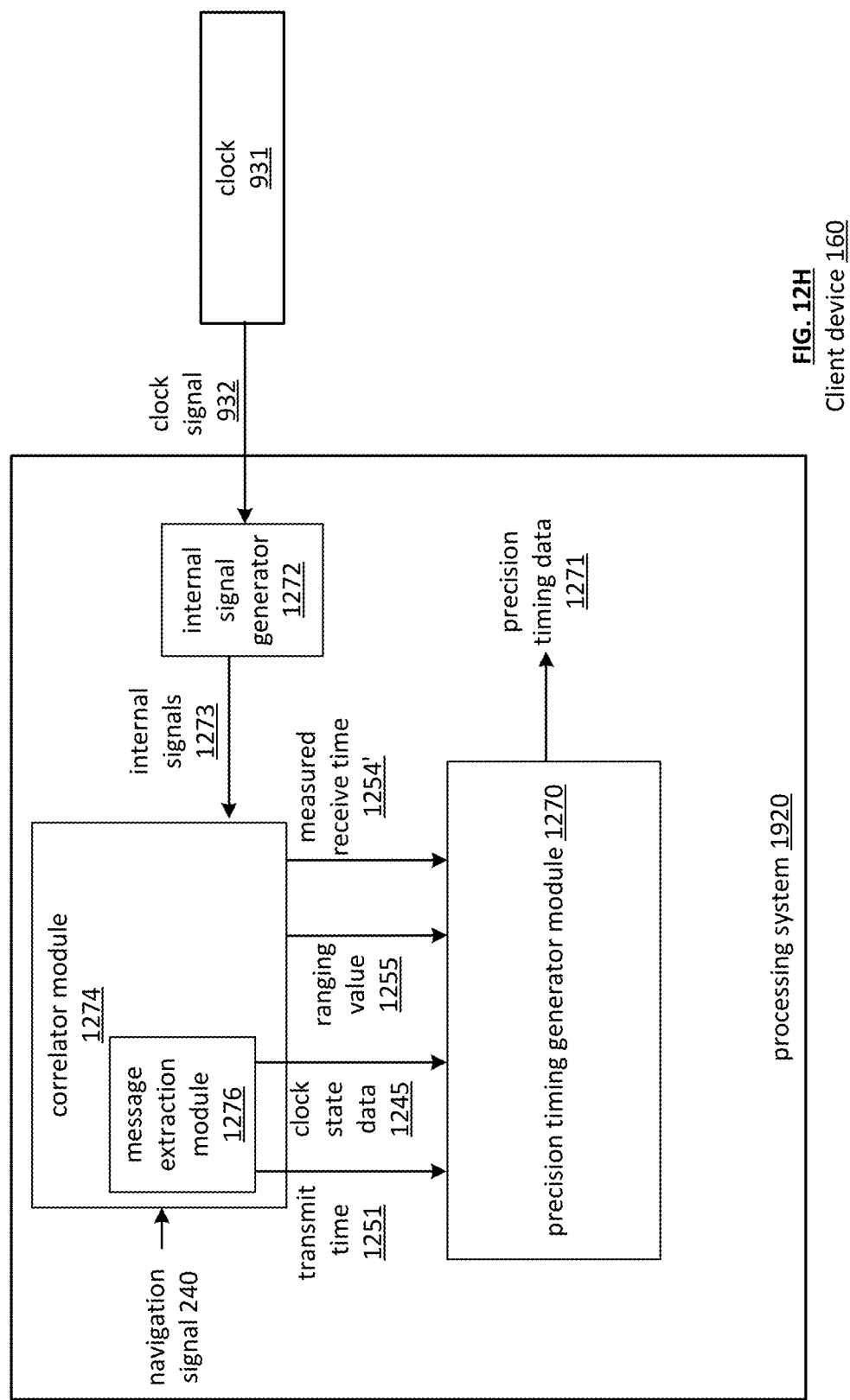
Figure 12I:
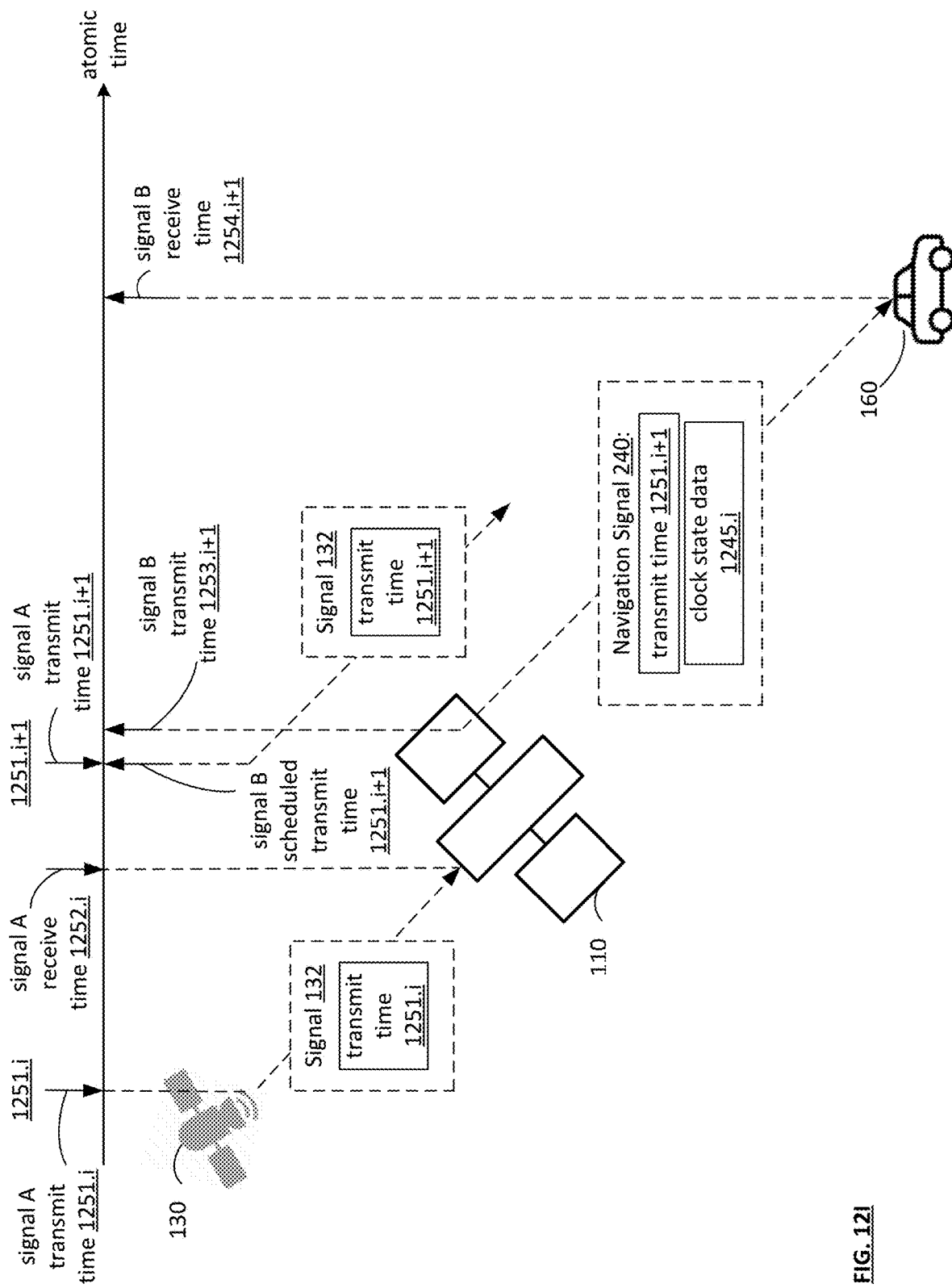
FIGS. 12I-12L illustrate the transmission and receipt of signals over time in accordance with various embodiments.
Figure 12J:
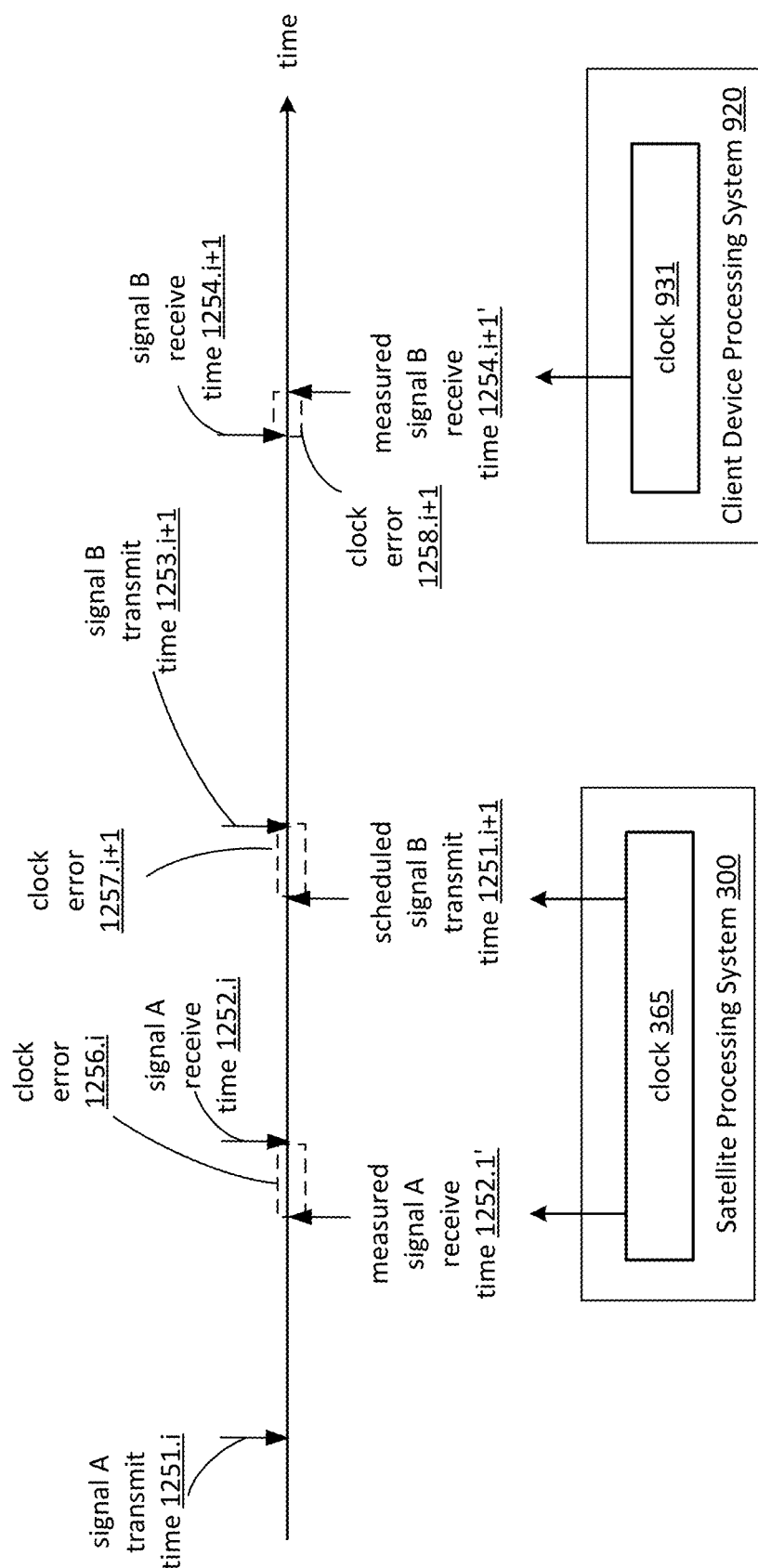
Figure 12K:
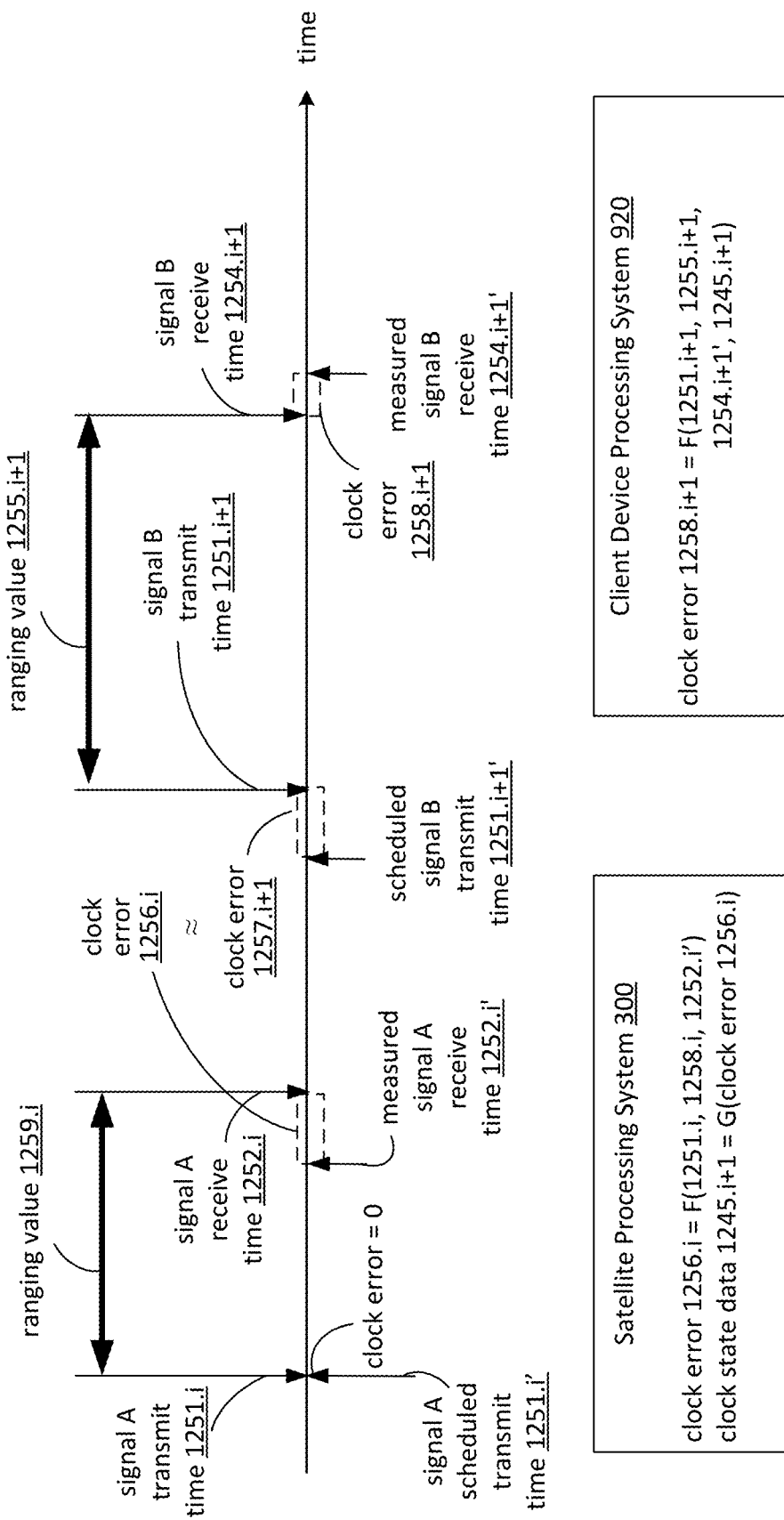
Figure 12L:
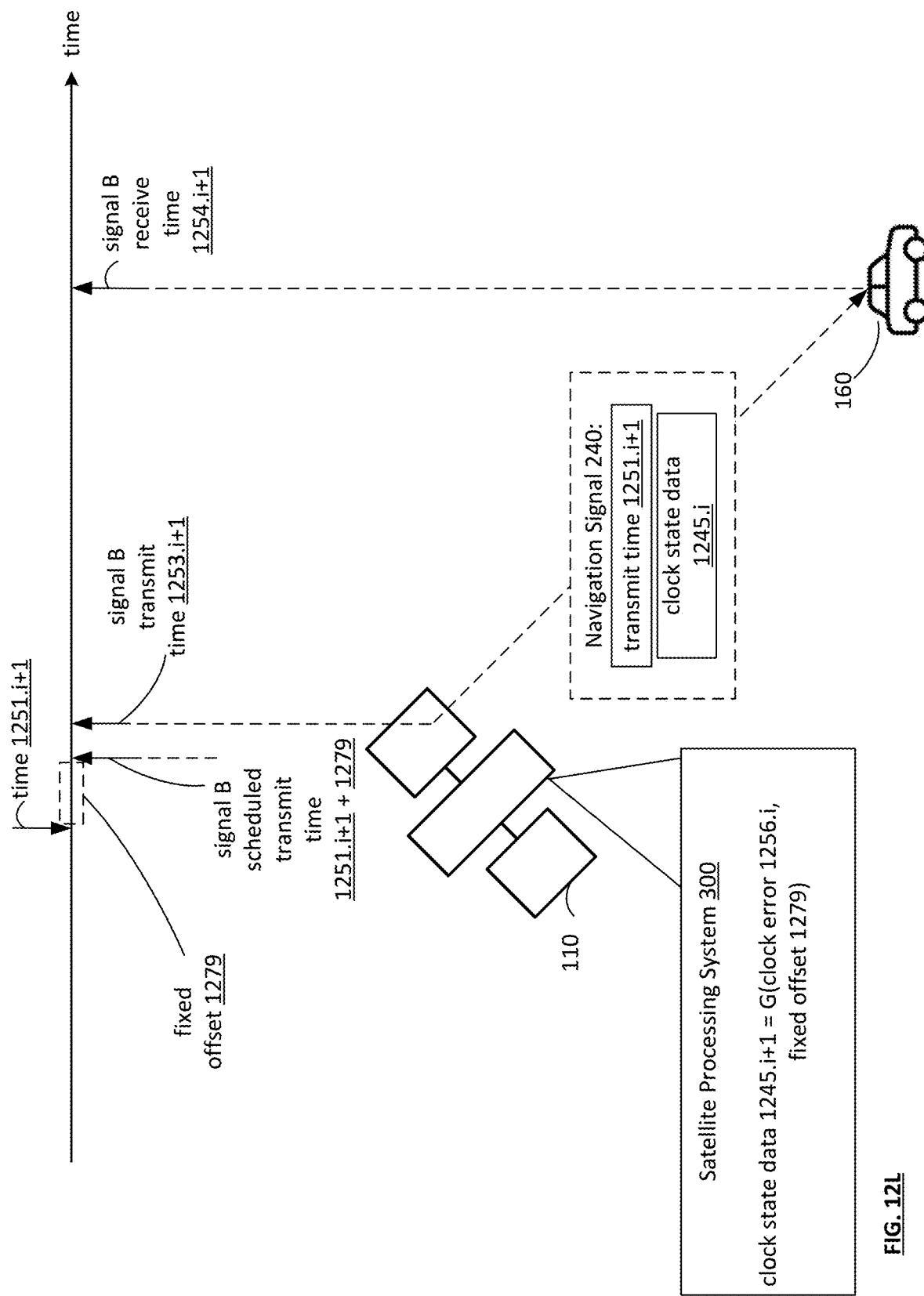
Figure 12M:
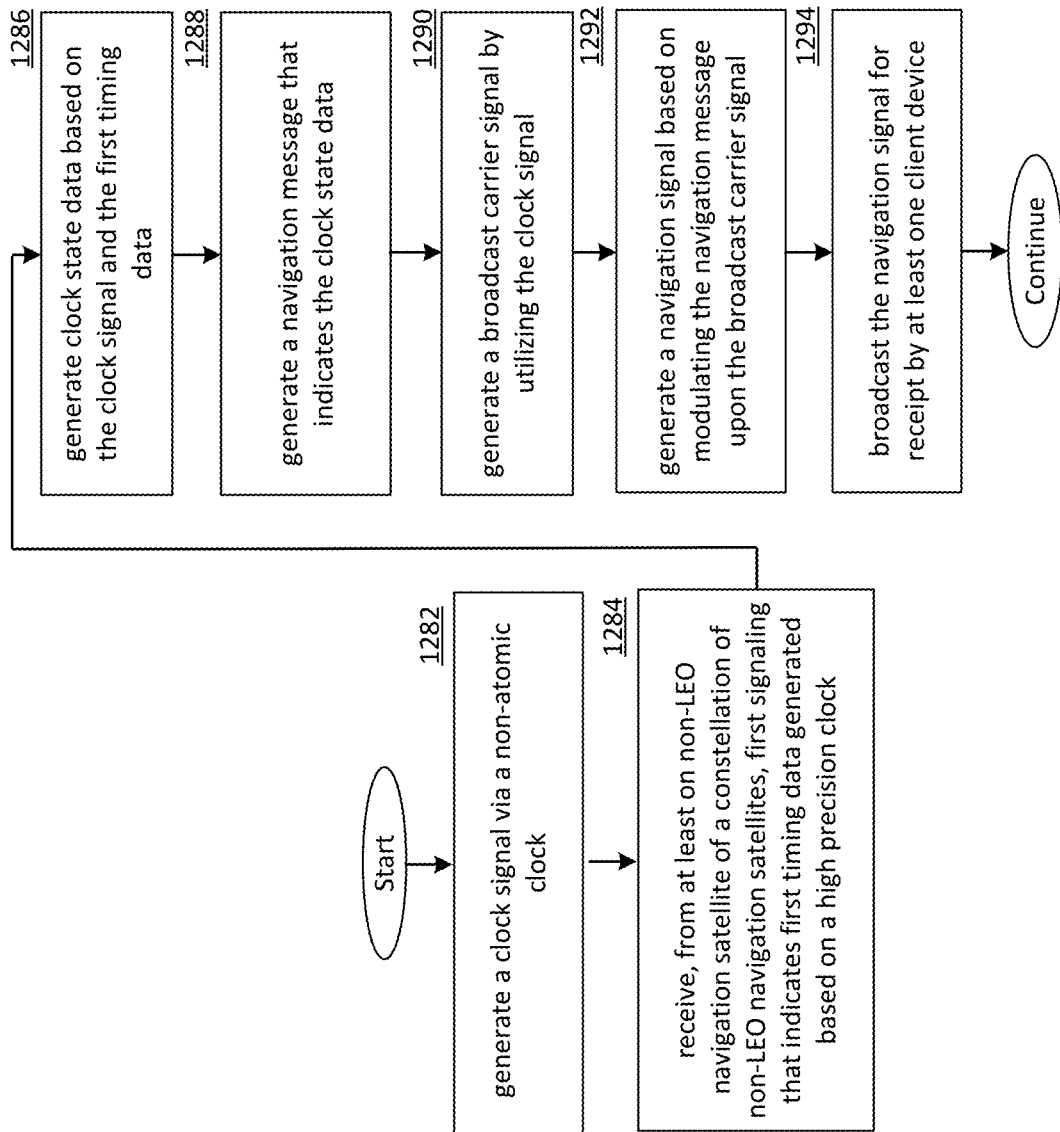
FIG. 12M is a logic diagram of an example of a method of generating a navigation signal estimation in accordance with various embodiments.
Figure 12N:
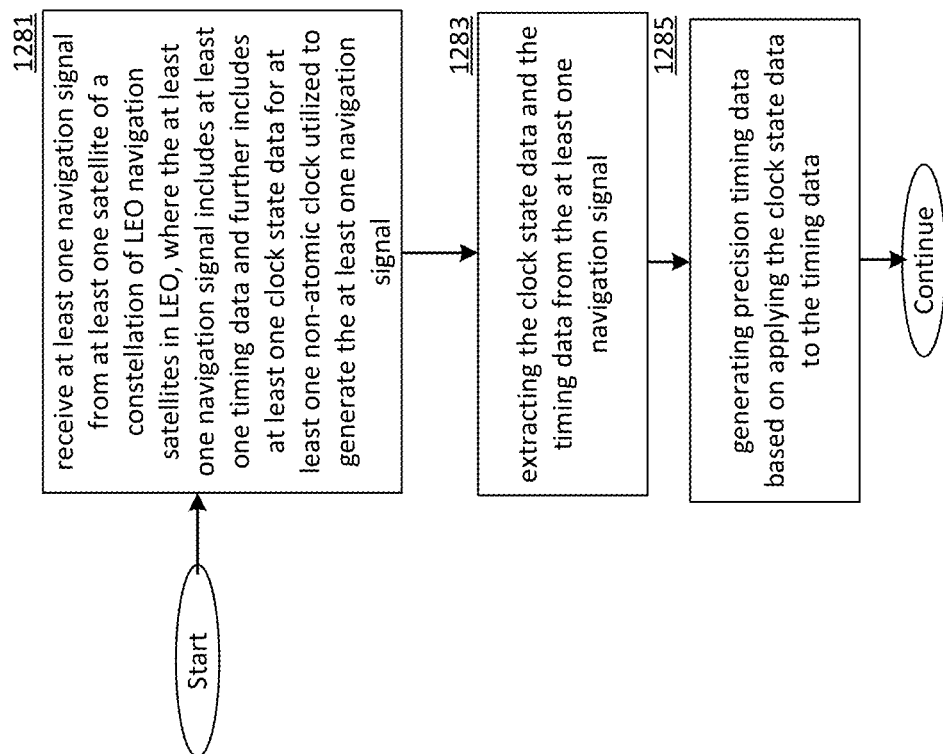
FIG. 12N is a logic diagram of an example of a method of generating precision timing data in accordance with various embodiments.

FIGS. 12A-12N present embodiments of a satellite constellation system 100 that is configured to facilitate generation of and/or synchronization with precision timing data, such as atomic time, by client devices 160 and/or one or more of its nodes. For example, satellites 110 or other nodes of satellite constellation system 100 can generate navigation signals 240 as discussed herein to indicate state data that includes clock state data of a clock utilized to generate the navigation signals 240. Client devices 160, or other nodes that receive navigation signals 240, can generate their own state data, such as their enhances position and timing data 922, based on generating or establishing synchronization with atomic time. These client devices can generate and/or establish synchronization with atomic time based on navigation signals 240, despite these navigation signals 240 not having been generated via an atomic clock or other high precision clock onboard corresponding satellites 110 and/or other nodes that generated these navigation signals 240. Thus, the satellite constellation system 100 can be configured to deliver, or otherwise facilitate synchronization with, atomic time, even if corresponding high precision clocks are not implemented onboard its satellites 110 and/or nodes.

This functionality can be ideal, as high precision clocks can be significantly more expensive than non-atomic clocks. For example, necessitating inclusion of a high precision clock onboard a satellite 110 to ensure the satellite is able to generate navigation signals that enable receiving client devices 160 to establish the enhanced position and/or timing data 922 as described herein can cause each satellite to be significantly more expensive than satellite that include non-high precision clocks. Facilitating delivery and/or synchronization with high precision time without necessitating the implementing of onboard high precision clocks can improve the technology of navigation systems and/or satellite communication systems by enabling some or all satellites 110 and/or other nodes of satellite constellation system 100 to be constructed via cheaper elements, without sacrificing the ultimate generation of precision timing data by client devices receiving their navigation signals 240.

Furthermore, as individual satellites 110 and/or other nodes of satellite constellation system 100 can be constructed more cheaply via inclusion of non-atomic clocks, a greater number of satellites can be constructed and launched via a same amount of monetary resources, which can further improve the technology of navigation systems and/or satellite communication systems by enabling greater global coverage, for example, where a greater number of satellites are expected and/or guaranteed to be in view of a given client device 160 on earth, which increases the ability of the given client device 160 to generate enhanced position and timing data 922 via satellite constellation system 100 and/or increases the proportion of client devices 160 on earth that are capable of generating enhanced position and timing data 922 due to a greater number of satellites being included in satellite constellation system 100.

As used herein "atomic time" can correspond to a "true time." Atomic time can be established by one or more atomic clocks, or one or more other high precision clocks. For example, atomic time is established based on a plurality of GNSS satellites 130 of a GNSS satellite constellation based on signals generated via their own high precision clocks, such as their own atomic clocks.

As used herein a "high precision clock" can correspond to any clock and/or clock ensemble with precision and/or long term stability of an atomic clock. A "high precision clock" can correspond to any clock and/or clock ensemble that is: operable to generate a clock signal that is in compliance with atomic time; is characterized to have long term stability; and/or has long term stability that compares favorably to a threshold stability required to establish atomic time and/or high precision time. For example, a "high precision clock" is implemented as one or more atomic clocks, or any other type of clock and/or clock ensemble that emulates the precision, long term stability, and/or some or all other functionality of an atomic clock.

As used herein a "non-atomic clock" can correspond to any clock and/or clock ensemble that is not a high precision clock and/or is not an atomic clock. For example, a "non-atomic clock": is not operable to generate a clock signal that is in compliance with atomic time; is not characterized to have long term stability; has long term stability that compares unfavorably to a threshold stability required to keep atomic time and/or high precision time; has a long term stability that is less favorable than the long term stability of a high precision clock; generates a clock signal that has a known and/or unknown error relative to atomic time and/or high precision time; and/or otherwise is not capable of some or all functionality of a high precision clock and/or an atomic clock.

Atomic time can be established by one or more processing systems, such as a processing system of a satellite 110 and/or a client device 160, and/or another processing system that does not include and/or is not coupled to its own atomic clock based on: receiving a signal indicating atomic time; synchronizing with atomic time; calculating and/or correcting for a clock error of one or more of its non-atomic clocks and/or one or more non-high precision clocks; and/or otherwise determining atomic time. For example, a processing system that does not include and/or is not coupled to its own atomic clock can determine the true, atomic time if it has enough other information, such as information regarding the error of its own non-atomic clock and/or the error of a non-atomic clock that transmitted a navigation signal utilized to establish the true, atomic time. Examples of this determining of atomic time by utilizing non-atomic clocks is discussed in further detail in conjunction with FIGS. 12A-12N.

FIG. 12A illustrates an example embodiment of a flowchart illustrating an example of performing orbit determination. In particular, a method is presented for use in association with one or more functions and features described in conjunction with FIGS. 1-11, for execution by a satellite processing system 300 that includes a processor or via another processing system of satellite constellation system 100 that includes at least one processor and memory that stores instructions that configure the processor or processors to perform some or all of the steps described below.

Step 1204 includes receiving a plurality of measurement data via at least one receiver onboard the satellite, where the plurality of other measurement data includes global navigation satellite data (GNSS) data received from a GNSS satellite and/or includes precise point positioning (PPP) correction data received from a space-based backhaul. A clock signal, for example, generated by a clock onboard the satellite 110, can be utilized by a GNSS receiver onboard the satellite to receive a GNSS signal from the GNSS satellite, and/or this clock signal can be utilized by an analog to digital converter onboard the satellite 110 to generate the GNSS data from the GNSS signal received by the GNSS receiver.

Step 1206 includes calculating a clock state for the satellite based on the GNSS data, and/or the PPP correction data, where the clock state includes a clock bias, a clock drift, and/or a clock drift rate. Step 1208 includes generating a navigation message that indicates the clock state data. Step 1210 includes generating a broadcast carrier signal using a clock signal. This clock signal can be the same clock signal and/or can be disciplined to the clock signal utilized in step 1204. For example, this clock signal can be the same as the clock signal used by GNSS receiver to receive the GNSS signal from the GNSS satellite, can be discipled to the clock signal used by GNSS receiver to receive the GNSS signal from the GNSS satellite, can be the same as the clock signal that is utilized by the analog to digital converter onboard the satellite 110 to generate the GNSS data from the GNSS signal received by the GNSS receiver, and/or can be disciplined to the clock signal that is utilized by the analog to digital converter onboard the satellite 110 to generate the GNSS data from the GNSS signal received by the GNSS receiver.

Step 1212 includes generating a navigation signal for broadcast by modulating the spreading code onto the broadcast carrier signal. Step 1214 includes adding additional data to the navigation signal for broadcast by modulating the navigation message onto the broadcast carrier signal. Step 1216 includes facilitating broadcast of the navigation signal via a transmitter onboard the satellite.

FIG. 12B illustrates embodiments of a satellite processing system 300. The satellite processing system 300 of FIG. 12B can be implemented onboard: a satellite 110, a client device 160, a ground station 200, a backhaul satellite 150, and/or any other node of the satellite constellation system 100 described herein. The satellite processing system 300 of FIG. 12B can be implemented utilizing some or all features and/or functionality of the satellite processing system of FIG. 3B. The satellite processing system 300 of FIG. 12B can be implemented to perform some or all steps of FIG. 12A and/or some or all steps of FIG. 12M. Some or all features and/or functionality of the satellite processing system 300 of FIG. 12B can be utilized to implement any other embodiment of satellite processing system 300 described herein.

The satellite processing system 300 can include and/or be operably coupled to a clock 365. Clock 365 can be implemented via an OCXO, another type of crystal oscillator, and/or any other clock. The clock 365 can be onboard and/or implemented within a corresponding satellite 110, backhaul satellite 150, ground station 200, client device 160, or other node of satellite processing system that implements the satellite processing system 300. Clock 365 can be implemented as one or more clocks 365 of FIG. 3B. The clock 365 can be implemented as a non-atomic clock.

A satellite processing system 300 can implement a navigation signal receiving and processing module 1220. The navigation signal receiving and processing module 1220 can utilize at least one antenna 1201 to receive at least one signal 132, such as a GNSS signal, generated by at least one corresponding GNSS satellite 130. For example, the least one antenna 1201 is implemented via GNSS receiver 360 of FIG. 3B.

The navigation signal receiving and processing module 1220 can include at least one processor, and can be configured to generate state data 1240 by utilizing the at least one processor. The state data 1240 can be generated to include clock state data 1245 that characterizes a clock 365. The state data 1240 can additionally include such as the clock state data 1245, orbital position data, timing state data, and/or other state data of a corresponding satellite and/or node as described herein. Multiple state data 1240 can be generated over time as discussed previously, as the same or different one or more signals 132 are received over time, where the most recent state data 1240 indicates a most recent estimated and/or computed state of the satellite 110 and/or other node that implements the given satellite processing system 300 that optionally updated from a prior state data 1240 due to an estimated and/or computed change in state of the satellite 110 and/or other node at a given time corresponding to the most recent state data 1240 from a prior time corresponding to the prior state data 1240.

The navigation signal receiving and processing module 1220 can receive the clock signal 1266 generated by clock 365. The navigation signal receiving and processing module 1220 can perform some or all of its functionality, such processing incoming signals 132 to generate state data 1240, based on utilizing clock signal 1266. For example, one or more local clocks of navigation signal receiving and processing module 1220 are disciplined to this clock signal 1266, and/or the functionality of navigation signal receiving and processing module 1220 is otherwise performed based on applying clock signal 1266, and/or not the clock signal of another clock of satellite processing system 300.

In particular, clock state data 1245 can be generated and updated over time in state data 1240 generated via signals 132 are received over time. The clock state data 1245 can change over time to reflect estimated and/or computed changes in the state of clock 365, such as characterization of changes in error of clock signal 1266 relative to atomic time.

The satellite processing system 300 can implement a navigation signal generation and transmission module 1230. The navigation signal generation and transmission module can broadcast a navigation signal 240 via at least one antenna 1202. For example, the least one antenna 1202 is implemented via navigation signal transmitter 330 of FIG. 3B.

The navigation signal generation and transmission module 1230 can include at least one processor, and can be configured to generate the navigation signal 240 by utilizing the at least one processor. The navigation signal 240 can be generated to include some or all of the state data 1240, such as the clock state data 1245, orbital position data, timing state data, and/or other state data of a corresponding satellite and/or node as described herein.

The navigation signal generator and transmission module 1230 can also receive the clock signal 1266 generated by clock 365. The navigation signal generator and transmission module 1230 can perform some or all of its functionality, such as generating navigation signal 240 to include state data 1240, based on utilizing clock signal 1266. For example, one or more local clocks of navigation signal generator and transmission module 1230 are disciplined to this clock signal 1266, and/or the functionality of navigation signal generator and transmission module 1230 is otherwise performed based on applying clock signal 1266, and/or not the clock signal of another clock of satellite processing system 300.

In some embodiments, the at least one processor that implements the navigation signal receiving and processing module 1220 can include one or more shared processing resources with the at least one processor that implements the navigation signal generation and transmission module 1230. In other embodiments, the at least one the at least one processor that implements the navigation signal receiving and processing module 1220 is entirely distinct from the at least one processor that implements the navigation signal generation and transmission module 1230.

In some embodiments, the at least one processor of navigation signal receiving and processing module 1220 is implemented via at least one processor of GNSS receiver 360. In some embodiments, at least one local clock of the GNSS receiver 360 that is utilized to perform some or all functionality of the navigation signal receiving and processing module 1220, such as generating ranging data based on signals 132 to generate the state data 1240, is disciplined to the clock signal 1266. Alternatively or in addition the GNSS receiver 360 otherwise performs some or all of its functionality, such as generating ranging data, based on receiving and utilizing clock signal 1266. Alternatively or in addition, the local clock of the GNSS receiver 360 is implemented as clock 365, where the clock signal of this local clock of the GNSS receiver 360 is also received and utilized by the navigation signal generation and transmission module 1230 as clock signal 1266.

In some embodiments, the at least one processor of navigation signal generation and transmission module 1230 is implemented via at least one processor of a software defined radio (SDR). In some embodiments, at least one local clock of the SDR that is utilized to perform some or all functionality of the navigation signal generation and transmission module 1230, such as generating a carrier signal and/or modulating data upon the carrier signal, is disciplined to the clock signal 1266. Alternatively or in addition the GNSS receiver 360 otherwise performs some or all of its functionality, such as generating a carrier signal and/or modulating data upon the carrier signal, based on receiving and utilizing clock signal 1266. Alternatively or in addition, the local clock of the SDR is implemented as clock 365, where the clock signal of this local clock of the SDR is also received and utilized by the navigation signal receiving and processing module 1220 as clock signal 1266.

In particular, as discussed in further detail herein, the use of the same clock signal 1266 by both the navigation signal receiving and processing module 1220 and the navigation signal generation and transmission module 1230 enables client devices 160 that receive and process navigation signals 240 to appropriately account for any clock error induced in the generation and transmission of navigation signal 240. In particular, based on the signals 132 being generated via an atomic time source, all clock error and/or a substantial portion of clock error induced in receiving and processing these signals 132, such as a discrepancy between a ranging value of the signal 132, a transmit time indicated in data of the signal 132, and a measured receive time generated utilizing clock signal 1266, can be attributed to error of clock signal 1266 relative to true, atomic time. This error can be characterized in clock state data 1245, and can similarly characterize any clock error induced in the generation and transmission of navigation signal 240 based on the navigation signal 240 being generated and transmitted utilizing the same clock signal that was utilized to receive and process the received signals 132. Thus, when a client device 160 receives navigation signal 240, any of these clock errors in the generation and transmission of the navigation signal 240 can be corrected and/or otherwise accounted for based on extracting and utilizing the clock state data 1245 included in these navigation signals 240. Any remaining errors can be attributed to the client device's own clock error in receiving the signals, and precise, atomic time can be established by the client device 160. This relationship between clock error and establishing atomic time by satellite processing system 300 and client devices 160 is discussed in conjunction with the first order example illustrated in FIGS. 12I-12L.

Thus, this use of the same clock signal by both the navigation signal receiving and processing module 1220 and the navigation signal generation and transmission module 1230 improves the technology of navigation systems by enabling generation and transmission of clock state data 1245 that characterizes clock error induced in generating and transmitting corresponding navigation messages 240 via a non-atomic clock, enabling receiving devices to establish atomic time despite these clock error induced in generating and transmitting corresponding navigation messages 240, as well as their own additional clock error induced in receiving and processing the navigation messages 240. In particular, if the clock error induced in the generation and/or transmission of navigation signal 240 via non-atomic clock wasn't appropriately characterized, the receiving device could be unable to establish atomic time unless their own clock error was known and/or appropriately characterized. As this is not the case for the clocks of many client devices 160 utilized to receive signals, this communication of clock state data 1245 can be necessary for the corresponding client device to establish atomic time if the signals are transmitted via a non-atomic clock.

The generation of accurate clock state data 1245 can be reliant upon leveraging the use of signals generated in accordance with atomic time and/or via synchronization with atomic time. In particular, if the clock signal utilized to transmit the navigation signal 240 were different from the clock signal utilized to receive and process the signals 132, additional measurement data and/or information would be necessary to determine the clock state of this different clock signal utilized to transmit the navigation signal 240.

In some embodiments, the clock 365 can be implemented via clock with favorable short term stability. As used herein "short term stability" can correspond to a stability within a given short time frame, such as a second, that compares favorably to a stability threshold. In particular, as there is a lapse in time between receiving of the signals 132 and transmission of signal 240, the clock state data 1245 generated based on clock error of the clock signal 1266 in receiving and processing signals 132 would not necessarily characterize the clock error of the clock signal 1266 in subsequently generating and sending signals 240 that include this clock state data 1245 if the clock signal 1266 were not stable within the short time frame, as the clock error could change within time between receiving signals 132 and transmitting navigation signal 240. Instead, the short term stability of clock 365 can be leveraged to guarantee and/or estimate that the clock state data 1245 characterizing the state of the clock signal 1266 at the time a signal 132 was received and processed can also accurately, and/or approximately within a given threshold, characterize the state of the clock signal 1266 at the later time that the navigation signal 240 that includes this clock state data 1245 is transmitted. In some embodiments, the short term stability of the clock 365 can be more favorable and/or otherwise more stable than the short term stability of the high precision clock, such as an atomic clock of a GPS satellite, implemented to generate navigation signals 132.

FIG. 12C illustrates an embodiment of a satellite processing system 300. Some or all features and/or functionality of the satellite processing system 300 of FIG. 12C can be utilized to implement the satellite processing system 300 of FIG. 12B and/or any other embodiment of satellite processing system 300 described herein.

The navigation signal receiving and processing module 1220 can implement the GNSS receiver 360 of FIG. 3B and/or the orbit determination module 322 of FIG. 3B. The orbit determination module 322 can be operable to generate the state data 1240 based on implementing some or all features and/or functionality discussed in conjunction with the state estimator flow of FIG. 5A. The clock signal 1266 can be utilized to implement the GNSS receiver 360 and/or the orbit determination module 322 of the navigation signal receiving and processing module 1220.

The navigation signal generation and transmission module can implement the navigation signal transmitter 330, the navigation message generator module 323, and/or the message schedule module 324 of FIG. 3B. The navigation message generation module 232 can generate navigation messages to include some or all of the state data 1240, for example, based on implementing some or all features and/or functionality discussed in conjunction with the navigation message generation flow of FIG. 5B, and/or can otherwise generate navigation messages for inclusion in navigation signals 240 as described herein. The message schedule module 324 can generate navigation signal based on implementing some or all features and/or functionality discussed in conjunction with the broadcast flow of FIG. 5C.

The clock signal 1266 can be utilized to implement navigation signal transmitter 330, the navigation message generator module 323, and/or the message schedule module 324 of the navigation signal generation and transmission module 1230. For example, the message schedule module 324 can generate navigation signals for transmission in accordance with scheduling and modulating navigation messages at scheduled times by applying the clock signal 1266.

FIG. 12D illustrates an embodiment of a satellite processing system 300. Some or all features and/or functionality of the satellite processing system 300 of FIG. 12D can be utilized to implement the satellite processing system 300 of FIG. 12B and/or any other embodiment of satellite processing system 300 described herein.

The signal receiving and processing module 1220 can implement an internal signal generator 1222 that is configured to utilize clock signal 1266 to generate at least one internal signal 1223. For example, the one or more internal signals 1223 are generated in accordance with at least one frequency, for example, corresponding to at least one frequency of the signals 132. As another example, the one or more internal signals 1223 are generated in accordance with a spreading code, for example, corresponding to at least one spreading code of the signals 132. In some embodiments, the internal signal generator 1222 is implemented via a GNSS receiver 360 of the satellite processing system 300 and/or other processing resources of the satellite processing system 300.

The signal receiving and processing module 1220 can implement a correlator module 1224, for example, that is configured to cross-correlate the signals 132 with internal signals 1223. The correlator module 1224 can be configured to generate ranging data 1225, for example, based on identifying a peak in correlation data of the correlation module and based on further identifying a range of time, such as a number of peaks of signal 132 and/or internal signal 1223 and/or number of bits of signal 132 and/or internal signal 1223, corresponding to timespan between transmission and receipt of the signal 132, such as a particular peak and/or particular data in signal 132, and/or corresponding to physical distance between the corresponding satellite 110 and/or other node implementing the satellite processing system 300 and a satellite 130 that transmitted the signal 132, for example, based on applying a value of the speed of light to the timespan. In some embodiments, the correlator module 1224 is implemented via a GNSS receiver 360 of the satellite processing system 300 and/or other processing resources of the satellite processing system 300.

The ranging data 1225 can be utilized by a state estimation module 1226 to generate the state data 1240, including clock state data 1245 and/or other state data such as an orbital position of the corresponding satellite 110 and/or other node implementing the satellite processing system 300. The state estimation module can optionally utilize correction data 1227, such as PPP correction data or other correction data received from a backhaul satellite 150 and/or ground station 200 to apply corresponding corrections to generate the state data 1240 as described previously. In some embodiments, the state estimation module 1226 is implemented via orbital determination module 322 of the satellite processing system 300 and/or any other processing resources of the satellite processing system 300. In some embodiments, the state estimation module 1226 is implemented based on performing some or all features and/or functionality of the state estimation flow of FIG. 5A and/or the navigation message generator flow of FIG. 5B to generate the state data 1240.

FIG. 12E illustrates an embodiment of a satellite processing system 300. Some or all features and/or functionality of the satellite processing system 300 of FIG. 12E can be utilized to implement the satellite processing system 300 of FIG. 12D and/or any other embodiment of satellite processing system 300 described herein.

The correlator module 1224 of FIG. 12D can further implement and/or can be operably coupled to a message extraction module 1228 that is operable to extract messages and/or other data modulated upon one or more carrier signals of signals 132. This can include extracting a transmit time 1251, such as a time stamp and/or time data included in a navigation message of signal 132 that indicates a time of transmission of a corresponding bit of the signal 132 that includes the transmit time and/or that corresponds to a start of the navigation message. The transmit time 1251 can indicate a number of seconds and/or a number of weeks. The transmit time 1251 can be in accordance with a time format associated with the GNSS constellation that includes the GNSS satellite 130 that generates the signal 132.

In some embodiments, a current time, corresponding to true atomic time can be established by the based on utilizing a given transmit time 1251, subsequently received transmit times 1251, and/or peaks and/or bits of signal 132 thereafter in conjunction with a known frequency of signals 132 to synchronize with and/or lock-into atomic time as signals 132 continue to be received from the same or different one or more GNSS satellites 130 over time, for example, as different GNSS satellites 130 come in and out of view of the satellite 110 implementing the satellite processing system as the satellite 110 orbits over time. The state data 1240 can optionally indicate and/or be based on the current time, for example, as timing data and/or transmit time values in a same or different time format as transmit times 1251 and/or at a same or different scheduled recurrence as transmit times 1251. In some embodiments, some transmit times 1251 are not extracted directly from a message of the signal 132, but are instead generated to reflect the current time.

The correlator module 1224 can be further implemented to generate a ranging value 1259 and a measured receive time 1252'. For example, the ranging value is a pseudorange value or other value of ranging data 1225 measured in cross-correlating the signals 132 with the internal signals. The measured receive time 1252' can correspond to a measured time that a corresponding bit and/or portion of signal 132 at which the transmit time was received, for example, as measured by utilizing clock signal 1266 and/or internal signals 1223.

The state estimation module can generate the clock state data 1245 as a function of the transmit time 1251, the ranging value 1259, and/or the measured receive time 1252'.

A given clock state data $1245.i$, for example, corresponding to the clock state at the receipt of portion of the signal that indicates a given transmit time $1251.i$, can optionally be further generated based on prior clock state data $1245.i-1$ and/or based on updating a corresponding estimation filter. This prior clock state data $1245.i-1$ can be accessed in memory module 310 and/or other memory of satellite processing system 300 storing at least one prior clock state data, such as clock state data $1245.i-1$. The newly generated clock state data $1245.i$ can be stored in memory module 310 for use in generating one or more subsequent clock state data 1245, such as subsequent clock data $1245.i+1$, for one or more subsequent transmit times 1251, such as a subsequent transmit time $1251.i+1$ or other subsequent current time. The newly generated clock state data $1245.i$ can replace the prior clock state data $1245.i-1$, where only the most recent clock state data 1245 is maintained memory. Alternatively, a log of multiple clock state data 1245 can be maintained in memory, where the newly generated clock state data $1245.i$ is added to memory for storage in conjunction with at least the prior clock state data $1245.i-1$.

In particular, the clock state data 1245 can include a clock bias 1246, which can indicate a bias value of the clock signal 1266 of clock 365, for example, relative to atomic time and/or relative to time established based on received signals 132. The clock bias 1246 can be determined based on the transmit time 1251, the ranging value 1259, and/or the measured receive time 1252'.

The clock state data 1245 can include a clock drift 1247, which can indicate a drift value of the clock signal 1266 of clock 365, for example, relative to atomic time and/or relative to time established based on received signals 132. This clock drift 1247 can correspond to a derivative and/or differential of the clock bias 1246, for example, from one or more prior clock states to the current clock state. For example, the clock bias 1246 of prior clock state data $1245.i-1$ and clock bias 1246 of the new clock state data is utilized to determine the clock drift 1247 of the new clock state data $1245.i$.

The clock state data 1245 can include a clock drift rate 1248, which can indicate a drift rate value of the clock signal 1266 of clock 365, for example, relative to atomic time and/or relative to time established based on received signals 132. This clock drift rate 1248 can correspond to a derivative and/or differential of the clock drift 1247, and/or a second derivative and/or second differential of the clock bias 1246, for example, from one or more prior clock states to the current clock state. For example, the clock drift 1247 of prior clock state data $1245.i-1$ and clock drift 1247 of the new clock state data is utilized to determine the clock drift rate 1248 of the new clock state data $1245.i$. As another example, the clock bias 1246 of multiple prior clock state data $1245.i-1$-$1245.i-k$ and clock bias 1246 of the new clock state data is utilized to determine the clock drift rate 1248 of the new clock state data $1245.i$.

The clock bias 1246, clock drift 1247, and/or clock drift rate 1248 of the clock state data 1245 can optionally be generated and stored over time as discussed in conjunction with the state estimator flow of FIG. 5A. The clock bias 1246, clock drift 1247, and/or clock drift rate 1248 of the clock state data 1245 can optionally include, implement, and/or be expressed as some or all of the curve fit parameters and/or propagated state data discussed in conjunction with FIG. 5B. For example, the propagated state data includes propagated clock state data based on the clock bias 1246, clock drift 1247, and/or clock drift rate 1248.

While not depicted in FIG. 12E, additional derivatives and/or differentials, such as any Nth derivative and/or differential of clock bias 1246 can be generated in given clock state data 1245 to characterize the clock 365. Alternatively or in addition, any other distribution information, estimations, and/or other characterization of the clock signal 1266, such as any type of measured and/or estimated error relative to atomic time, can be indicated in and/or determined based on one or more clock state data 1245 generated over time.

While not depicted in FIG. 12E, in some embodiments, the most recent clock state data 1245 can be utilized applied to clock signal 1266, for example, where generating internal signals 1223 and/or determining measured receive time 1252' includes applying the most recent clock state data 1245 can be utilized applied to clock signal 1266 to correct for any known clock error of the clock 365. Alternatively, as illustrated in FIG. 12E, the clock state data simply indicates these errors, where clock signal 1266 is not adjusted in generating internal signals 1223 and/or in generating measured receive time 1252'.

FIG. 12F illustrates an embodiment of a satellite processing system 300. Some or all features and/or functionality of the satellite processing system 300 of FIG. 12F can be utilized to implement the satellite processing system 300 of FIG. 12B and/or any other embodiment of satellite processing system 300 described herein.

The signal receiving and processing module 1220 can implement a navigation message generator 1234 that is configured to generate a navigation message that includes the clock state data 1245. The navigation message 1235 can further include the transmit time 1251 and/or a time stamp or other time data indicating a current time generated by the navigation signal receiving and processing module based on synchronizing with atomic time as discussed previously.

The signal receiving and processing module 1220 can implement a broadcast carrier signal generator 1232 that is configured to generate a broadcast carrier signal based on utilizing clock signal 1266. For example, the broadcast carrier signal 1233 is generated at a configured and/or predetermined one or more frequencies based on clock signal 1266. An actual frequency of broadcast carrier signals 1233 at a given time can be different from a corresponding configured and/or predefined frequency, where this difference is based on a corresponding the clock signal 1266 error, such as a non-zero clock bias, clock drift, and/or clock drift rate. For example, the difference between the actual frequency and the configured and/or predefined frequency can be a deterministic function and/or increasing function of clock bias 1246.

The signal receiving and processing module 1220 can implement a modulation module 1238 that is configured to generate a navigation signal 240 for broadcast based upon modulating the navigation message 1235 upon the broadcast carrier signals 1233. The modulation module 1238 can optionally modulate spreading code 1237 upon the broadcast carrier signals 1233, for example, that identifies a satellite 110 or other node implementing the satellite processing system 300 and/or enables a receiving client device 160 to generate ranging data from the navigation signal 240.

Modulating a given navigation message 1235 upon broadcast carrier signal can include modulating a given navigation message 1235 and/or a given one or more bits of navigation message 1235 upon navigation signal 240 in accordance with a scheduled time and/or for transmission in accordance with the scheduled time. For example, timing data, such as a transmit time 1251, other time value, or other data indicating when the corresponding bit and/or portion of the signal was transmitted, can be included in navigation message 1235 based on navigation message 1235 being generated to include this timing data. The navigation message can be scheduled for transmission in navigation signals 240 at a time corresponding to the timing data and/or at a time with a predetermined offset from the timing data. Transmission at the scheduled time can be achieved via modulation module 1238 based on utilizing clock signals 1266. However, a clock error in clock signals 1266 can render the timing data to be transmitted at an actual transmit time that is different from the scheduled transmit time. A difference in time from the actual transmit time and the scheduled transmit time denoted by the timing data can be different based on a corresponding the clock signal 1266 error, such as a non-zero clock bias, clock drift, and/or clock drift rate. For example, a difference in time from the actual transmit time and the scheduled transmit time denoted by the timing data can be a deterministic and/or increasing function of the clock bias 1246 of clock signals 1266.

Navigation signals 240 can be different from navigation signals 132. For example, the navigation signals 240 are generated and/or transmitted: in a different frequency band from navigation signals 132; at a different amplitude and/or power from navigation signals 132, for example, based on navigation signals 240 being transmitted from LEO and based on navigation signals 132 being transmitted from MEO and/or based on navigation signals 240 being transmitted from satellites in a different constellation configuration from satellites transmitting navigation signals 132; at a different to include a broadcast carrier signal 1233 that is in accordance with a different one or more frequencies than navigation signals 132; to include spreading code 1237 that is in accordance with a different type and/or structure of spreading code than navigation signals 132; to include navigation messages 1235 in accordance with a different schema, structure, size, and/or format than navigation messages of navigation signals 132; in accordance with a different encryption scheme and/or encryption level than navigation signals 132; and/or in accordance with other differences from navigation signals 132.

In various embodiments, while not illustrated in FIGS. 12B-12F, the navigation signal receiving and processing module 1220 can be operable to receive and/or process another one or more signals from another one or more entities, such one or more backhaul satellite 150, one or more ground stations 200, one or more satellites 110, and/or one or more other nodes of the satellite constellation system 100. For example, alternatively or in addition to receiving and processing GNSS signals generated and transmitted via GNSS satellites based on high precision clocks onboard these GNSS satellites, the navigation signal receiving and processing module 1220 can receive signals generated via one or more backhaul satellite 150, one or more ground stations 200, one or more satellites 110, and/or one or more other nodes of the satellite constellation system 100 based on high precision clocks onboard these entities. This can be ideal to enable the satellite constellation system 100 to facilitate client devices 160 to establish atomic time as discussed herein without a reliance upon GNSS signals and/or without synchronizing with time established by a GNSS constellation.

As a particular example, a backhaul satellite 150, a ground station 200, and/or a small subset of the satellites 110 in satellite constellation system 100 are equipped with onboard high precision clocks, such as onboard atomic clocks. The backhaul satellite 150, a ground station 200, and/or a small subset of the satellites 110 can thus generate their own signals that implement signals 132 and/or that otherwise indicate timing data, such as one or more timestamps, a carrier frequency, and/or a ranging signal, that are generated via the high precision clock and/or that are modulated by utilizing the high precision clock.

As another particular example, the backhaul satellite 150, ground station 200, and/or some or all of the satellites 110 in satellite constellation system 100 are equipped with onboard non-atomic clocks, such as clock 365, and generate their own navigation signals 240 that include clock state data 1245, for example, by implementing their own satellite processing system 300 discussed in conjunction with FIG. 12B-12F. For example, rather than receiving a signal 132 from a GNSS satellite as illustrated in FIGS. 12B-12F, a given satellite processing system 300 can receive a navigation signal 240 generated and transmitted by another satellite processing system 300 of FIGS. 12B-12F that is onboard a corresponding backhaul satellite 150, ground station 200, and/or satellites 110. For example, the given satellite processing system 300 can extract and apply the clock state data generated by the other satellite processing system 300 from the navigation signal received from the other satellite processing system, enabling the given satellite processing system 300 to generate its own clock state data. In such embodiments, the given satellite processing system 300 can perform some or all of the functionality of a client device 160 of FIGS. 12G-12H to receive and process navigation signals 240 to generate its precision timing data and/or to determine the clock state data for its own clock 365.

FIG. 12G presents an embodiment of a client device 160 that implements a receiver 1904, processing system 920, and/or client device components and applications 1925. For example, the client device 160 of FIG. 12G can be implemented as the mobile device 900 of FIG. 9A, where the receiver 1904 is implemented by utilizing the global positioning receiver 904; where the processing system 1920 is implemented as the processing system 920, and/or where the client device components and applications 1925 is implemented as the mobile device components and applications 925. The client device 160 can correspond to any type of client device described herein, such as a cellular device, smart phone, mobile device, vehicle, stationary infrastructure element, or other type of client device 160 described herein. The client device 160 can optionally correspond to a node of the satellite constellation system 100. Some or all features and/or functionality of the client device 160 of FIG. 12G can be utilized to implement mobile device 900 of FIG. 9A and/or any other embodiments of client device 160 described herein.

The receiver 1904 can utilize an antenna 1902, such as the antenna 902 of FIG. 9A, to receive navigation signals 240 from one or more satellites 110 and/or other nodes of the satellite constellation system 100 that generate and transmit navigation signals 240 via a satellite processing system 300. For example, the navigation signals 240 are generated to include clock state data 1245 and/or transmit times 1251 via some or all functionally discussed in conjunction with FIGS. 12B-12F.

The processing system 1920 can utilize at least one processor to implement a precision timing generator module 1270 that is configured to generate precision timing data 1271 based on the clock state data 1245 included in navigation signal 240 and/or other timing data of the navigation signal 240, such as a transmit time 1251 and/or other time value indicating when a corresponding one or more bits or other portions of navigation signal 240 was transmitted. The precision timing data 1271 can be utilized by client device components and/or application, for example, that require operation via atomic time and/or other precision time. The precision timing data 1271 can indicate atomic time and/or can correspond to synchronization with and/or establishing of atomic time.

The precision timing data 1271 can be implemented as the timing data 922 of FIG. 9A and/or can be utilized to generate the timing data 922 of FIG. 9A. The precision timing data 1271 can further enable the client device 160 to generate its own position solution, such as the enhanced position data 922.

FIG. 12H illustrates an embodiment of client device 160. Some or all features and/or functionality of the client device 160 of FIG. 12H can be utilized to implement the client device 160 of FIG. 12G and/or any other embodiment of client device 160 described herein.

The client device can include its own clock 931, which can be implemented as one or more clocks and/or a clock ensemble. The clock 931 can be a non-atomic clock. The clock 931 can be the same or different type of clock as clock 365, and can have: a same or different long term stability as clock 365; a same or different short term stability as clock 365; and/or same or different error characterization as clock 365 over time.

The processing system 1920 can implement an internal signal generator 1272, which can be configured to generate internal signals 1273 based on clock signal 932. The internal signal generator 1272 can be implemented in a same or similar fashion as internal signal generator 1222. For example, the one or more internal signals 1273 are generated in accordance with at least one frequency, for example, corresponding to at least one frequency of the navigation signals 240. As another example, the one or more internal signals 1273 are generated in accordance with a spreading code, for example, corresponding to at least one spreading code 1237 of the navigation signals 240. In some embodiments, the internal signal generator 1272 is implemented via a GNSS receiver 360 of the client device 160, the global positioning receiver 904, receiver 1904, and/or other processing resources of the client device 160.

The processing system 1920 can implement a correlator module 1224, for example, that is configured to cross-correlate the navigation signals 240 with internal signals 1273. The correlator module 1274 can be implemented in a same or similar fashion as correlator module 1224. The correlator module 1274 can be configured to generate ranging data, for example, based on identifying a peak in correlation data of the correlation module and based on further identifying a range of time, such as a number of peaks of signal navigation signal 240 and/or internal signal 1273 and/or number of bits of navigation signal 240 and/or internal signal 1273, corresponding to timespan between transmission and receipt of the navigation signal 240, such as a particular peak and/or particular data in navigation signal 240, and/or corresponding to physical distance between the client device 160 and the satellite 110 and/or other node that transmitted the navigation signal 240, for example, based on applying a value of the speed of light to the timespan. In some embodiments, the correlator module 1274 is implemented via a GNSS receiver 360 of the client device 160, the global positioning receiver 904, receiver 1904, and/or other processing resources of the satellite processing system 300.

The correlator module 1274 can implement a message extraction module 1276. The message extraction module 1276 can be implemented in a same or similar fashion as the message extraction module 1228. The message extraction module 1276 can be operable to extract messages and/or other data modulated upon one or more broadcast carrier signals 1233 of navigation signals 240.

The message extraction module 1276 can further extract a transmit time 1251, and/or other timing data included in a navigation message 1235 of navigation signal 240 that indicates a time of transmission of a corresponding bit of the signal 132 that includes the transmit time and/or that corresponds to a start of the navigation message. The transmit time 1251 can optionally indicate a number of seconds and/or a number of weeks, and/or can correspond to a current and/or atomic time determined by the navigation processing system 300 that generated the navigation signal 240 as discussed previously.

The message extraction module 1276 can extract clock state data 1245 and/or other state data 1240 included in navigation messages 1235. This extracted clock state data 1245 can include clock bias 1246, clock drift 1247, and/or clock drift rate 1248. The extracted clock state data 1245 can include propagated clock state data generated based on the clock bias 1246, clock drift 1247, and/or clock drift rate 1248.

The correlator module 1274 can further generate a ranging value 1255, such as a pseudorange, and/or measured receive time 1254', for example, corresponding to a time that one or more bits indicating transmit time 1251 were received.

The precision timing generator module 1270 can generate precision timing data 1271 based on the transmit time 1251, clock state data 1245, ranging value 1255, and/or measure receive time 1254'. As the one or more navigation signals 240 are received from the same or different satellites 110 or other nodes over time, further transmit times 1251, clock state data 1245, ranging values 1255, and/or measured receive times 1254' can be generated as illustrated in FIG. 12H to enable the client device 160 to maintain generating of precision timing data 1271 over time and/or to maintain synchronization with atomic time over time.

For example, a current time, corresponding to true atomic time can be established by the client device 160 based on utilizing a given transmit time 1251, subsequently received transmit times 1251, and/or peaks and/or bits of navigation signal 240 thereafter in conjunction with a known frequency of navigation signal 240 to synchronize with and/or lock-into atomic time as navigation signal 240 continue to be received from the same or different one or more satellites 110 or other nodes over time, for example, as different satellites 110 or other nodes come in and out of view of the client device 160 over time.

This can include applying the clock bias 1246, clock drift 1247, clock drift rate 1248, and/or propagated clock state data of a given clock state data 1245 for a window of time after the clock state data 1245, for example, until a subsequent clock state data 1245 is generated by and received from the satellite 110 or other node in the navigation signal 240. For example subsequently determined current times of the precision timing data 1271 can be generated within this window of time based on applying the clock drift 1247, clock drift rate 1248, and/or propagated clock state data of the most recently received clock state data 1245. In cases where the clock state data 1245 indicates that the clock signal 1266 is estimated to drift or otherwise change over time, different current times in the time window can be generated based on applying different corresponding clock biases 1246 to the received navigation signal 240, for example, to correct corresponding changes in error of navigation signal 240 induced by clock signal 1266.

The precision timing data 1271, other state data 1240 extracted from navigation signals 240 such as orbital position data, and/or other ranging data can be further utilized to generate the enhanced position data 922 indicating a precise position of the client device, for example, in conjunction with receiving other navigation signals 240 from one or more other satellites and/or in conjunction with receiving navigation signals 132 from one or more GNSS satellites 130. The precision timing data 1271, other state data 1240 extracted from navigation signals 240 such as orbital position data, and/or other ranging data can be further utilized to generate clock state data for the client device, characterizing error in the client device's own clock 932 relative to atomic time.

FIGS. 12I-12L provide an illustrative example of determining and correcting for clock error as described in conjunction with FIGS. 12A-12H. Some or all features and/or functionality discussed in conjunction with FIGS. 12I-12L can be utilized to implement satellite processing system 300 of FIGS. 12B-12F and/or client device 160 of FIGS. 12G and/or 12H.

As illustrated in FIG. 12I, a GNSS satellite 130 generates and transmits signal 132, corresponding to "signal A." The signal 132 can indicate various transmit times 1251 as it is transmitted over time. Each transmit time 1251 can indicate when the corresponding signal was transmitted by the GNSS satellite 130.

At a particular time 1251.$i$ of atomic time, transmitted signal 132 indicates this time transmit time 1251.$i$. The corresponding bits and/or portion of signal 132 that indicate transmit time 1251.$i$ can be transmitted by satellite 130 at exactly the time 1251.$i$ and/or at an actual transmit time that is within the time 1251.$i$ by a maximum threshold as required for keeping atomic time. For example, the corresponding bits and/or portion of signal 132 that indicate transmit time 1251.$i$ can be transmitted at exactly the time 1251.$i$ based on GNSS satellite 130 utilizing an onboard high precision clock to generate and transmit its signal 132.

A satellite 110 can receive this portion of the signal 132 at a corresponding receive time 1252.$i$. The satellite can extract transmit time 1251.$i$ from signal 132 to establish and/or maintain synchronization with atomic time, for example, based on generating a ranging value indicating the actual difference from corresponding receive time 1252.$i$ to transmit time 1251.$i$ and/or locking-in upon signal 132 as the satellite 110 continues to receive signals 132 from the same or different satellite 130.

The satellite 110 can generate and transmit its own navigation signal 240, corresponding to "signal B." The navigation signal 240 can similarly indicate various transmit times 1251 as it is transmitted over time. Each transmit time 1251 can indicate when the corresponding signal was scheduled to be transmitted by the navigation satellite 110. The transmit times can be established by satellite 110 and included in navigation signals based on the satellite 110 receiving one or more prior transmit times 1251 in received signals 132 and/or establishing synchronization with atomic time accordingly. The navigation signal 240 can further include clock state data 1245, for example indicating the current and/or propagated state of the satellite 110's clock 365 at the corresponding scheduled transmit time 1251.

In this case, transmit time 1251.$i$+1 is indicated in the navigation signal 240 generated by navigation satellite 110 as a scheduled transmit time. This scheduled transmit time 1251.$i$+1 can align with a time that satellite 130 transmits this time 1251.$i$+1 in its own signal 132, as illustrated in FIG. 12I. Alternatively, transmit times 1251 included in navigation signals 240 can be offset from and/or in different intervals from the transmit times included in signals 132, for example, based on different carrier frequencies of these signals and/or based on other predetermined interval and/or scheduling of their transmit times. In either case, the scheduled transmit time 1251.$i$+1 can be in accordance with a true, corresponding time of atomic time based on the satellite having synchronized with and/or having established atomic time.

A client device, for example, on earth, can receive this portion of the navigation signal 240 indicating transmit time 1251.$i$+1 at a corresponding receive time 1254.$i$+1. The satellite can extract transmit time 1251.$i$+1 from signal 240 to establish and/or maintain synchronization with atomic time, for example, by locking-in upon navigation signal 240 as the client device continues to receive navigation signals 240 from the same or different satellite 110.

However, due to clock error of clock signal 1266, the corresponding portion of navigation signal indicating transmit time 1251.$i$+1 is actually transmitted by satellite 110 at a different corresponding time 1253.$i$+1. The clock state data 1245.$i$ can indicate and/or estimate this clock error, and can be utilized by client device to establish atomic time or other precision timing data accurately, based on the clock state data 1245.$i$ characterizing the corresponding error appropriately.

As illustrated in FIG. 12J, a clock error 1256 is induced in receiving of signal A by satellite processing system of satellite 300. In particular, the satellite processing system measures a measured receive time 1252.$i$' based on clock 365, which is different from an actual receive time 1252.$i$. This difference can correspond to a clock error 1256.$i$, for example, which is induced based on a clock bias, clock drift, and/or clock drift rate of the clock 365 at the given time. The clock error 1256 for receipt of signal A over time can be change over time due to the clock bias, clock drift, and/or clock drift rate changing over time, for example, due to the clock 365 not having long term stability and/or based on clock 365 not being an atomic clock. These changes over time can cause the differences between a measured receive time 1252' and corresponding actual receive times 1252 to be different by differing, and perhaps unpredictable, amounts over time.

A clock error 1257 is also induced in transmitting of signal B by satellite processing system 300 of satellite 110. In particular, a given scheduled transmit time 1251.$i$+1 can be different from a different from the actual transmit time 1253.$i$+1 as discussed previously based on utilizing clock 365 to transmit signal B. This difference can correspond to a clock error 1257.$i$+1, for example, which is induced based on a clock bias, clock drift, and/or clock drift rate of the clock 365 at the given time. The clock error 1257 for transmission of signal B over time can be change over time due to the clock bias, clock drift, and/or clock drift rate changing over time, for example, due to the clock 365 not having long term stability and/or based on clock 365 not being an atomic clock. These changes over time can similarly cause the differences between a scheduled transmit time 1251 and corresponding actual transmit times 1253 to be different by differing, and perhaps unpredictable, amounts over time.

A clock error 1258 is also induced in receiving of signal B by client device processing system 920 of client device 160. In particular, the client device processing system 920 measures a measured receive time 1254.$i$+1' based on clock 365, which is different from an actual receive time 1254.$i$+1. This difference can correspond to a clock error 1258.$i$, for example, which is induced based on a clock bias, clock drift, and/or clock drift rate of the clock 931 at the given time. The clock error 1256 for receipt of signal B over time can be change over time due to the clock bias, clock drift, and/or clock drift rate changing over time, for example, due to the clock 931 not having long term stability and/or based on clock 931 not being an atomic clock. These changes over time can cause the differences between a measured receive time 1252' and corresponding actual receive times 1252 to be different by differing, and perhaps unpredictable, amounts over time.

As illustrated in FIG. 12K, the clock error 1256.$i$ can be characterized by satellite processing system 300 as a function of the transmit time 1251.$i$, the measured receive time 1252.$i'$, and the ranging value 1259.$i$ indicating the difference between the true transmit time 1251.$i$ and the true receive time 1252.$i$, for example, that is measured via cross-correlating signal A with internal signal 1223 as discussed previously. In particular, as the clock error in transmission of signal A is zero and/or negligible due to the use of a high precision clock, most or all discrepancy between the difference between transmit time 1251.$i$ and the measured receive time 1252.$i'$, and the ranging value 1259 can be attributed to the clock error 1256.$i$ in receiving signal A. The clock state data 1245.$i$ can be generated by the satellite processing system 300 as a function of, and/or to otherwise indicate this clock error 1256.$i$.

Client device processing system 920 can apply this clock error clock error 1256.$i$ indicated in clock state data 1245.$i$ to determine clock error 1257.$i$+1. In particular, the use of the same clock 365 to both receive signal A and to transmit signal B, as well as the short term stability of this clock 365, can be leveraged as discussed previously to enable the assumption that a given clock error 1257.$i$+1 is the same and/or is substantially the same as the clock error 1256.$i$, and/or is otherwise characterized in the most recent clock state data 1245.$i$ received in signal B.

Thus, given the clock state data 1245.$i$ that indicates this transmission clock error 1257.$i$+1 as well as the transmit time 1251.$i$+1 extracted from signal B, the measured receive time 1254.$i$+1' measured using clock 931, and the ranging value 1255.$i$+1 indicating the difference between the true transmit time 1251.$i$+1 and the true receive time 1254.$i$+1 for example, that is measured via cross-correlating signal B with internal signal 1273 as discussed previously. As both the clock error 1257.$i$+1 in transmission of signal B and the clock error 1258.$i$+1 in receiving of signal B can be resolved, the true atomic time can be established to enable generation of precision timing data 1271.

FIG. 12L illustrates a further example of this timeline where a fixed offset 1279, such as a known and/or estimated latency in the message generation and/or transmission process, and/or another predefined and/or scheduled offset, is applied in transmission of the bits and/or portion of navigation signal 240 indicating a given transmit time 1251.$i$+1. In particular, the scheduled transmit time 1251.$i$+1 is offset by this fixed offset 1279, and the bits and/or portion of the navigation signal indicating this scheduled transmit time 1251.$i$+1 is sent at a true transmit time 1253.$i$+1 that thus offset by a combination of this fixed transmit time and the clock error 1256.$i$. The clock state data 1256.$i$ can further indicate and/or further be a function of this fixed offset 1279, enabling the client device 160 to appropriately account for this fixed offset 1279, as well as the characterization of clock error 1256.$i$.

In other embodiments, the transmit time 1251.$i$+1 can be adjusted to reflect the actual scheduled transmit time, rather than time 1251.$i$+1, by applying this offset 1279, for example, where the navigation signal instead indicates transmit time 1251.$i$+1+1279, and only the clock error 1256.$i$ need be accounted for.

While the examples of FIGS. 12I-12L corresponds to a simple example that only visually illustrates effects of clock bias 1246, similar functionality can be performed by satellite processing systems 300 and client devices 160 to similarly determine and correct for clock drift 1247, clock drift rate 1248, and/or other characterization of current and/or propagated clock state of clock state data 1245, as discussed in conjunction with FIGS. 12A-12H.

In various embodiments, a low-earth orbit (LEO) satellite of a constellation of LEO satellites in LEO includes a non-atomic clock, a navigation signal receiving and processing module, and/or a navigation signal generation and transmission module. The non-atomic clock can be configured to generate a clock signal, such as clock signal 1266. The navigation signal receiving and processing module can be configured to receive first signaling, such as one or more signals 132, from at least one non-LEO navigation satellite of a constellation of non-LEO navigation satellites in non-LEO, such as at least one GNSS satellite 130. The first signaling can include first timing data generated based on a high precision clock, such as transmit time 1251 generated via an atomic clock of satellite 130. The navigation signal receiving and processing module can alternatively or additionally be configured to generate clock state data, such as clock state data 1245, based on the clock signal and the first timing data. The navigation signal generation and transmission module can be configured to receive the clock signal from the non-atomic clock, generate a navigation message, such as navigation message 1235, that indicates the clock state data. The navigation signal generation and transmission module can be alternatively or additionally configured to generate a broadcast carrier signal, such as broadcast carrier signal 1233, by utilizing the clock signal. The navigation signal generation and transmission module can be alternatively or additionally configured to generate a navigation signal, such as navigation signal 240, based on modulating the navigation message upon the broadcast carrier signal. The navigation signal generation and transmission module can be alternatively or additionally configured to broadcast the navigation signal for receipt by at least one client device. The navigation signal can facilitate the at least one client device to generate precision timing data based on the clock state data.

In various embodiments, the non-atomic clock is implemented via clock 365 of FIGS. 12B-12F, the navigation signal receiving and processing module is implemented via navigation signal receiving and processing module 1220 of FIGS. 12B-12F, and/or the navigation signal generation and transmission module can be implemented via the navigation signal generation and transmission module 1230 of FIGS. 12B-12F.

In various embodiments, the navigation signal is further modulated based on modulating spreading code identifying the LEO satellite upon the broadcast carrier signal. In various embodiments an analog to digital converter of the navigation signal receiving and processing module is configured to extract the first timing data from the first signaling by utilizing the clock signal. In various embodiments, a signal generator of the navigation signal receiving and processing module is configured to generate at least one internal signal by utilizing the clock signal, wherein the navigation signal receiving and processing module is further configured generate ranging data based on cross-correlating the at least one internal signal with the first signaling, and wherein the clock state data is based on the ranging data.

In various embodiments, the signal generator of the navigation signal receiving and processing module is configured to generate the at least one internal signal for cross-correlation with the first signaling by applying prior clock state data to the clock signal. In various embodiments, the clock state data is updated from the prior clock state data. In various embodiments, the navigation signal receiving and processing module is further configured to receive subsequent first signaling indicating subsequent first timing data. In various embodiments, the signal generator of the navigation signal receiving and processing module is further configured to generate at least one updated internal signal for cross-correlation with the subsequent first signaling by applying the clock state data to the clock signal.

In various embodiments, a signal generator of the navigation signal generation and transmission module is configured to generate the broadcast carrier signal by applying the clock state data to the clock signal.

In various embodiments, the LEO satellite further includes at least one memory, for example, implemented via memory module 310. In various embodiments the navigation signal receiving and processing module is further configured to generate clock state data further based on prior clock state data accessed in the at least one memory, store the clock state data in the at least one memory; receive subsequent first signaling; generate updated clock state data based on the subsequent first signaling, the clock signal, and the clock state data accessed in the at least one memory; and/or store the updated clock data in the at least one memory.

In various embodiments, the at least one non-LEO navigation satellite includes a Global Positioning System (GPS) satellite, and/or the high precision clock is an atomic clock of the GPS satellite. In various embodiments, the navigation signal receiving and processing module includes a GNSS receiver disciplined to the clock signal of the non-atomic clock, and/or the navigation signal receiving and processing module includes a software defined radio (SDR) disciplined to the clock signal of the non-atomic clock. In various embodiments, the non-atomic clock is an oven-controlled crystal oscillator (OCXO).

In various embodiments, a low-earth orbit (LEO) satellite includes a non-atomic clock configured to generate a clock signal. The LEO satellite can further include at least one receiver configured to receive first signaling from at least on non-LEO navigation satellite of a constellation of non-LEO navigation satellites in non-LEO. The first signaling can include first timing data generated based on a high precision clock. The LEO satellite can further include at least one processor configured to execute operational instructions that cause the at least one processor to perform operations that include generating clock state data based on the clock signal and the first timing data; generating a navigation message that indicates the clock state data generating a broadcast carrier signal by utilizing the clock signal; and/or generate a navigation signal based on modulating the navigation message upon the broadcast carrier signal. The LEO satellite can further include a navigation signal transmitter configured to broadcast the navigation signal for receipt by at least one client device, the navigation signal facilitating the at least one client device to generate precision timing data based on the clock state data.

In various embodiments, the non-atomic clock is implemented via clock 365, the at least one receiver is implemented via at least one GNSS receiver 360, the at least one processor is implemented via processing module 320, and/or the navigation signal transmitter is implemented via a navigation signal transmitter 330.

In various embodiments, the clock state data includes a clock bias relative to the high precision clock, a clock drift relative to the high precision clock, and/or a clock drift rate relative to the high precision clock. In various embodiments, the client device generates precision timing data based on applying the clock bias, the clock drift, and/or the clock drift rate to the navigation signal.

In various embodiments, the first signaling includes at least one GNSS signal generated by a GNSS satellite of a GNSS satellite constellation. Execution of the operational instructions can cause the at least one processor to perform operations that further include generating orbital position data of the LEO satellite based on the GNSS signal. In various embodiments, the navigation signal is generated to include the orbital position data.

In various embodiments, the at least one receiver is configured to receive correction data associated with the GNSS satellite constellation. In various embodiments, generating the clock state data for the non-atomic clock includes applying the correction data to the first timing data.

In various embodiments, the correction data includes Precise Point Positioning (PPP) correction data. In various embodiments, generating the clock state data includes applying clock estimate data for the GNSS satellite included in the PPP correction data to the first timing data. In various embodiments, the at least one receiver is configured to receive the correction data from at least one of: a backhaul satellite, or a ground station. In various embodiments, the PPP correction data is received via a backhaul receiver 340 of the satellite, a satellite receiver 350 of the satellite, and/or another receiver of the satellite.

In various embodiments, the navigation signal is generated to indicate timing data based on the first timing data. In various embodiments, the navigation signal facilitates the at least one client device to generate precision timing data based on applying the clock state data to the timing data.

In various embodiments, a client device includes at least one receiver configured to receive at least one navigation signal from at least one satellite of a constellation of LEO navigation satellites in LEO. The at least one navigation signal can include at least one timing data and/or can includes at least one clock state data for at least one non-atomic clock utilized to generate the at least one navigation signal. The at least one processor can be configured to execute operational instructions that cause the at least one processor to perform operations that include extracting the clock state data and the timing data from the at least one navigation signal and/or generating precision timing data based on applying the clock state data to the timing data.

In various embodiments, the client device includes a client device non-atomic clock that generates a clock signal. The operations can further include generating at least one internal signal by utilizing the clock signal; generating ranging data based on cross-correlating the at least one internal signal with the at least one navigation signal; and/or generating client device clock state data for the client device non-atomic clock based on the ranging data and the clock state data. The precision timing data can be generated based on applying the client device clock state data to the timing data. In various embodiments, the at least one navigation signal further includes at least one orbital position data for the at least one satellite. The operations can further include generating enhanced position data based on the orbital position data and based on the precision timing data.

FIG. 12M illustrates a method for execution. Some or all steps of FIG. 12M can be executed by at least one processor of a satellite, such as a satellite 110. Some or all steps of FIG. 12M can be performed via a satellite processing system 300 implemented by a satellite, a client device, a ground station, a backhaul satellite, stationary infrastructure, and/or any node of the satellite constellation system 100. Multiple different satellites 110 of the satellite constellation system 100 and/or any multiple different nodes of the satellite constellation system 100 can each implement their own satellite processing system 300 to perform some or all steps of FIG. 12M independently and/or simultaneously, with or without coordination. Some or all steps of FIG. 12M can be performed in conjunction with performing some or all steps of FIG. 12A. Some or all steps of FIG. 12M can be performed in conjunction with implementing some or all features and/or functionality of the satellite processing system 300 and/or a satellite 110 as discussed in conjunction with some or all of FIGS. 12B-12L.

Step 1282 includes generating a clock signal via a non-atomic clock, such as clock signal 1266 generated via clock 365. In various embodiments, the non-atomic clock can be included onboard a corresponding satellite 110 or other node that performs the method of FIG. 12M.

In various embodiments, the non-atomic clock is implemented via a single OCXO. In various embodiments, the non-atomic clock is implemented via multiple OCXOs of a clock ensemble. In various embodiments, the mon-atomic clock is implemented one or more TCXOs, one or more VCXOs, or one or more other types of clocks and/or clock ensembles. In various embodiments, the non-atomic clock is implemented as any non-atomic clock, such as any non-high precision clock and/or any other clock that is not characterized as having long term stability and/or that is non characterized as generating atomic time. In various embodiments, the non-atomic clock is implemented via a clock that is characterized as having short term stability, such as at least a threshold level of stability within a threshold amount of time, such as one second.

Step 1284 can include receiving, from at least one non-LEO navigation satellite of a constellation of non-LEO navigation satellites, first signaling. For example, the first signaling is implemented as signal 132 that is received from one or more non-LEO navigation satellites, such as one or more GNSS satellites 130. The first signaling, such as each of the one or more signals 132, can be generated via a high precision clock of the corresponding non-LEO navigation satellite, such as an atomic clock or other high precision clock onboard the corresponding non-LEO navigation satellite.

In various embodiments, the high precision clock can be characterized as having long term stability, such as a threshold level of stability over at least a threshold amount of time and/or indefinitely. In various embodiments, high precision clock can be characterized as being capable of generating atomic time. In various embodiments, the high precision clock can optionally be implemented via a clock that is characterized as having short term stability, such as at least a threshold level of stability within a threshold amount of time, such as one second.

In various embodiments, the short term stability of the non-atomic clock is greater than and/or is otherwise more favorable than the short term stability of the high precision clock. In various embodiments, the long term stability of the high precision clock is greater than and/or is otherwise more favorable than the long term stability of the non-atomic clock.

Generation of the first signaling based on the high precision clock can include the one or more non-LEO satellites generating a carrier signal at one or more carrier frequencies of the first signaling via a clock signal generated by the high precision clock. The one or more carrier frequencies of the first signaling can be fixed and/or stable based on the high precision clock being characterized as having the short term and/or long term stability.

Generation of the first signaling based on the high precision clock can include the one or more non-LEO satellites utilizing a clock signal of the high precision clock to modulate a ranging signal and/or a navigation message upon the carrier signal. For example, the ranging signal and/or a navigation message are modulated upon the carrier signal at a precise time based on utilizing the high precision clock.

The first signaling can indicate first timing data generated based on a high precision clock. For example, each signal 132 was generated by a corresponding one of the non-LEO navigation satellites based on a high precision clock, such as one or more atomic clocks and/or a high precision clock ensemble, onboard the corresponding one of the non-LEO navigation satellites.

In various embodiments, the first timing data is implemented as a time stamp or other time data indicating a transmit time included in a navigation message and/or other navigation data modulating upon a carrier and/or ranging signal of the signal 132. For example, the first timing data is implemented as transmit time 1251. This time data can be in accordance with a time format associated with the constellation of non-LEO navigation satellites. For example, the time data indicates a week number and/or second number corresponding to the current week and/or current second, and/or corresponding to atomic time. As a particular example, the time data indicates a week number and/or a second number of GPS time generated via a GPS satellite based on an atomic clock or other high precision clock on board the GPS satellite. The time data can otherwise indicate a high precision current time, such as a current time in accordance with true, atomic time, corresponding to the time at which this time data was transmitted by the corresponding non-LEO navigation satellite. For example, the time data is modulated upon the carrier signal at a corresponding time indicated by the time data based on utilizing the high precision clock.

In various embodiments, the first timing data is alternatively or additionally implemented as and/or based on a frequency of the signal 132, and/or implemented as and/or based on a ranging code of the signal 132. For example, a given current time can be determined by the satellite processing system 300 as a function of the time data included in the navigation message, as well as a determined amount of time after the time data in the signal 132, such as a number of peaks of the signal 132 after the time data was indicated in the signal 132 and/or a number of bits of the signal 132 after the time data was indicated in the signal 132.

Step 1286 includes generating clock state data based on the clock signal and the first timing data. For example, the clock state data can be implemented as clock state data 1245 that is included in state data 1240.

In various embodiments, clock state data can characterize a current state determined for and/or estimated for the non-atomic clock. In various embodiments, the clock state data indicate a clock bias, such as a value indicating a current bias of the non-atomic clock. The clock bias can be relative to the high precision clock and/or atomic time.

In various embodiments, the clock state data can alternatively or additionally indicate a clock drift, such as a value indicating a current drift of the non-atomic clock. The clock drift can be relative to the high precision clock and/or atomic time. The clock drift can be based on at least one clock bias value, such as a derivative and/or differential calculated based on the current clock bias value and/or at least one prior clock bias value.

In various embodiments, the clock state data can alternatively or additionally indicate a clock drift rate, such as a value indicating a current drift rate of the non-atomic clock. The clock drift rate can be relative to the high precision clock and/or atomic time. The clock drift rate can be based on at least one clock bias value, such as a second derivative and/or second differential calculated based on the current clock bias value and/or at least one prior clock bias value. The clock drift rate can be based on at least one clock drift value, such as a derivative and/or differential calculated based on the current clock drift value and/or at least one prior clock drift value.

In various embodiments, generating clock state data is further based on prior clock state data accessed in at least one memory. In various embodiments, the method can further include storing the clock state data in the at least one memory; receive subsequent first signaling; generating updated clock state data based on the subsequent first signaling, the clock signal, and/or the clock state data accessed in the at least one memory; and/or storing the updated clock data in the at least one memory.

In various embodiments, the method includes generating at least one internal signal by utilizing the clock signal and/or generating ranging data based on cross-correlating the at least one internal signal with the first signaling. The clock state data can be generated based on the ranging data.

In various embodiments, the method includes generating the at least one internal signal for cross-correlation with the first signaling by applying prior clock state data to the clock signal. The clock state data can be updated from the prior clock state data. The method can further include receiving subsequent first signaling indicating subsequent first timing data, and/or generating at least one updated internal signal for cross-correlation with the subsequent first signaling by applying the clock state data to the clock signal. For example, the updated internal signal is phase shifted from the at least one internal signal and/or has a different frequency from the at least one internal signal based on a clock bias indicated in the prior clock state data.

In various embodiments, the method includes extract the first timing data from the first signaling by utilizing the clock signal. For example, an analog to digital converter utilizes the clock signal to extract message data that includes the first timing data from the first signaling. As another example, cross-correlating the at least one internal signal with the first signaling further includes extracting the first timing data from the first signaling.

In various embodiments, the method includes determining a measured receive time for the first signaling based on the clock signal, such as a measured receive time corresponding to receipt of the first timing data in the first signaling. For example, cross-correlating the at least one internal signal with the first signaling further includes identifying the measured receive time. Generating the clock state data can be further based on the measured receive time.

In various embodiments, the method includes receiving correction data associated with the non-LEO satellite constellation. Generating the clock state data for the non-atomic clock can include applying the correction data to the first timing data. In various embodiments, the correction data includes Precise Point Positioning (PPP) correction data, and the generating the clock state data the PPP correction data to the first timing data. For example, the PPP data can include clock estimate data for a corresponding non-LEO satellite that sent the first signaling. In various embodiments, the correction data is received from at least one of: a backhaul satellite, or a ground station.

In various embodiments, the method includes generating orbital position data of the corresponding satellite and/or corresponding node based on the first signaling. For example, the orbital position data is generated in conjunction with the clock state data as satellite state data.

In various embodiments, step 1284 and/or step 1286 are performed via at least one antenna of a GNSS receiver and/or at least one processor of a GNSS receiver, for example, where the GNSS receiver is implemented onboard the corresponding satellite and/or node that performs the step of FIG. 12M. In various embodiments, the GNSS receiver is disciplined to the clock signal of the non-atomic clock and/or the GNSS receiver otherwise performs its functionality, such as functionality of steps 1284 and/or step 1286, based on utilizing the clock signal of the non-atomic clock.

Step 1288 includes generating a navigation message that indicates the clock state data. Step 1290 includes generating a broadcast carrier signal by utilizing the clock signal. Step 1292 includes generating a navigation signal based on modulating the navigation message upon the broadcast carrier signal. Step 1294 includes broadcasting the navigation signal for receipt by at least one client device.

In various embodiments, the navigation signal is further modulated based on modulating spreading code identifying the corresponding LEO satellite and/or the corresponding node upon the broadcast carrier signal. In various embodiments, modulating the modulating the navigation message upon the broadcast carrier signal includes utilizing the clock signal of the non-atomic clock to modulate the navigation message upon the broadcast carrier signal.

In various embodiments, the broadcast carrier signal is generated based on applying the clock state data to the clock signal. For example, an updated broadcast carrier signal is phase shifted from a prior broadcast carrier signal and/or has a different frequency from the prior broadcast carrier signal based on a clock bias indicated in the prior clock state data.

In various embodiment, the navigation message of the navigation signal further includes timing data indicating a scheduled time and/or estimated time that the navigation message is transmitted. For example, the method includes modulating the time data of the navigation message upon the carrier signal at a corresponding time indicated by the time data based on utilizing the clock signal of the non-atomic clock. In various embodiments, the scheduled transmission time indicated by the time data is different an actual transmission time indicated by the time data based on clock error of the non-atomic clock. In various embodiments, this clock error of the non-atomic clock is characterized by the clock state data generated in step 1286.

In various embodiments, the at least one client device the navigation signal facilitates the at least one client device to generate precision timing data based on the at least one client device applying the clock state data to the timing data included in the navigation signal.

In various embodiments, the navigation message further includes orbital position data. For example, the clock state data is generated in conjunction with orbital position data as satellite state data, and both the clock state data and the orbital position data are included in the navigation message based on including the satellite state data in the navigation message. In various embodiments, the at least one client device the navigation signal facilitates the at least one client device to generate enhanced position data based on: utilizing the precision timing data determined by the at least one client device; the at least one client device applying the clock state data to the navigation signal; and/or the at least one client device utilizing the orbital position data.

In various embodiments, step 1288, step 1290, step 1292, and/or step 1294 are performed via a software defined radio (SDR), where the SDR is implemented onboard the corresponding satellite and/or node that performs the step of FIG. 12M. In various embodiments, the SDR is disciplined to the clock signal of the non-atomic clock and/or the SDR otherwise performs its functionality, such as functionality of steps 1288, 1290, 1292, and/or 1294, based on utilizing the clock signal of the non-atomic clock.

FIG. 12N illustrates a method for execution. Some or all steps of FIG. 12N can be executed by at least one processor of a client device, such as a mobile device, infrastructure device, vehicle, a node of the satellite constellation 100, and/or any other client device 160 discussed herein. Some or all steps of FIG. 12N can be performed via a client device processing system 920 implemented by a client device 160. Multiple different client devices 160 can each implement their own client device processing system 920 to perform some or all steps of FIG. 12N independently and/or simultaneously, with or without coordination. Some or all steps of FIG. 12N can be performed in conjunction with implementing some or all features and/or functionality of the client device processing system 920 and/or a client device 160 as discussed in conjunction with some or all of FIGS. 12G-12L.

Step 1281 includes receiving at least one navigation signal from at least one satellite of a constellation of LEO navigation satellites in LEO. The at least one navigation signal includes at least one timing data and further includes at least one clock state data for at least one non-atomic clock utilized to generate the at least one navigation signal. For example, a given navigation signal is generated and transmitted by a given corresponding satellite based on the given satellite performing some or all steps of FIG. 12A and/or FIG. 12M. The clock state data of a given navigation signal can indicate bias, drift and/or drift rate of a non-atomic clock of the given satellite.

Step 1283 includes extracting the clock state data and the timing data from the at least one navigation signal. Step 1285 includes generating precision timing data based on applying the clock state data to the timing data.

In various embodiments, the method further includes generating a clock signal via a non-atomic clock of the client device. The method can further include generating at least one internal signal by utilizing the clock signal, generating ranging data based on cross-correlating the at least one internal signal with the at least one navigation signal, and/or generating client device clock state data for the non-atomic clock of the client device based on the ranging data and the clock state data. The precision timing data can be generated based on applying the client device clock state data to the timing data.

In various embodiments, the at least one navigation signal further includes at least one orbital position data for the at least one satellite. The method can further include generating enhanced position data based on the orbital position data and/or based on the precision timing data.

FIG. 13A is an illustration of various satellite constellations and antenna beamwidth adjustments in accordance with various embodiments. In various embodiments, the beamwidth of navigation signal 240 produced by the satellite 110 can be adjusted from a wider bandwidth with a lower gain over a wider area to a more directional beamwidth having a higher gain over a smaller area. For example, the navigation signal transmitter 330 discussed in conjunction with FIG. 3B can be equipped with a phased-array antenna system that allows the beam to be controlled in such a fashion under control of the resource allocation module 325.

As previously discussed, the beamwidth of the navigation signal 240 can be adjusted along with other signal parameters of the satellite 110 to adapt to various conditions of the satellite 110. In addition or in the alternative, the beamwidth of navigation signal 240 can be adjusted to adapt to the status of the satellite constellation system 100. For example, when more satellites are present in the constellation, satellite coverage can be maintained with reduced beamwidth.

The examples 1300, 1302 and 1304 present, respectively, states of the satellite constellation system 100 with 3, 6 and 12 orbital paths/planes and an increasing numbers of satellites per path/plane. While polar orbits are shown, other orbital configurations are likewise possible. In state 1300 of the satellite constellation system 100, a greater beamwidth θ1 is used to cover more area. In state 1302 of the satellite constellation system 100, a reduced beamwidth θ2 can be used due to the decreased spacing between individual satellites. In state 1304 of the satellite constellation system 100, a further reduced beamwidth θ3 can be used due to the further decreased spacing between individual satellites.

It should also be noted that the orbital position of each satellite 110 can also be used to adjust the beamwidth from a widest coverage, at or near the equator, to a narrowest coverage at or near the north and south poles. Gravitational dynamics caused by the non-spherical shape of the earth can change distances between satellites. Coverage changes caused by such changes in satellite distance can be compensated, all or in part, by changes in antenna beamwidth. It should be noted that a reduced beamwidth and corresponding higher antenna gain can enable either a greater link budget for a constant transmit power or a lower transmit power and power consumption for a fixed link budget.

Figure 13B:
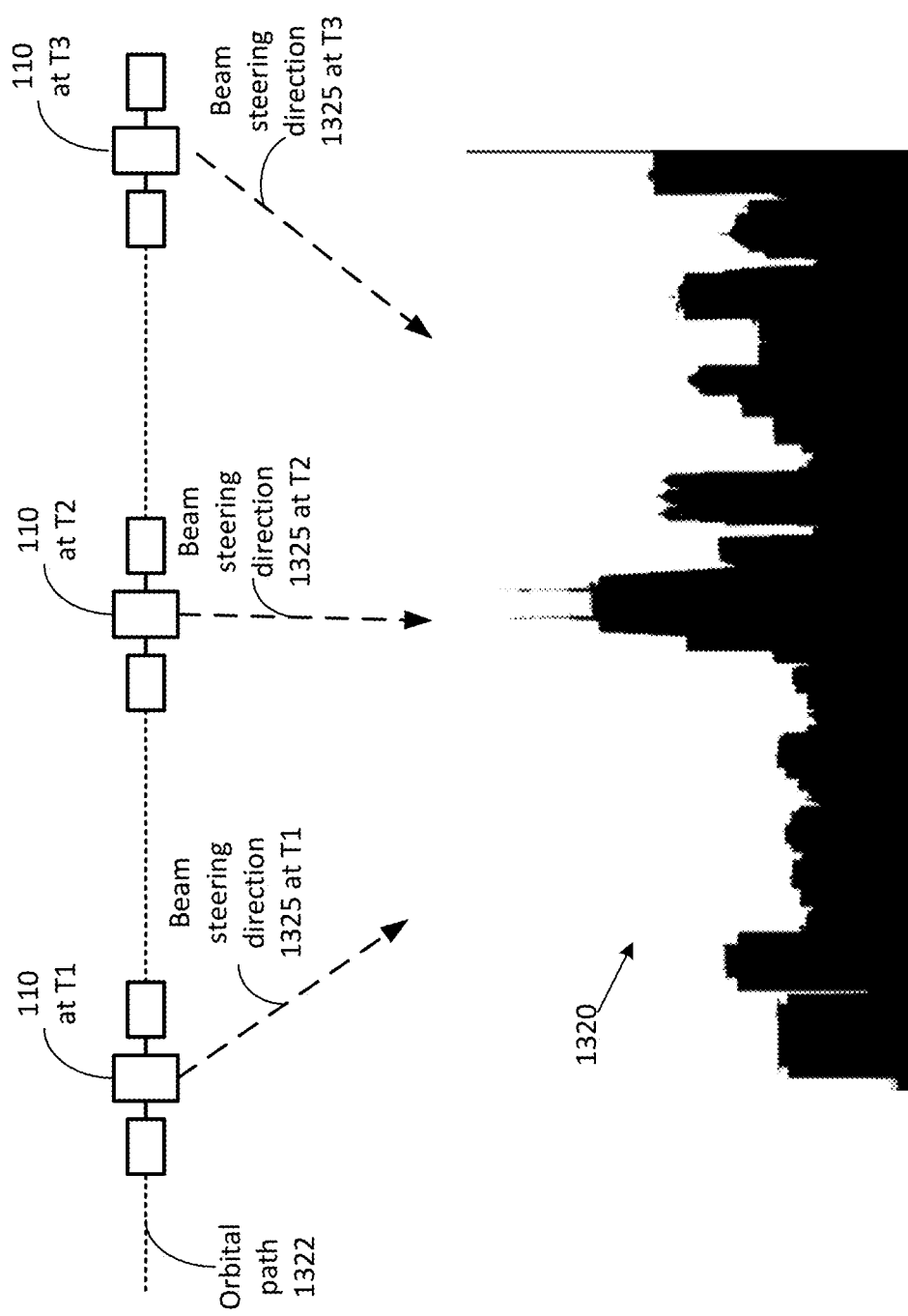
FIG. 13B is an illustration of various antenna beam steering adjustments in accordance with various embodiments.

FIG. 13B is an illustration of various antenna beam steering adjustments in accordance with various embodiments. As previously discussed, the resource allocation module 325 of the satellite 110 can control the various operations of the satellite 110 based on the orbital position of the satellite 110 relative to positions above the earth corresponding to high population density, low population density, an ocean, a rainforest, a mountain range, a desert or other terrestrial condition or feature. In the example shown, the satellite 110 proceeds from T1 to T2 to T3 along an orbital path 1322 in LEO above an area of high population density 1320 when compared with the population density of the surround areas along the orbital path 1322. Such areas of high population density can include a corresponding high density of autonomous or highly automated vehicles and/or other client devices that may heavily rely upon high precision position, navigation and timing and/or that provide challenges to signal reception due to tall buildings and other infrastructure and/or other terrestrial features.

The processing system of the satellite 110 stores a map or other data structure of the orbital path 1322 that indicates the position of the area of high population density 1320 along the orbital path 1322. The beam steering direction 1325 corresponds, for example, to the center of the main transmission lobe of the antenna beam pattern of the navigation signal transmitter 330. As shown, the beam steering direction 1325 is adjusted as the satellite 110 proceeds from T1 to T2 to T3 along an orbital path 1322 to point at the area of high population density 1320. The effect of this beam-steering adjustment is to increase the signal strength of the navigation signals transmitted by the satellite 110 in the area of the of high population density 1320, facilitating better reception and improved positioning, navigation and timing of client devices 160 within this area.

Figure 14:
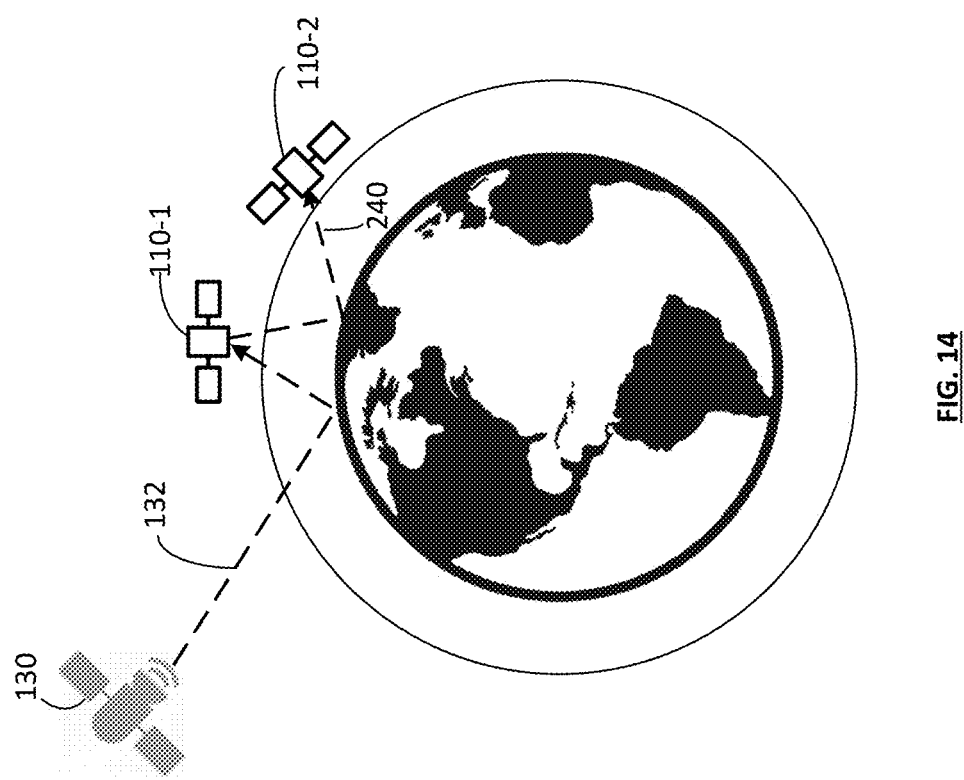
FIG. 14 is an illustration of GPS reflectometry in accordance with various embodiments.

FIG. 14 is an illustration of GPS reflectometry in accordance with various embodiments. While the foregoing has discussed the use of satellite to satellite signals used for radio occultation, satellite signals transmitted by one satellite and reflected by the surface of the earth can be received by one or more other satellites. In the examples shown, a satellite 110-1 receives signals 132 from satellite 130 that reflect off the surface of the earth. In other configurations, satellite 110-2 receives navigation signal 240 from satellite 110-2 that reflect off the surface of the earth. The strength of the received signal, together with factors such as the orbital position of both the transmit and receive satellites, the transmit power, the transmit and receive beamwidth, and a current atmospheric model can be used to determine and map the current reflectivity of different regions of the globe. Such GPS reflectometry can be used, for example, to create maps of current sea surface conditions, rainforest tree canopy density, snowfall, crop conditions, soil water density and/or other environmental conditions around the globe.

Figure 15B:
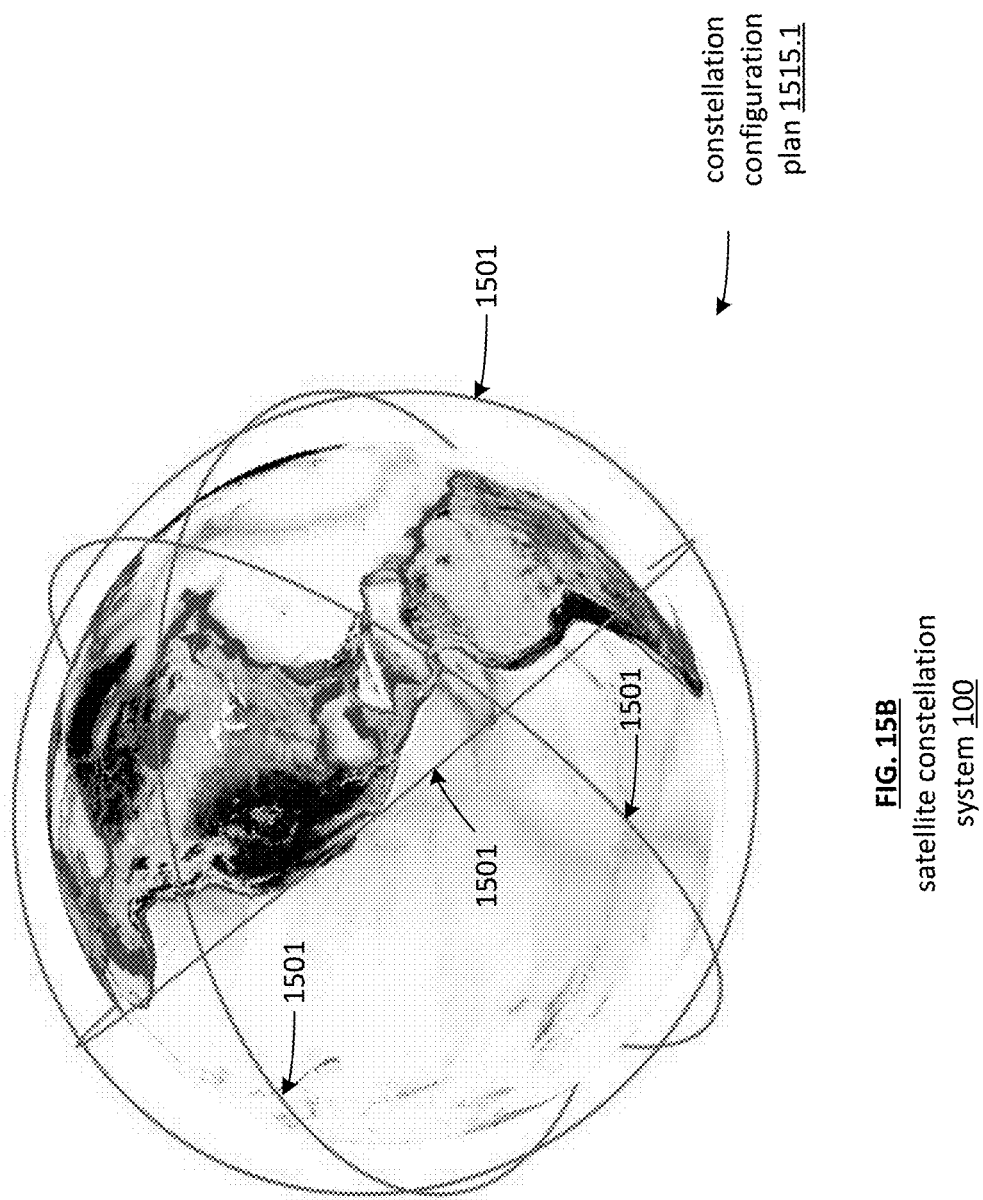
FIGS. 15B-15D illustrate embodiments of a satellite constellation in accordance with example constellation configuration plan in accordance with various embodiments.
Figure 15C:
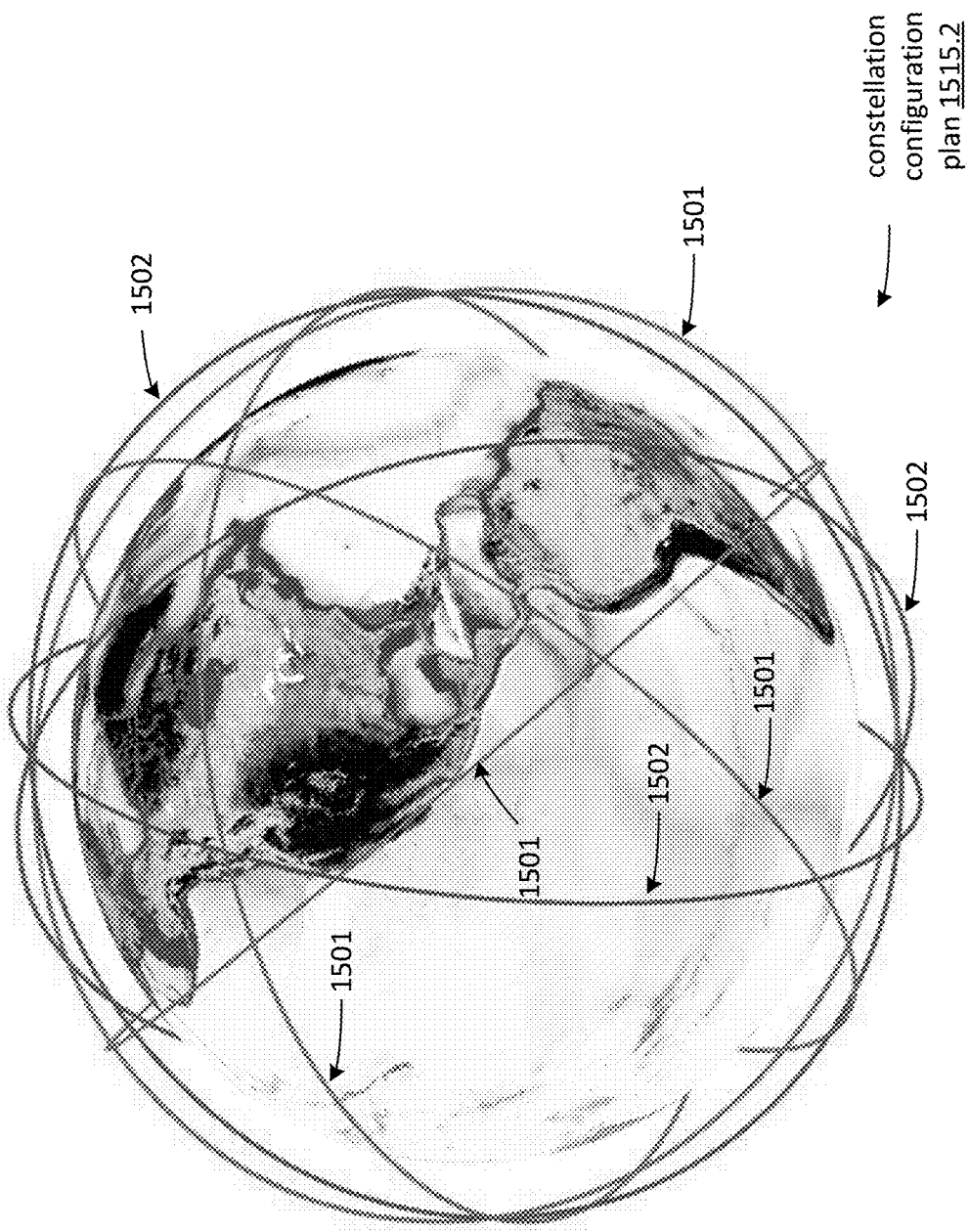
Figure 15D:
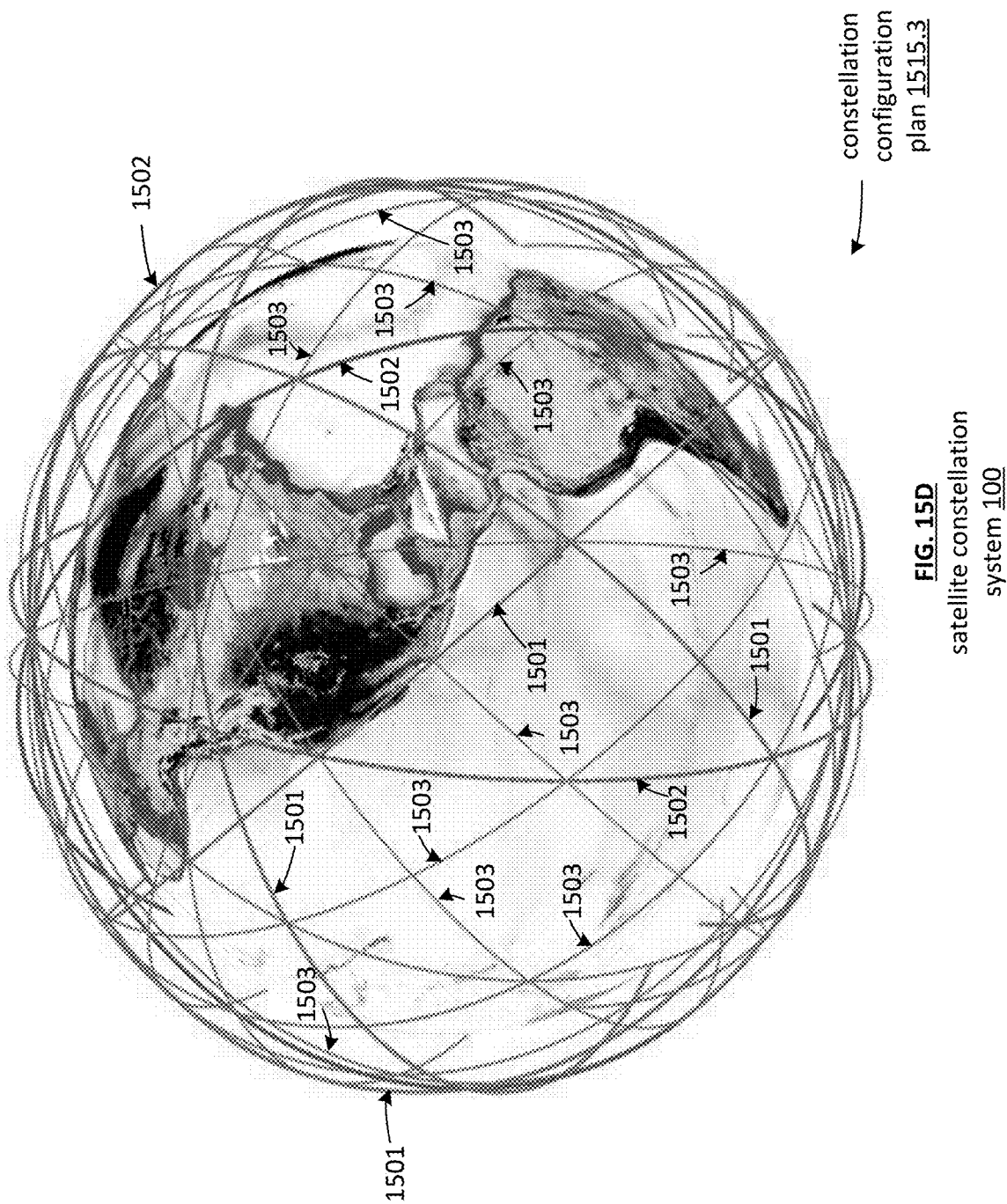
Figure 15E:
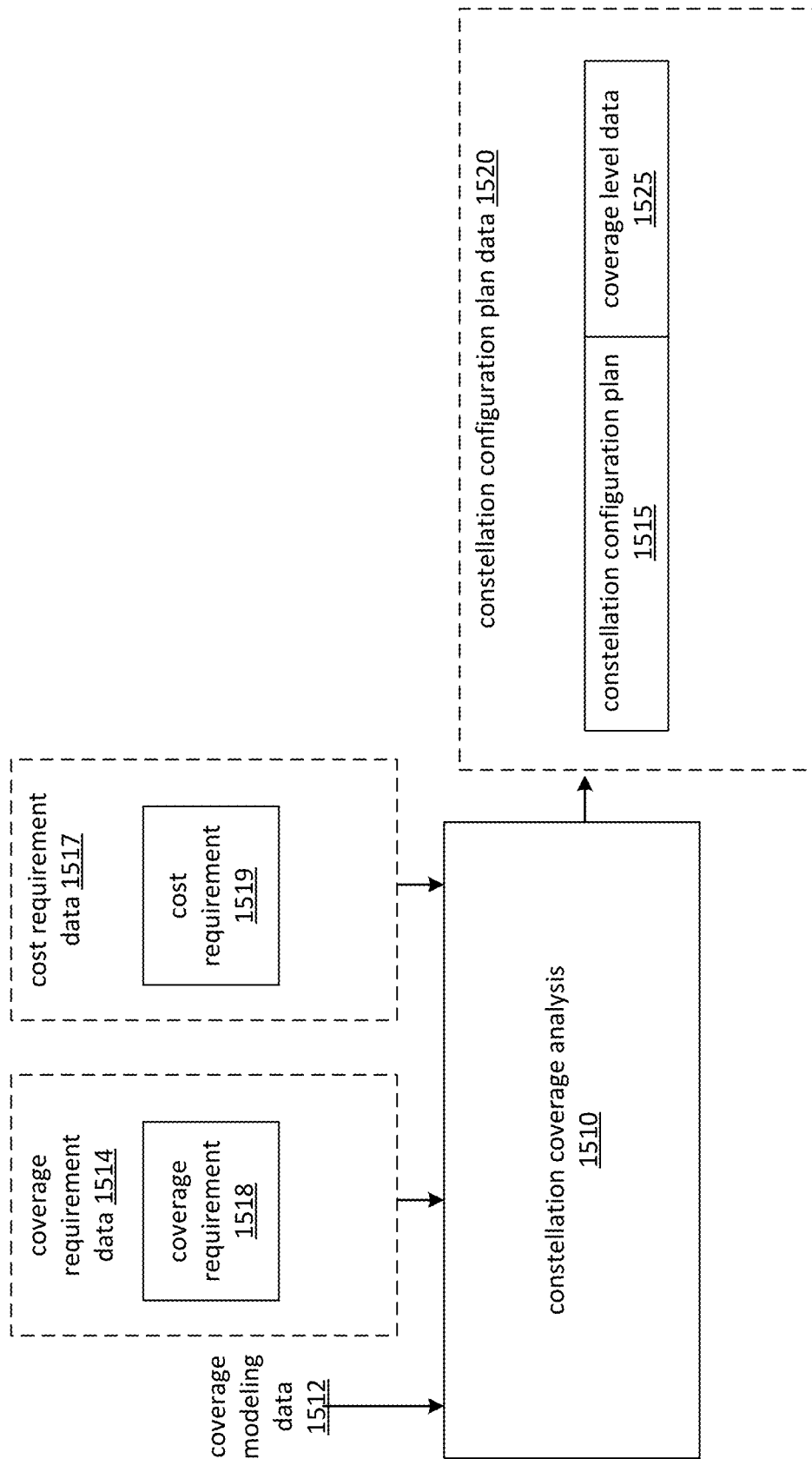
FIG. 15E illustrates an example flow of generating constellation configuration plan data via a constellation coverage analysis in accordance with various embodiments.
Figure 15F:
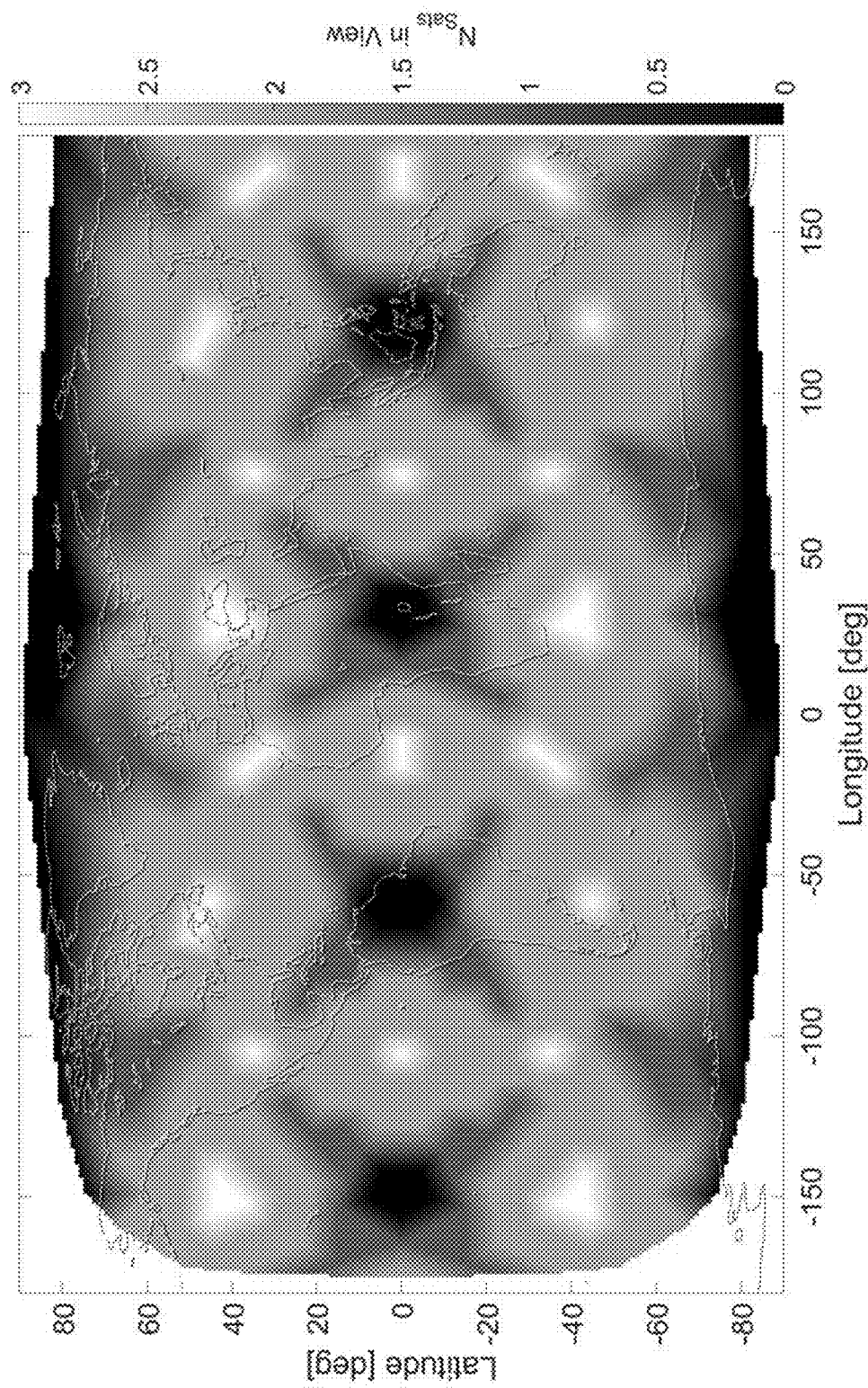
FIGS. 15F-15M illustrate example embodiments of coverage level data of example generating constellation configuration plans in accordance with various embodiments.
Figure 15G:
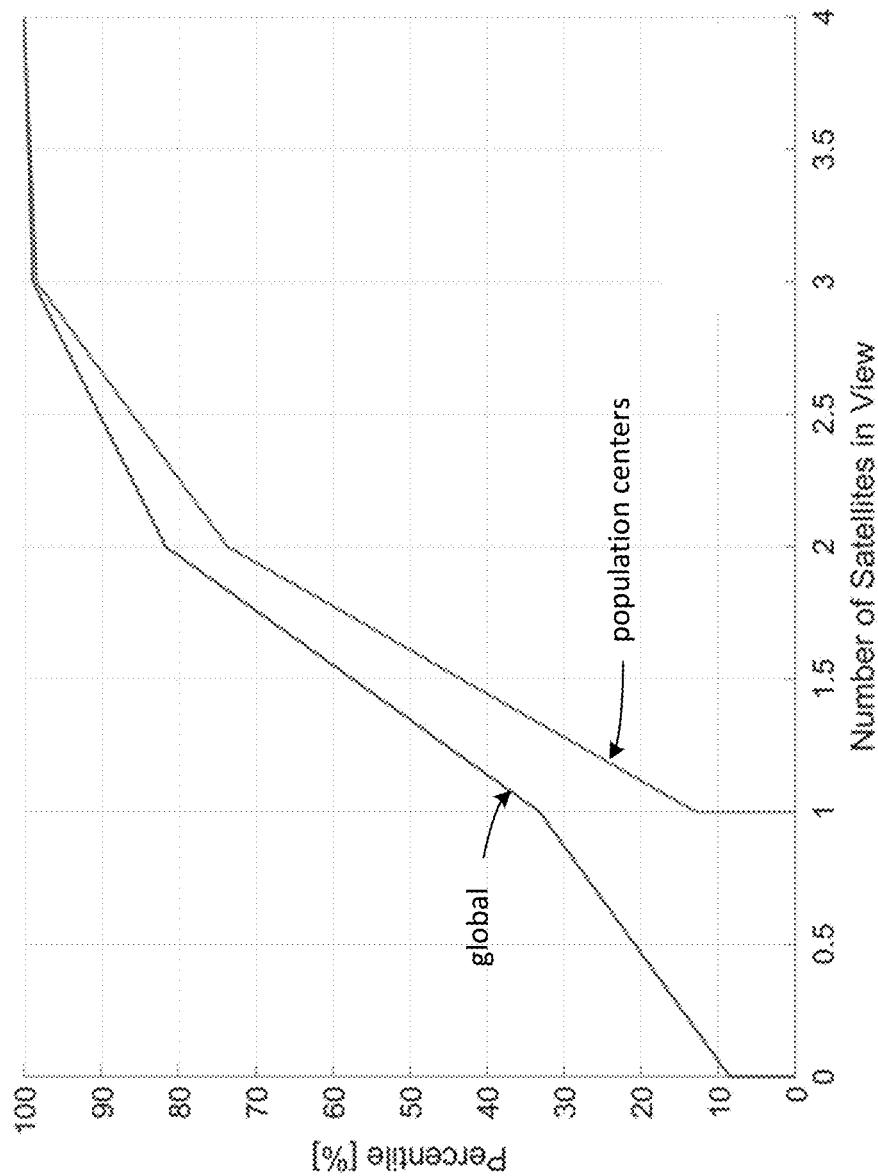
Figure 15H:
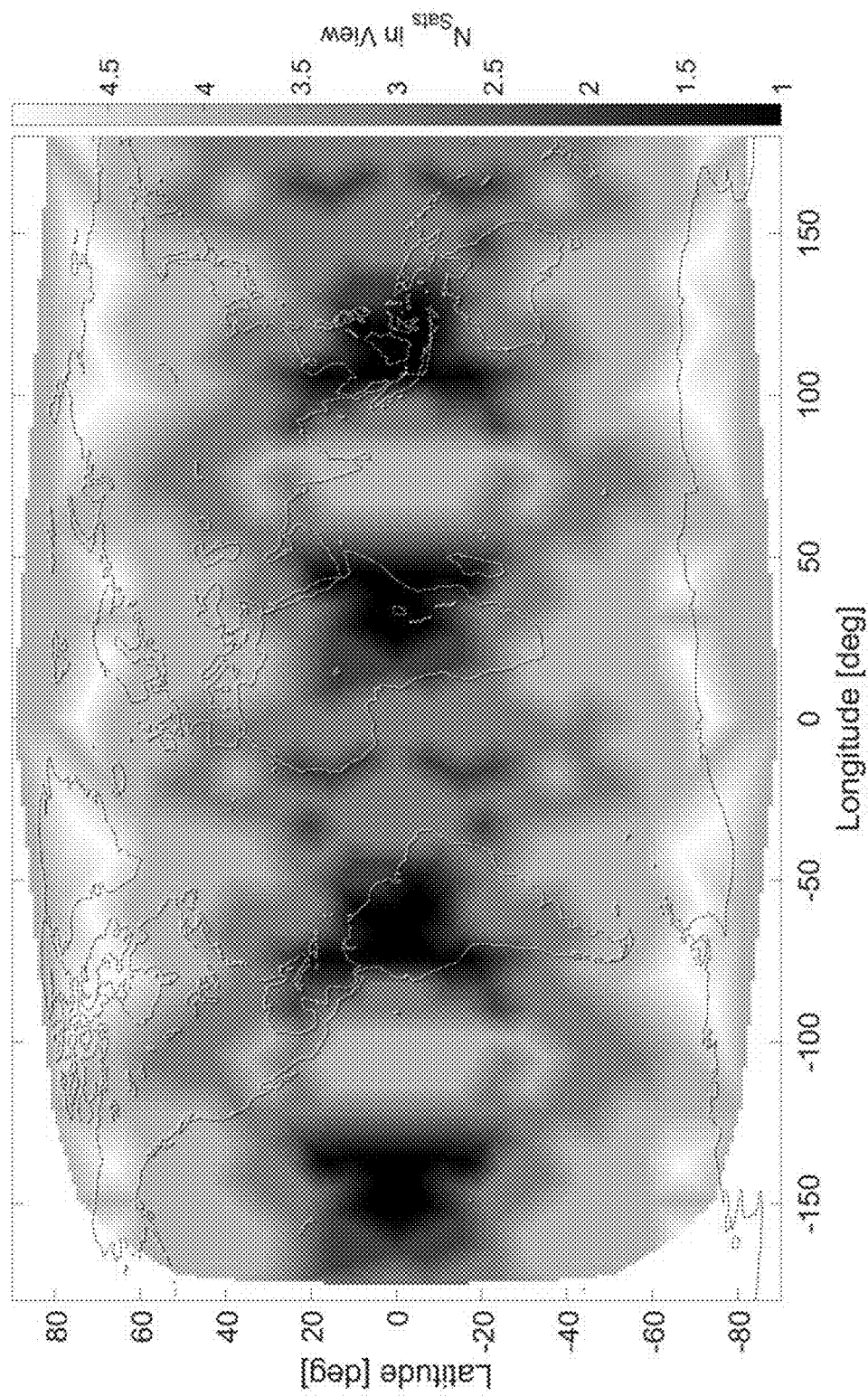
Figure 15I:
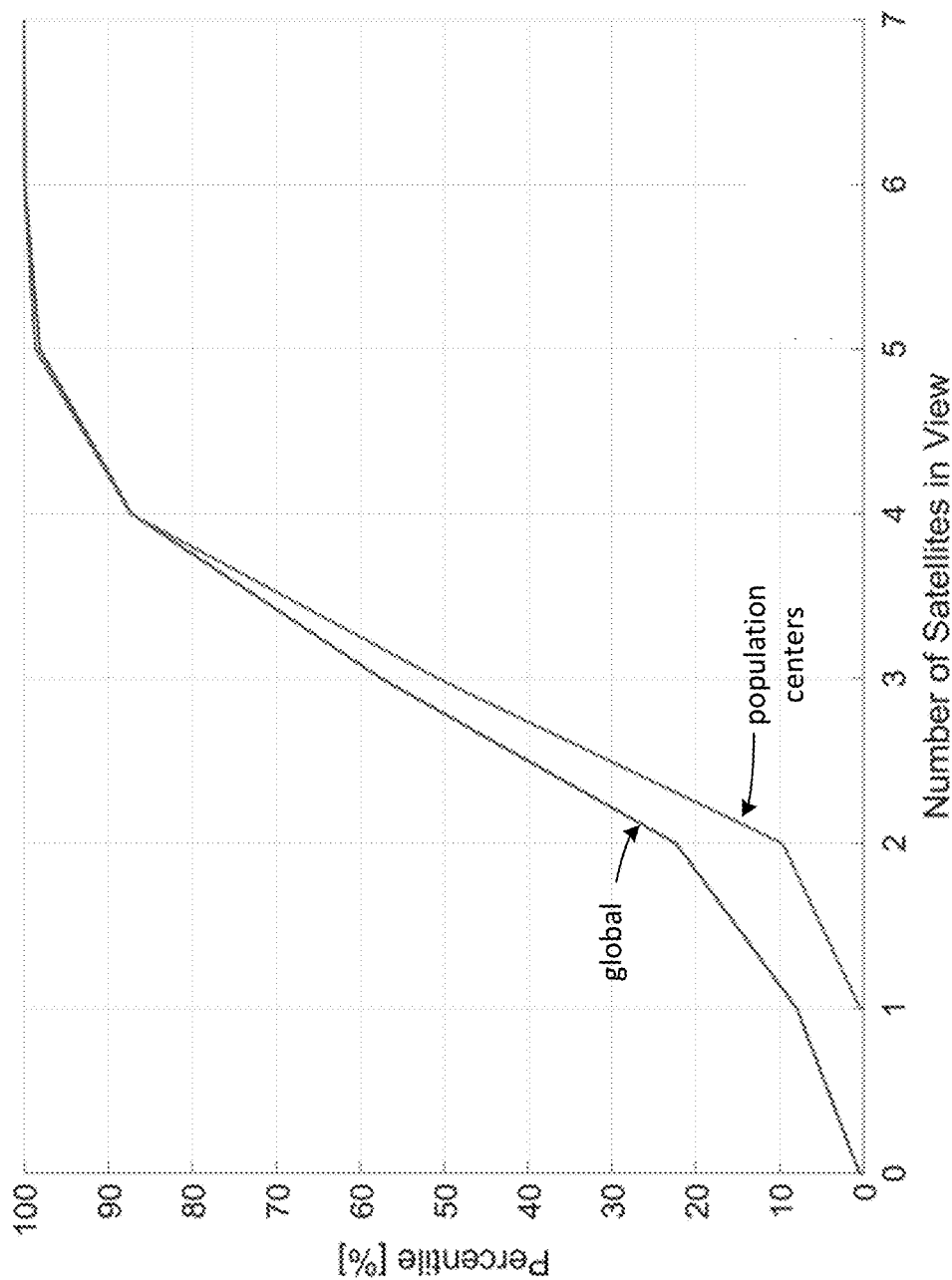
Figure 15J:
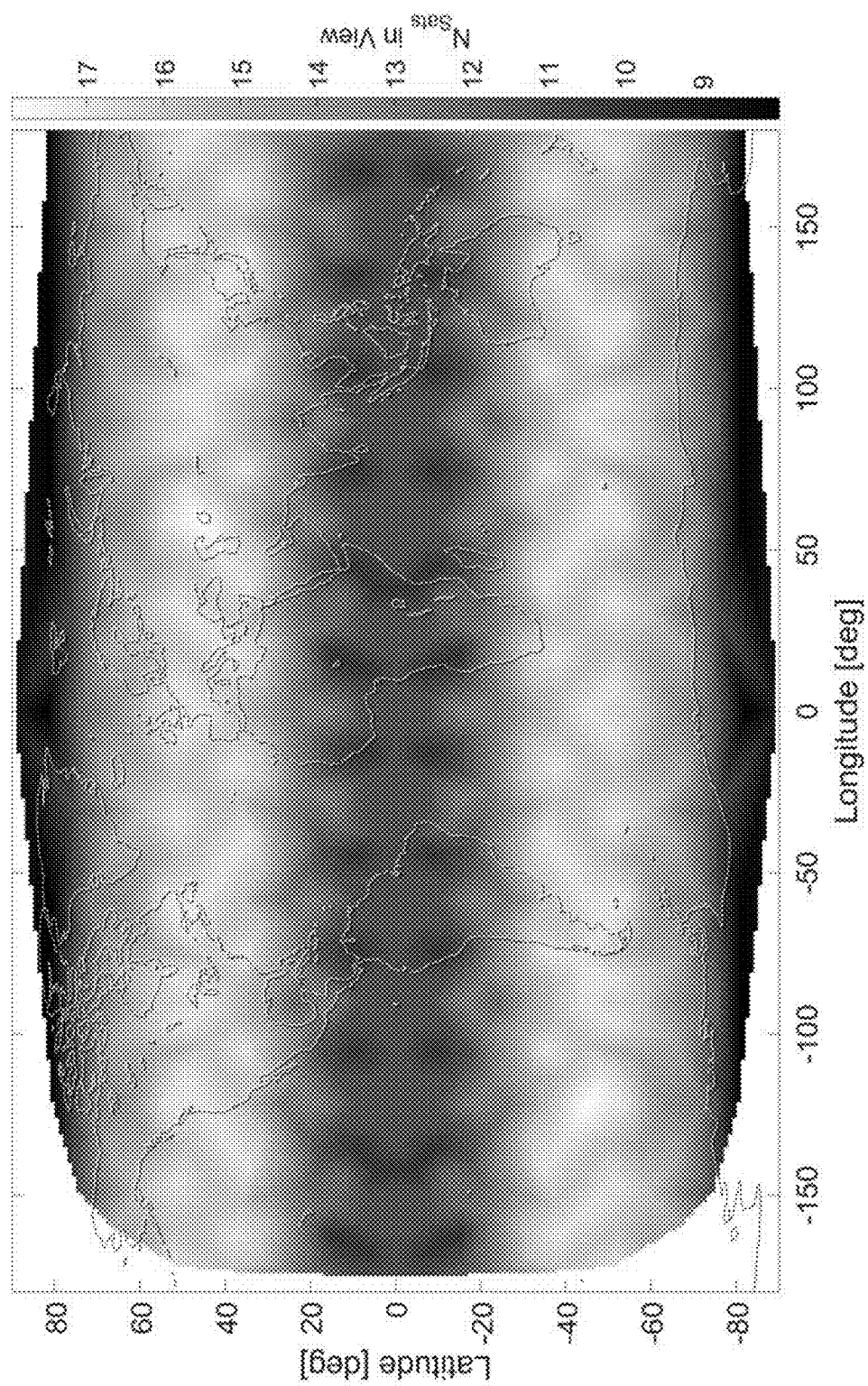
Figure 15K:
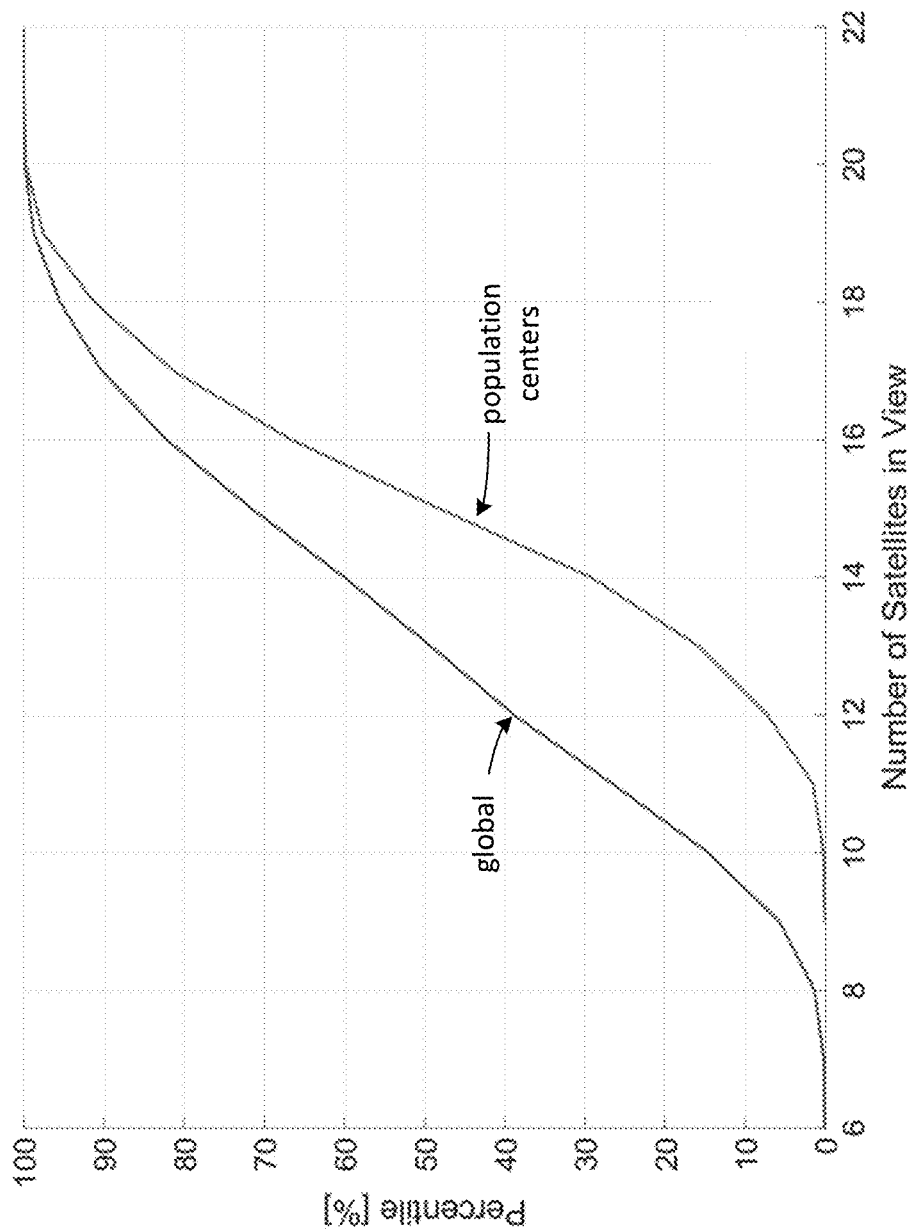
Figure 15L:
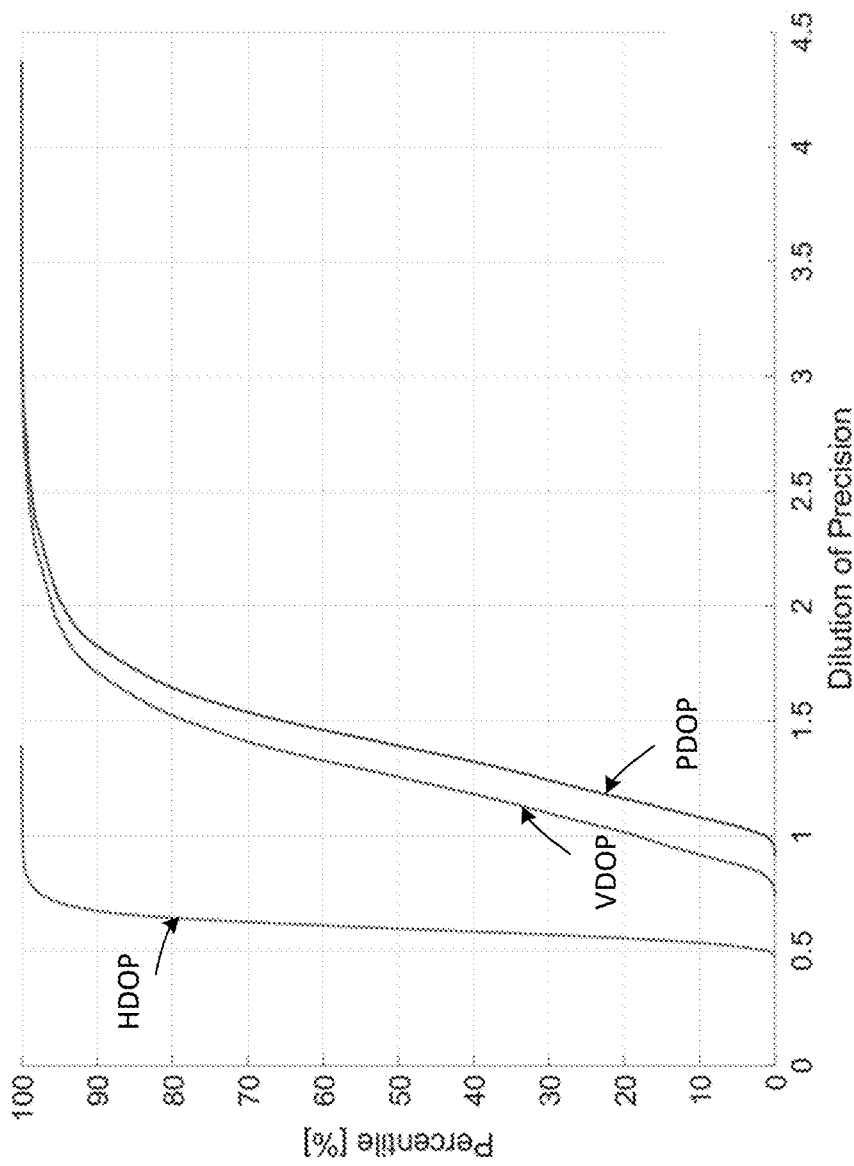
Figure 15M:
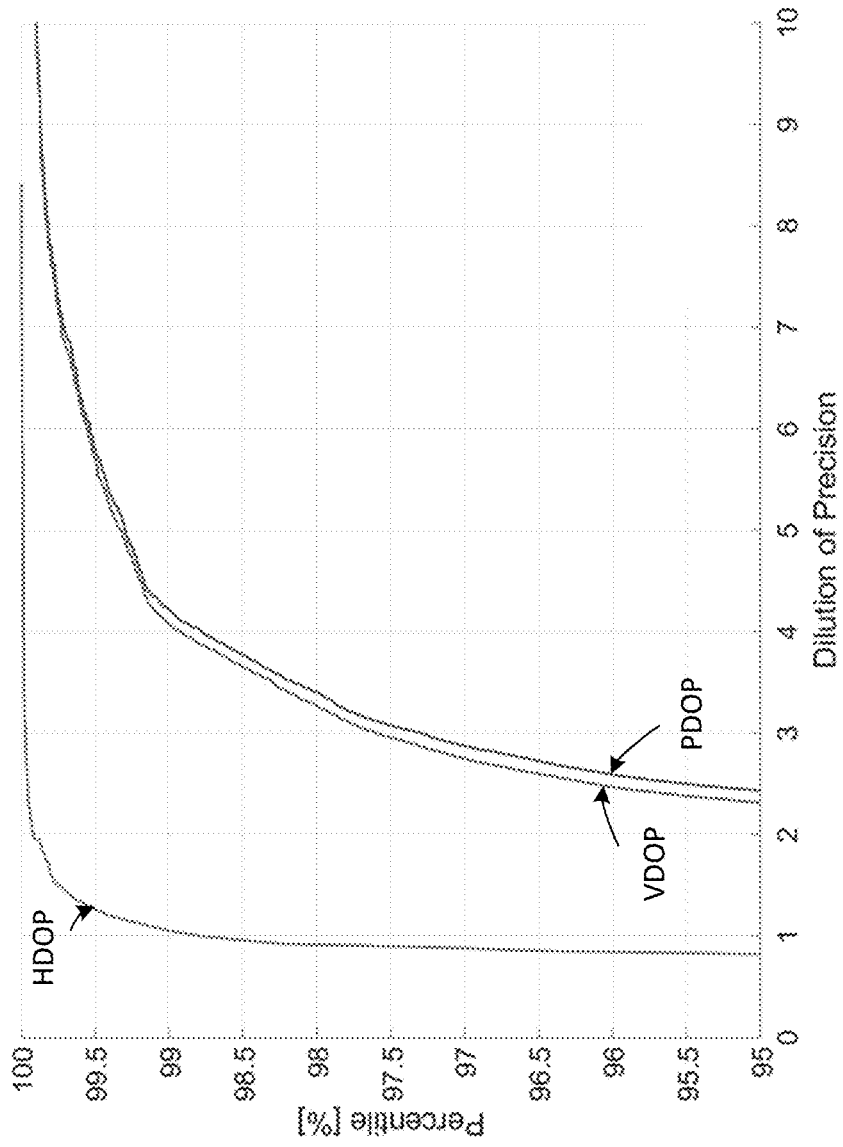
Figure 15N:
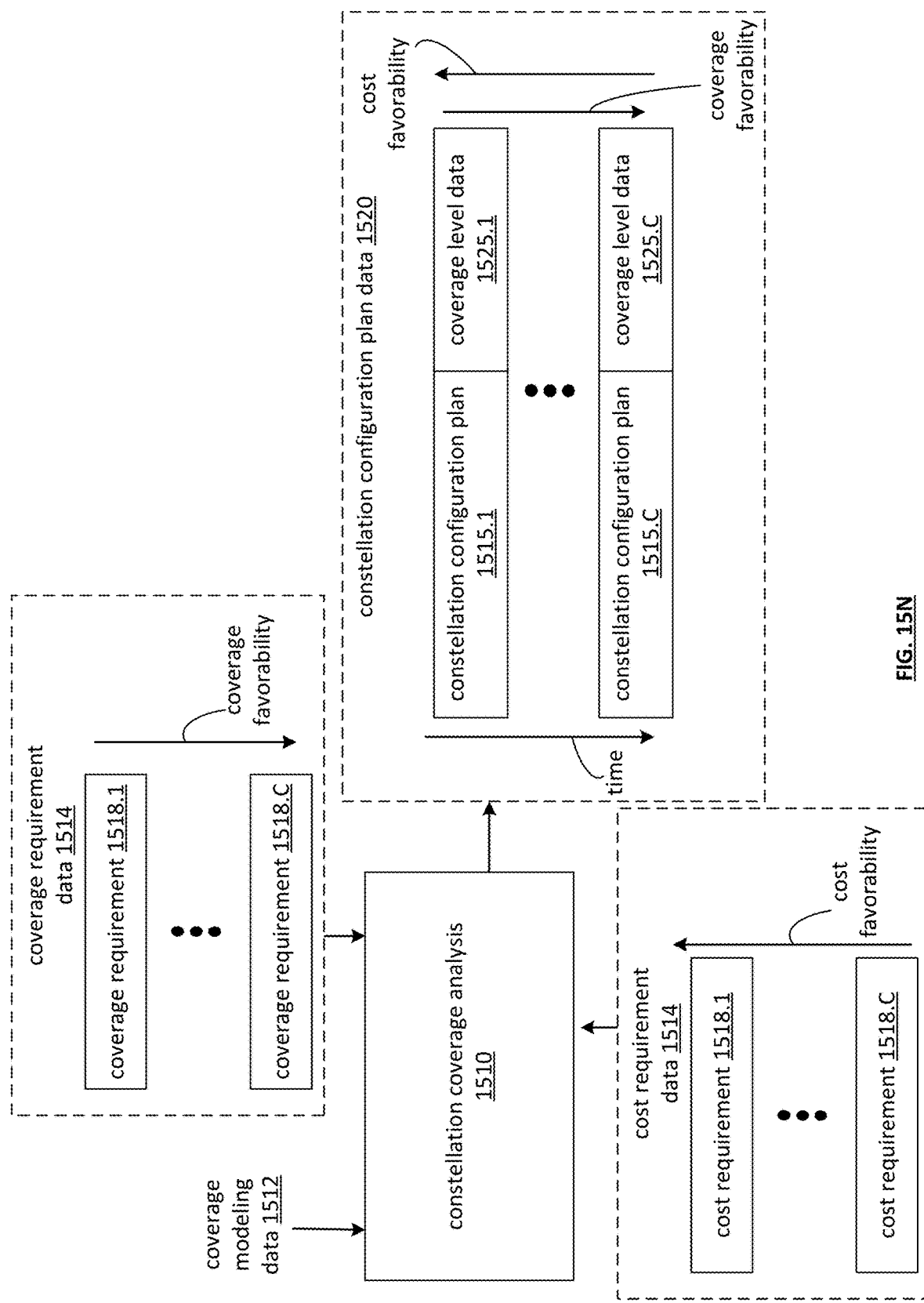
FIG. 15N illustrates an example flow of generating constellation configuration plan data that includes multiple constellation configuration plans over time via a constellation coverage analysis in accordance with various embodiments.
Figure 15O:
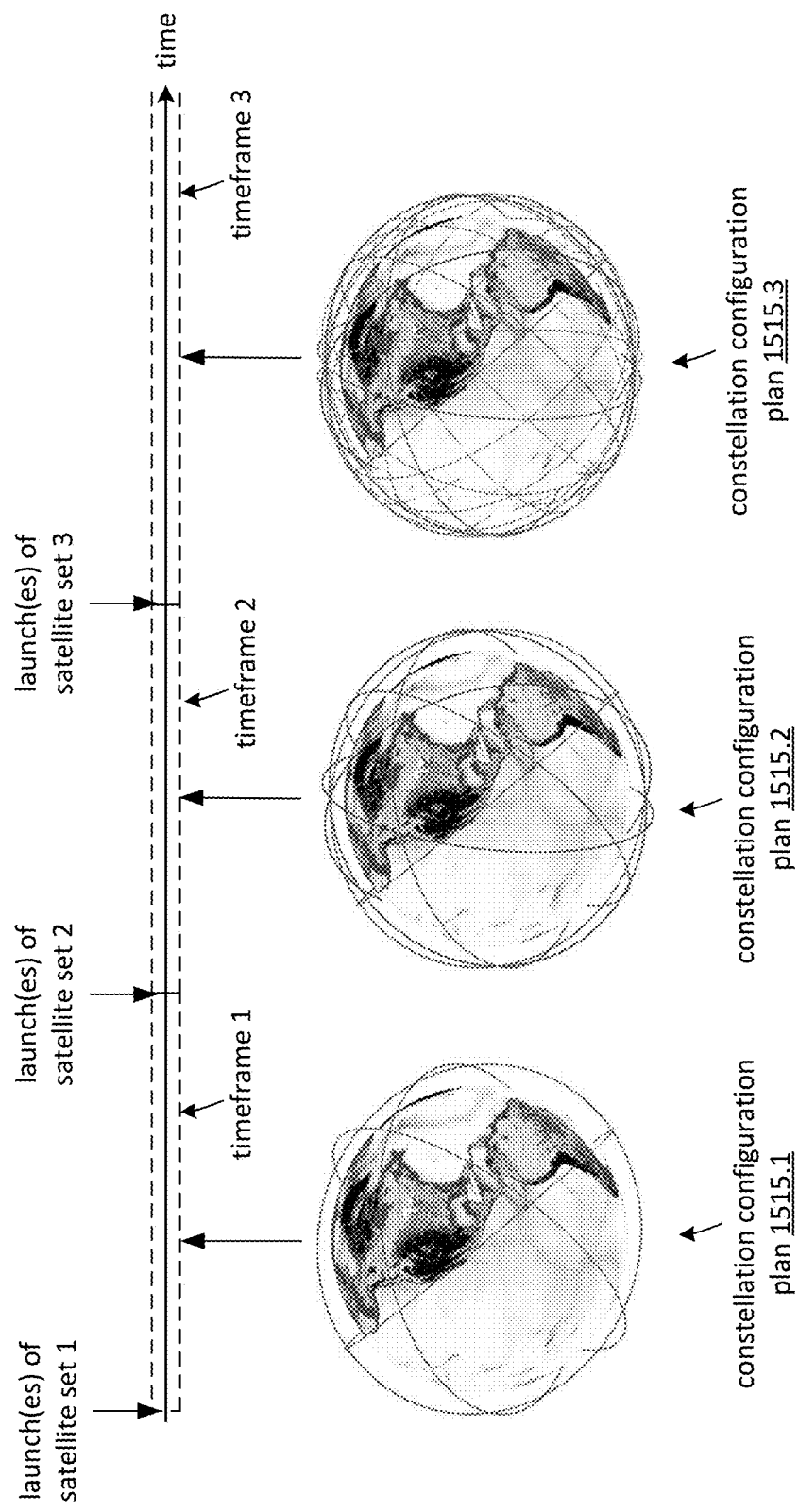
FIGS. 15O-15P illustrate example timelines of implementing multiple constellation configuration plans over time in accordance with various embodiments.
Figure 15P:
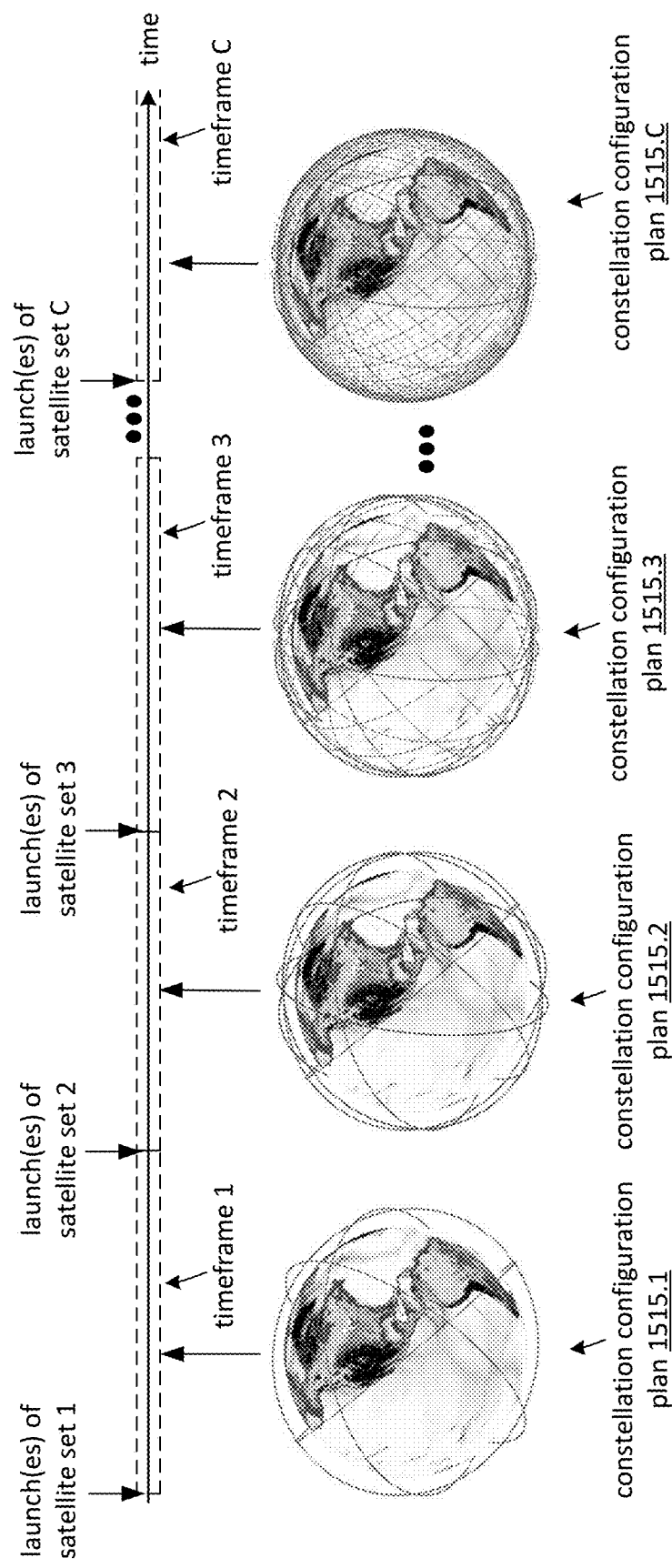
Figure 15Q:
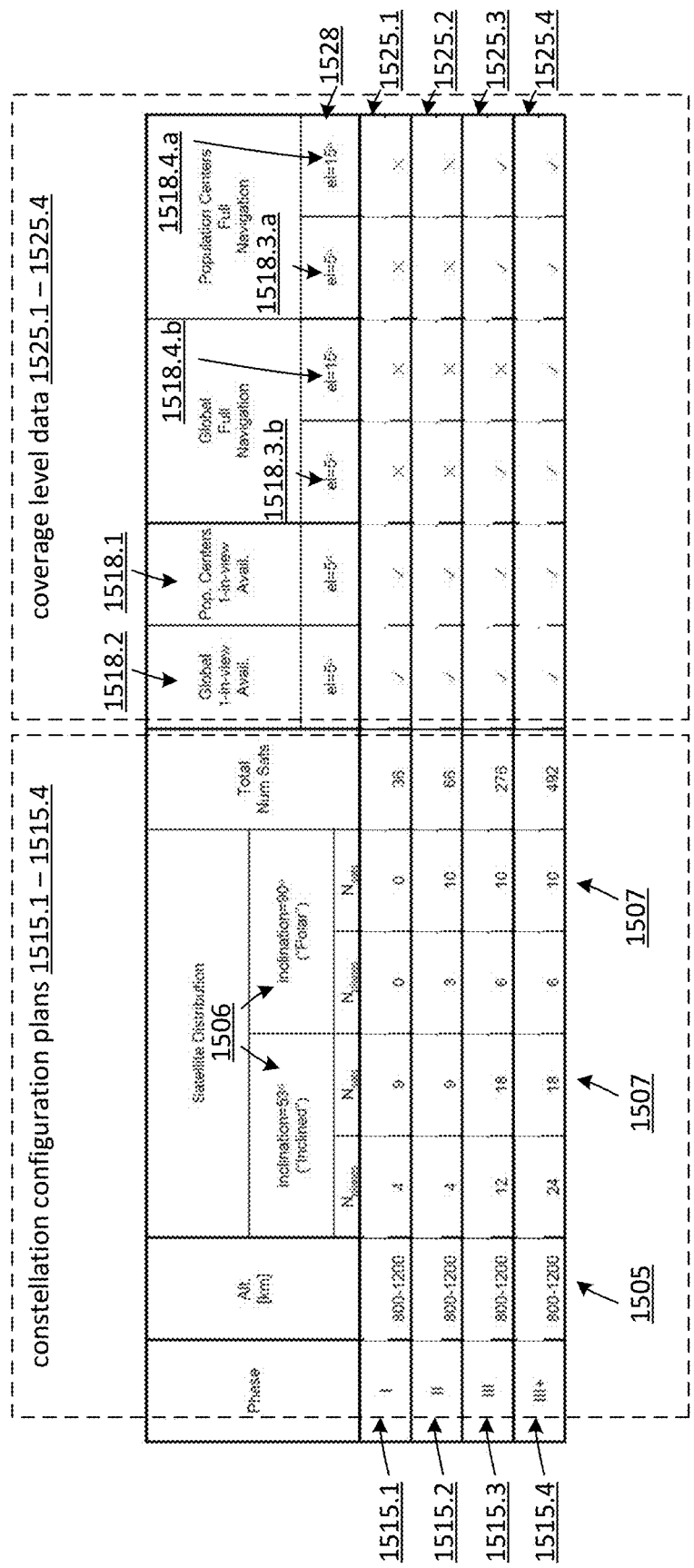
FIGS. 15Q-15R illustrate example configuration plan data for implementing multiple constellation configuration plans over time in accordance with various embodiments.
Figure 15R:
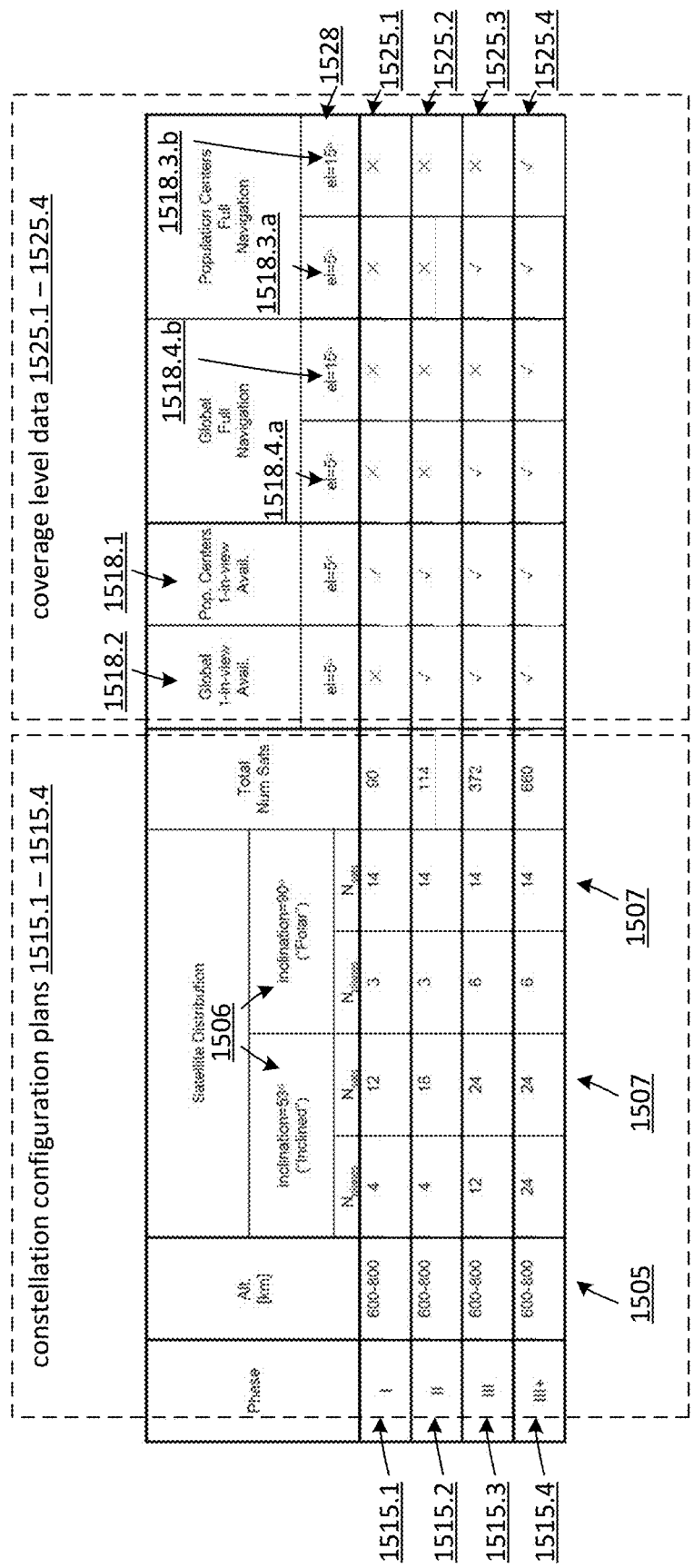
Figure 15S:
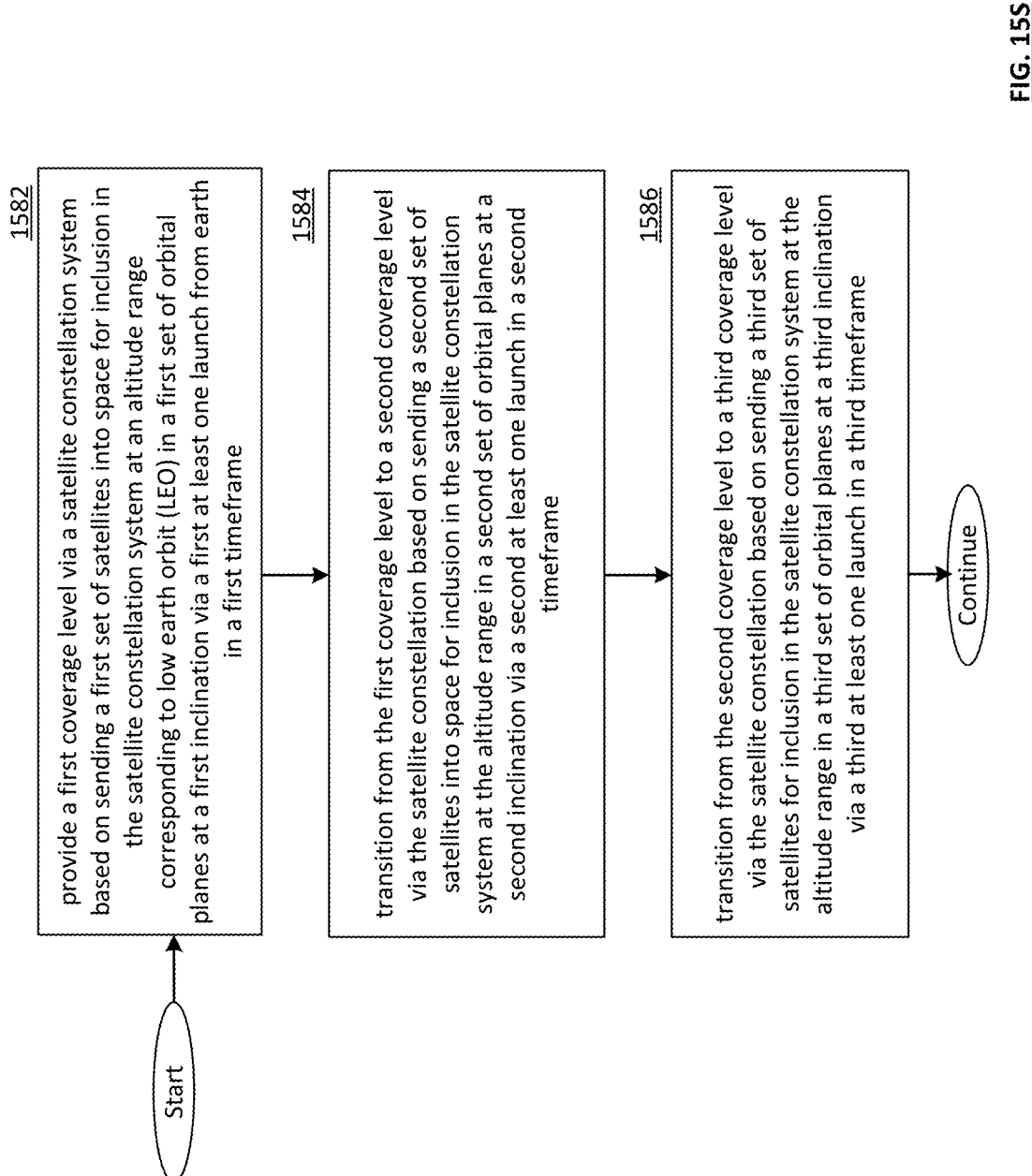
FIG. 15S is a logic diagram of an example of a method of implementing multiple constellation configuration plans over time in accordance with various embodiments.

FIGS. 15A-15S present embodiments of a satellite constellation that is implemented in accordance with a constellation configuration plan. The satellite constellation discussed and depicted in conjunction with FIGS. 15A-15S can be implemented via any embodiment of the satellite constellation system 100 described herein. Some or all of the satellites of the satellite constellation discussed and depicted in conjunction with FIGS. 15A-15S can implemented via any embodiment of satellite 110 described herein.

As illustrated in FIG. 15A, a constellation configuration plan 1515 can be in accordance with and/or can indicate various parameters defining the configuration and/or distribution of satellites in the corresponding satellite constellation, for example, relative to Earth and/or relative to a planet or other celestial mass that the corresponding satellites in the corresponding satellite constellation are orbiting.

A constellation configuration plan 1515 can correspond to a satellite constellation that is already deployed and in orbit, expressing the given current and/or expected configuration of this satellite constellation. A constellation configuration plan 1515 can correspond to a proposed future configuration for satellite constellation that is not yet deployed and in orbit, and/or that is not yet fully deployed and in orbit.

The parameters of constellation configuration plan 1515 can indicate one or more orbital planes 1500 of the corresponding satellite constellation, such as a set of P orbital planes 1500.1-1500.P, where P can be any number greater than one. A given satellite of the corresponding satellite constellation can orbit via a corresponding one of the orbital planes 1500.

Each orbital plane 1500 can be in accordance with a corresponding altitude 1505, such as single altitude and/or altitude range in which satellites of the orbital plane 1500 are configured to fall within in their orbit via the corresponding orbital plane. Different orbital planes 1500 of a constellation configuration plan 1515 can have different altitudes 1505, for example, with overlapping and/or non-overlapping altitude ranges. In some embodiments, some or all orbital planes 1500.1-1500.P of a given constellation configuration plan 1515 can have the same altitude 1505, such as same altitude ranges. In some embodiments, the altitude 1505 for some or all orbital planes orbital planes 1500 of the satellite constellation can indicate a range within a LEO altitude, such as a range with a minimum that is greater than or equal to 600 kilometers and/or a maximum that is less than or equal to and 1200 kilometers. In some embodiments, the altitude 1505 for some or all orbital planes 1500 can be a sub-range within LEO, such as a range with a minimum that is greater than or equal to 600 kilometers, a maximum that is less than or equal to and 1200 kilometers, and a span of less than 600 kilometers. For example, the altitude 1505 for some or all orbital planes 1500 can indicate: an altitude range of 600-800 kilometers; an altitude range of 800-1200 kilometers; an altitude range of 800-1000 kilometers; an altitude range of 1000-1200 kilometers; an altitude of 600 kilometers; an altitude of 800 kilometers; an altitude of 1000 kilometers; an altitude of 1200 kilometers; and/or another altitude.

Each orbital plane 1500 can alternatively or additionally be in accordance with a corresponding inclination 1506, such as a degree measure and/or range of degree measures expressing a tilt of the orbital plane, for example, relative to the Earth's equatorial plane or another fixed plane of the Earth and/or other celestial body. Different orbital planes 1500 of a constellation configuration plan 1515 can have different inclinations 1506. In some embodiments, some or all orbital planes 1500.1-1500.P of a given constellation configuration plan 1515 can have the same inclination 1506, such as a same degree of tilt relative to the Earth's equatorial plane. In some embodiments, all orbital planes 1500.1-1500.P of a given constellation configuration plan 1515 are in accordance with one of two possible inclinations 1506.A or 1506.B. As a particular example, inclination 1506.A corresponds to a non-polar inclination, such as a 53 degree inclination, and/or inclination 1506.B corresponds to a polar inclination at 90 degrees. Alternatively, any number of different inclinations can be implemented via different 1500.1-1500.P of a given constellation configuration plan 1515.

Each orbital plane 1500 can alternatively or additionally have a corresponding number of satellites 1507 in the orbital plane 1500. For example, a summation of the number of satellites 1507.1-1507.P can correspond to a total number of satellites in the satellite constellation and/or a total number of satellites in orbital planes 1500.1-1500.P. Different orbital planes 1500 of a constellation configuration plan 1515 can have different numbers of satellites 1507. In some embodiments, some or all orbital planes 1500.1-1500.P of a given constellation configuration plan 1515 can have the same numbers of satellites 1507. In some embodiments, all orbital planes 1500 of a first given inclination 1506.A have a same first number of satellites, and/or all orbital planes 1500 of a second given inclination 1506.B have a same second number of satellites, where the same first number of satellites is different from the same second number of satellites.

As discussed in further detail herein, the configuration of various parameters, such the number of orbital planes and/or the altitude of, inclination of, and/or number of satellites in each of these orbital planes, can influence: the coverage level attained by a satellite constellation implementing a corresponding constellation configuration plan, and/or the cost in monetary, time, and/or personnel resources required to implement the satellite constellation implementing a corresponding constellation configuration plan. These various parameters can be selected based on optimizing the cost and/or coverage level of the satellite constellation, and/or otherwise ensuring the cost and/or coverage level of the satellite constellation are favorable.

In particular, implementing some or all orbital planes to have a non-polar inclination can be favorable over implementing some or all orbital planes with a polar inclination, based on enabling a more favorable level of coverage with a smaller number of total satellites when the orbital planes have non-polar inclinations. For example, at the poles, horizontal dilution of precision decreases while vertical dilution of precision increases. Furthermore, the concentration of satellites over polar latitudes is greater than the concentration of satellites over other latitudes, such as latitudes with greater population density. In can be favorable to implement a satellite constellation, such as satellite constellation system 100, via a set of inclined orbital planes at a non-polar inclination, such as fifty three degrees, to increase and/or prioritize coverage over latitudes corresponding to population centers with a higher population density, such as the latitudes between 22 and 60 degrees latitude. Examples of various favorable coverage induced via use of orbital planes with non-polar inclinations is discussed in further detail herein.

Some or all of these embodiments of constellation configuration plan 1515 can be implemented as the configuration of any embodiment satellite constellation system 100 described herein. For example any embodiment of satellite 110 described herein can be orbiting in a particular one of the set of orbital planes 1500.1-1500.P of the satellite constellation system at a corresponding altitude 1505 and/or at a corresponding inclination 1506 based on the satellite constellation system 100 being configured in accordance with the constellation configuration plan 1515.

FIG. 15B illustrates an embodiment of satellite constellation system 100 that implements an example constellation configuration plan 1515.1. For example, the constellation configuration plan 1515.1 can be in accordance with a one-in-view population center requirement as discussed in conjunction with FIGS. 15E and/or can have simulated and/or actual coverage level in accordance with coverage level data 1525.1 of FIGS. 15F and/or 15G. In some embodiments, the constellation configuration plan 1515.1 of FIG. 15B is implemented as the constellation configuration plan 1515.1 of FIG. 15Q.

As illustrated, this constellation configuration plan 1515.1 can include exactly four orbital planes 1501, or another number of these orbital planes 1501. Each orbital plane 1501 can be in accordance with an altitude range of 600 kilometers to 800 kilometers and/or any other sub-range with minimum that is greater than or equal to 600 kilometers, a maximum that is less than or equal to and 1200 kilometers, and/or a span of less than 600 kilometers. Each orbital plane 1501 can be in accordance with a same, non-polar inclination, such as an inclination of 53 degrees or another non-polar inclination. Alternatively, some or all orbital planes 1501 can be in accordance with a polar inclination. Each orbital plane 1501 can include exactly nine satellites 110, where the satellite constellation system 100 includes exactly thirty-six satellites 110. Alternatively each orbital plane 1501 can any other number of satellites 110.

FIG. 15C illustrates an embodiment of satellite constellation system 100 that implements another example constellation configuration plan 1515.2. For example, the constellation configuration plan 1515.2 can be in accordance with a one-in-view global requirement as discussed in conjunction with FIGS. 15E and/or can have simulated and/or actual coverage level in accordance with coverage level data 1525.2 of FIGS. 15H and/or 15I. In some embodiments, the constellation configuration plan 1515.2 of FIG. 15C is implemented as the constellation configuration plan 1515.2 of FIG. 15Q.

As illustrated, this constellation configuration plan 1515.2 can include four orbital planes 1501 and/or another number or orbital planes 1501, which can be implemented in a same or similar fashion as illustrated in FIG. 15B. This constellation configuration plan 1515.2 can further include three orbital planes 1502, and/or another number of these orbital planes 1502.

Each orbital plane 1502 can be in accordance with an altitude range of 600 kilometers to 800 kilometers and/or any other sub-range with minimum that is greater than or equal to 600 kilometers, a maximum that is less than or equal to and 1200 kilometers, and/or a span of less than 600 kilometers. Each orbital plane 1502 can be in accordance with a same polar inclination, such as an inclination of 90 degrees. Alternatively, orbital planes 1502 can optionally be in accordance with a non-polar inclination and/or another inclination that is different from the inclination of orbital planes 1501. Each orbital plane 1502 can include exactly ten satellites 110. For example, the satellite constellation system 100 includes exactly sixty-six satellites 110 based on including four orbital planes 1501 with nine satellites per plane and based on further including three orbital planes 1502 with ten satellites per plane. Alternatively each orbital plane 1502 can any other number of satellites 110.

In some embodiments, satellites 110 of orbital planes 1502 are added to satellite constellation system 100 after a prior addition of satellites 110 of orbital planes 1501 to the satellite constellation system 100. For example, the addition of satellites 110 of orbital planes 1502 facilitates enhancement of the coverage level of the satellite constellation system 100 based on transitioning satellite constellation system 100 from being in accordance with constellation configuration plan 1515.1 to being in accordance with constellation configuration plan 1515.2, for example, as discussed in conjunction with FIGS. 15N-15P.

FIG. 15D illustrates an embodiment of satellite constellation system 100 that implements another example constellation configuration plan 1515.3. For example, the constellation configuration plan 1515.2 can be in accordance with a global full navigation requirement as discussed in conjunction with FIGS. 15E and/or can have simulated and/or actual coverage level in accordance with coverage level data 1525.2 of FIGS. 15J, 15K, and/or 15M. In some embodiments, the constellation configuration plan 1515.3 of FIG. 15D is implemented as the constellation configuration plan 1515.3 of FIG. 15Q.

As illustrated, this constellation configuration plan 1515.3 can include four orbital planes 1501 and/or another number or orbital planes 1501, which can be implemented in a same or similar fashion as illustrated in FIG. 15B and/or FIG. 15C. This constellation configuration plan 1515.3 can further include three orbital planes 1502 and/or another number of orbital planes 1502, which can be implemented in a same or similar fashion as illustrated in FIG. 15C. This constellation configuration plan 1515.3 can further include eight orbital planes 1503.

Each orbital plane 1503 can be in accordance with an altitude range of 600 kilometers to 800 kilometers and/or any other sub-range with minimum that is greater than or equal to 600 kilometers, a maximum that is less than or equal to and 1200 kilometers, and/or a span of less than 600 kilometers. Each orbital plane 1503 can be in accordance with a same non-polar inclination, such as: an inclination of 53 degrees; an inclination that is the same as the inclination of orbital planes 1501; an inclination that is different from the inclination of orbital planes 1503; and/or another polar or non-polar inclination. Each orbital plane 1503 can include exactly eighteen satellites 110. Alternatively each orbital plane 1503 can any other number of satellites 110.

In some embodiments, some or all parameters defining orbital planes 1503 can be the same as the parameters defining orbital planes 1501 and/or the orbital planes 1501 can be updated with additional satellites to be implemented as additional orbital planes 1503. For example, all orbital planes 1501 are implemented as orbital planes 1503 to render twelve orbital planes 1503 that: each have a same non-polar inclination, such as an inclination of 53 degrees; are each in accordance with a same altitude range such as an altitude range of 600 kilometers to 800 kilometers; and/or that each have a same number of satellites, such as eighteen satellites per plane.

For example, the satellite constellation system 100 includes exactly two-hundred and seventy-six satellites 110 based on including four orbital planes 1501 and fourteen orbital planes 1503 that each have eighteen satellites per plane, based on further including three orbital planes 1502 with ten satellites per plane. In other embodiments, orbital plane 1501 can include exactly nine satellites 110, where the satellite constellation system 100 includes exactly thirty-six satellites 110.

In some embodiments, satellites 110 of orbital planes 1503 are added to satellite constellation system 100 after a prior addition of satellites 110 of orbital planes 1502 to the satellite constellation system 100 and/or after another prior addition of satellites 110 of orbital planes 1501 to the satellite constellation system 100. In some embodiments, new satellites 110 are added to existing orbital planes prior addition of each set of three satellites 110 of orbital planes 1502 to the satellite constellation system 100 and/or after another prior addition of each set of four satellites 110 of orbital planes 1501 to the satellite constellation system 100. As a particular example, in conjunction with the addition of satellites of new orbital planes 1503 to satellite constellation system 100, an additional fourteen satellites are added to each orbital plane 1501 to render eighteen satellites per orbital plane 1501. The addition of satellites 110 of new orbital planes 1503 and/or the addition of additional satellites to existing orbital planes 1501 can facilitates enhancement of the coverage level of the satellite constellation system 100 based on transitioning satellite constellation system 100 from being in accordance with constellation configuration plan 1515.2 to being in accordance with constellation configuration plan 1515.3, for example, as discussed in conjunction with FIGS. 15N-15P.

FIG. 15E illustrates an embodiment of implementing a constellation coverage analysis 1510 to generate constellation configuration plan data 1520 that includes one or more constellation configuration plans 1515, such as the constellation configuration plan 1515.1 of FIG. 15B, the constellation configuration plan 1515.2 of FIG. 15C, the constellation configuration plan 1515.1 of FIG. 15C, and/or any other constellation configuration plan 1515 of FIG. 15A.

The one or more constellation configuration plan 1515 of generated constellation configuration plan data 1520 can correspond to proposed and/or future constellation configuration plans 1515 for a satellite constellation such as satellite constellation system 100, for example, prior to the satellite constellation system 100 being implemented in space to include some or all satellites 110 in the configuration of the proposed and/or future constellation configuration plans 1515.

In particular, the constellation configuration plan data 1520 can be generated to automatically select, and/or to facilitate human selection of, an optimal and/or otherwise favorable constellation configuration plan 1515, and/or an optimal and/or otherwise favorable subset of possible constellation configuration plans 1515 for consideration, for implementation of satellite constellation system 100 based on implementing the constellation coverage analysis 1510.

In some embodiments, performance of constellation coverage analysis 1510 includes generating coverage level data 1525 for each of a plurality of constellation configuration plan options. For example, different constellation configuration plan options can have: different numbers of orbital planes, different numbers of satellites per orbital plane, different numbers and/or proportions of orbital planes in a polar inclination, different numbers and/or proportions of orbital planes in a non-inclination, different particular non-polar inclination values of some or all orbital plans; different altitude ranges; and/or differences in some or all parameters of FIG. 15A, and/or other differences that influence coverage level of each given of constellation configuration plan option and/or that influence cost of each given of constellation configuration plan option.

In some embodiments, performance of the constellation coverage analysis to generate coverage level data 1525 for a given constellation configuration plan 1515 of the plurality of constellation configuration plan options is based on utilizing coverage modeling data 1512.

The coverage modeling data 1512 can be generated based on and/or can be implemented based on: a plurality of possible orbital planes; a grid and/or distribution of users on earth; geometry and/or links of satellites in one of more constellation configuration plan options; one or more measurement models; precise orbit determination performed by one or more satellites in constellation configuration plan, for example, via state estimation flow of FIG. 5A; one or more user positioning equations; horizontal dilution of precision, vertical dilution of precision, position dilution of precision, and/or other dilution of precision measures; and/or other parameters and/or techniques. For example, on some embodiments, performance of the a constellation coverage analysis to generate coverage level data 1525 for a given constellation configuration plan 1515 can include performing and/or simulating an orbit determination algorithm for example, via state estimation flow of FIG. 5A and/or based on the distribution of satellites of the given constellation configuration plan 1515, and/or performing and/or simulating a user positioning equation for one or more simulated users in the grid and/or distribution of users on earth. The coverage modeling data 1512 can indicate and/or be based on any other features and/or functionality of satellite constellation system 100 such as: orbital position of satellites 110 over time; communication between satellites 110; transmission of navigation signals 240 by satellites 110; and/or other any features and/or functionality of satellites 110 as described herein.

In some embodiments, performance of the constellation coverage analysis further includes comparing coverage level data 1525 outputted in the constellation configuration plan data 1520 to one or more coverage requirements 1518 as coverage requirement data 1514. For example, the coverage requirements 1518 can be configured based on required and/or desired coverage requirements of the satellite constellation system 110. Proposed constellation configuration plans 1515 outputted by the constellation coverage analysis 1510 can include only constellation configuration plan 1515 with coverage level data 1525 that compares favorably to some or all coverage requirements 1518.

In some embodiments, comparing constellation configuration plan options to one or more cost requirements 1519 of cost requirement data 1517. For example, the coverage requirements 1518 can be configured based on required and/or desired cost requirements, such as a maximum monetary cost, maximum number of satellites, maximum number of required launches, maximum number of orbital planes, and/or other restraints imposed upon constellation configuration plans 1515 of the satellite constellation system 110. Proposed constellation configuration plans 1515 outputted by the constellation coverage analysis 1510 can include only constellation configuration plans 1515 that compare favorably to some or all cost requirements 1519 and/or can be configured based on optimizing and/or meeting some or all cost requirements 1519. Proposed constellation configuration plans 1515 outputted by the constellation coverage analysis 1510 can include constellation configuration plans 1515 with most favorable coverage level data 1525 that compares favorably to some or all cost requirements 1519. Proposed constellation configuration plans 1515 outputted by the constellation coverage analysis 1510 can include constellation configuration plans 1515 that compares favorably to some or all coverage requirements 1518 and that have a most favorable cost and/or most favorably optimize cost parameters of the cost requirements 1519.

As used herein, a first constellation configuration plan 1515 can have a more favorable cost than a second constellation configuration plan 1515 based on: the first constellation configuration plan 1515 having a lower and/or otherwise more favorable number of orbital planes than the first constellation configuration plan 1515; the same number of satellites in some or all orbital planes of the first constellation configuration plan 1515 being lower than and/or otherwise more favorable than the same number of satellites in some or all orbital planes of the second; constellation configuration plan 1515; the total number of satellites of the first constellation configuration plan 1515 being lower than and/or otherwise more favorable than the total number of satellites of the second constellation configuration plan 1515; the total monetary cost to launch satellites of the first constellation configuration plan 1515 being lower than and/or otherwise more favorable than the second constellation configuration plan 1515, for example, based on respective costs of a schedule of possible launches and/or based on comparing the schedule of possible launches to a timeline to build the total number of satellites and/or based on comparing possible orbital planes for these different launches to the orbital planes of the constellation configuration plan 1515; the total amount of time and/or a projected date a current data to launch satellites of the first constellation configuration plan 1515 being shorter than, being closer to the current data than and/or otherwise more favorable than the second constellation configuration plan 1515, for example, based on comparing a schedule of possible launches to a timeline to build the total number of satellites and/or based on dates of these possible launches to the current date, and/or other cost-based differences.

In some embodiments, the altitude range, the degree of a non-polar inclination, the number of orbital planes in the first orbital plane subset, and/or the first same number of satellites in the orbital planes of a given constellation configuration plan 1515 in constellation configuration plan data 1520 were configured and/or selected for implementing the satellite constellation system 100 based on: performing the constellation coverage analysis 1510; the coverage level data of the selected constellation configuration plan 1515 being determined to compare favorably to some or all coverage requirements 1518; the selected constellation configuration plan 1515 being determined to compare favorably to some or all cost requirements 1519; the constellation configuration plan being determined to have a most favorable cost of the constellation configuration plans determined to compare favorably to the at least one coverage requirement 1518; the constellation configuration plan being determined to have a lowest and/or most otherwise most optimal coverage level data while also meeting the at least one cost requirement 1519; and/or other optimization and/or analysis techniques.

In some embodiments, a given constellation configuration plan 1515 in constellation configuration plan data 1520 is configured and/or selected for implementing the satellite constellation system 100 based on implementing a threshold failure tolerance level, for example, to account for satellite failure. Consider a constellation configuration plan 1515 determined based on including a required number of satellites in each orbital plane. For example, the required number of satellites in each given orbital plane is determined as a minimum number of satellites for each orbital plane, given the altitude and/or inclination of these orbital planes, that meets the corresponding coverage requirements 1518. In particular, any fewer than the required number of satellites in one or more corresponding orbital planes can compare unfavorably to some or all coverage requirements 1518, and at least the first number of satellites included the plurality of orbital planes can thus be required to implement meet some or all coverage requirements 1518. Thus, if this constellation configuration plan 1515 is selected for implementation with exactly these required number of satellites in each orbital plane, a satellite failure could cause the satellite constellation to fail to meet some or all of these coverage requirements 1518.

To account for possible satellite failure, one or more additional satellites, beyond a base-level constellation configuration plan 1515 with only the determined required number of satellites in each corresponding orbital plane, can be included in a selected constellation configuration plan 1515 that implements a satellite constellation system 100. In particular, a base-level constellation configuration plan 1515 can be determined, for example, as described previously, to include a minimum and/or most cost effective number of satellites in each selected orbital plane, while meeting the corresponding one or more coverage requirements 1518. A redundant-level constellation configuration plan 1515 can then be determined based on adding additional, redundant satellites to this base-level constellation configuration plan 1515, where a redundant-level constellation configuration plan 1515 includes additional satellites added to one or more orbital planes of the base-level constellation configuration plan 1515, and/or includes additional satellites added to a new orbital plane.

The redundant-level constellation configuration plan 1515 can be configured to guarantee that the coverage requirement 1518 be provided by the satellite constellation in accordance with a determined and/or configured threshold failure tolerance level, which can correspond to and/or be based on: a threshold number and/or proportion of satellite failure, a probability of satellite failure, and/or other fault tolerance metrics. In some embodiments, this threshold failure tolerance level is indicated in coverage requirement data 1514 for the corresponding coverage requirement 1518.

In some embodiments, this threshold failure tolerance level is computed based on a known and/or expected probability of satellite failure.

As described and/or illustrated herein, a given constellation configuration plan 1515 implemented by satellite constellation system 100 can correspond to a base-level constellation configuration plan 1515 or a redundant-level constellation configuration plan 1515. A given constellation configuration plan 1515 of constellation configuration plan data 1520 as described herein can correspond to a base-level constellation configuration plan 1515 or a redundant-level constellation configuration plan 1515. For example, the constellation coverage analysis 1510 can be implemented to propose and/or select a redundant-level constellation configuration plan 1515 for a given base-level constellation configuration plan 1515. The constellation coverage analysis 1510 can optionally be implemented to automatically impose a corresponding level of redundancy for the corresponding coverage requirement 1518 in proposing and/or selecting a constellation configuration plan 1515, where a selected constellation configuration plan 1515 is a redundant-level constellation configuration plan 1515. The constellation coverage analysis 1510 can optionally propose and/or select number of and/or placement of K additional satellites for inclusion in a given base-level constellation configuration plan 1515 to render a corresponding redundant-level constellation configuration plan 1515.

For example, a number of additional satellites K is determined for addition to a base number of satellites M in a base-level constellation configuration plan 1515, to render a final number of satellites N=M+K in the redundant-level constellation configuration plan 1515. For example, the value of K is selected as the minimum number of additional satellites required for the satellite constellation to meet the threshold failure tolerance level, and the placement of the K satellites is selected based on rendering a best coverage level, and/or otherwise favorable coverage level that does not exceed a threshold cost, of a plurality of options for the placement of the K satellites. In such cases, the placement of the K additional satellites in the satellite constellation, such as the orbital planes they are assigned to, can be further be strategically selected automatically and/or via user input to optimize coverage.

In some cases, K particular satellites of a set of N satellites can be designated as spare satellites, while the remaining M particular satellites can be designated as base-level and/or active satellites. In such cases, the K particular satellites can operate differently from the remaining M satellites based on being designated as spares, for example, by being dormant until one of the M satellites fails and needs replacement. Alternatively, any K satellites of the set of N satellites can be viewed as "redundant" satellites, where all N satellites operate in a same or similar fashion and/or where "spares" are otherwise not differentiable from active satellites, and are simply implemented as increasing the number of satellites in operation to account for fault tolerance at the threshold failure tolerance level.

In some cases, it can be ideal to determine numbers of redundant satellites to add to each orbital plane 1501 separately to help ensure that each orbital plane will include the required number satellites in the event of failures at a predicted failure rate that is in accordance with a determined and/or configured failure probability. For example, maintaining the required coverage level can require that each orbital plane maintain its own threshold number of satellites. As a particular example, a satellite constellation that loses two satellites in a single orbital plane may render transition to a first coverage level that falls below the coverage requirements 1518, while a satellite constellation that loses three satellites, each in different orbital planes, can render transition to a second coverage level that does not fall below the coverage requirements 1518 and/or that is more favorable than the first coverage level.

For example, values $M_j$, $K_j$, and $N_j$ can be determined for each orbital plane j of a set of P orbital planes, where $M_j$ of a given orbital plane j corresponds to a number of satellites in the given orbital plane j in the base constellation configuration plan; where $K_j$ corresponds to the number of satellites added to the given orbital plane, and/or where $N_j=K_j+M_j$ corresponds to the total number of satellites in the given orbital plane in the corresponding final constellation configuration plan 1515, as respectively. For example, a number of additional satellites $K_j$ is determined for addition to a base number of satellites $M_j$ in some or all given orbital planes of a base-level constellation configuration plan 1515, to render a final number of satellites $N_j=M_j+K_j$ in each given orbital plane for the redundant-level constellation configuration plan 1515. Different orbital planes can be configured with different numbers of additional satellites $K_j$, for example, as a function of having different values of $M_j$, and/or based on relative importance of maintaining a threshold number of satellites within different orbital planes, where different orbital planes are configured with different selected threshold failure tolerances accordingly Some orbital planes can optionally have a value of $K_j=0$, and/or all orbital planes can strictly have a value of $K_j>0$. The total number of additional satellites K determined for addition to a base number of satellites M in a base-level constellation configuration plan 1515 to render a total of N satellites of the redundant-level constellation configuration plan 1515 with P orbital planes can thus be expressed as $K=\Sigma_{j=1}^{P} K_j$.

In some embodiments, the value of K and/or N for the satellite constellation as a whole, and/or the value of $K_j$ and/or $N_j$ for a given orbital plane j, is determined based on the threshold failure tolerance level being determined based on a probability of satellite failure. The probability of satellite failure can be expressed as and/or determined based on probability of failure within an amount of time a satellite is included in a satellite constellation, such as a number of years and/or indefinitely. The probability of satellite failure can be expressed as and/or determined based on probability of failure within an amount of time from a time a satellite is deployed until a time that additional satellites will be added to the constellation in subsequent launches to enable failed satellites to be replaced, such as the probability of failure within a timeframe of a given constellation configuration plan before its transition to an enhanced constellation configuration plan as discussed in conjunction with FIGS. 15N-15P.

Failure of a satellite can correspond to the satellite no longer being operational, for example, based on: not transmitting navigation signals; not generating navigation signals and/or orbital position solutions correctly; not communicating with neighboring satellites as configured; and/or otherwise not operating in accordance with some or all of its configured functionality. Failure of a satellite can be detected based on the self-monitoring of FIG. 6 and/or the neighborhood monitoring of FIGS. 7A-7C. Failure of a satellite can be known or unknown at a given time. Failure of a given satellite can be temporal)/or permanent.

The threshold failure tolerance level can be based on a probability distribution of number of satellite failures within the corresponding time period, which can be expressed as and/or based on a binomial distribution of this probability of failure. For example, for a given M, K is selected such that the number of successes in N=M+K trials, corresponding to the N satellites in the satellite constellation as a whole, is no greater than K with at least a threshold probability, where a success of a given trial corresponds to the corresponding satellite failing withing the time period. As another example, for a given $M_j$ of a given orbital plane, $K_j$ is selected such that the expected number of successes in $N_j=M_j+K_j$ trials, corresponding to the $N_j$ satellites in the given orbital plane, is no greater than $K_j$ with at least a threshold probability, where a success of a given trial corresponds to the corresponding satellite failing withing the time period. The threshold probability can correspond to a predetermined high threshold probability value, for example, to guarantee that the coverage requirement 1518 is not compromised with this threshold probability value. This threshold probability value can be indicated in the coverage requirement data 1514 and/or can be dictated by the threshold failure tolerance level. As satellite failures may not be independent events and/or may not have equivalent probabilities for all satellites, a different probability distribution can optionally be utilized.

In some cases, all satellites are treated as having a same probability of failure. Alternatively, all satellites in a same plane are treated as having a same probability of failure, where satellites indifferent planes are treated as having different probabilities of failure, for example, based on having different altitudes, different inclinations, being deployed in different launches, and/or being deployed via different orbital transfer vehicles, and/or other differences. Alternatively, any different satellites 110 included in and/or to be deployed in a satellite constellation system 100 can optionally have different failure probabilities based on: being at different altitudes; being in different orbital planes; having different physical components; having different software; being built at different times; being built by different personnel and/or companies; having different current operational status; being configured to perform different functionality; being deployed in different launches; and/or other reasons. In some embodiments, different satellites 110 have different probabilities of failure based on being included in the satellite constellation system 100 for differing durations of time, for example based on being added to the satellite constellation system 100 in different constellation configuration plans 1515 in embodiments where the satellite constellation transitions between multiple constellation configuration plans 1515 in over time, and/or where older satellites have a higher probability of failure than newer satellites.

Alternatively, rather than determining and/or predicting a probability of satellite failure for satellites 110, the probability of satellite failure can be configured as a predetermined failure rate, a failure rate in accordance with one or more standards, a user-configured threshold, and/or another predetermined value. For example, the threshold failure tolerance level can indicate tolerance up to a failure rate of a threshold number and/or proportion of satellites failure per orbital plane, where each orbital plane includes a corresponding number of additional satellites in the redundant-level constellation configuration plan 1515. As a particular example, the threshold failure tolerance level can indicate tolerance up to a failure of one satellite per orbital plane or another number of satellites per orbital plane, which can optionally be regardless of the number of satellites per orbital plane. As another particular example, the threshold failure tolerance level can indicate tolerance up to a failure of one satellite in the entire satellite constellation, or another number of satellites in the entire satellite constellation.

In some embodiments, some or all of the K additional satellites can be included in one or more new, redundant orbital planes of the redundant-level constellation configuration plan, for example, to account for failure of an entire orbital plane. For example, this can be based on fault tolerance for orbital transfer vehicles and/or launch vehicles that are responsible for deploying satellites into a respective orbital planes, where failure of one orbital transfer vehicles prior to deployment of some or all satellites would result in no satellites, or an insufficient number of satellites, being included in the orbital plane. A number of redundant orbital planes beyond the P orbital planes of a base-level constellation configuration plan 1515 can be selected based on a probability of failure, or other threshold failure tolerance level, associated with the orbital transfer vehicles, a launch vehicle, or other deployment mechanisms for deployment of satellites into a respective orbital plane. Satellites in these additional redundant orbital planes can be deployed via redundant orbital transfer vehicles and/or launch vehicles. Altitude, inclination, and/or number of satellites in these redundant orbital planes can be the same as the altitude, inclination, and/or number of satellites of corresponding base-level orbital planes.

In some embodiments, the value of K and/or N for the entire satellite constellation and/or individual orbital planes is alternatively or additionally determined based on a cost threshold and/or based on minimizing cost, such as a monetary cost associated with a number of satellites K and/or N and/or a time required to build the satellites K and/or N. For example, the value of K and/or N is selected such that a corresponding threshold cost is not exceeded. As a particular example, the value of K is equal to exactly one for some or all orbital planes, providing a minimum level of redundancy to reduce additional cost for each orbital plane.

In some embodiments, the constellation configuration plans 1515.1, 1515.2, and/or 1515.3 of FIGS. 15B, 15C, and/or 15D, respectively, can correspond to example base-level constellation configuration plans 1515. One or more redundant-level constellation configuration plans 1515 can be determined based on one or more of these example base-level constellation configuration plans 1515 for implementation by satellite constellation system 100 to account for possible satellite failure, while ensuring that coverage requirements 1518 are met, for example, up to a threshold failure tolerance level.

Implementing a given constellation configuration plan 1515 can include deploying its redundant-level constellation configuration plan that includes: at least one additional satellite in at least one of its orbital plane from its base-level constellation configuration plan; at least one additional satellite in all of its orbital planes from its base-level constellation configuration plan; and/or at least one additional satellite in a new orbital plane from its base-level constellation configuration plan.

As a particular example, if the base-level constellation configuration plan 1515.1 includes nine satellites for each of its four orbital planes as discussed previously, a corresponding redundant-level constellation configuration plan 1515.1 can include more than 36 satellites, such as ten or more satellites per each of these four orbital planes and/or one or more satellites in one or more additional orbital planes. Implementing constellation configuration plan 1515.1 can include deploying this corresponding redundant-level constellation configuration plan 1515.1. Implementing constellation configuration plans 1515.2 and/or 1515.3 can similarly include deploying corresponding redundant-level constellation configuration plans 1515.2 and/or 1515.3, respectively, that include: at least one additional satellite in at least one of its orbital plane; at least one additional satellite in all of its orbital planes; and/or at least one additional satellite in a new orbital plane.

In some embodiments, deploying a redundant-level constellation configuration plan 1515 can include implementing one or more satellites, such as its K additional satellites, as dormant satellites, where only a subset of satellites in the satellite constellation, such as M satellites, are active at a given time, for example, by generating and transmitting navigation signals 240. For example, when a satellite fails, one of the dormant satellites, such as another satellite in the same orbital plane, can transition from dormant to active to effectively replace this satellite's functionality. This allocation of only a required number of active satellites can be ideal in conserving resources and/or enabling these dormant satellites to monitor satellites and/or perform other tasks of the satellite constellation other than transmission of navigation signals 240, while still maintaining the coverage requirement via the set of active satellites, such as only M satellites and/or less than all N satellites.

In some embodiment, a dormant satellite becomes active and begins generating and transmitting navigation signals 240, or otherwise begins implementing some or all functionality of a satellite 110, based on detection of another satellite failing. For example, this failed satellite detects its own failure based on the self-monitoring of FIG. 6. As another example, another satellite, such as an active satellite, detects the failed satellite based on the neighborhood monitoring of FIGS. 7A-7C, and relays command data or other data to this dormant satellite indicating it become active. As another example, the dormant satellite itself detects the failed satellite based on the neighborhood monitoring of FIGS. 7A-7C, for example, based on being configured to perform neighborhood monitoring while dormant. A dormant satellite can optionally transition to being active based on receiving inter-satellite communications and/or command data indicating it change its status to begin transmitting navigation signals 240, for example, based on other satellites generating and transmitting command data indicating such status changes as described herein.

Alternatively, in other embodiments, some or all of the K additional satellites can be configured as active participants in the satellite constellation. For example, more than the M satellites of the base-level constellation configuration plan 1515, such as all N satellites, all generate and transmitting navigation signals 240. This can be ideal in further enhancing the coverage level provided by the satellite constellation beyond the coverage requirements 1518 at times when no satellites have failed.

In some embodiments, an orbital transfer vehicle (OTV) is implemented to deploy each set of satellites in each corresponding orbital plane. For example, an OTV of an orbital plane j deploys at least the $M_j$ in orbital plane j. In such embodiments, the OTV of a given orbital plane can further be utilized as an in-orbit spare hosting the navigation payload and/or serving as a backup in the case of a primary satellite failure, in addition to being implemented to deploy some or all of the satellites 110 of its orbital plane. For example, some or all OTVs utilized to deploy satellites 110 of satellite constellation 100 can be configured to implement its own satellite processing system 300 via its own on-board hardware and/or processing resources, and/or can otherwise be implemented as an additional node of the satellite constellation system 100. The OTV of a given orbital plane j can thus be implemented as some or all of the $K_j$ additional satellites of orbital plane j, while having some or all different hardware, software, and/or functionality from the respective satellites 110 that it deploys. This can be ideal in providing redundant coverage via the OTV, which is already positioned in the orbital plane based on being responsible for deployment of the satellites 110 of this orbital plane. In embodiments where these OTVs are implemented to provide redundant coverage in addition to each deploying $M_j$ satellites 110 in their respective orbital planes, a threshold failure tolerance level of one satellite failure per orbital plane can be achieved.

In various embodiments, some or all of the constellation coverage analysis 1510 is implemented by at least one processor of one or more computing devices. For example, the at least one processor executes operational instructions stored in at least one memory of the one or more computing devices to generate the coverage level data 1525 for one or more given constellation configuration plan 1515, and/or to select a proper subset of constellation configuration plans 1515 from a plurality of constellation configuration plan options.

The operational instructions executed by the at least one processor implementing the constellation coverage analysis 1510 can include: receiving user input indicating, accessing in memory, automatically generating, and/or otherwise determining the coverage modeling data 1512; receiving user input indicating, accessing in memory, automatically generating, and/or otherwise determining the one or more coverage requirements 1518 of coverage requirement data 1514; automatically executing one or more simulation functions in accordance with the coverage modeling data 1512 for each of a set of constellation configuration plan options to generate coverage level data 1525 for some or all of the constellation configuration plan options; and/or automatically selecting one or more constellation configuration plans 1515 from the constellation configuration plan options based on comparing the coverage level data 1525 of one or more corresponding constellation configuration plans 1515 to one or more coverage requirements 1518 and/or one or more cost requirements 1519, for example, where only ones of the constellation configuration plans 1515 with coverage data meeting coverage requirements 1518 and/or cost requirements 1519 are proposed and/or selected automatically by least one processor implementing the constellation coverage analysis 1510; and/or facilitating display of some or all of the constellation configuration plan data 1520 via at least one display device based on sending the constellation configuration plan data 1520 to at least one client device for display via the display device and/or sending instructions to the display device to display the constellation configuration plan data 1520.

The coverage level data 1525 can indicate particular regions of and/or proportions of the earth's surface that are in view of a given number of satellites, and/or how many satellites are expected to be in view of a given client device in one or more particular regions of the earth's surface. In particular, this coverage level data 1525 can indicate, for a given client device anywhere on earth and/or within a particular region on earth, how many navigation signals 240 are expected and/or guaranteed to be received by the given client device, and/or a distribution of number of signals expected and/or guaranteed to be received by client device in different locations anywhere on earth and/or within the particular region. This can be expressed as a number of satellites in view, where a number of different navigation signals 240 from different satellites 110 received by a given client device to generate their enhanced position and/or time data 922 as described herein at a given time and/or while in a given location is equal to and/or otherwise dictated by the number of satellites in view.

As used herein, coverage level data 1525 can indicate simulated, projected, computed, and/or actual coverage provided by satellites in a satellite constellation system when configured in accordance with the corresponding constellation configuration plan 1515. The coverage level data 1525 can indicate and/or be based on one or more of: an expected number of satellites in view by a client device anywhere on earth globally; a minimum number of satellites in view by a client device anywhere on earth globally; an expected number of satellites in view by a client device anywhere on earth globally; a distribution of the minimum number and/or expected number of satellites in view across different regions on earth globally; an expected number of satellites in view by a client device within a predefined subset of the earth's surface, such as within any geographic region defined as a population center; a minimum number of satellites in view by a client device within a predefined subset of the earth's surface, such as within any geographic region defined as a population center; a distribution of the minimum number and/or expected number of satellites in view across different regions within the predefined subset of the earth's surface; at least one dilution of precision (DOP) measure, such as a horizontal dilution of precision (HDOP), a vertical dilution of precision (VDOP), a position dilution of precision (PDOP), and/or one or more another DOP measures; and/or other metrics indicating an amount of, percentage of, stability of, probability of, or other measure of coverage. One or more of these measures can be in accordance with one or more elevation masks, such as a five degree elevation mask, a fifteen degree elevation mask, and/or one or more other elevation masks at one or more other degree values.

One or more of these measures can be in accordance with the threshold tolerance level. For example, the coverage level data 1525 can indicate some or all of these measures as a function of number of satellite failures in one or more orbital planes, and/or can indicate some or all of these measures for a threshold number and/or proportion of satellites whose failure can be tolerated as indicated by the threshold tolerance level. As another example, the coverage level data 1525 can indicate some or all of these measures for the redundant-level constellation configuration plan 1515 and/or for the base-level constellation configuration plan 1515. In some embodiments, the coverage level data 1525 can indicate one or more of these measures for the base-level constellation configuration plan 1515, where the redundant-level constellation configuration plan 1515 is configured to maintain at least the coverage level data 1525 for the base-level constellation configuration plan 1515 in accordance with the threshold failure tolerance level.

As used herein, first coverage level data can be more favorable than second coverage level data based on: the first coverage level data indicating an expected number of satellites in view by a client device anywhere on earth globally that is greater than and/or otherwise more favorable than this indication in the second coverage level data; the first coverage level data indicating a minimum number of satellites in view by a client device anywhere on earth globally an expected number of satellites in view by a client device anywhere on earth globally that is greater than and/or otherwise more favorable than this indication in the second coverage level data; the first coverage level data indicating a distribution of the minimum number and/or expected number of satellites in view across different regions on earth globally, such as within any geographic region defined as a population center, that is wider spread than, more favorably distributed than and/or otherwise more favorable than this indication in the second coverage level data; the first coverage level data indicating an expected number of satellites in view by a client device within a predefined subset of the earth's surface that is greater than and/or otherwise more favorable than this indication in the second coverage level data; the first coverage level data indicating a minimum number of satellites in view by a client device within a predefined subset of the earth's surface, such as within any geographic region defined as a population center, that is greater than and/or otherwise more favorable than this indication in the second coverage level data; the first coverage level data indicating a distribution of the minimum number and/or expected number of satellites in view across different regions within the predefined subset of the earth's surface more favorable than this indication in the second coverage level data; the first coverage level data indicating an average HDOP and/or a distribution of HDOP that is more favorable than this indication in the second coverage level data; the first coverage level data indicating an average VDOP and/or a distribution of VDOP that is more favorable than this indication in the second coverage level data; the first coverage level data indicating an average PDOP and/or a distribution of PDOP that is more favorable than this indication in the second coverage level data; the first coverage level data being in accordance with a greater threshold tolerance level than the second coverage level data and/or being able to tolerate a greater number of satellite failures than the second coverage level data; the first coverage level data corresponding to a given redundant-level constellation configuration plan and the second coverage level data corresponding to the respective base-level constellation configuration plan of this given redundant-level constellation configuration plan; and/or the first coverage level data otherwise indicating an amount of, percentage of, stability of, probability of, or other one or more measures of coverage that are individually and/or collectively more favorable than that of the second coverage level.

In some cases, the first coverage level data can be more favorable than second coverage level data based on differences in configuration of a corresponding first constellation configuration plan and a corresponding second constellation configuration plan, respectively. For example, the first coverage level data can be more favorable than second coverage level data based on the selected altitude 1505, inclination 1506, and/or number of satellites 1507 of the corresponding first constellation configuration plan inducing the more favorable coverage than the selected altitude 1505, inclination 1506, and/or number of satellites 1507 of the corresponding second constellation configuration plan.

As a particular example, a first coverage level data can be more favorable than second coverage level data in population centers based on the inclination 1506 of some or all orbital planes of the corresponding first constellation configuration plan being non-polar inclinations. For example, the first coverage level data can be more favorable than second coverage level based on the corresponding first constellation configuration plan having a greater number and/or proportion of non-polar inclinations than the corresponding second constellation configuration plan.

A given coverage requirement 1518 can correspond to any requirement regarding minimum and/or average coverage level provided by the satellite constellation system, such as a minimum and/or average value for one or more of the metrics of the coverage level data 1525. This minimum and/or average coverage level can optionally be required up to a number of failures as required by the threshold failure tolerance level. As used herein a first coverage requirement can be more restrictive than a second coverage requirement based on the first coverage requirement a more favorable level of coverage than the second coverage requirement. As used herein, coverage level data can meet and/or compare favorably to a given coverage requirement based on indicating the corresponding constellation configuration plan adheres to the given coverage requirement and/or is at least as favorable as a threshold coverage level associated with the given coverage requirement.

As used herein, first coverage level data can be more favorable than second coverage level data based on: the first coverage level data comparing more favorably to a given coverage requirement 1518 than the second coverage level data; the first coverage level data comparing more favorably to a greater number of coverage requirements 1518 than the second coverage level data; the first coverage level data exceeding minimum threshold requirements of one or more coverage requirements 1518 by a greater amount than the second coverage level data; and/or the first coverage level data being more favorable relative to the one or more coverage requirements 1518 than the second coverage level data.

A coverage requirement 1518 can correspond to a one-in-view population center requirement. A one-in-view population center requirement can require that at least one satellite is expected and/or guaranteed to be in view of any given client device in any population center on earth and/or of any given client device within a threshold area percentage across all population centers on earth. For example, this one-in-view population center requirement can be ideal in ensuring that most and/or all client devices in population centers, such as most and/or all client devices in view of open skies in these population centers, are guaranteed and/or expected to receive a navigation signal 240 from one satellite 110 of satellite constellation system 100. For example, this one-in-view population center requirement can help ensure that most and/or all client devices in population centers can generate enhanced position and/or time data 922 at a given time and/or in the given location based on receiving at least one navigation signal 240, for example, in conjunction with receiving and/or processing one or more GNSS signals 132 as illustrated in FIGS. 8A and 8B and as described previously. In some embodiments, the constellation configuration plan 2515.1 of FIG. 15B adheres to, and/or is configured based on, the one-in-view population center requirement.

As used herein, a population center can correspond to any predefined portion of earth's landmass and/or oceans. In some embodiments, a set of all population centers can be defined as all portions of the earth between one or more particular predefined latitude and/or longitude bounds, such as all portions of the earth between 60 degrees latitude and 22 degrees latitude. Alternatively or in addition, the set of all population centers can include some or all of the contiguous United States; some or all of Canada; some or all of China; some or all of Japan; some or all of Korea; some or all of Europe; and/or some or all of other continents and/or countries on earth. Alternatively or in addition, the set of all population centers can correspond to some or all geographic regions that have a population density greater than a predefined threshold.

The one-in-view population center requirement can indicate that any client device within a population center on earth, and/or any client devices in view of open skies within a population center on earth, is: guaranteed to be view of at least of at least one satellite of the satellite constellation system, and/or is expected to be in view of at least of at least one satellite of the satellite constellation system by at least a predefined threshold probability level.

The one-in-view population center requirement can alternatively or additionally indicate that at least a predefined threshold percentage of area corresponding to population centers on earth is: guaranteed to be view of at least of at least one satellite of the satellite constellation system, and/or is expected to be in view of at least of at least one satellite of the satellite constellation system by at least a predefined threshold probability level.

The one-in-view population center requirement can indicate that any client device within a predefined latitude range, such as a latitude range between 60 degrees latitude and 22 degrees latitude is: guaranteed to be view of at least of at least one satellite of the satellite constellation system, and/or is expected to be in view of at least of at least one satellite of the satellite constellation system by at least a predefined threshold probability level. The one-in-view population center requirement can alternatively or additionally indicate that at least a predefined threshold percentage of area within the predefined latitude range is: guaranteed to be view of at least of at least one satellite of the satellite constellation system, and/or is expected to be in view of at least of at least one satellite of the satellite constellation system by at least a predefined threshold probability level.

This one-in-view population center requirement can be further based on a given masking elevation, where the client device within a population center on earth in view of open skies within a population center on earth, is guaranteed to and/or expected be view of at least of at least one satellite of the satellite constellation system at elevations that are greater than and/or are in accordance with the masking elevation, such as a masking elevation of five degrees and/or a masking elevation of fifteen degrees.

Different one-in-view population center requirements can be in accordance with different masking elevations. A first one-in-view population center requirement with a first masking elevation can be less strict than a second one-in-view population center requirement with a second masking elevation based on the first masking elevation being less than, and/or masking a smaller amount of elevation than, the second masking elevation. For example, the first one-in-view population center requirement is in accordance with a five degree masking elevation, and the second in-view population center requirement is in accordance with a fifteen degree masking elevation.

FIGS. 15F and 15G depict example coverage level data 1525.1 that compares favorably to a one-in-view population center requirement. FIG. 15F depicts coverage level data 1525.1 as a heatmap illustrating number of satellites in view at particular latitudes and longitudes of the Earth, applying a five degree masking elevation. FIG. 15G depicts coverage level data 1525.1 by illustrating the number of satellites in view for different percentiles of these latitudes and longitudes globally, and for different percentiles of these latitudes and longitudes that fall within population centers, applying a five degree masking elevation.

The visual depiction of coverage level data 1525.1 of FIG. 15F and/or FIG. 15G can optionally be automatically generated by the at least one processing system implementing the constellation coverage analysis 1510. The visual depiction of coverage level data 1525.1 of FIG. 15F and/or FIG. 15G can be displayed via a display device based on being sent to a corresponding client device for display by the at least one processor, and/or at least one corresponding network interface, that implements the constellation coverage analysis 1510.

This coverage level data 1525.1 FIG. 15F and/or FIG. 15G can be based on performance of a corresponding base-level constellation configuration plan, for example, without yet accounting for failure tolerance. Other embodiments of coverage level data 1525 can be based on performance of a corresponding redundant-level constellation configuration plan, for example, accounting for one or more satellite failures as tolerated by failure tolerance threshold.

In some embodiments, the coverage level data 1525.2 of FIG. 15F and/or FIG. 15G is provided by a satellite constellation system 100 configured in accordance with the constellation configuration plan 1515.1 of FIG. 15B. In some embodiments, the constellation configuration plan 1515.1 of FIG. 15B is selected and/or implemented as satellite constellation system 100 based on its coverage level data 1525.1 being determined to compare favorably to the one-in-view population center requirement and/or based on its coverage level data 1525.1 being determined have a most favorable cost, such as a lowest number of total satellites and/or orbital planes, of a plurality of constellation configuration plan options determined to compare favorably to the one-in-view population center requirement.

Establishing a coverage requirement to only encompass population centers can improve the technology of satellite constellation systems and/or navigation systems based on prioritizing coverage in high density areas, where more users and/or more client devices require and/or could benefit from generating generate enhanced position and/or time data 922 based on receiving one of more receiving the navigation signals 240. Configuring a satellite constellation system via a constellation configuration plan 1515 based on having coverage level data comparing favorably to one-in-view population center requirement can improve the technology of satellite constellation systems and/or navigation systems based on prioritizing coverage in high density areas while also optimizing and/or reducing the cost and/or time resources necessary to implement this satellite constellation system. For example, this can reduce the cost and/or time required to launch all satellites required for a given constellation system and/or navigation system, while still providing a threshold level of coverage to high-density regions of the world, based on: requiring fewer orbital planes, fewer satellites per orbital plane, and/or fewer total satellites.

A coverage requirement 1518 can alternatively or additionally correspond to a one-in-view global requirement. The one-in-view global requirement can be stricter than the one-in-view population center requirement.

A one-in-view global requirement can require that at least one satellite is expected and/or guaranteed to be in view of any given client device anywhere on earth and/or of any given client device within a threshold area percentage across all of earth. For example, this one-in-view global requirement can be ideal in ensuring that most and/or all client devices globally, such as most and/or all client devices in view of open skies globally, are guaranteed and/or expected to receive a navigation signal 240 from one satellite 110 of satellite constellation system 100. For example, this one-in-view global requirement can help ensure that most and/or all client devices anywhere on earth can generate enhanced position and/or time data 922 at a given time and/or in the given location based on receiving at least one navigation signal 240, for example, in conjunction with receiving and/or processing one or more GNSS signals 132 as illustrated in FIGS. 8A and 8B and as described previously. In some embodiments, the constellation configuration plan 2515.2 of FIG. 15C adheres to, and/or is configured based on, the one-in-view global requirement.

This one-in-view global requirement can be further based on a given masking elevation, where the client device any on earth in view of open skies is guaranteed to and/or expected be view of at least of at least one satellite of the satellite constellation system at elevations that are greater than and/or are in accordance with the masking elevation, such as a masking elevation of five degrees and/or a masking elevation of fifteen degrees.

Different one-in-view global requirements can be in accordance with different masking elevations. A first one-in-view global requirement with a first masking elevation can be less strict than a second one-in-view global requirement with a second masking elevation based on the first masking elevation being less than, and/or masking a smaller amount of elevation than, the second masking elevation. For example, the first one-in-view global requirement is in accordance with a five degree masking elevation, and the second in-view global requirement is in accordance with a fifteen degree masking elevation.

FIGS. 15H and 15I depict example coverage level data 1525.2 that compares favorably to a one-in-view global requirement.

FIG. 15H depicts coverage level data 1525.2 as a heatmap illustrating number of satellites in view at particular latitudes and longitudes of the Earth, applying a five degree masking elevation. FIG. 15I depicts coverage level data 1525.2 by illustrating the number of satellites in view for different percentiles of these latitudes and longitudes globally, and for different percentiles of these latitudes and longitudes that fall within population centers, applying a five degree masking elevation.

The visual depiction of coverage level data 1525.2 of FIG. 15H and/or FIG. 15I can optionally be automatically generated by the at least one processing system implementing the constellation coverage analysis 1510. The visual depiction of coverage level data 1525.2 of FIG. 15H and/or FIG. 15I can be displayed via a display device based on being sent to a corresponding client device for display by the at least one processor, and/or at least one corresponding network interface, that implements the constellation coverage analysis 1510.

This coverage level data 1525.2 FIG. 15H and/or FIG. 15I can be based on performance of a corresponding base-level constellation configuration plan, for example, without yet accounting for failure tolerance. Other embodiments of coverage level data 1525 can be based on performance of a corresponding redundant-level constellation configuration plan, for example, accounting for one or more satellite failures as tolerated by failure tolerance threshold.

In some embodiments, the coverage level data 1525.2 of FIG. 15H and/or FIG. 15I is provided by a satellite constellation system 100 configured in accordance with the constellation configuration plan 1515.2 of FIG. 15C. In some embodiments, the constellation configuration plan 1515.2 of FIG. 15C is selected and/or implemented as satellite constellation system 100 based on its coverage level data 1525.2 being determined to compare favorably to the one-in-view global requirement and/or based on its coverage level data 1525.2 being determined have a most favorable cost, such as a lowest number of total satellites and/or orbital planes, of a plurality of constellation configuration plan options determined to compare favorably to the one-in-view global requirement.

The coverage level data 1525.1 of FIGS. 15F and 15G can also compare favorably to the one-in-view global requirement. However, the coverage level data 1525.1 of FIGS. 15F and 15G can be less favorable than the coverage level data 1525.2 of FIGS. 15H and 15I, and/or the coverage level data 1525.2 of FIGS. 15H and 15I can compare more favorably to the one-in-view global requirement than the coverage level data 1525.1 of FIGS. 15F and 15G.

Establishing a coverage requirement to require global coverage can improve the ensuring that any users and/or more client devices that require and/or could benefit from receiving the navigation signal 240 are expected and/or guaranteed to receive at least one navigation signal 240, regardless of whether they are within a population center. Establishing a coverage requirement to only require one satellite in view, rather than a greater number of satellites in view, can improve the technology of satellite constellation systems by ensuring that most and/or all client devices can generate enhanced position and/or time data 922 based on receiving one of more receiving the navigation signals 240, for example, while also leveraging the coverage of one or more GNSS constellations to ensure that a necessary number of GNSS signals 132 are also received by a given client device to enable this generate enhanced position and/or time data 922. Configuring a satellite constellation system via a constellation configuration plan 1515 based on having coverage level data comparing favorably to one-in-view global requirement can improve the technology of satellite constellation systems and/or navigation systems based on prioritizing receipt of at least one navigation signal 240 globally while also optimizing and/or reducing the cost and/or time resources necessary to implement this satellite constellation system. For example, this can reduce the cost and/or time required to launch all satellites required for a given constellation system and/or navigation system, while still providing a threshold level of coverage globally, based on: requiring fewer orbital planes, fewer satellites per orbital plane, and/or fewer total satellites.

A coverage requirement 1518 can alternatively or additionally correspond to a population center full navigation requirement. The population center full navigation requirement can be stricter than the than the one-in-view population center requirement and/or the one-in-view global requirement.

A population center full navigation requirement can require that at least a threshold number of satellites is expected and/or guaranteed to be in view of any given client device in a population center and/or of any given client device within a threshold area percentage across all of earth corresponding to a population center. The population center full navigation requirement can be similar to the one-in-view population center requirement, where the threshold number of satellites of the one-in-view population center requirement is equal to one, and where the threshold number of satellites of the population center full navigation requirement is four, or a different number that is strictly greater than one.

This threshold number of satellites can correspond to four satellites and/or another number of satellites corresponding to a number of navigation signals 240 required to generate a positioning solution by a client device 160 without also receiving GNSS signals as described previously. For example, this population center full navigation requirement can be ideal in ensuring that most and/or all client devices in population centers, such as most and/or all client devices in view of open skies in population centers, are guaranteed and/or expected to receive at least the threshold number of navigation signal 240 from the threshold number of satellites in satellite constellation system 100 from their given location and/or at a given time. For example, this population center full navigation requirement can help ensure that most and/or all client devices in population centers can generate enhanced position and/or time data 922 at a given time and/or in the given location based on receiving the threshold number of navigation signals 240, for example, without relying on also receiving and processing one or more GNSS signals 132 as illustrated in FIG. 8C and as described previously. In some embodiments, the constellation configuration plan 2515.3 of FIG. 15D adheres to, and/or is configured based on, the population center full navigation requirement.

The population center full navigation requirement can be based on one or more threshold expected and/or guaranteed DOP threshold metrics achievable all client devices in population centers and/or achievable at least a threshold proportion of area of the population centers. This can include threshold VDOP, HDOP, and/or PDOP metrics. The threshold VDOP, HDOP, and/or PDOP can be based on VDOP, HDOP, and/or PDOP metrics achieved by a GNSS system such as GPS and/or Galileo in population centers.

This population center full navigation requirement can be further based on a given masking elevation, where the client device in a population center in view of open skies is guaranteed to and/or expected be view of at least of the threshold number of satellites of the satellite constellation system at elevations that are greater than and/or are in accordance with the masking elevation, such as a masking elevation of five degrees and/or a masking elevation of fifteen degrees.

Different population center full navigation requirements can be in accordance with different masking elevations. A first population center full navigation requirement with a first masking elevation can be less strict than a second population center full navigation requirement with a second masking elevation based on the first masking elevation being less than, and/or masking a smaller amount of elevation than, the second masking elevation. For example, the first population center full navigation requirement is in accordance with a five degree masking elevation, and the second population center full navigation requirement is in accordance with a fifteen degree masking elevation.

A coverage requirement 1518 can alternatively or additionally correspond to a global full navigation requirement. The global full navigation requirement can be stricter than the than the one-in-view population center requirement, the one-in-view global requirement, and/or the population center full navigation requirement.

A global full navigation requirement can require that at least a threshold number of satellites is expected and/or guaranteed to be in view of any given client device anywhere on earth and/or of any given client device within a threshold area percentage across all of earth. The population center full navigation requirement can be similar to the one-in-view population center requirement, where the threshold number of satellites of the one-in-view global requirement is equal to one, and where the threshold number of satellites of the global full navigation requirement is four, or a different number that is strictly greater than one. The threshold number of satellites of the global full navigation requirement can be the same threshold number of satellites as the population center full navigation requirement.

This threshold number of satellites can correspond to four satellites and/or another number of satellites corresponding to a number of navigation signals 240 required to generate a positioning solution by a client device 160 without also receiving GNSS signals as described previously. For example, this global full navigation requirement can be ideal in ensuring that most and/or all client devices globally, such as most and/or all client devices in view of open skies globally, are guaranteed and/or expected to receive at least the threshold number of navigation signal 240 from the threshold number of satellites in satellite constellation system 100 from their given location and/or at a given time. For example, this global full navigation requirement can help ensure that most and/or all client devices across the earth can generate enhanced position and/or time data 922 at a given time and/or in the given location based on receiving the threshold number of navigation signals 240, for example, without relying on also receiving and processing one or more GNSS signals 132 as illustrated in FIG. 8C and as described previously. In some embodiments, the constellation configuration plan 2515.3 of FIG. 15D adheres to, and/or is configured based on, the global full navigation requirement.

The global full navigation requirement can be based on one or more threshold expected and/or guaranteed DOP threshold metrics achievable all client devices globally and/or achievable at least a threshold proportion of area globally. This can include threshold VDOP, HDOP, and/or PDOP metrics. The threshold VDOP, HDOP, and/or PDOP can be based on VDOP, HDOP, and/or PDOP metrics achieved by a GNSS system such as GPS and/or Galileo in population centers.

This global full navigation requirement can be further based on a given masking elevation, where the client device anywhere globally in view of open skies is guaranteed to and/or expected be view of at least of the threshold number of satellites of the satellite constellation system at elevations that are greater than and/or are in accordance with the masking elevation, such as a masking elevation of five degrees and/or a masking elevation of fifteen degrees.

Different global full navigation requirements can be in accordance with different masking elevations. A first global full navigation requirement with a first masking elevation can be less strict than a second global full navigation requirement with a second masking elevation based on the first masking elevation being less than, and/or masking a smaller amount of elevation than, the second masking elevation. For example, the first global center full navigation requirement is in accordance with a five degree masking elevation, and the second global full navigation requirement is in accordance with a fifteen degree masking elevation.

FIGS. 15J-15M depict example coverage level data 1525.3 that compares favorably to a population center full navigation requirement and a global full navigation requirement. FIG. 15J depicts coverage level data 1525.3 as a heatmap illustrating number of satellites in view at particular latitudes and longitudes of the Earth, applying a five degree masking elevation. FIG. 15K depicts coverage level data 1525.3 by illustrating the number of satellites in view for different percentiles of these latitudes and longitudes globally, and for different percentiles of these latitudes and longitudes that fall within population centers, applying a five degree masking elevation. FIG. 15L depicts coverage level data 1525.3 by illustrating HDOP, VDOP, and PDOP for different percentiles of these latitudes and longitudes that fall within population centers, applying a five degree masking elevation. FIG. 15M depicts coverage level data 1525.3 by illustrating HDOP, VDOP, and PDOP for different percentiles of these latitudes and longitudes globally, applying a five degree masking elevation.

The visual depiction of coverage level data 1525.3 of FIGS. 15J, 15K, 15L, and/or 15M can optionally be automatically generated by the at least one processing system implementing the constellation coverage analysis 1510. The visual depiction of coverage level data 1525.3 of FIGS. 15J, 15K, 15L, and/or 15M can be displayed via a display device based on being sent to a corresponding client device for display by the at least one processor, and/or at least one corresponding network interface, that implements the constellation coverage analysis 1510.

This coverage level data 1525.3 FIGS. 15J, 15K, 15L, and/or 15M can be based on performance of a corresponding base-level constellation configuration plan, for example, without yet accounting for failure tolerance. Other embodiments of coverage level data 1525 can be based on performance of a corresponding redundant-level constellation configuration plan, for example, accounting for one or more satellite failures as tolerated by failure tolerance threshold.

In some embodiments, the coverage level data 1525.3 of FIGS. 15J, 15K, 15L, and/or 15M is provided by a satellite constellation system 100 configured in accordance with the constellation configuration plan 1515.3 of FIG. 15D. In some embodiments, the constellation configuration plan 1515.3 of FIG. 15D is selected and/or implemented as satellite constellation system 100 based on its coverage level data 1525.3 being determined to compare favorably to the population center full navigation requirement and/or global full navigation requirement, and/or based on its coverage level data 1525.3 being determined have a most favorable cost, such as a lowest number of total satellites and/or orbital planes, of a plurality of constellation configuration plan options determined to compare favorably to the population center full navigation requirement and/or global full navigation requirement.

The coverage level data 1525.1 of FIGS. 15F and 15G can be less favorable than the coverage level data 1525.3 of FIGS. 15J, 15K, 15L, and 15M. The coverage level data 1525.2 of FIGS. 15H and 15I can be less favorable than the coverage level data 1525.3 of FIGS. 15J, 15K, 15L, and 15M.

Establishing a coverage requirement to require full navigation coverage globally and/or within population centers can improve the ensuring that any users and/or more client devices that require and/or could benefit from receiving the navigation signal 240 are expected and/or guaranteed to receive the threshold number of navigation signals required to generate enhanced position and/or time data 922 without the additional reliance upon GNSS signals, and/or are expected and/or guaranteed to utilize navigation signals from satellites 110 in view to generate enhanced position and/or time data 922 with favorable HD OP, VDOP, and/or PDOP. Establishing a coverage requirement to require full navigation, rather than only a single satellite in view, can improve the technology of satellite constellation systems by ensuring that most and/or all client devices can generate enhanced position and/or time data 922 based on receiving one of more receiving the navigation signals 240, for example, without relying upon the coverage of one or more GNSS constellations to ensure that a necessary number of GNSS signals 132 are also received by a given client device to enable this generate enhanced position and/or time data 922. In embodiments where navigation signals are encrypted and/or secure, this can improve the technology of satellite constellation systems by ensuring that most and/or all client devices can generate enhanced position and/or time data 922 that is secure and/or encrypted, which can have more favorable security than generating position and/or time data via use of GNSS signals.

In some cases, the trade-off of cost and coverage levels utilized to select a constellation configuration plan 1515 to implement satellite constellation system 100 can change over time. In particular, in the short term, it may not be possible and/or feasible to implement a population center and/or global full navigation coverage requirement due to the vast number of satellites required to be included in satellite constellation system 100, the monetary cost to build and/or launch this vast number of satellites, and/or the time required to build and/or launch this vast number of satellites, which can be inhibited by capacity and/or scheduling of various launches that can include satellites 110 for inclusion in satellite constellation system 100.

However, in the long term, the time and monetary resources may be available to implement a population center and/or global full navigation coverage requirement via the vast number of satellites required to be included in satellite constellation system 100. Thus, aiming for an eventual constellation configuration plan 1515, such as constellation configuration plan 1515.3, to implement satellite constellation system 100 that implements a population center and/or global full navigation coverage requirement is feasible and favorable, as it provides the most favorable coverage in the long term. As a result, settling upon another constellation plan with less favorable coverage level data 1525 that is feasible in the short term from a cost perspective may not be the most favorable long term solution.

One solution to resolve differences in these trade-offs over time can include intelligently implementing the satellite constellation system 100 via a plurality of constellation configuration plans 1515 over time that incrementally improve the coverage levels achieved by satellite constellation system 100 as more satellites are added. The configuration of these constellation configuration plans 1515 can be selected based on how well they achieve coverage and cost requirements as discussed previously. However, the coverage requirements can become stricter over time to reflect proposed improvements of the satellite constellation system 100's coverage level, and/or the cost requirements become looser over time based on more monetary, personnel, and/or time resources being available over greater spans of time.

Furthermore, the configuration of these constellation configuration plans 1515 can be selected to ensure that deployed satellites of prior constellation configuration plans 1515 are useful and/or need not be reallocated in future constellation configuration plans 1515. For example, an orbital plane 1500 with a first number of satellites is indicated in a given constellation configuration plan 1515. This same orbital plane 1500 with at least the first number of satellites is also included in all subsequent constellation configuration plans 1515 that improve upon the constellation configuration plans 1515 over time. In particular, the set of orbital planes 1500, and their set of respective satellites, of a given constellation configuration plans 1515, can constitute a proper subset of the expanded set of orbital planes 1500, and their expanded set of respective satellites of all subsequent constellation configuration plans 1515. This ensures that existing satellites are utilized in all future constellation configuration plans 1515, for example, optimally and/or favorably, as opposed to being neglected prior resources and/or as opposed to needing to be relocated to a different orbital plane.

Such an embodiment where a satellite constellation is enhanced via transitioning to one or more expanded constellation configuration plans 1515 over time is illustrated in FIGS. 15N-15P. The features and/or functionality introduced in in FIGS. 15N-15P improve the technology of navigation systems and/or satellite constellations by enabling optimal and/or favorable coverage, and/or optimal use of cost resources, at each of a set of timeframes over time based on enabling this progressively expansion of a satellite constellation. This can ensure that in a given timeframe, client devices 160 are receiving a favorable and/or intelligently selected level of coverage, enabling threshold numbers of people and/or threshold proportions of the Earth's surface are expected and/or guaranteed to be in view of at least one satellite 110 to enable generation of enhanced position and time data 922, even though the satellite constellation is not yet "complete". This can ensure that cost resources are utilized intelligently and/or optimally while building the satellite constellation based on ensuring that all satellite are utilized in the final satellite constellation, and based on ensuring that all satellites in a given intermediate rendition of the satellite constellation are instrumental in providing an intermediate level of coverage in the timeframe prior to completion of the final satellite constellation.

As illustrated in FIG. 15N, the constellation configuration plan data 1520 can be generated via constellation coverage analysis 1510 to indicate a plurality of constellation configuration plans 1515.1-1515.C, where C is any number of constellation configuration plans 1515 greater than one. The constellation coverage analysis 1510 of FIG. 15N can implement the constellation coverage analysis 1510 of FIG. 15E. In some embodiments, at least one processor of at least one computing device is utilized to implement some or all features and/or functionality of performing the constellation coverage analysis 1510 of FIG. 15N in a same or similar fashion as the discussion of at least one processor of at least one computing device being utilized to implement some or all features and/or functionality of performing the constellation coverage analysis 1510 of FIG. 15E.

The constellation configuration plans 1515.1-1515.C can be in accordance with an ordering increasing with time to deployment, where constellation configuration plans 1515.1 is proposed and/or scheduled to be deployed first, and where constellation configuration plans 1515.C is scheduled to be deployed last. Each constellation configuration plans 1515.$i$ can correspond to an expansion of a prior constellation configuration plans 1515.$i$−1. Satellites and orbital planes of each constellation configuration plans 1515.$i$ can correspond to a proper subset of satellites and orbital planes of all subsequent constellation configuration plans 1515.$i$+1-1515.C.

The plurality of constellation configuration plans 1515.1-1515.C can also be in an ordering of strictly increasing coverage favorability, where constellation configuration plan 1515.1 has least favorable coverage level data 1525.1 of the set of coverage level data 1525.1-1525.C, and where constellation configuration plan 1515.C has most favorable coverage level data 1525.C of the set of coverage level data 1525.1-1525.C.

Each of the plurality of constellation configuration plans 1515.1-1515.C can be based on, and/or can be selected based on comparing favorably to, a corresponding one of a plurality of coverage requirements 1518.1-1518.C. For example, the plurality of constellation configuration plans 1515.1-1515.C can be in an ordering of strictly increasing coverage favorability based on the plurality of coverage requirements 1518.1-1518.C being in accordance with an ordering increasing with coverage favorability, where coverage requirements 1518.1 is a least strict coverage requirement and where coverage requirements 1518.C is a most strict coverage requirement. Alternatively or in addition, the each of the plurality of constellation configuration plans 1515.1-1515.C can be based on optimizing coverage, such as selecting one of a plurality of constellation configuration plan options that compares favorably to a corresponding one of the plurality of cost requirements 1519.1-1519.C with most favorable coverage level data 1525.

The plurality of constellation configuration plans 1515.1-1515.C can also be in an ordering of strictly decreasing cost favorability, where constellation configuration plan 1515.1 has most favorable cost of the set of constellation configuration plans 1515.1-1515.C, and where constellation configuration plan 1515.C has least favorable cost of the set of coverage level data 1525.1-1515.C. For example, the cost of constellation configuration plans can be greater for later ones in the ordering based on being expanded from prior ones in the ordering, and thus including a greater number of satellites and/or greater amount of monetary, time, and/or personnel resources to build and/or deploy.

In some embodiments, the differential of cost favorability is also strictly decreasing over the ordering of the plurality of constellation configuration plans 1515.1-1515.C, for example, where a difference in cost between constellation configuration plans 1515.$i$−1 and constellation configuration plans 1515.$i$ is less than and/or more favorable than a cost between constellation configuration plans 1515.$i$ and 1515.$i$+1. For example, monetary and/or personnel resources can be available at a greater rate at later times once portions of the satellite constellation are already in space and providing coverage, enabling later constellation configuration plans to have greater levels of expansion from immediately prior constellation configuration plans.

Each of the plurality of constellation configuration plans 1515.1-1515.C can be based on, and/or can be selected based on comparing favorably to, to a corresponding one of a plurality of cost requirements 1519.1-1519.C. For example, the plurality of constellation configuration plans 1515.1-1515.C can be in an ordering of strictly decreasing cost favorability based on the plurality of cost requirements 1519.1-1519.C being in accordance with an ordering decreasing with coverage favorability, where cost requirement 1519.1 requires a lowest cost and/or has a lowest maximum threshold cost, and where cost requirements 1519.C overage requirement 1518.C requires a highest cost and/or has a highest maximum threshold cost. Alternatively or in addition, the each of the plurality of constellation configuration plans 1515.1-1515.C can be based on optimizing cost, such as selecting one of a plurality of constellation configuration plan options that compares favorably to the corresponding one of the plurality of coverage requirements 1518.1-1518.C with a lowest and/or most favorable cost.

Generating the constellation configuration plan data 1520 can be based on not only ensuring that coverage levels and/or cost of each constellation configuration plan 1515 is optimal and/or compares favorably to corresponding coverage requirements 1518 and/or cost requirements 1519, but can further be based on optimizing overall coverage over time and/or final cost of building the satellite constellation over time via the C incremental steps.

For example, intelligently planning for incremental building of the satellite constellation over time to select the plurality of constellation configuration plans 1515.1-1515.C can include selecting the plurality of constellation configuration plans 1515.1-1515.C such that satellites and/or orbital planes 1500 of each constellation configuration plan 1515.$i$ constitute a proper subset of all subsequent constellation configuration plans 1515.$i$+1-1515.C. This can alternatively or additionally include selecting the set of constellation configuration plans 1515.1-1515.C from a plurality of different sets of constellation configuration plans 1515.1-1515.C meeting this criteria, where the selected set of constellation configuration plans 1515.1-1515.C has most favorable overall cost, has a most favorable set of C incremental costs relative to the cost thresholds 1519.1-1519.C, has most favorable overall coverage level data, has a most favorable set of C incremental coverage level data 1525.1-1525.C relative to the coverage thresholds 1518.1-1518.C, and/or based on other criteria. This can alternatively or additionally include optimizing and/or intelligently selecting the number C, for example, based on coverage and/or cost thresholds, projected future cost resources, based on a schedule of launches, and/or based on other criteria.

The constellation configuration plans 1515 of constellation configuration plan data 1520 can correspond to base-level constellation configuration plans 1515 and/or redundant-level constellation configuration plans 1515 as discussed previously. In some embodiments, each of the redundant-level constellation configuration plans 1515.1-1515.C is selected in accordance with a same threshold failure tolerance level.

In some embodiments, as monetary, personnel and/or time resources can increase with time as discussed previously, it can be more feasible over time to provide increased levels of redundancy via greater numbers and/or proportions of spare and/or redundant satellites, to further improve the functioning of each constellation configuration plan. The fault tolerance levels for redundant-level constellation configuration plan 1515 can increase over some or all constellation configuration plans 1515.1-1515.C, for example, where the set of C threshold failure tolerance levels strictly increases, where a corresponding tolerated satellite failure rate increases, and/or where the probability that a given redundant-level constellation configuration plan meets its coverage requirement 1518 and/or adheres to the coverage level data 1525 of its base-level constellation configuration plan is strictly increasing. For example, redundant-level constellation configuration plan 1515.1 has a smallest, and/or otherwise least favorable, fault tolerance level with respect to its base-level constellation configuration plan 1515.1, its coverage requirement 1518.1, and/or its coverage level 1525.1, while the redundant-level constellation configuration plan 1515.C has a greatest, and/or otherwise most favorable, fault tolerance level with respect to its base-level constellation configuration plan 1515.C, its coverage requirement 1518.C, and/or its coverage level 1525.1. This can be ideal in leveraging increased resource availability over time to provide more and more favorable levels of redundancy, despite their relative costs.

Alternatively, in other embodiments, as the baseline coverage level can increase with each constellation configuration plan 1515 as discussed previously, it can be reasonable to sustain and/or provide decreased levels of redundancy via smaller numbers and/or proportions of spare and/or redundant satellites. The fault tolerance levels for redundant-level constellation configuration plan 1515 can decrease over some or all constellation configuration plans 1515.1-1515.C, for example, where the set of C threshold failure tolerance levels strictly decreases, where a corresponding tolerated satellite failure rate decreases, and/or where the probability that a given redundant-level constellation configuration plan meets its coverage requirement 1518 and/or adheres to the coverage level data 1525 of its base-level constellation configuration plan is strictly decreasing. This can be ideal in leveraging the increased baseline coverage level over time to ensure sufficient coverage is continually provided despite handling of lower failure rates. Alternatively, the levels of fault tolerance can decrease with some transitions between constellation configuration plans, can increase with other transitions between constellation configuration plans, and/or can be maintained with other transitions between constellation configuration plans.

In some embodiments, the intelligent planning for incremental building of the satellite constellation over time to select the plurality of constellation configuration plans 1515.1-1515.C can include selecting the plurality of constellation configuration plans 1515.1-1515.C such that satellites and/or orbital planes 1500 of each redundant-level constellation configuration plan 1515.i constitutes a proper subset of some or all subsequent base-level constellation configuration plans 1515.i+1-1515.C. For example, the satellites serving as spares for redundant purposes in one constellation configuration plan 1515 can be active members, or again spare satellites for redundancy, of a subsequent constellation configuration plan 1515. As a particular example, one constellation configuration plan 1515.A is deployed as having $N_A$ satellites, where $K_A$ of these $N_A$ satellites are included for redundancy as discussed previously. A later constellation configuration plan 1515.B, such as the immediately next constellation configuration plan 1515 or other later constellation configuration plan 1515.B, can include $M_B$ satellites in its base-level constellation configuration plan that include some or all of the $K_A$ satellites, for example, where $M_B$ is greater than or equal to $N_A$. Alternatively or in addition, some or all of these $K_A$ satellites are again utilized for redundancy, for example, where the $K_A$ satellites are implemented as a subset of the $K_B$ satellites of the redundant-level constellation configuration plan 1515.B and/or where $K_B$ is greater than or equal to $K_A$. Redundant satellites in some or all orbital planes of constellation configuration plan 1515.A can be implemented as active members, or again as spare satellites, of the orbital planes of constellation configuration plan 1515.B.

In some embodiments, the constellation configuration plan data 1520 is generated prior to deployment of any satellites of a corresponding satellite constellation, where the satellite constellation is incrementally built over time based on implementing constellation configuration plans 1515.1-1515.C one at a time. In other embodiments, constellation configuration plan data 1520 is generated after deployment and/or scheduled deployment of some satellites of an initial satellite configuration, where one or more subsequent constellation configuration plans 1515.1-1515.C correspond to incremental improvements from this initial satellite configuration and/or include all satellites and/or orbital planes of this initial satellite configuration. For example, the constellation configuration plans 1515.1-1515.C are further selected based on: including satellites and/or orbital planes of the initial satellite configuration; and/or actual coverage data, alternatively or in addition to the simulated coverage data, for an already-deployed initial satellite configuration.

In some embodiments, C is equal to three and/or is greater than three. Constellation configuration plans 1515.1-1515.3 can be implemented as constellation configuration plan 1515.1 of FIG. 15B, constellation configuration plan 1515.2 of FIG. 15C, and/or constellation configuration plan 1515.3 of FIG. 15D. For example, these particular constellation configuration plans 1515.1-1515.3 are selected based on their corresponding coverage level data 1525.1-1525.3 discussed in conjunction with FIGS. 15F-15M.

The particular constellation configuration plans 1515.1-1515.3 of FIGS. 15B-15D can be selected in constellation configuration plan data based on each comparing favorably to respective ones of the set of coverage requirements 1518.1-1518.C. For example, coverage requirement 1518.1 corresponds to a one-in-view population center requirement, and constellation configuration plan 1515.1 of FIG. 15B is selected based on having coverage level data 1525.1 comparing favorably to the one-in-view population center requirement as discussed in conjunction with FIGS. 15F and 15G. Alternatively or in addition, coverage requirement 1518.2 corresponds to a one-in-view global requirement, and constellation configuration plan 1515.2 of FIG. 15D is selected based on having coverage level data 1525.2 comparing favorably to the one-in-view global requirement as discussed in conjunction with FIGS. 15H and 15I. Alternatively or in addition, coverage requirement 1518.3 corresponds to a population center full navigation requirement and/or a global full navigation requirement, and constellation configuration plan 1515.3 of FIG. 15E is selected based on having coverage level data 1525.3 comparing favorably to the one-in-view global requirement as discussed in conjunction with FIGS. 15J, 15K, 15L, and 15M. Alternatively or in addition, constellation configuration plans 1515.1, 1515.2, and 1515.3 are selected based on constellation configuration plan 1515.1 having a set of satellites and orbital planes that constitute a proper subset of constellation configuration plan 1515.2 and/or based on constellation configuration plan 1515.2 having a set of satellites and orbital planes that constitute a proper subset of constellation configuration plan 1515.3.

FIGS. 15O and 15P illustrate examples of timelines of transitioning between different constellation configuration plans. For example, a set of constellation configuration plans 1515.1-1515.C are selected based on performing constellation coverage analysis 1510 of FIG. 15N. Alternatively or in addition, the constellation configuration plans 1515.1, 1515.2, and/or 1515.3 of FIGS. 15O and 15P can be implemented as the constellation configuration plan 1515.1 of FIG. 15B, the constellation configuration plan 1515.2 of FIG. 15C, and/or the constellation configuration plan 1515.3 of FIG. 15D, respectively. The set of constellation configuration plans 1515.1-1515.C deployed in the timeline of FIGS. 15O-15P can correspond to base-level constellation configuration plans and/or redundant-level constellation configuration plans.

As illustrated in FIG. 15O, a satellite constellation, such as satellite constellation system 100, can be implemented via each of three satellite configuration plans 1515.1, 1515.2, and/or 1515.3. Prior to a first timeframe, a first set of satellites are launched via one or more launches. For example, this first set of satellites is implemented as the 36 satellites of the four orbital plans 1501 of FIG. 15B, and/or is otherwise implemented to include all satellites of the satellite configuration plans 1515.1. This first set of satellites are added to the satellite constellation, causing the satellite constellation to implement satellite configuration plan 1515.1 and/or to provide coverage at the corresponding coverage level 1525.1 and/or in accordance with the first coverage requirement 1518.1 within the first timeframe. For example, the satellite configuration plans 1515.1 of FIG. 15B provides coverage as illustrated in FIGS. 15F and 15G in the first timeframe, meeting one-in-view population center coverage at a five percent mask as discussed previously. In some embodiments, the constellation configuration plan 1515.1 is implemented as the constellation configuration plan 1515.1 of FIG. 15Q or the constellation configuration plans 1515.1 of FIG. 15R.

Prior to a second time frame, a second set of satellites are launched via one or more launches. For example, this second set of satellites is implemented as the 30 satellites of the three new orbital plans 1502 of FIG. 15C, and/or is otherwise implemented to include all satellites in the set difference between: the full set of satellites of the satellite configuration plans 1515.1, and the full set of satellites of the satellite configuration plans 1515.2. Some or all of these one or more launches of the second set of satellites can be within the first timeframe. The launching of the second set of satellites can be strictly after the launching of the first set of satellites. This second set of satellites are added to the satellite constellation, causing the satellite constellation to transition from satellite configuration plan 1515.1 to satellite configuration plan 1515.2 and/or causing the satellite constellation to provide coverage at the corresponding coverage level 1525.2 and/or in accordance with the second coverage requirement 1518.2 within the second timeframe. For example, the satellite configuration plan 1515.2 of FIG. 15C provides coverage as illustrated in FIGS. 15H and 15I in the second timeframe, meeting one-in-view global coverage at a five percent mask as discussed previously. In some embodiments, the constellation configuration plan 1515.2 is implemented as the constellation configuration plan 1515.2 of FIG. 15Q or the constellation configuration plan 1515.2 of FIG. 15R.

Prior to a third time frame, a third set of satellites are launched via one or more launches. For example, this third set of satellites is implemented as 210 satellites, including the 144 satellites in the eight new orbital planes 1503 of FIG. 15D and including the 56 satellites distributed as 14 new satellites in each of the four existing planes 1501. The third set of satellites can be otherwise implemented to include all satellites in the set difference between: the full set of satellites of the satellite configuration plans 1515.2, and the full set of satellites of the satellite configuration plans 1515.3. Some or all of these one or more launches of the third set of satellites can be within the second timeframe. The launching of the third set of satellites can be strictly after the launching of the first set of satellites and the second set of satellites. This third set of satellites are added to the satellite constellation, causing the satellite constellation to transition from satellite configuration plan 1515.2 to satellite configuration plan 1515.3 and/or causing the satellite constellation to provide coverage at the corresponding coverage level 1525.3 and/or in accordance with the second coverage requirement 1518.3 within the third timeframe. For example, the satellite configuration plan 1515.3 of FIG. 15D provides coverage as illustrated in FIGS. 15J, 15K, 15L, and 15M in the third timeframe, meeting population center full navigation coverage at a five percent mask as well as global full navigation coverage at a five percent mask as discussed previously. In some embodiments, the constellation configuration plan 1515.3 is implemented as the constellation configuration plan 1515.3 of FIG. 15Q or the constellation configuration plan 1515.3 of FIG. 15R.

As illustrated in FIG. 15P, a satellite constellation, such as satellite constellation system 100, can be implemented via each of C satellite configuration plans 1515.1-1515.C. The first three satellite configuration plans 1515.1, 1515.2, and 1515.3 of FIG. 15P can be the same or different from the three satellite configuration plans 1515.1, 1515.2, and 1515.3 of FIG. 15O. C can be greater than or equal to four.

After transitioning across the first three satellite configuration plans 1515.1, 1515.2, and 1515.3 in timeframes 1, 2, and 3 as discussed in conjunction with FIG. 15O, one or more further transitions can similarly be employed over time. Prior to a Cth timeframe, one or more subsequent sets of satellites can be launched in one or more launches. The Cth set of satellites can be otherwise implemented to include all satellites in the set difference between: the full set of satellites of the constellation configuration plans 1515.C−1, and the full set of satellites of the constellation configuration plans 1515.C. In some embodiments, the constellation configuration plans 1515.C−1 is implemented as satellite configuration plan 1515.3. Alternatively, satellite configuration plan 1515.1, 1515.2, or 1515.3 is implemented as the final constellation configuration plan 1515.C, where C is instead equal to one, two, or three. Constellation configuration plans 1515.1, 1515.2, 1515.3, and/or 1515.0 can be implemented as the constellation configuration plans 1515.1, 1515.2, 1515.3, and/or 1515.4, respectively, of FIGS. 15Q and/or 15R.

FIG. 15Q illustrates an example set of constellation configuration plans 1515.1, 1515.2, 1515.3, and 1515.4, and corresponding coverage level data 1525.1, 1525.2, 1525.3, and 1525.4. The satellite constellation system 100 described herein can optionally be implemented with a configuration of any of the constellation configuration plans 1515.1, 1515.2, 1515.3, and 1515.4 and/or can transition from 1515.1 to 1515.2, from 1515.2 to 1515.3, and/or from 1515.3 to 1515.4 over time as illustrated in FIG. 15P.

The set of constellation configuration plans 1515.1, 1515.2, 1515.3, and 1515.4 of FIG. 15Q can correspond to base-level constellation configuration plans and/or redundant-level constellation configuration plans. In some embodiments, the set of constellation configuration plans 1515.1, 1515.2, 1515.3, and 1515.4 of FIG. 15Q can correspond to base-level constellation configuration plans, where additional satellites are added to one or more orbital planes in deployment in accordance with implementing redundant-level constellation configuration plans for these base-level constellation configuration plans.

Coverage level data 1525.1, 1525.2, 1525.3, and 1525.4 can be denoted as comparing favorably or unfavorably to each of a set of coverage requirement 1518.1-1518.4, applied in accordance with a corresponding masking elevation 1528. As illustrated in FIG. 15Q, a check can denote that coverage level data 1525 of a corresponding constellation configuration plans 1515 meets and/or otherwise compares favorably to a corresponding coverage requirement 1518, and an X can denote that coverage level data 1525 of a corresponding constellation configuration plans 1515 does not meet and/or otherwise compares unfavorably to a corresponding coverage requirement 1518. Coverage level data 1525.1 can correspond to the one-in-view population center requirement with a five degree elevation mask; coverage level data 1525.2 can correspond to the one-in-view global requirement with a five degree elevation mask; coverage level data 1525.3 can correspond to the one-in-view global requirement with a five degree elevation mask; coverage level data 1525.3.$a$ can correspond to the population center full navigation requirement with a five degree elevation mask; coverage level data 1525.3.$b$ can correspond to the population center full navigation requirement with a fifteen degree elevation mask; coverage level data 1525.4.$a$ can correspond to the global full navigation requirement with a five degree elevation mask; and/or coverage level data 1525.4.$b$ can correspond to the global full navigation requirement with a fifteen degree elevation mask.

For example, the constellation configuration plans 1515.1, 1515.2, 1515.3, and/or 1515.4, and corresponding coverage level data 1525.1, 1525.2, 1525.3, and/or 1525.4 are included in constellation configuration plan data 1520 of FIG. 15N generated via constellation coverage analysis 1510. Alternatively or in addition, any of the constellation configuration plans 1515.1, 1515.2, 1515.3, and/or 1515.4, of FIG. 15Q and any of their corresponding coverage level data 1525.1, 1525.2, 1525.3, and/or 1525.4 of FIG. 15Q, are generated in constellation configuration plan data 1520 of FIG. 15E.

The example constellation configuration plans 1515.1, 1515.2, 1515.3, and/or 1515.4 of FIG. 15Q can be implemented as the constellation configuration plans 1515.1, 1515.2, 1515.3, and/or 1515.4 of FIGS. 15B, 15C, and/or 15D, respectively. The example constellation configuration plans 1515.1, 1515.2, 1515.3, and/or 1515.4 of FIG. 15Q can be implemented as the constellation configuration plans 1515.1, 1515.2, 1515.3, and/or 1515.4 of FIG. 15P.

FIG. 15R illustrates another example set of constellation configuration plans 1515.1, 1515.2, 1515.3, and 1515.4, and corresponding coverage level data 1525.1, 1525.2, 1525.3, and 1525.4 that are different from those of FIG. 15Q. In particular, different elevations and different orbital planes are implemented in these constellation configuration plans 1515 of FIG. 15R, inducing different coverage level data 1525. The satellite constellation system 100 described herein can optionally be implemented with a configuration of any of the constellation configuration plans 1515.1, 1515.2, 1515.3, and 1515.4 and/or can transition from 1515.1 to 1515.2, from 1515.2 to 1515.3, and/or from 1515.3 to 1515.4 over time as illustrated in FIG. 15P. Coverage level data 1525.1, 1525.2, 1525.3, and 1525.4 can be denoted as comparing favorably or unfavorably to each of a set of coverage requirement 1518.1-1518.4 in a same fashion as illustrated in FIG. 15Q.

The set of constellation configuration plans 1515.1, 1515.2, 1515.3, and 1515.4 of FIG. 15R can correspond to base-level constellation configuration plans and/or redundant-level constellation configuration plans. In some embodiments, the set of constellation configuration plans 1515.1, 1515.2, 1515.3, and 1515.4 of FIG. 15R can correspond to base-level constellation configuration plans, where additional satellites are added to one or more orbital planes in deployment in accordance with implementing redundant-level constellation configuration plans for these base-level constellation configuration plans.

For example, the constellation configuration plans 1515.1, 1515.2, 1515.3, and/or 1515.4, and corresponding coverage level data 1525.1, 1525.2, 1525.3, and/or 1525.4 of FIG. 15R are included in constellation configuration plan data 1520 of FIG. 15N generated via constellation coverage analysis 1510, for example as another option presented in addition to the constellation configuration plans 1515.1, 1515.2, 1515.3, and/or 1515.4, and corresponding coverage level data 1525.1, 1525.2, 1525.3, and/or 1525.4 of FIG. 15Q. For example, only one of the progressive set of constellation configuration plans 1515.1, 1515.2, 1515.3, and/or 1515.4 of either FIG. 15Q or FIG. 15R is selected for implementing the satellite constellation system 100 over time. Alternatively a different progressive set of constellation configuration plans 1515.1-1515.C is selected for implementing the satellite constellation system 100 over time. Alternatively or in addition, any of the constellation configuration plans 1515.1, 1515.2, 1515.3, and/or 1515.4, of FIG. 15R and any of their corresponding coverage level data 1525.1, 1525.2, 1525.3, and/or 1525.4 of FIG. 15R, are generated in constellation configuration plan data 1520 of FIG. 15E.

In some embodiments, some or all constellation configuration plans 1515.1-1515.4 and/or some or all corresponding coverage level data 1525.1-1525.4 of FIG. 15Q and/or FIG. 15R can optionally be automatically generated by the at least one processing system implementing the constellation coverage analysis 1510. The visual depiction of constellation configuration plans 1515.1-1515.4 and/or corresponding coverage level data 1525.1-1525.4 in a tale format as illustrated in of FIG. 15Q and/or FIG. 15R can be displayed via a display device based on being sent to a corresponding client device for display by the at least one processor, and/or at least one corresponding network interface, that implements the constellation coverage analysis 1510.

FIG. 15S illustrates a method. For example, the method of 15S can be based on the timeline of FIGS. 15O and/or 15P. The method of FIG. 15S can be executed to implement the timeline of FIGS. 15O and/or 15P.

Step 1582 includes providing a first coverage level via a satellite constellation system based on sending a first set of satellites into space for inclusion in the satellite constellation system at an altitude range corresponding to low earth orbit (LEO) in a first set of orbital planes at a first inclination via a first at least one launch from earth in a first timeframe. For example, a first constellation configuration plan 1515.1 is implemented by the satellite constellation system based on performing step 1582. The first coverage level can provide a same or similar level of coverage as illustrated in FIGS. 15F-15G.

Step 1584 includes transitioning from the first coverage level to a second coverage level via the satellite constellation based on sending a second set of satellites into space for inclusion in the satellite constellation system at the altitude range in a second set of orbital planes at a second inclination via a second at least one launch in a second timeframe. For example, a second constellation configuration plan 1515.2 is implemented by the satellite constellation system based on performing step 1584. The second coverage level can be strictly more favorable than the first coverage level. The second coverage level can provide a same or similar level of coverage as illustrated in FIGS. 15H-15I.

Step 1586 includes transitioning from the second coverage level to a third coverage level via the satellite constellation based on sending a third set of satellites for inclusion in the satellite constellation system at the altitude range in a third set of orbital planes at a third inclination via a third at least one launch in a third timeframe. For example, a third constellation configuration plan 1515.3 is implemented by the satellite constellation system based on performing step 1586. The third coverage level can be strictly more favorable than the second coverage level. The third coverage level can provide a same or similar level of coverage as illustrated in FIGS. 15I-15M.

Further steps of transitioning to one or more further enhanced coverage levels can similarly be performed in a similar fashion as step 1584 and/or 1586 to enable transition to further favorable coverage levels by implementing further expanded constellation configuration plans.

In various embodiments, a satellite, such as a satellite 110, orbits in one of a plurality of orbital planes of a satellite constellation system, such as satellite constellation system 100 at an altitude range corresponding to LEO. The satellite includes at least one processor and at least one transmitter. The at least one processor is configured to generate satellite state data, and/or to generate a navigation signal based on the satellite state data. The at least one transmitter is configured to transmit the at least one navigation signal for receipt by at least one client device on earth. The satellite can be further configured to perform additional functionality, such as any other functionality of satellites 110 discussed herein and/or any other functionality facilitated via implementing a satellite processing system 300 as discussed herein.

In various embodiments, each of the plurality of orbital planes includes a corresponding one of a plurality of satellite subsets of a plurality of satellites of the satellite constellation system. Each of the plurality of orbital planes can be within the altitude range. The plurality of orbital planes can include a set of inclined orbital planes at a non-polar inclination, such as an inclination that is different from 90 degrees. For example, each orbital plane in the set of inclined orbital planes can be at a same non-polar inclination. Alternatively, some or all different orbital planes in the set of inclined orbital planes can be at different non-polar inclinations.

In various embodiments, the satellite further includes at least one receiver configured to receive signaling from at least one non-LEO satellite. The satellite can include any other components of a satellite processing system 300, for example as discussed in FIG. 3B.

In various embodiments, the altitude range is between 600 kilometers and 1200 kilometers. In various embodiments, the altitude range is in accordance with a minimum altitude of 800 kilometers and/or a maximum altitude of 1000 kilometers. In various embodiments, the altitude range is in accordance with a minimum altitude of 800 kilometers and/or a maximum altitude of 1200 kilometers. In various embodiments, the altitude range is in accordance with a minimum altitude of 600 kilometers and/or a maximum altitude of 800 kilometers. In various embodiments, the altitude range is approximately 600 kilometers, 800 kilometers, and/or 100 kilometers. The altitude range can be relative to a distance from the earth and/or a distance from the earth's surface.

In various embodiments, the non-polar inclination of the first set of inclined orbital planes corresponds to a 53 degree inclination. In various embodiments, the one of the plurality of orbital planes is included in the set of inclined orbital planes at the at a non-polar inclination.

In various embodiments, the plurality of orbital planes includes a set of polar orbital planes at a polar inclination, such as a 90 degree inclination. In various embodiments, the set of polar orbital planes and the set of inclined orbital planes are mutually exclusive. In various embodiments, the set of polar orbital planes and the set of inclined orbital planes are collectively exhaustive with respect to the plurality of orbital planes of the satellite constellation system. For example, each orbital plane in the plurality of orbital planes is at one of two possible inclinations: the polar inclination, or the non-polar inclination.

In various embodiments, the plurality of satellites includes a plurality of launch-based subsets. An ordering of the plurality of launch-based subsets corresponds to a temporal ordering of a plurality of timeframes in which satellites of the each of the plurality of launch-based subsets are added to the satellite constellation system. For example, satellites from a same launch and/or a same set of consecutive launches are included in a same one of the plurality of launch-based subset. In various embodiments, addition of each of the plurality of launch-based subsets to the satellite constellation system, in accordance with the ordering, facilitates transition of the satellite constellation system from a prior one of an ordered plurality of coverage levels to a next one of the ordered plurality of coverage levels that is more favorable than the prior one of the ordered plurality of coverage levels.

In various embodiments, a first orbital plane subset of the plurality of orbital planes corresponds to a first coverage level facilitated by a plurality of navigation signals transmitted by ones of the plurality of satellites in the first orbital plane subset. The first orbital plane subset can be a proper subset of the plurality of orbital planes, or can include all of the plurality of orbital planes.

In various embodiments, the first orbital plane subset is a subset of the set of inclined orbital planes. The first orbital plan subset can be a proper subset of the set of inclined orbital planes, or can include the full set of inclined orbital planes.

Each orbital plane in the first orbital plane subset can be within the altitude range. Each corresponding one of the plurality of satellite subsets of each orbital plane in the first orbital plane subset can include a first same number of satellites. Alternatively, in other embodiments, different orbital planes in the first orbital plane can optionally include different numbers of satellites.

In various embodiments, the first coverage level is based on a one-in-view population center requirement. For example, the first coverage level is as favorable as and/or is more favorable than the one-in-view population center requirement. In various embodiments, adherence to the one-in-view population center requirement can be facilitated via a distribution of satellites in the orbital planes of the first orbital plane subset based on: the altitude range, the non-polar inclination, a number of orbital planes in the first orbital plane subset, and the first same number of satellites in the orbital planes of the first orbital plane subset. In various embodiments, the one-in-view population center requirement is in accordance with applying a mask at a predefined degree threshold, such as a five degree mask.

In various embodiments, the altitude range, the non-polar inclination, the number of orbital planes in the first orbital plane subset, and/or the first same number of satellites in the orbital planes of the first orbital plane subset were configured and/or selected based on: performing a constellation coverage analysis to generate coverage level data for a plurality of constellation configuration plan options; the coverage level data of a corresponding constellation configuration plan being determined to compare favorably to at least one coverage requirement, such as one or more coverage requirements corresponding to the first coverage level; the constellation configuration plan being determined to have a lowest and/or most otherwise most optimal number of orbital planes, first same number of satellites, and/or total number of satellites of a subset of the plurality of constellation configuration plan options determined to compare favorably to at least one coverage requirement; and/or other optimization and/or analysis techniques.

In various embodiments, the first same number of satellites is equal to nine, and the number of orbital planes in the first orbital plane subset is equal to four. The same first number of satellites can alternatively be equal to any other integer number and/or the number of orbital planes in the first orbital plane subset can be equal to any other integer number.

In various embodiments, the first orbital plane subset includes all of the plurality of the plurality of satellites of the satellite constellation system.

In various embodiments, a second orbital plane subset of the plurality of orbital planes corresponds to a second coverage level facilitated by a plurality of navigation signals transmitted by ones of the plurality of satellites in the second orbital plane subset. The second coverage level is more favorable than the first coverage level. Each orbital plane in the second orbital plane subset is within the altitude range. A first proper subset of the second orbital plane subset is included in the set of inclined orbital planes at the non-polar inclination. A second proper subset of the second orbital plane subset is in accordance with a polar inclination. The first proper subset and the second proper subset are mutually exclusive and collectively exhaustive with respect to the second orbital plane subset. Each corresponding one of the plurality of satellite subsets of each orbital plane in the first proper subset includes a second same number of satellites, and each corresponding one of the plurality of satellite subsets of each orbital plane in the second proper subset includes a third same number of satellites.

In various embodiments, the first orbital plane subset is a proper subset of the second orbital plane subset, and the first proper subset of the second orbital plane subset is the first orbital plane subset.

In various embodiments, the second coverage level is based on a one-in-view global requirement. Adherence to the one-in-view global requirement is facilitated via a distribution of satellites in the orbital planes of the second orbital plane subset based on: the altitude range, a first number of orbital planes in the first proper subset at the non-polar inclination, the second same number of satellites in the orbital planes of the first proper subset, a second number of orbital planes in the second proper subset at the polar inclination, and the third same number of satellites in the orbital planes of the second proper subset. In various embodiments, the one-in-view global requirement is in accordance with applying a five degree mask.

In various embodiments, the second same number of satellites is equal to nine, the first number of orbital planes in the first proper subset is equal to four, the third same number of satellites is equal to ten, and/or the second number of orbital planes in the second proper subset is equal to three.

In various embodiments, the orbital planes of the first orbital plane subset include a first proper subset of the plurality of satellites. The first proper subset of the plurality of satellites added to the satellite constellation system via a first at least one launch in a first timeframe to facilitate a preliminary coverage by the satellite constellation system in the first timeframe that compares favorably to the first coverage level. The preliminary coverage can optionally compare favorably to or unfavorably to the second coverage level.

The orbital planes of a set difference between the first orbital plane subset and the second orbital plane subset include a second proper subset of the plurality of satellites. The second proper subset of the plurality of satellites were added to the satellite constellation system via a second at least one launch in a second timeframe to facilitate an enhanced coverage from the preliminary coverage by the satellite constellation system in the second timeframe that compares favorably to both first coverage level and the second coverage level. A start of the second timeframe is temporally after an elapsing of the first timeframe. The enhanced coverage can be in accordance with a coverage level that is more favorable than a coverage level of the preliminary coverage.

In various embodiments, all orbital planes of the first orbital plane subset are in accordance with the non-polar inclination, and all orbital planes of the set difference are in accordance with the polar inclination.

In various embodiments, a third orbital plane subset of the plurality of orbital planes corresponds to a third coverage level facilitated by a plurality of navigation signals transmitted by ones of the plurality of satellites in the third orbital plane subset. The third coverage level is more favorable than the second coverage level. Each orbital plane in the third orbital plane subset is within the altitude range, where a third proper subset of the third orbital plane subset is included in the set of inclined orbital planes. A fourth proper subset of the third orbital plane subset is in accordance with a polar inclination that is different from the non-polar inclination. The third proper subset and the fourth proper subset are mutually exclusive and collectively exhaustive with respect to the third orbital plane subset. Each corresponding one of the plurality of satellite subsets of each orbital plane in the third proper subset includes a fourth same number of satellites, and wherein each corresponding one of the plurality of satellite subsets of each orbital plane in the fourth proper subset includes a fifth same number of satellites.

In various embodiments, the second orbital plane subset is a proper subset of the third orbital plane subset, and the fourth proper subset of the third orbital plane subset is the second proper subset of the second orbital plane subset.

In various embodiments, the third coverage level is based on a population center full navigation requirement and/or a global full navigation requirement. Adherence to the population center full navigation requirement and/or the global full navigation requirement is facilitated via a distribution of satellites in the orbital planes of the second orbital plane subset based on: the altitude range, a third number of orbital planes in the third proper subset at the non-polar inclination, the fourth same number of satellites in the orbital planes of the first proper subset, a fourth number of orbital planes in fix fourth proper subset at the polar inclination, and the fifth same number of satellites in the orbital planes of the fourth proper subset. In various embodiments, the population center full navigation requirement and/or a global full navigation requirement is in accordance with applying a five degree mask.

In various embodiments, the fourth same number of satellites is equal to eighteen, the third number of orbital planes in the third proper subset is equal to twelve, the fifth same number of satellites is equal to ten, and/or the fourth number of orbital planes in the fourth proper subset is equal to three.

In various embodiments, the orbital planes of the first orbital plane subset include a first proper subset of the plurality of satellites. The first proper subset of the plurality of satellites added to the satellite constellation system via a first at least one launch in a first timeframe to facilitate a preliminary coverage by the satellite constellation system in the first timeframe that compares favorably to the first coverage level and compares unfavorably to the third coverage level. The preliminary coverage can compare favorably or unfavorably to the second coverage level.

In various embodiments, the orbital planes of a first set difference between the first orbital plane subset and the second orbital plane subset include a second proper subset of the plurality of satellites. The second proper subset of the plurality of satellites were added to the satellite constellation system via a second at least one launch in a second timeframe to facilitate an enhanced coverage from the preliminary coverage by the satellite constellation system in the second timeframe that compares favorably to both first coverage level and the second coverage level and compares unfavorably to the third coverage level. A start of the second timeframe is temporally after an elapsing of the first timeframe. The enhanced coverage is strictly more favorable than the preliminary coverage.

In various embodiments, the orbital planes of a second set difference between the first orbital plane subset and the second orbital plane subset include a third proper subset of the plurality of satellites. The third proper subset of the plurality of satellites were added to the satellite constellation system via a third at least one launch in a third timeframe to facilitate a further enhanced coverage from the enhanced coverage by the satellite constellation system in the third timeframe that compares favorably to the first coverage level, the second coverage level, and the third coverage level. A start of the third timeframe is temporally after an elapsing of the second timeframe. The further enhanced coverage is strictly more favorable than the enhanced coverage.

In various embodiments, a client device, such as client device 160, includes at least one receiver and at least one processor. The at least one receiver is configured to receive at least one navigation signal from a subset of a plurality of satellites of a satellite constellation system. At least one satellite in the subset of the plurality of satellites is included in one of a set of launch-based subsets of the plurality of satellites. The at least one satellite transmits a first navigation signal of the at least one navigation signal from one of a plurality of orbital planes of the satellite constellation system at a non-polar inclination and within an altitude range corresponding to low-earth orbit (LEO). The at least one processor is configured generate enhanced position and/or time data based on the at least one navigation signal.

In various embodiments, a number of satellites in the subset of the plurality of satellites is based on a number of launch-based subsets in the set of launch-based subsets and a latitude of the client device on earth.

In various embodiments, at least one other satellites in the subset of the plurality of satellites is included in another one of a set of launch-based subsets based on being launched into space in a different timeframe from the at least one satellite. The at least one other satellite in the subset of the plurality of satellites transmits a second navigation signal of the at least one navigation signal from another one of a plurality of orbital planes of the satellite constellation system at a polar inclination and within an altitude range corresponding to LEO.

In various embodiments, a method, such as the method of FIG. 15S, includes providing a first coverage level via a satellite constellation system based on sending a first set of satellites into space for inclusion in the satellite constellation system at an altitude range corresponding to low earth orbit (LEO) in a first set of orbital planes at a first inclination via a first at least one launch from earth in a first timeframe. The method further includes transitioning from the first coverage level to a second coverage level via the satellite constellation based on sending a second set of satellites into space for inclusion in the satellite constellation system at the in a second set of orbital planes at a second inclination via a second at least one launch from the earth in a second timeframe that is temporally after the first timeframe, wherein the second coverage level is more favorable than the first coverage level. The method further includes transitioning from the second coverage level to a third coverage level via the satellite constellation based on sending a third set of satellites for inclusion in the satellite constellation system at the altitude range in a third set of orbital planes at a third inclination via a third at least one launch from the earth in a third timeframe that is temporally after the second timeframe, wherein the third coverage level is more favorable than the second coverage level.

In various embodiments, a first set intersection between the first set of orbital planes and the second set of orbital planes is null, a second set intersection between the second set of orbital planes and the third set of orbital planes is null, and a third set intersection between the first set of orbital planes and the second set of orbital planes is non-null.

In various embodiments, the first inclination is equal to the third inclination and corresponds to a non-polar inclination, and wherein the second inclination corresponds to a polar inclination.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a non-transitory computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A satellite constellation system comprising:
    a plurality of satellites, wherein each satellite of the plurality of satellites includes at least one processor configured to:
        generate satellite state data; and
        generate a navigation signal based on the satellite state data; and
    at least one transmitter configured to transmit the navigation signal for receipt by at least one client device on earth;
    wherein each satellite is configured to orbit in one of a plurality of orbital planes of the satellite constellation system at an altitude range corresponding to low earth orbit (LEO), wherein each of the plurality of orbital planes includes a corresponding one of a plurality of satellite subsets of a plurality of satellites, wherein each of the plurality of orbital planes is within the altitude range, and wherein the plurality of orbital planes includes a set of inclined orbital planes at a non-polar inclination;
    wherein a first orbital plane subset of the plurality of orbital planes corresponds to a first coverage level facilitated by a plurality of navigation signals transmitted by ones of the plurality of satellites in the first orbital plane subset, wherein the first orbital plane subset is a subset of the set of inclined orbital planes, wherein each orbital plane in the first orbital plane subset is within the altitude range, and wherein each corresponding one of the plurality of satellite subsets of each orbital plane in the first orbital plane subset includes a first same number of satellites; and
    wherein a second orbital plane subset of the plurality of orbital planes corresponds to a second coverage level facilitated by a plurality of navigation signals transmitted by ones of the plurality of satellites in the second orbital plane subset, wherein the second coverage level is more favorable than the first coverage level, wherein each orbital plane in the second orbital plane subset is within the altitude range, wherein a first proper subset of the second orbital plane subset is included in the set of inclined orbital planes at the non-polar inclination, wherein a second proper subset of the second orbital plane subset is in accordance with a polar inclination, wherein the first proper subset and the second proper subset are mutually exclusive and collectively exhaustive with respect to the second orbital plane subset, wherein each corresponding one of the plurality of satellite subsets of each orbital plane in the first proper subset includes a second same number of satellites, and wherein each corresponding one of the plurality of satellite subsets of each orbital plane in the second proper subset includes a third same number of satellites.

2. The satellite constellation system of claim 1, wherein the altitude range is in accordance with a minimum altitude of 800 kilometers and a maximum altitude of 1000 kilometers.

3. The satellite constellation system of claim 1, wherein the non-polar inclination of the set of inclined orbital planes corresponds to a 53 degree inclination, and wherein the one of the plurality of orbital planes is included in the set of inclined orbital planes.

4. The satellite constellation system of claim 1, wherein the plurality of orbital planes includes a set of polar orbital planes at a 90 degree inclination, and wherein the set of polar orbital planes and the set of inclined orbital planes are mutually exclusive.

5. The satellite constellation system of claim 4, wherein the set of polar orbital planes and the set of inclined orbital planes are collectively exhaustive with respect to the plurality of orbital planes of the satellite constellation system.

6. The satellite constellation system of claim 1, wherein the plurality of satellites includes a plurality of launch-based subsets, wherein an ordering of the plurality of launch-based subsets corresponds to a temporal ordering of a plurality of timeframes in which satellites of the each of the plurality of launch-based subsets are added to the satellite constellation system, and wherein addition of each of the plurality of launch-based subsets in accordance with the ordering facilitates transition of the satellite constellation system from a prior one of an ordered plurality of coverage levels to a next one of the ordered plurality of coverage levels that is more favorable than the prior one of the ordered plurality of coverage levels.

7. The satellite constellation system of claim 1, wherein the first coverage level is based on a one-in-view population center requirement, and wherein adherence to the one-in-view population center requirement is facilitated via a distribution of satellites in the orbital planes of the first orbital plane subset based on: the altitude range, the non-polar inclination, a number of orbital planes in the first orbital plane subset, and the first same number of satellites in the orbital planes of the first orbital plane subset.

8. The satellite constellation system of claim 7, wherein the first same number of satellites is equal to nine, and wherein the number of orbital planes in the first orbital plane subset is equal to four.

9. The satellite constellation system of claim 1, wherein the second coverage level is based on a one-in-view global requirement, and wherein adherence to the one-in-view global requirement is facilitated via a distribution of satellites in the orbital planes of the second orbital plane subset based on: the altitude range, a first number of orbital planes in the first proper subset at the non-polar inclination, the second same number of satellites in the orbital planes of the first proper subset, a second number of orbital planes in the second proper subset at the polar inclination, and the third same number of satellites in the orbital planes of the second proper subset.

10. The satellite constellation system of claim 9, wherein the second same number of satellites is equal to nine, wherein the first number of orbital planes in the first proper subset is equal to four, wherein the third same number of satellites is equal to ten, and wherein the second number of orbital planes in the second proper subset is equal to three.

11. The satellite constellation system of claim 1, wherein a third orbital plane subset of the plurality of orbital planes corresponds to a third coverage level facilitated by a plurality of navigation signals transmitted by ones of the plurality of satellites in the third orbital plane subset, wherein the third coverage level is more favorable than the second coverage level, wherein each orbital plane in the third orbital plane subset is within the altitude range, wherein a third proper subset of the third orbital plane subset is included in the set of inclined orbital planes, wherein a fourth proper subset of the third orbital plane subset is in accordance with a polar inclination that is different from the non-polar inclination, wherein the third proper subset and the fourth proper subset are mutually exclusive and collectively exhaustive with respect to the third orbital plane subset, wherein each corresponding one of the plurality of satellite subsets of each orbital plane in the third proper subset includes a fourth same number of satellites, and wherein each corresponding one of the plurality of satellite subsets of each orbital plane in the fourth proper subset includes a fifth same number of satellites.

12. The satellite constellation system of claim 11, wherein the third coverage level is based on at least one of: a population center full navigation requirement, or a global full navigation requirement, and wherein adherence to the at least one of: the population center full navigation requirement, or the global full navigation requirement, is facilitated via a distribution of satellites in the orbital planes of the third orbital plane subset based on: the altitude range, a third number of orbital planes in the third proper subset at the non-polar inclination, the fourth same number of satellites in the orbital planes of the first proper subset, a fourth number of orbital planes in the fourth proper subset at the polar inclination, and the fifth same number of satellites in the orbital planes of the fourth proper subset.

13. The satellite constellation system of claim 12, wherein the fourth same number of satellites is equal to eighteen, wherein the third number of orbital planes in the third proper subset is equal to twelve, wherein the fifth same number of satellites is equal to ten, and wherein the fourth number of orbital planes in the fourth proper subset is equal to three.

14. The satellite constellation system of claim 11, wherein the orbital planes of the first orbital plane subset include a first proper subset of the plurality of satellites, wherein the first proper subset of the plurality of satellites added to the satellite constellation system via a first at least one launch in a first timeframe to facilitate a preliminary coverage by the satellite constellation system in the first timeframe that compares favorably to the first coverage level and compares unfavorably to the third coverage level;

wherein the orbital planes of a first set difference between the first orbital plane subset and the second orbital plane subset include a second proper subset of the plurality of satellites, wherein the second proper subset of the plurality of satellites were added to the satellite constellation system via a second at least one launch in a second timeframe to facilitate an enhanced coverage from the preliminary coverage by the satellite constellation system in the second timeframe that compares favorably to both first coverage level and the second coverage level and compares unfavorably to the third coverage level, and wherein a start of the second timeframe is temporally after an elapsing of the first timeframe;

wherein the orbital planes of a second set difference between the first orbital plane subset and the second orbital plane subset include a third proper subset of the plurality of satellites, wherein the third proper subset of the plurality of satellites were added to the satellite constellation system via a third at least one launch in a third timeframe to facilitate a further enhanced coverage from the enhanced coverage by the satellite constellation system in the third timeframe that compares favorably to the first coverage level, the second coverage level, and the third coverage level, and wherein a start of the third timeframe is temporally after an elapsing of the second timeframe.

15. A method comprising:
providing a plurality of satellites of a satellite constellation system, wherein each satellite of the plurality of satellites includes at least one processor configured to:
generate satellite state data; and
generate a navigation signal based on the satellite state data; and
at least one transmitter configured to transmit the navigation signal for receipt by at least one client device on earth;
wherein each satellite is configured to orbit in one of a plurality of orbital planes of the satellite constellation system at an altitude range corresponding to low earth orbit (LEO), wherein each of the plurality of orbital planes includes a corresponding one of a plurality of satellite subsets of a plurality of satellites, wherein each of the plurality of orbital planes is within the altitude range, and wherein the plurality of orbital planes includes a set of inclined orbital planes at a non-polar inclination;
wherein a first orbital plane subset of the plurality of orbital planes corresponds to a first coverage level facilitated by a plurality of navigation signals transmitted by ones of the plurality of satellites in the first orbital plane subset, wherein the first orbital plane subset is a subset of the set of inclined orbital planes, wherein each orbital plane in the first orbital plane subset is within the altitude range, and wherein each corresponding one of the plurality of satellite subsets of each orbital plane in the first orbital plane subset includes a first same number of satellites; and
wherein a second orbital plane subset of the plurality of orbital planes corresponds to a second coverage level facilitated by a plurality of navigation signals transmitted by ones of the plurality of satellites in the second orbital plane subset, wherein the second coverage level is more favorable than the first coverage level, wherein each orbital plane in the second orbital plane subset is within the altitude range, wherein a first proper subset of the second orbital plane subset is included in the set of inclined orbital planes at the non-polar inclination, wherein a second proper subset of the second orbital plane subset is in accordance with a polar inclination, wherein the first proper subset and the second proper subset are mutually exclusive and collectively exhaustive with respect to the second orbital plane subset, wherein each corresponding one of the plurality of satellite subsets of each orbital plane in the first proper subset includes a second same number of satellites, and wherein each corresponding one of the plurality of satellite subsets of each orbital plane in the second proper subset includes a third same number of satellites.

16. The method of claim 15, wherein the plurality of orbital planes includes a set of polar orbital planes at a 90 degree inclination, and wherein the set of polar orbital planes and the set of inclined orbital planes are mutually exclusive.

17. The method of claim 16, wherein the set of polar orbital planes and the set of inclined orbital planes are collectively exhaustive with respect to the plurality of orbital planes of the satellite constellation system.

18. The method of claim 15, wherein the plurality of satellites includes a plurality of launch-based subsets, wherein an ordering of the plurality of launch-based subsets corresponds to a temporal ordering of a plurality of timeframes in which satellites of the each of the plurality of launch-based subsets are added to the satellite constellation system, and wherein addition of each of the plurality of launch-based subsets in accordance with the ordering facilitates transition of the satellite constellation system from a prior one of an ordered plurality of coverage levels to a next one of the ordered plurality of coverage levels that is more favorable than the prior one of the ordered plurality of coverage levels.

19. The method of claim 15, wherein the first coverage level is based on a one-in-view population center requirement, and wherein adherence to the one-in-view population center requirement is facilitated via a distribution of satellites in the orbital planes of the first orbital plane subset based on: the altitude range, the non-polar inclination, a number of orbital planes in the first orbital plane subset, and the first same number of satellites in the orbital planes of the first orbital plane subset.

20. The method of claim 15, wherein a third orbital plane subset of the plurality of orbital planes corresponds to a third coverage level facilitated by a plurality of navigation signals transmitted by ones of the plurality of satellites in the third orbital plane subset, wherein the third coverage level is more favorable than the second coverage level, wherein each orbital plane in the third orbital plane subset is within the altitude range, wherein a third proper subset of the third orbital plane subset is included in the set of inclined orbital planes, wherein a fourth proper subset of the third orbital plane subset is in accordance with a polar inclination that is different from the non-polar inclination, wherein the third proper subset and the fourth proper subset are mutually exclusive and collectively exhaustive with respect to the third orbital plane subset, wherein each corresponding one of the plurality of satellite subsets of each orbital plane in the third proper subset includes a fourth same number of satellites, and wherein each corresponding one of the plurality of satellite subsets of each orbital plane in the fourth proper subset includes a fifth same number of satellites.

* * * * *